(12) United States Patent
Miyashita et al.

(10) Patent No.: US 6,411,148 B1
(45) Date of Patent: Jun. 25, 2002

(54) TELEMETERING APPARATUS

(75) Inventors: Tokio Miyashita; Toshihiko Kotaka; Tokuo Nakamura; Hironobu Uehara, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/418,508

(22) Filed: Oct. 15, 1999

Related U.S. Application Data

(62) Division of application No. 08/882,378, filed on Jun. 25, 1997, now Pat. No. 6,049,234.

(30) Foreign Application Priority Data

Jun. 26, 1996 (JP) .............................. 8-184284

(51) Int. Cl.[7] .............................................. H03K 3/033
(52) U.S. Cl. ........................................................ 327/227
(58) Field of Search ................................. 327/227, 228, 327/230

(56) References Cited

U.S. PATENT DOCUMENTS

| | | | | |
|---|---|---|---|---|
| 3,633,048 A | | 1/1972 | Kleinberg | 307/273 |
| 3,649,852 A | | 3/1972 | Bohley | 307/289 |
| 4,409,497 A | | 10/1983 | Nagano | 307/360 |
| 4,667,118 A | * | 5/1987 | Maruta | 327/227 |
| 4,736,118 A | * | 4/1988 | Fischer | 327/131 |
| 4,791,315 A | | 12/1988 | Gontowski, Jr. | 307/291 |
| 4,811,389 A | | 3/1989 | Balch | 379/377 |
| 4,999,527 A | | 3/1991 | Gontowski | 307/273 |
| 5,469,100 A | * | 11/1995 | Wuidart et al. | 327/227 |
| 5,793,237 A | * | 8/1998 | Martin | 327/227 |
| 5,841,306 A | * | 11/1998 | Lim | 327/228 |

FOREIGN PATENT DOCUMENTS

| | | | |
|---|---|---|---|
| EP | 0 661 865 | 7/1995 | .......... H04M/19/04 |
| JP | 59-094959 | 5/1984 | |
| JP | 59-122159 A | 7/1984 | ............ H04M/1/00 |
| JP | 05-344231 | 12/1993 | |
| JP | 6-237307 A | 8/1994 | .......... H04M/11/00 |
| JP | 06-350741 | 12/1994 | |

* cited by examiner

Primary Examiner—Toan Tran
(74) Attorney, Agent, or Firm—Venable; Robert J. Frank; Jeffrey W. Gluck

(57) ABSTRACT

The object of the present invention is to provide the telemetering apparatus, which telemeters electric power, gas, and waterworks, for telemetering via a telephone network with an exchange, wherein the telemetering apparatus responds to the normal polarity inversion, the slow polarity inversion, and calling bell signal applied to the communication line therebetween upon starting or releasing of use of the communication line. To attain the above object, the telemetering appears according to the present invention comprises detection means for detecting a rising edge or falling edge of those polarity inversions and signal characterized thereby with reference to the respective predetermined voltage and the respective predetermined period, thus distinguishing one of these polarity inversions and signal from the others.

15 Claims, 69 Drawing Sheets

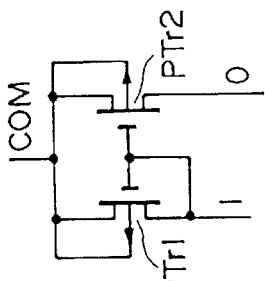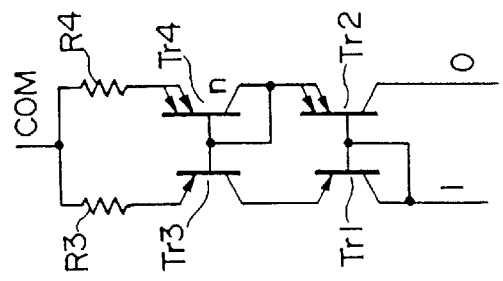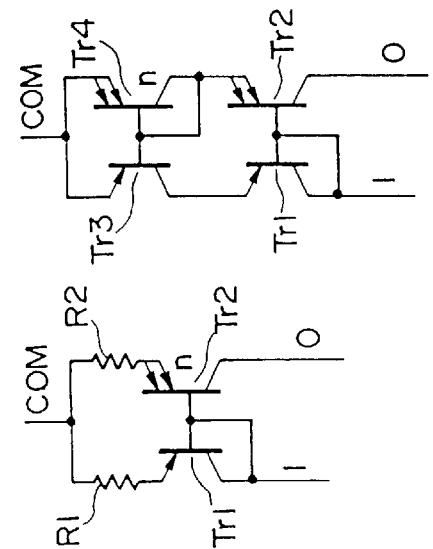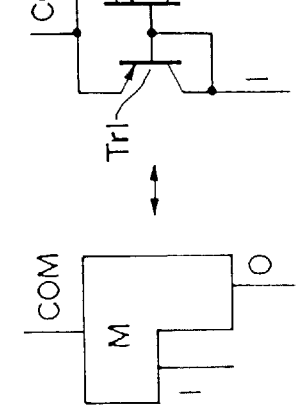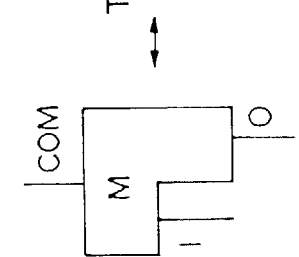
Fig.4(a) Fig.4(b) Fig.4(c) Fig.4(d) Fig.4(e) Fig.4(f)

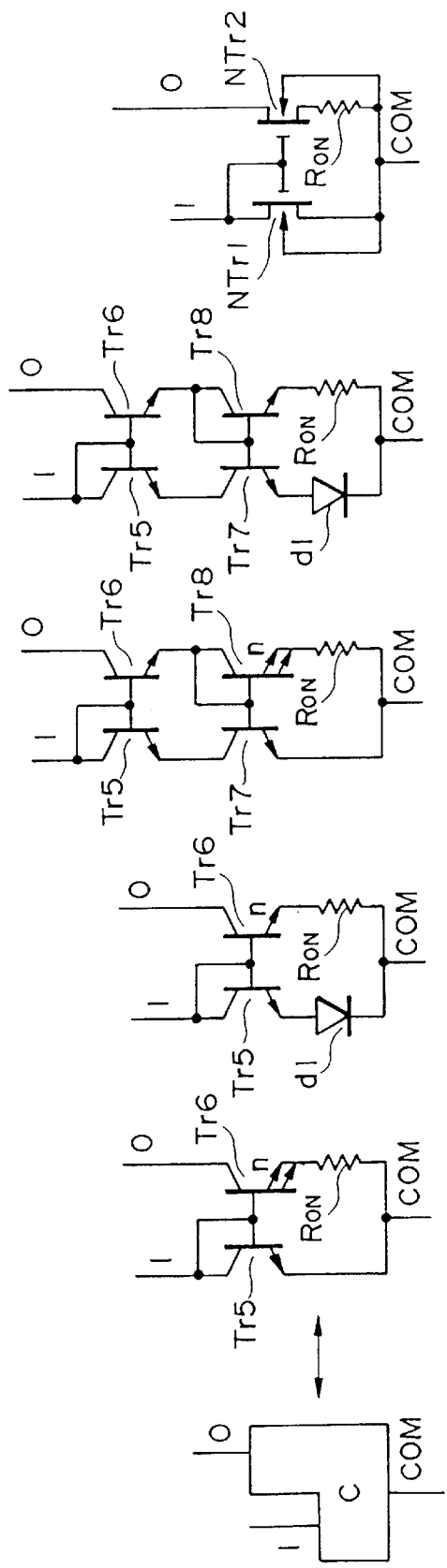

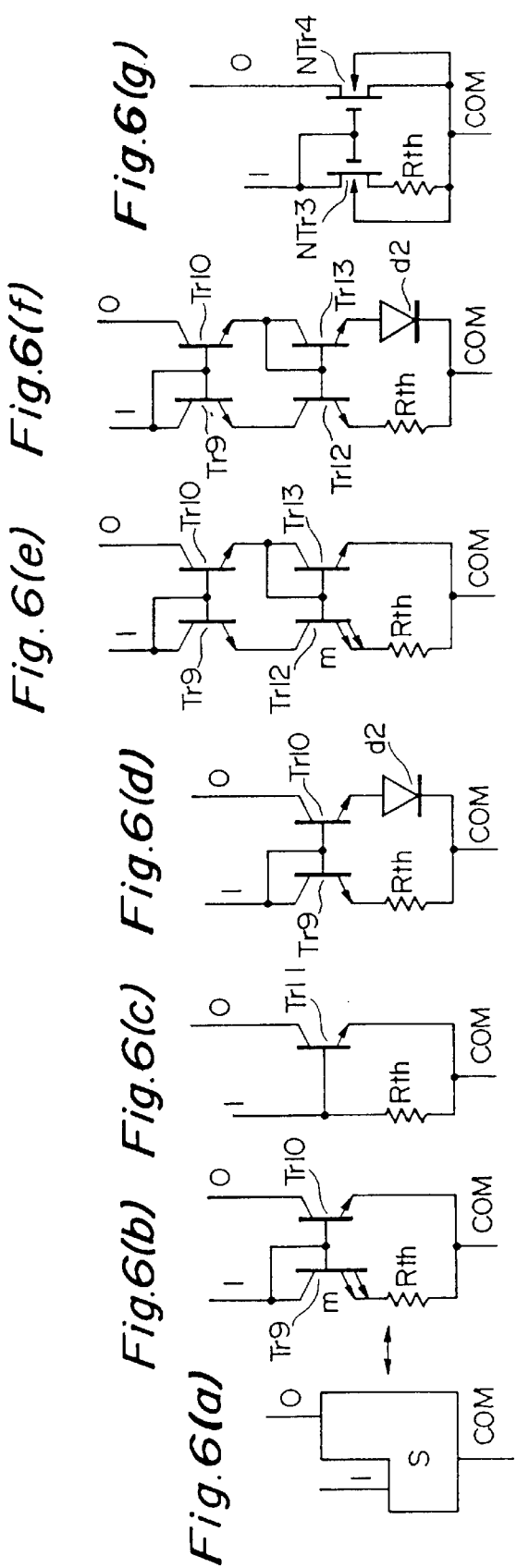

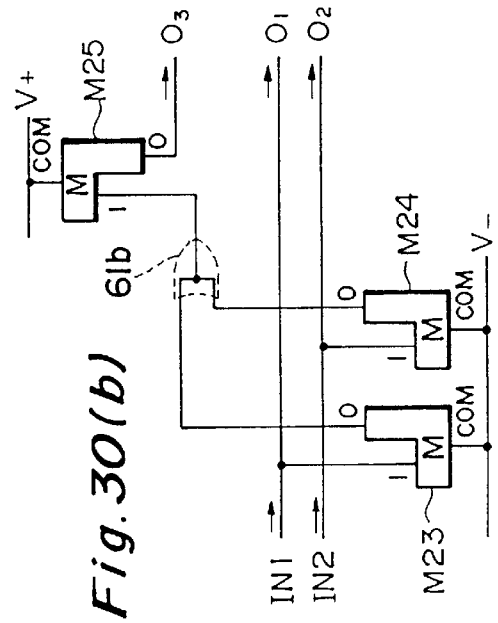
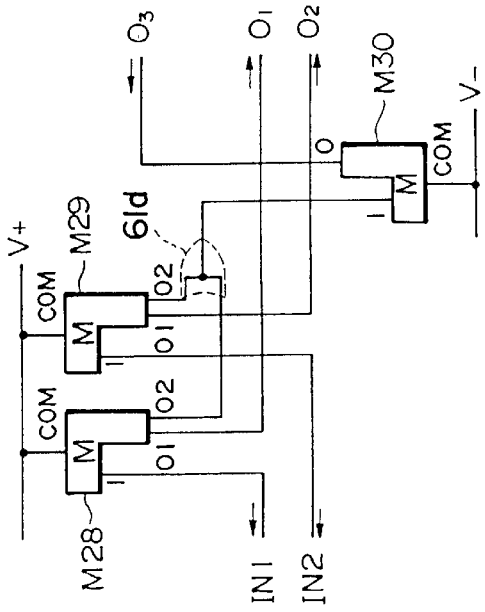
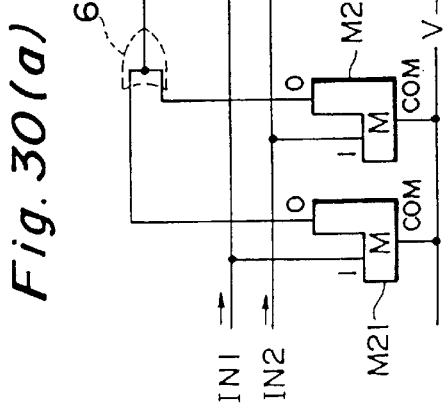
Fig.30(a) Fig.30(b) Fig.30(c) Fig.30(d)

Fig. 67

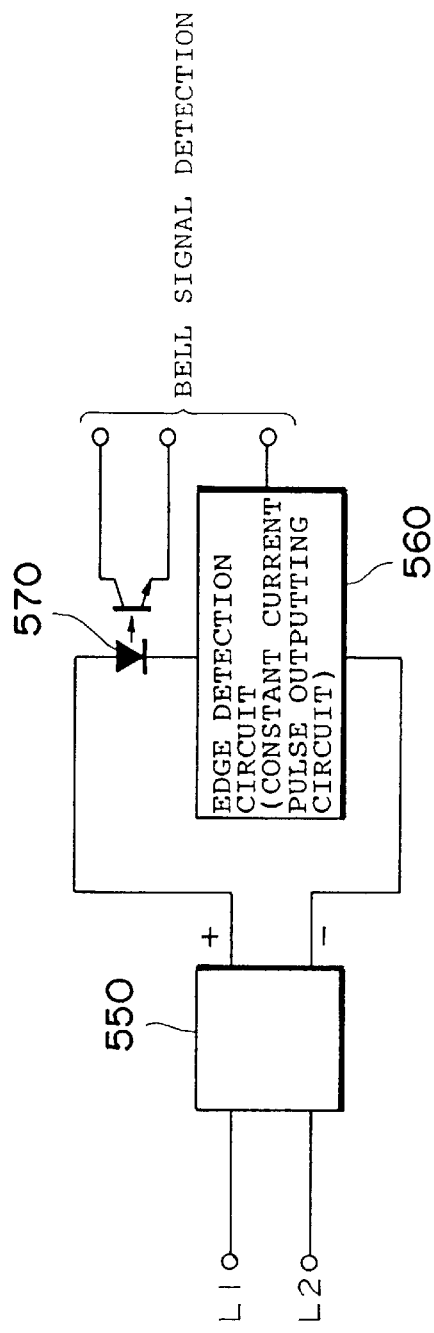
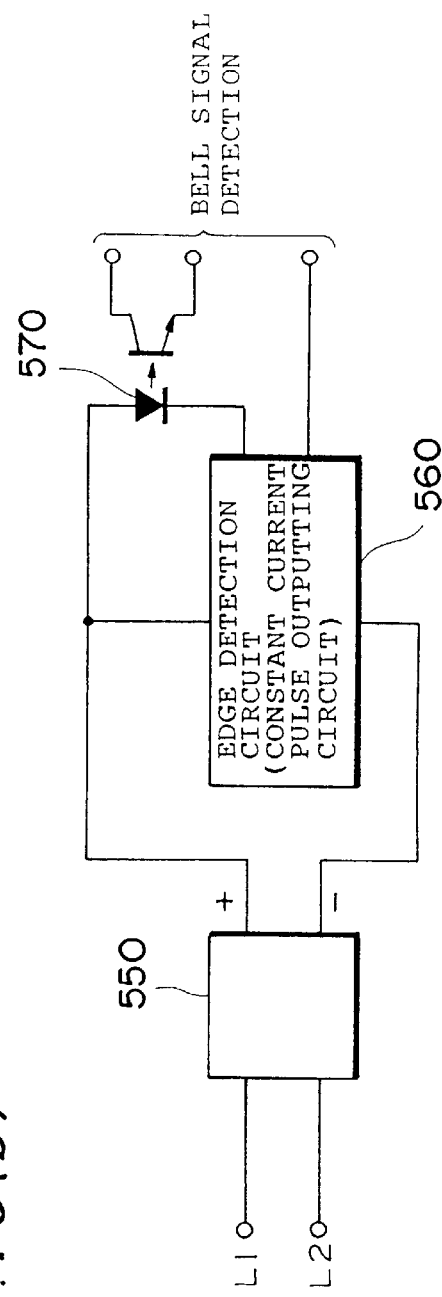
Fig.70(a)
Fig.70(b)

TELEMETERING APPARATUS

CROSS-REFERENCE TO RELATED APPLICATION

This is a division of application Ser. No. 08/882,378, filed Jun. 25, 1997 (now U.S. Pat. No. 6,049,234, issued Apr. 11, 2000).

BACKGROUND OF THE INVENTION

The present invention relates to the subscriber terminal system which includes a telephone and telemetering apparatuses. More specifically, it relates to the telemetering apparatuses which detect the signals sent from the exchange upon starting and stopping of use of the communication line between the exchange and the subscriber.

Conventionally, there have been used the telephone network, where the exchange provides with power supply to activate the telephone in house via the communication line, When an origination subscriber call up a destination subscriber, the exchange inverts the polarity of the voltage applied to the communication line between the exchange and the destination subscriber in order to notify to the destination subscriber the starting and stopping of use of the communication line therebetween.

Also, there have been the telemetering system via telephone network to easily gather information periodically. FIG. 75 is a diagram showing the telemetering system, and FIG. 76 is a block diagram showing the telemetering apparatus. In the telemetering system, for example, the electric power company, the waterworks company, and the gas company each telemeter electric power, water, and gas used in home via telephone network. In each house are installed the power telemetering apparatus, the water telemetering apparatus, and the gas telemetering apparatus corresponding to the respective companies. When one of the companies starts or stop use of the communication line for telemetering, the exchange inverts the voltage polarity of the power supply applied to the communication line between the exchange and the destination consumer. In order to distinguish a use of telemetering apparatus and a use of telephone from each other, the forms of those polarity inversions are different from each other. As the result, the telemetering apparatuses have the polarity inversion detection circuit for detecting the polarity inversion, the bell signal detection circuit for detecting the bell signal, and the controlling circuit for controlling the detection circuits and gathering data on electric power, water, and gas from the power meter, the water meter, and the gas meter.

FIG. 77 is a time chart showing wave shapes, in which FIG. 77(a) illustrates the wave shape of the polarity inversion of telephone (normal polarity inversion); FIG. 77(b) illustrates the wave shape of the polarity inversion of telemetering (slow polarity inversion); and FIG. 77(c) illustrates the wave shape of the calling bell signal. The wave shape of the bell follows only the normal voltage polarity inversion in calling the destination subscriber for telephone conversation, not following the slow voltage polarity inversion. Upon starting or stopping of use of the communication line, the telemetering apparatus tries to detect the normal polarity inversion and the calling bell signal, or the slow polarity inversion. If both of a polarity inversion and a calling bell signal are found, the telemetering apparatus does not start telemetering but the telephone does works. On the contrary, if a polarity inversion is found, but no calling bell signal is found, the telemetering apparatus starts telemetering. In summary, the conventional telemetering apparatus did not detect a slow polarity inversion owing to its technical difficulty: there has been provided no electric power during the period between the end of the first half of the slow polarity inversion and the start of the second half thereof because the applied voltage keeps ground level during the period. With respect to the above system and apparatus, there is such a document as Japanese Laid Open HEI 6-237307.

FIG. 2 illustrates a conventional polarity inversion detection circuit. The polarity inversion detection circuit has a rectifier 1 connected to a pair of communication lines L1 and L2. Moreover, the communication line L1 connects to an array of diodes 2 that are connected in series, a Zener diode 3 connected to the array of diodes in parallel, an emitter resistor 4, two transistors Darlington-connected between the resistor 4 and an output terminal of the array of diodes 2, and a polarity inversion detection amplification circuit 9 which includes a diode 7 and a resistor 8, both of which are connected in series to the collector of a transistor 6, the collector being located at the output side of the transistors 5 and 6. The communication line L2 connects to a polarity inversion detection amplification circuit 10 having the same configuration as that of polarity inversion detection amplification circuit 9. Between the output terminal of the array of the diodes 2 in the polarity inversion detection amplification circuit 9 and the output terminal of the array of the diodes in the polarity inversion detection amplification circuit 10, a Zener diode 11, a resistor 12, a capacitor 13, a resistor 14 and a Zener diode 15 are connected in series in this described order.

Between a positive electrode output terminal 1a and a negative electrode output terminal 1b of the rectifier 1, two holding circuits 16 and 17, which operate on an output from the rectifier 1, are connected in parallel. Between both of the holding circuits 16 and 17 and the negative electrode output terminal 1b, reset circuits 18 and 19 both. of which halt the operation of holding by the holding circuits 16 and 17 respectively are connected.

Upon starting and releasing use of the communication lines L1 and L2, the exchange inverts the polarity of voltage applied thereto so as to notify the telemetering apparatus of the starting and releasing. When the polarity inversion on the communication lines L1 and L2 starts and-when thereby the voltage between the communication lines L1 and L2 varies, either Zener diode 11 or Zener diode 12 detects the change to turn into a current passing state, and thus a polarity inversion detection trigger current flows in accordance with charging and discharging on the capacitor 13. The polarity inversion detection amplification circuit 9 or the polarity inversion detection amplification circuit 10 amplifies a trigger current via the array of the diodes 2, the Zener diodes 11 and 15, the resistor 12 and 14 in the polarity inversion detection amplification circuit 9 or in the polarity inversion detection amplification circuit 10. The holding circuit 16 or the holding circuit 17 holds polarity inversion information with an amplified trigger current, outputted from the polarity inversion detection amplification circuit 9 or from the polarity inversion detection amplification circuit 10, as a trigger. Also, they output the polarity inversion information to the controlling circuit using a externally attached circuit such a photo coupler. At the point of time when it is not necessary to hold the polarity inversion information, a reset signal is given from the controlling circuit so that the held information in the holding circuits 16 and 17 are cleared. Thus, they return to be in a stand-by state.

In the manner as described above, since the polarity inversion information on the communication lines L1 and L2 is obtained, conventional telemetering apparatus detects a polarity inversion using, for example, the polarity inversion detection circuit such as shown in FIG. 2. Finally, the controlling circuit determines which of telemetering or telephone the purpose of using the communication line is oriented to, which depends on a bell signal which will follow the normal polarity inversion and will not follow the slow polarity inversion.

For detection of bell signal, conventional bell signal detection circuits experience logic OR of two polarity inversion information indicating either a starting or a releasing which is generated by the Zener diodes 11 and 15 shown in FIG. 2, the resistors 12 and 14, the capacitor 13 and the polarity inversion detection amplification circuits 9 and 10, whereby, they obtain a stream of pulses like impulses and detect a bell signal based on the stream.

However, there have been the following problems (1)–(6) in the conventional polarity inversion detection circuit.

(1) Is is not possible to integrate the polarity inversion circuit in form of monolithic IC (Integrated Circuit). Because the capacitor 13, which charges and discharges for differentiation operation to generate a trigger current, requires several hundreds nF (nano farad) of capacity.

(2) Generally, the trigger the value of the trigger current depends upon the speed of the polarity inversion, or dV/dt. Accordingly, regarding high dV/dt as a proper value makes low dV/dt malfunction, while regarding low dv/dt as a proper value deteriorates the noise-proof characteristic.

(3) Some noises added on the communication lines L1 and L2 increase the voltage difference between the communication line L1 and L2 during standby to thereby cause the trigger current to flow, which causes the holding circuits 16 and 17 to malfunction as if detecting a bell signal. Returning to the standby state from such a detection state through judgment of the malfunction requires a specified period; if some noises bring a malfunction, the communication lines are not available in the period.

(4) The amount of generated trigger current changes according to the speed of the polarity inversion. Also, the amount of on-current flowing through the holding circuits 16 and 17 and the amount of ON/OFF threshold current each changes depending on the surrounding temperature. The mount of trigger current, the amount of the on-current, and the amount of ON/OFF threshold current each vary due to the respective causes. Consequently, avoiding any malfunctions requires a large margin among those currents, which obstructs realizing of low dissipation power circuit.

(5) The conventional polarity inversion detection circuit has two independent holding circuits comprising the holding circuits 16 and 17 to work in turn, which has a possibility of bringing some malfunction such as simultaneous operation.

(6) The conventional polarity inversion detection circuit has two independent holding circuits, which require the respective photo-couplers. This poses a such problem as increase in number of the parts including the above capacitor 13 employed outside.

In addition, there have been the following problems (7) and (8) in the conventional bell signal detection circuit.

(7) It is difficult to judge which of the telemetering and the telephone the purpose of using the communication line is directed to by detection of the normal polarity inversion and the slow polarity inversion.

(8) The pulse like a impulse generated upon detection of an unexpected single polarity inversion, which is not one of the normal polarity inversions for the telephone should be canceled. Because such a pulse serves to bring some malfunctions.

(9) Since the stream of pulses representing correct detection of the bell signal appears like a stream of pulses like impulses, which is hard to be processed in the other circuits.

SUMMARY OF THE INVENTION

The object of the present invention is to provide the telemetering apparatus which distinguishes the normal polarity inversion, the slow polarity inversion, and the calling bell signal applied to the communication line between the telemetering apparatus and the exchange in the telephone network.

According to one aspect of the present invention, the telemetering apparatus comprises edge detection means for detecting one of a rising edge and a falling edge characterized by each of the signals from the exchange based on predetermined levels of the edges and predetermined periods of the edges.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates linear current mirror circuits;

FIG. 5 illustrates a non-linear current amplifier ( a constant-current source typed current amplifier);

FIG. 6 illustrates a non-linear current amplifier (a switch typed current amplifier);

FIG. 30 illustrates an example configuration of the interface circuit 61 shown in FIG. 28;

FIG. 67 illustrates a bell signal detection circuit which is a modification example of the circuit shown in FIG. 66;

FIG. 70 illustrates a bell signal detection circuit of a twelfth embodiment according to the present invention;

DESCRIPTION OF THE PREFERRED EMBODIMENTS

Preferred embodiments of the present invention will be described in detail in accordance with accompanying drawings.

The preferred embodiments of the telemetering apparatuses are principally classified into three arts: detection of the normal polarity inversion, detection of the slow polarity inversion, detection of the bell signal. For detection of the normal polarity inversion, there are a edge detection circuit, a state holding circuit, and a polarity inversion detection circuit, which constitutes a normal polarity inversion circuit. For detection of the slow polarity inversion, in addition to those circuits, there are a polarity inversion detection circuit and a monostable multivibrator, which constitutes a telemetering apparatus to work in response to the slow polarity inversion. For detection of the bell signal, there is a bell signal detection circuit. As an application of detecting the edge, there is a high voltage detection circuit.

Figure 38A:
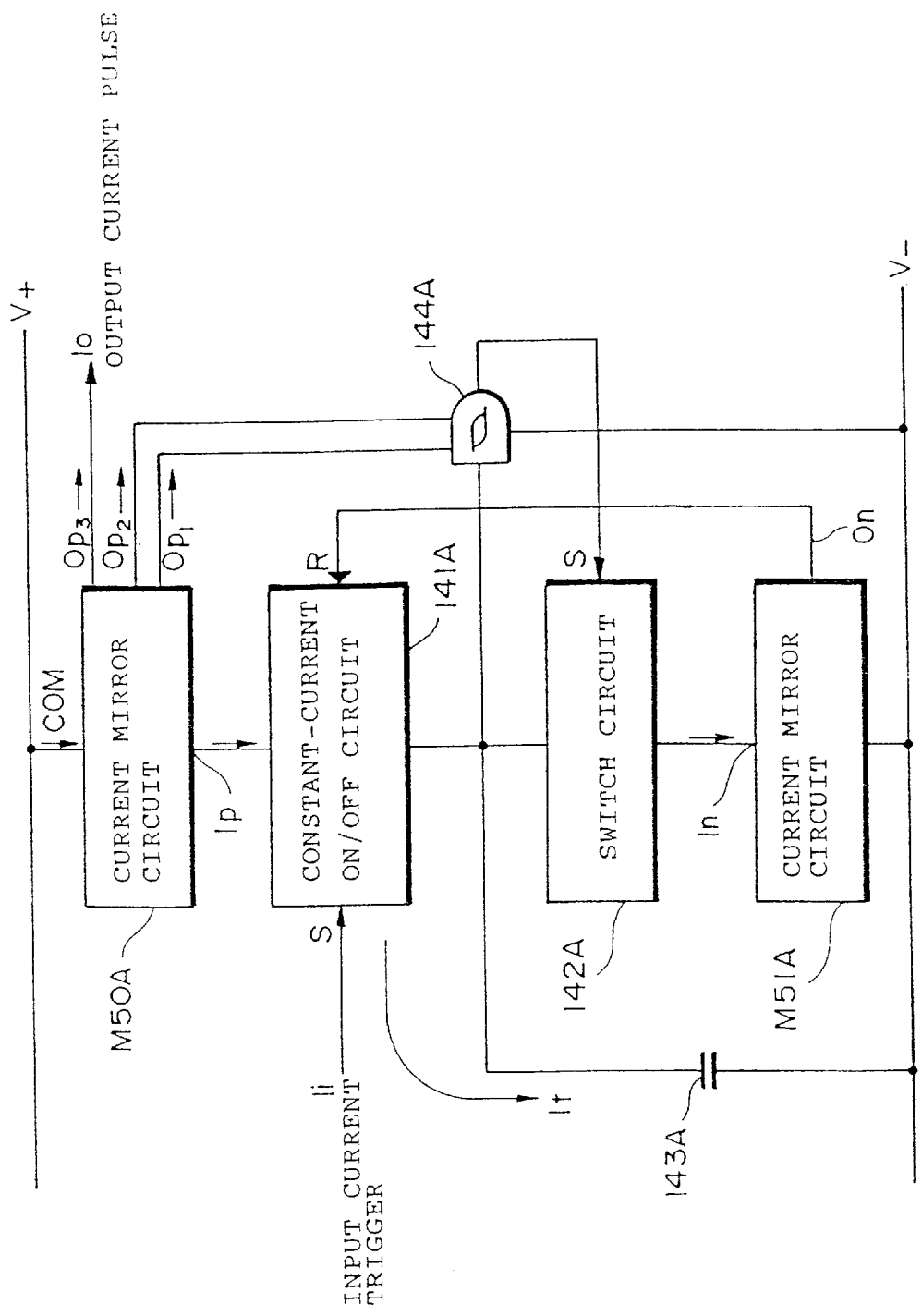
FIG. 38(a) shows a configuration of a first constant-current ON/OFF typed monostable multivibrator.

The edge detection circuit will be principally described with reference to FIGS. 3,8, and 9;

the state holding circuit will be principally described with reference to FIG. 14;

the polarity inversion detection circuit will be principally described with reference to FIG. 1;

The slow polarity inversion detection circuit will be principally described with reference to FIGS. 33 and 42;

the monostable multivibrator will be principally described with reference to FIGS. 38 and 41;

the bell signal detection circuit will be principally described with reference to FIGS. 52 and 64; and the high voltage detection circuit will be principally described with reference to FIG. 70.

<<First Embodiment>>

Figure 1:
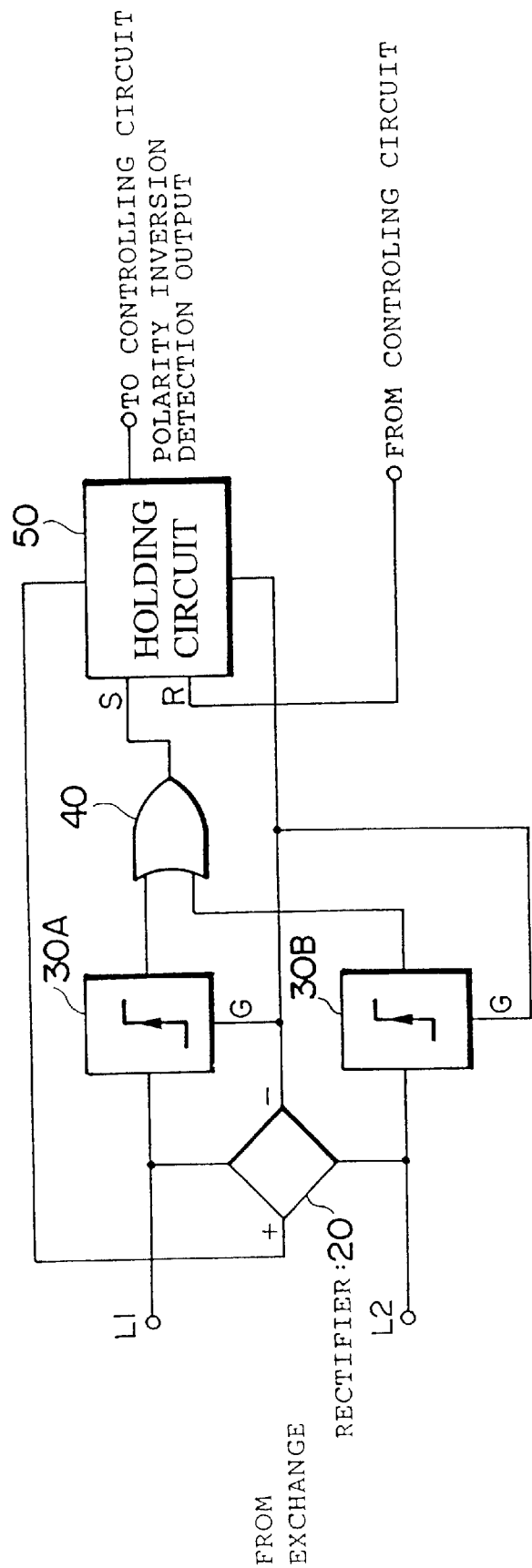
FIG. 1 illustrates a polarity inversion detection circuit of a first embodiment according to the present invention.

FIG. 1 is a figure illustrating a polarity inversion detection circuit of the first embodiment according to the present invention. The polarity inversion detection circuit is provided in a telemetering apparatus to detect polarity inversions representing a starting or a releasing use of communication line, which are performed by the exchange via the communication line.

The polarity inversion detection circuit has a full-wave rectifier 20 connected between the communication lines L1 and L2, a first edge detection circuit 30A connected between a negative electrode terminal (−) of the full-wave rectifier 20 and the line L1, and a second edge detection circuit 30B connected between the negative electrode terminal (−) of the full-wave rectifier 20 and the line L2. The output sides of the edge detection circuits 30A and 30B are connected to input terminals of a OR circuit 40 respectively. The OR circuit 40 is, for example, a wired OR to process output signals of the edge detection circuits 30A and 30B. Between the positive electrode terminal and negative electrode terminal of the full-wave rectifier 20, moreover, a constant-current on/off typed holding circuit 50 is connected. The constant-current on/off typed holding circuit 50 has a set input terminal S and a reset input terminal R. The output signal of the OR circuit 40 and a reset signal from the controlling circuit are provided to the set input terminal S and the reset input terminal R respectively. The constant-current on/off holding circuit 50 outputs the result of the polarity inversion detection. The structure and the function [I] and the operation [II] of each circuit in the polarity inversion detection circuit shown in FIG. 1 will be separately described below. Further, the effect of the polarity inversion detection circuit shown in FIG. 1 will be described at the following section [III].

[I] The Structure and the Function of Each Circuit in the Polarity Inversion Detection Circuit Shown in FIG. 1

Both the structure and the function of the full-wave rectifier 20 in the polarity inversion detection circuit shown in FIG. 1 will be described in the following section [I] (1). Also, both the structure and the function of the edge detection circuit 30A and 30B will be described in the following section [I] (2). Further, both the structure and the function of the constant-current on/off typed holding circuit 50 will be described in the following section [I] (3).

[I] (1) Full-wave Rectifier 20

The full-wave rectifier 20 performs full-wave rectification on the currents flowing on the communication lines L1 and L2 to output a voltage in a fixed polarity. The full-wave rectifier 20, for example, is made from diodes which is one of the semiconductor rectifying devices which are embedded on four sides of a bridge respectively. The opposing two corners of the bridge are connected to the communication lines L1 and L2 respectively, and the other opposing two corners are the positive electrode terminal (+) and the negative electrode terminal (−) respectively.

[I] (2) Edge Detection Circuit 30A and 30B

Each of the edge detection circuit 30A and 30B detects the releasing signal or the starting signal via the communication lines L1 and L2 respectively to output an edge detection trigger pulse. In the following sections [I] (2) (i)–(iii), the edge detection circuits 30A and 30B will be described in detail.

[I] (2) (i) Elements in the Edge Detection Circuits 30A and 30B

Figure 3:
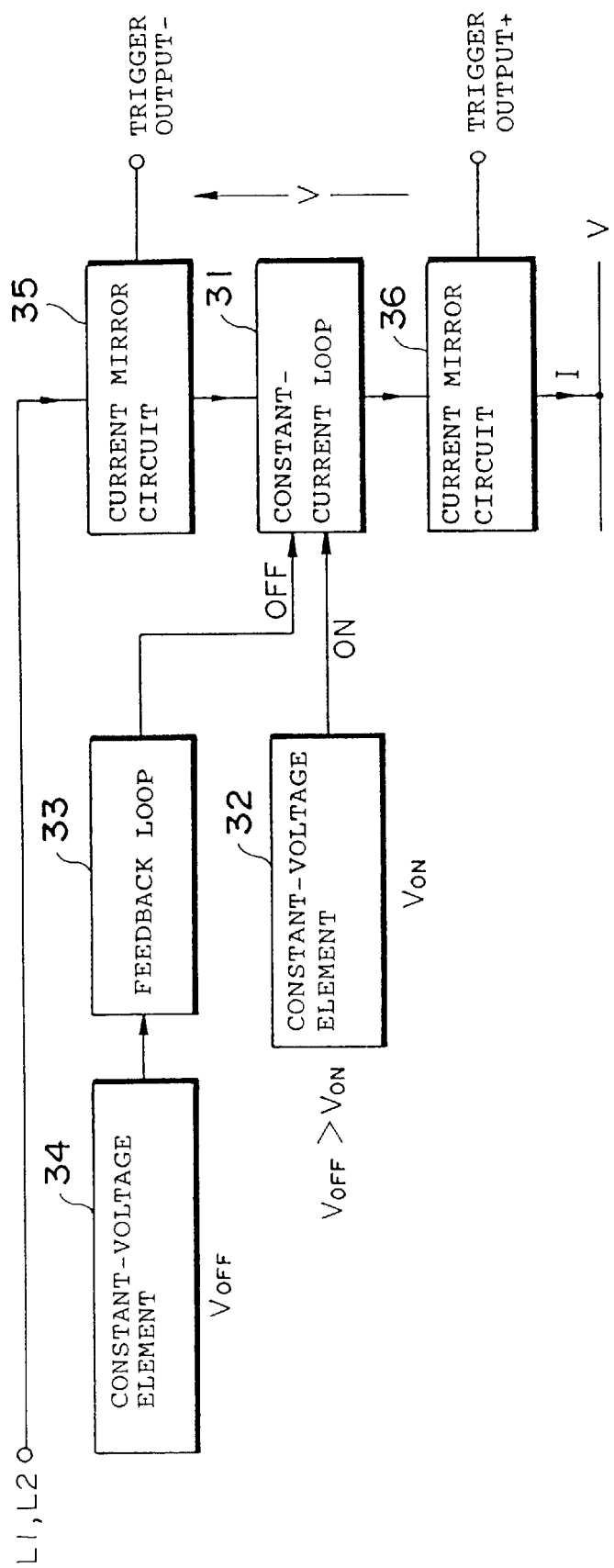
FIG. 3 shows elements in the edge detection circuit shown in FIG. 1.

FIG. 3 is a block diagram illustrating the elements of the edge detection circuits 30A and 30B shown in FIG. 1. The edge detection circuits 30A and 30B have the same configuration. Each of them has a first constant-current loop 31, a first constant-voltage element 32, a feed back loop 33, and a constant-voltage element 34. The constant-current loop 31 allows a constant-current $i_{on}$ to flow in accordance with an applied voltage. The first constant-voltage element 32 prevents the current $i_{on}$ from flowing into the constant-current loop 31 when the applied voltage is below $V_{on}$ either, which is performed by restricting the operation of the current loop amplification in the constant-current loop 31 through connection into the current loop 31, or by restricting the amount of the applied voltage of the constant-current loop 31 through connection to the current path of the constant-current loop 31 in serial. the feed back loop 33 serves as a feed back circuits for the constant-current loop 31 in order to cause the total current in the whole circuit (including the constant-current loop 31) to be zero by reducing the loop current amplification factor of the whole circuit below 1. The constant-voltage element 34 is connected in the feedback loop 33, and stops the feedback operation of the feedback loop 33 when the applied voltage is below $V_{off}$. The combination of the constant-current loop 31, the feedback loop 33 and the constant-voltage elements 32 and 34 composes the constant-current circuit. The constant-current ion which flows from the constant-current circuit, is changed into an output current by the two of the current mirror circuits 35 and 36.

The constant-current loop 31 to which the constant-voltage element 32 and the feedback loop 33 (including the constant-voltage element 34) are attached and the current mirror circuits 35 and 36 are connected between the input terminal, which is connected to a communication line L1 or L2, and the ground. Each output terminal of the current mirror circuits 35 and 36 is an output terminal to indicate detection of a pulse edge.

When the constant-voltage element 32 allows conduction; and also the feedback loop 33 does not allow feedback operation, the constant current loop 31 is forced into an on-state, thus permitting the current $i_{on}$ to flow. In other words, when the constant-voltage element 32 does not allow conduction; or the constant-current loop 33 allows feedback operation, the constant-current loop 31 does not work, thereby forbidding the current $i_{on}$ to flow.

The feedback loop 33 is forced into operation; when the constant-voltage element 34 allows conduction. The voltage Von of the constant-voltage element and the voltage $V_{off}$ of the constant-voltage element are set in such a fashion that the latter voltage Voff is larger than the former voltage Von. Consequently, the current $i_{on}$ can flow only when an applied voltage is laid in the range from Von to Voff.

[I] (2) (ii) Specific Circuit Configuration on Edge Detection Circuits 30A and 30B Before describing the specific circuit configuration on the edge detection circuits 30A and 30B, in reference with FIG. 4 through FIG. 6, the edge detection circuits 30 and 40, a liner current mirror circuit used for other circuits shown in this specification, and two kinds of non-linear current amplifiers will be described.

FIG. 4(a) through (f) illustrate the linear current mirror circuit, wherein FIG. 4(a) shows a symbolic representation and FIG. 4(b) through (f) are its example circuits.

The linear current mirror circuit has three terminals including: an input terminal I from which a current flows out (in) an output terminal O from which a current flows out (in) and a common terminal COM to which the total amount of currents on the input terminal I and the output terminal O flows in, thereby the Input/Output relation of the circuit is a linear amplification.

The circuit shown in FIG. 4(b) has a pair of PNP transistors Tr1 and Tr2, in which both emitters of them are connected to the common terminal COM. Both bases of the transistors Tr1 and Tr2 are connected to the collector of the transistor Tr1. The collector of the transistor Tr1 is the input terminal I while the collector of the transistor Tr2 is the output terminal O.

The circuit shown in FIG. 4(c) has the configuration that emitter resistors R1 and R2 are inserted between the emitters of the transistors Tr1 and Tr2 and the common terminal COM shown in FIG. 4(b) respectively. The circuit shown in FIG. 4(d) has transistors Tr3 and Tr4 added to the circuit shown in FIG. 4(b). The emitter of the transistor Tr3 is connected to the common terminal COM while the collector of the transistor Tr3 is connected to the emitter of the transistor Tr1. The emitter of the transistor Tr4 is connected to the common terminal COM while the collector of the transistor Tr4 is connected to the emitter of the transistor Tr2. The bases of the transistors Tr3 and Tr4 are connected to the collector of the transistor Tr4.

The circuit shown in FIG. 4(e) has the configuration that emitter resistors R3 is inserted between the emitter of the transistor Tr3 and the common terminal COM, and that emitter resistor R4 is inserted between the emitter of the transistor Tr4 and the common terminal COM. The circuit shown in FIG. 4(f) has the configuration that PMOS transistors PTr1 and PTr2 are substituted for the transistors Tr1 and TrZ shown in FIG. 4(b) respectively. That is, both the sources of the PMOS transistors PTr1 and PTr2 are connected to the common terminal COM, while both the gates of the PMOS transistors PTr1 and PTr2 are connected to the drain of the transistor Tr1. The drain of the PMOS transistor PTr1 is the input terminal I while the drain of the PMPS transistor PTr2 is the output terminal O.

Each of the circuits shown in FIG. 4(b) through (e) uses PNP transistors, however, it is also possible to use NPN transistors in place of PNP transistors. The circuit shown in FIG. (f) uses PMOS transistors, however, it is also possible to use NMOS transistors in place of PMOS transistors. Just like the circuit shown in FIG. 4(b) can be replaced with MOS transistors as shown in FIG. 4(f), the circuits shown in FIG. 4(b) through (e) can be replaced with MOS transistors.

FIG. 5(a) through (f) illustrate non-linear current amplifiers (constant-current source typed current amplifier), wherein FIG. 5(a) shows a symbolic representation and FIG. 5(b) through (f) are its example circuits.

Each of the non-linear current amplifiers has three terminals including: an input terminal I for a current flowing in (out) an output terminal O for a current flowing in (out) and a common terminal COM in which a total amount of currents of the input terminal I and the output terminal O. The non-linear current amplifiers have the maximum current gain at around zero in an input current, and the property that the current gain monotonously decreases toward zero while the input current increases. This type of the non-linear current amplifier is referred as a constant-current source typed current amplifier below, since from the combination of it and the linear current mirror circuit shown in FIG. 4 a constant-current circuit can be made. Here, the resistor Ron shown in FIG. 5(b) through (f) and figures which will be referred later stands for a resistor which sets the value of the constant-current. Moreover, the symbol n shown near the neighbor of a transistor indicates a ratio of a transistor size which sets an input threshold current which will be described later.

The circuit shown in FIG. 5(b) has a transistor Tr5 in which both its base and collector are connected to a input terminal I, and a transistor Tr6 in which its collector is connected to the output terminal O. The emitter of the transistor Tr5 is connected to a common terminal COM while the emitter of the transistor Tr6 is connected to the common terminal COM via a resistor Ron. The bases of the transistors Tr5 and Tr6 are connected to the collector of Tr5.

The circuit shown in FIG. 5(c) has the configuration in that a diode d1 is placed between the emitter of the transistor Tr5 and the common terminal COM shown in FIG. 5(b). The circuit shown in FIG. 5(d) has the configuration that transistors Tr7 and Tr8 are added to the circuit shown in FIG. 5(b). The emitter of the transistor Tr7 is connected to a common terminal COM while the collector of the transistor Tr7 is connected to the emitter of the transistor Tr5. The emitter of the transistor Tr8 is connected to the common terminal COM via a resistor Ron while the collector of the transistor Tr8 is connected to the emitter of the transistor Tr6. The bases of the transistor Tr7 and Tr8 are connected to the collector of the transistor Tr8. The circuit shown in FIG. 5(e) has the configuration in that a diode d1 is inserted between the emitter of the transistor Tr7 and a common terminal COM. The circuit shown in FIG. 5(f) has the configuration in that NMOS transistors NTr1 and NTr2 is substituted for the transistors Tr5 and Tr6 respectively as shown in FIG. 5(b). That is, the source of the NMOS transistor NTr1 is directly connected to a common terminal COM, and the source of the NMOS transistor NTr2 which has a gate width larger than the gate width of the NMOS transistor NTr1 is connected to the common terminal COM via a resistor Ron. The back-gate of NMOS transistor NTr2 is connected to the common terminal COM, and both gates of NMOS transistors NTr1 and Ntr2 are connected to the drain of the transistor NTr1. The drain of the NMOS transistor NTr1 is an input terminal I while the drain of the NMOS transistor NTr2 is an output terminal O. Each of the circuits shown in FIG. 5(b) through (e) uses NPN transistors, however, it is also possible to use PNP transistors in place of NPN transistors. Just like the circuit shown in FIG. 5(b) is replaced with the one shown in FIG. (f), the configurations shown in FIG. 5(b) through (e) can be created using MOS transistors.

FIG. 6(a) through (g) illustrate non-linear current amplifiers (switch typed current amplifiers), wherein FIG. 6(a) is a symbolic representation and FIG. (b) through (g) are its example circuits.

These non-linear current amplifiers shown in FIG. 6(a) through (g) have three terminals including: an input terminal I for a current flowing in (out), an output terminal O for a current flowing in (out), and a common terminal COM for a current flowing out (in). They have the minimum current gain at around zero in input current and the property that current gain monotonously increases in accordance with increase of the input current. Hereinafter, this type of non-linear current amplifier is referred to as a switch typed current amplifier, since the combination of it and the linear current mirror circuit shown in FIG. 4 can make a switch circuit. Here, the resistor Rth shown in FIG. 6(b) through (f) and in the figures which will be referred later denotes the resistor which sets the input threshold current. Also, the symbol m shown at around a transistor denotes a ratio of transistor size which sets the input threshold current which will be described later.

The circuit shown in FIG. 6(b) has a transistor Tr9 whose base and collector both are connected to an input terminal I and a transistor Tr10 whose collector is connected to an output terminal O. The emitter of the transistor Tr9 is connected to a common terminal COM via a resistor Rth while the emitter of the transistor Tr10 is directly connected to the common terminal COM. The base of the transistor Tr10 is connected to the collector of the transistor Tr9.

In the circuit shown in FIG. 6(c), both the base of a transistor Tr11 and one end of a resistor Rth are connected to an input terminal I. The collector of the transistor Tr11 is connected to an output terminal O while both the emitter of the transistor Tr11 and the other end of the resistor Rth is connected to the common terminal COM. The circuit shown in FIG. 6(d) has the configuration in that a diode d2 is inserted between the emitter of the transistor Trio and the common terminal COM as shown in FIG. 6(b). The circuit shown in FIG. 6(e) has the configuration in that transistors Tr12 and Tr13 are added to the circuit shown in FIG. 6(b). The emitter of the transistor Tr12 is connected to a common terminal COM via the resistor Rth while the collector of the transistor Tr12 is connected to the emitter of a transistor Tr9. The emitter of a transistor Tr13 is connected to the common terminal COM while the collector of the transistor Tr13 is connected to the emitter of the transistor Tr10. Both bases of the transistors Tr12 and Tr13 are connected to the collector of the transistor Tr13. The circuit shown in FIG. 6(f) has the configuration in that transistors Tr12 and Tr13 are added to the circuit shown in FIG. 6(d).

The circuit shown in FIG. 6(g) has the configuration in that the transistors Tr9 and Tr10 shown in FIG. 6(b) are replaced with NMOS transistors NTr3 and NTr4 respectively. In the NMOS transistors NTr3 and NTr4, the source of the NMOS transistor NTr3 which has a gate width larger than the gate width of the NMOS transistor NTr4 is connected to a common terminal COM via a resistor Rth while the source of the NMOS transistor NTr4 is directly connected to the common terminal COM. Both gates of the transistors NTr3 and NTr4 are connected to the drain of the transistor NTr3. The drain of the NMOS transistor NTr3 is an input terminal I while the drain of the NMOS transistor NTr4 is an output terminal O. The circuits shown in FIG. 6(b) through (f) use NPN transistors, however, it is possible to replace each NPN transistor with a PNP transistor or a MOS transistor.

Next, an example configuration of the edge detection circuit will be described below.

Figure 7:
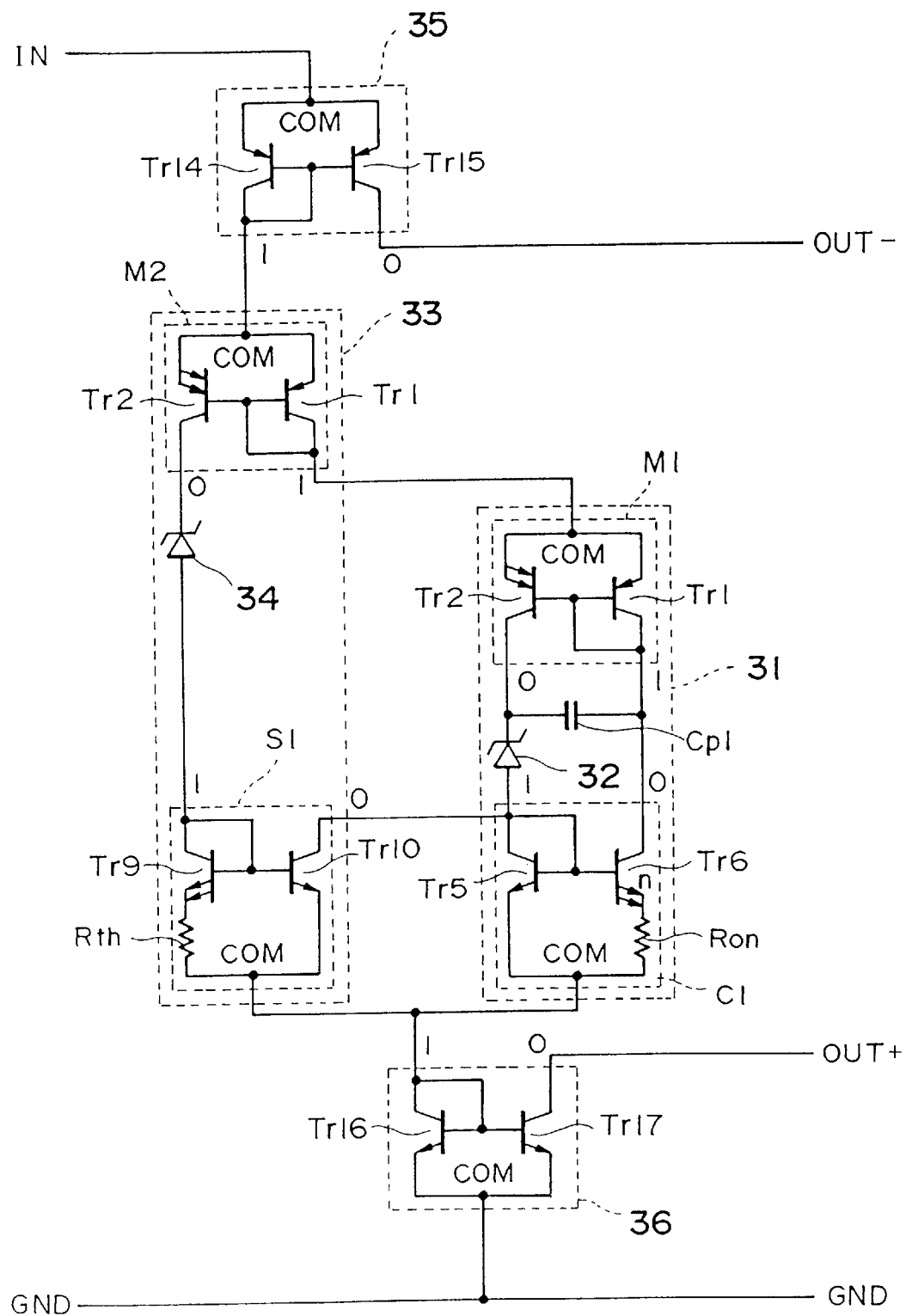
FIG. 7 shows a configuration of the edge detection circuit shown in FIG. 3.

FIG. 7 illustrates the example configuration of the edge detection circuit shown in FIG. 3, wherein the same elements as the ones in FIG. 3 are attached the same respective reference numerals in FIG. 7.

The edge detection circuit has a first current mirror circuit M1 which is made from, for example, the linear current mirror circuit shown in FIG. 4(b), a constant-current source typed current amplifier C1 which is a first non-linear current amplifier, a constant-voltage element 32 which is a Zener diode, and capacitor Cp1. The output terminal O of the constant-current source typed current amplifier C1 is connected to an input terminal I, the output terminal O of the current mirror circuit M1 is connected to the cathode of the constant-voltage element 32, and the anode of the constant-voltage element 32 is connected to the input terminal I of the constant-current source typed current amplifier C1, a current amplification loop is made. With these connections, the circuit, in that the cathode and the anode of the constant-voltage element 32 are short-circuited, corresponds to the constant-current loop 31 as shown in FIG. 3. The constant-voltage element 32 can also be inserted between the output terminal O of the constant-current source typed current amplifier C1 and the input terminal I of the current mirror circuit M1 so as to have the same effect. To guarantee that the constant-current loop 31 is forced into on-state, a capacitor Cp1 is connected between the input and the output terminals of the current mirror circuit M1.

The edge detection circuit has, other than the constant-current loop 31, a second linear current mirror circuit M2 made from the linear current mirror circuit shown in FIG. 4(b), a switch typed current amplifier S1 as the second non-linear current amplifier shown in FIG. 6(b), and a constant-voltage element 34 which is a Zener diode. The output terminal O of the current mirror circuit M2 is connected to the cathode of the constant-voltage element 34 while the anode of the constant-voltage element 43 is connected to the input terminal I of the switch typed current amplifier S1. In these connections, the circuit, in that the cathode and the anode of the constant-voltage element 34 are short-circuited, corresponds to the feedback loop 33 as shown in FIG. 3.

To make the feedback loop 33 act on the constant-current loop 31, the common terminal COM of the current mirror circuit M1 in the constant-current loop 31 is connected to the input terminal I of the current mirror circuit M2 in the feedback loop 33, and the output terminal O of the switch typed current amplifier S1 in the feedback loop 33 is connected to the input terminal I of the constant-current source typed current amplifier C1 in the constant current loop 31.

The common terminal COM of the current mirror circuit M2 in the feedback loop 33 is connected to the input terminal I of the current mirror circuit 35 while both common terminal COM of the switch typed current amplifier S1 and the common terminal COM of the constant-current source typed current amplifier C1 are connected to the input terminal I of the current-mirror circuit 36.

The common terminal of the current mirror circuit 36 is connected to the ground terminal GND of the edge detection circuits 30A and 30B while the common terminal COM of the current mirror circuit 35 is connected to the input terminal IN of the edge detection circuits 30A and 30B. The output terminal O of the current mirror circuit 35 is connected to the negative output terminal for flowing a current out OUT− while the output terminal O of the current mirror circuit 36 is connected to the positive output terminal for a current flowing in OUT+ of the edge detection circuits 30A and 30B.

The current mirror circuits M1 and M2 are made from, for example, the circuit shown in FIG. 4(b). The switch typed current amplifier S1 is made from the circuit shown in FIG. 6(b).

The current mirror circuit 35 has a pair of PNP transistors Tr14 and Tr15 whose emitters are connected to a common terminal COM. Both the collector and the base of the transistor Tr14 are connected to the input terminal I of the current mirror circuit 35 while the collector of the transistor Tr15 is connected to the output terminal OUT− via the output terminal O of the current mirror circuit 35. The base of the transistor Tr15 as well as both the collector and the base of the transistor Tr14 are connected to the input terminal I of the current mirror circuit 35.

The current mirror circuit 36 has a pair of NPN transistors Tr16 and Tr17 whose respective emitters are connected to a common terminal COM. Both the collector and the base of the transistor Tr16 are connected to the input terminal I of the current mirror circuit 36 while the collector of the transistor Tr17 is connected to the output terminal OUT+ via the output terminal O of the current mirror circuit 36. The base of the transistor Tr17 as well as both the collector and the base of the transistor Tr16 are connected to the input terminal I of the current mirror circuit 36. Here, these current mirror circuits 35 and 36 are prepared to output. When either the output current for flowing in or the other output for flowing out is unnecessary, accordingly, either the current mirror circuit 35 or the current mirror circuit 36 can be omitted.

The same function mentioned above can also be attained by replacing the current mirror circuit M1 with the constant-current source typed current amplifier C1, or by replacing the constant-current source typed current amplifier C1 with the current mirror circuit M1, or by exchanging NPN transistors for PNP transistors and vice versa.

[I] (2) (iii) Function of the Edge Detection Circuits 30A and 30B

Figure 8:
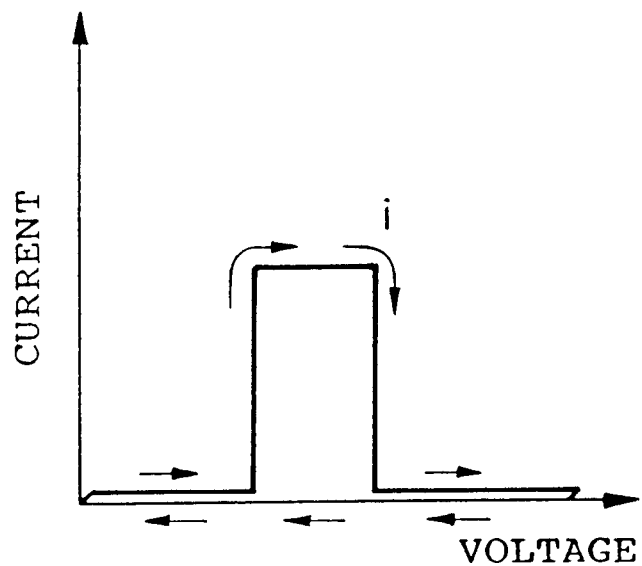
FIG. 8 is a graph showing the relation between applied voltages and corresponding currents in the edge detection circuit.
Figure 9:
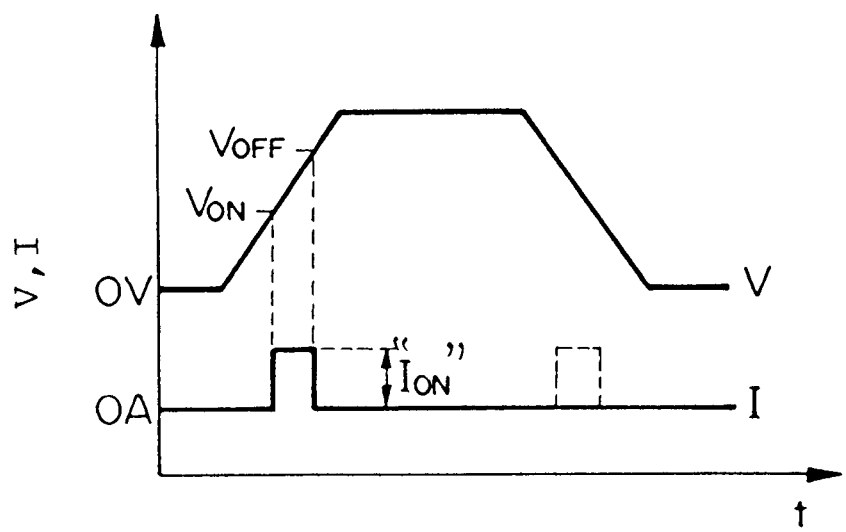
FIG. 9 shows wave shapes of applied voltages and corresponding currents in transient of edge detection process.

FIG. 8 illustrates the relation between an applied voltage and an amount of flowing current in the edge detection circuit. FIG. 9 illustrates an applied voltage and a current which flows at a transient time of an edge detection. With reference to FIG. 8 and FIG. 9, the function of the edge detection circuit shown in FIG. 3 and FIG. 7 will be described.

In the edge detection circuit shown in FIG. 3, voltage raising from zero between the input terminal and the ground will be described. With no addition of the constant-voltage element 32 or the feedback loop 33, the constant-current loop 31 turns on when the voltage V reaches a certain low voltage, whereby the current $i_{on}$ begin to flow in the constant-current loop 31.

However, with the constant-voltage element 32 (like a Zener diode) and no breakdown thereof, the constant-voltage element 32 prevents the loop current amplification of the constant-current loop 31 (when connected in the constant-voltage loop 31), or keeps the voltage V applied on the constant-current loop 31 such low not to enable it to work (when connected to the constant-current loop 31 in serial). This keeps the constant-current loop 31 non-active. Further, rising of the applied voltage beyond the voltage $V_{on}$ forces a breakdown on the constant-voltage element 32.

Upon breakdown of the constant-voltage element 32, the condition that forces the constant-current loop 31 to be held in an off-state is removed. Accordingly, the constant-current loop 31 turns on, whereby the constant-current $i_{on}$ begins to flow. With the breakdown point of the constant-voltage element 34 being set higher than that of the constant-voltage element 32, at this set point the constant-voltage element 34 does not experience any breakdown, namely in cutoff-status. The feedback loop 33 cannot implement such a feedback as to allow the current loop 31 to be an off-state. Moreover, when the input voltage is raised beyond Voff, a breakdown on the constant-voltage element 34 occurs to start the operation of the feedback loop 33. When the feedback loop 33 starts its operation, the loop current gain of the constant-current loop 31 including the feedback loop 33 always becomes less than 1, and current decreases little by little into an off-state.

After then, even though the input voltage V is raised, no current $i_{on}$ flows. A current according to the constant-current $I_{on}$ is outputted through the current mirror circuits 35 and 36. When breakdown voltages of the constant-voltage elements 32 and 34 are selected so that the relation among a peak value of an input pulse Von, Voff and Vp satisfies the following Expression (1), the current $I_{on}$ flows only during the time between Von of the leading voltage edge of the input pulse and Voff, and thereby a trigger current as an edge detection pulse is obtained. The current value Ion is decided by a predetermined current value of the constant-current loop 31, and pseudo-differential can be attained without detrimental effects from the magnitude of the velocity dV/dt.

$$0 < Von < Voff < Vp \tag{1}$$

Moreover, when a setting is made according to the following Expression (2), the input applied voltage V during stand-by is always more than Voff, and no false trigger which can be a cause of malfunction is made. Therefore, the function of preventing any malfunction from occurring can be obtained.

$$(Vp - Voff) > (\text{noise amplitude during time of waiting}) \tag{2}$$

Here, the specific function of the edge detection circuit shown in FIG. 7 with its operation will be described below.

The constant-current loop 31 when the constant-voltage element 32 is short-circuited will be taken in account. When the current amplification factor (the product between current amplification factors of two current amplifiers hereinafter it is referred to as a loop current amplification factor), of the circuit making a trip from the current mirror circuit M1 through the constant-current source typed current amplifier C1, is set to 1 on current i=ion, from the current gain characteristic of the constant-current source typed current amplifier, the loop current amplification factor is larger than 1 on $i < i_{on}$, the loop current amplification factor is 1 on $i = i_{on}$, and the loop current amplification factor is less than 1 on i>$i_{on}$. Consequently, it is well-balanced on i=$i_{on}$, and a constant-current $i_{on}$ flows. The current on the common terminal COM is also a constant-current which is one-dimension ally decided by the current $i_{on}$. The current i flowing to the constant-current loop 31 is decided by both the band gap voltage according to the ratio of transistor size n and a resistor Ron. The ratio of transistor size of the constant-current source typed current amplifier C1 is denoted by n, the resistance value of resistor is denoted by $r_{on}$, the current gain of the current mirror circuit M1 is denoted by K, Boltzmann's constant is denoted by k, an electric charge of an electron is denoted by q, an absolute temperature is denoted by T, and an amount of current flowing on the common terminal COM is denoted by ion again. Therewith, $i_{on}$ can be approximated in accordance with the following Expression (3).

$$i_{on}=(kT/qr_{on})(1+K)\ln(nK) \qquad (3)$$

The current path making a trip through the components of the transistor Tr14 in the current mirror circuit 35 placed between the input terminal IN and the ground GND, the transistor Tr1 in the current mirror circuit M2, constant-current loop 31 and the transistor Tr16 in the current mirror circuit 36, easily forces the current to an on-state by applying a voltage which makes several forward-biased diodes on, if the constant-voltage element 32 is short-circuited,.

When the constant-voltage element 32 is inserted, as long as a breakdown does not occur on it, the constant-current loop 31 can not make loop-current amplification and stays in an off-state. Therefore, by selecting the breakdown voltage of the constant-voltage element 32, the voltage for starting a current from flowing can be controlled.

When a current flows on the aforementioned current path, the current mirror circuit M2 tries to flow a current, in proportion to the one flowing on the constant-current loop 31, on the path making a trip among the output transistor Tr2 in the current-mirror circuit M2 which is a current path of the feedback loop 33, the constant-voltage element 34 and the input terminal of the switch typed current amplifier S1. However, the current does not flow as long as a breakdown does not occur on the constant-voltage element 34. The constant-voltage element 34 controls the voltage for starting a current from flowing.

When a breakdown occurs on the constant-voltage element 34 and a current flows on the feedback loop 33, the output current of the switch typed current amplifier S1 takes a flowing-in current to the input terminal I of the constant-current source typed current amplifier in the constant-current loop 31. Therefore, the loop current gain of the constant-current loop 31 including the feedback loop 33 is set less than 1, and the constant-current loop 31 works as a loop approaching an off-state. Whether a final current value is zero or approaches a very close to zero can be decided by the switch typed current amplifier S1. When the voltage Von, which determines when a current starts flowing, of the constant-current loop 31 according to the constant-voltage element 32 and the voltage Voff, which determines when a current stops flowing, of the feedback loop 33 according to the constant-voltage element 34 are set to Von<Voff and the voltage between the input terminal IN and GND is raised from zero, the current-flowing begins at Von and stops at Voff. That is, it functions in such a way that the constant-current in decided in the constant-current loop 31 flows only within the range from Von through Voff.

Supposing that the current gain of the current mirror circuit M2 is J, the ratio in the transistor size of the switch typed amplifier S1 is m, the resistance value $r_{th}$ of the resistor Rth satisfies $r_{th} \gg r_{on}$, the last remained total current value $i_{off}$ is expressed by the following Expression (4):

$$i_{off}=(kT/qr_{th})((1+J)/J)\times(\ln(m(nK-1)/nJ(1+K)) \qquad (4)$$

when K=J=1, $$i_{off}=2(kT/qr_{th})\times\ln(m(n-1)/2n) \qquad (5)$$

Herein, when (m (n−1)/2n)<1, $i_{off}$=1 can be attained.

That is, by selecting the breakdown voltages of the constant-voltage elements 32 and 34, the current $i_{on}$ flows only within a short period of time from Von through Voff in a leading voltage edge when an input pulse pass the period, and conversely, no current flows at more than Voff. Thereby, a pulse edge can be detected.

Further, a capacitor Cp1 charging current when an applied voltage V rises forces the constant-current loop 31 into an on-state easier. However, a capacitor Cp1 discharging current when the applied voltage falls prevents the constant-current loop 31 from becoming on. As a result, on a transient response, a leading edge of the applied voltage can be detected (a current flows), however, a trailing edge of it can not be detected (no current flows).

The current value is decided by a set-up current value on the constant-current loop 31 as long as the capacity of the capacitor Cp1 is not large, and thus it is not affected by the changing velocity dV/dt on the input pulse The constant-voltage element 32 is prepared in order to set an on-state-starting voltage Von for the constant-current loop 31. Thus, the same effectiveness can be obtained by connecting it somewhere among the path designated by the current mirror circuit M2, transistors in the current mirror circuits 35 and 36 and the constant-current loop 31, the path in which a current passes at first. In particular, it is possible to shift both the voltage Von and Voff by connecting the constant-voltage element 32 in series to a transistor in the current mirror circuits 35 and 36 which are places outside of the paths included in the feedback loop 33.

Figure 10:
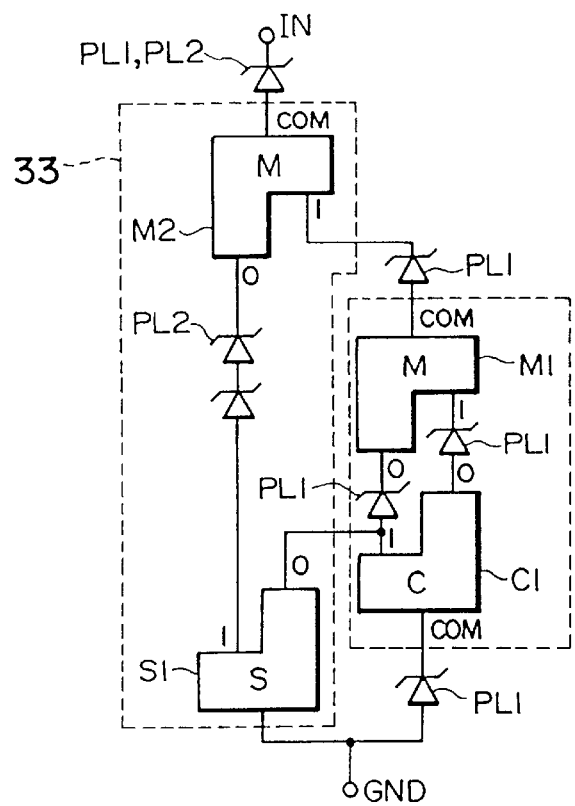
FIG. 10 illustrates a circuit in which inserted positions of the constant-voltage devices 31 and 32 are shown.

FIG. 10 is a block diagram showing positions in which the constant-voltage elements 34 and 32 as shown in FIG. 3 are inserted.

In FIG. 10, the current mirror circuit, constant-current source typed current amplifier and the switch typed current amplifier in the edge detection circuits 30A and 30B are represented with symbolic notations illustrated in FIG. 4(a), FIG. 5(a) and FIG. 6(a), however, the current mirror circuits 35 and 36 are omitted.

The constant-voltage elements 32 and 34 can be inserted into different positions in the edge detection circuit as shown in FIG. 10. Insertion of a constant-voltage element into the place which is referred to as 'PL1' influences the Von. Insertion of it into the place which is referred to as 'PL2' influences the Voff. Insertion of it into both places which are referred to as 'PL1' and 'PL2' influences both of Von and Voff voltages.

Figure 11:
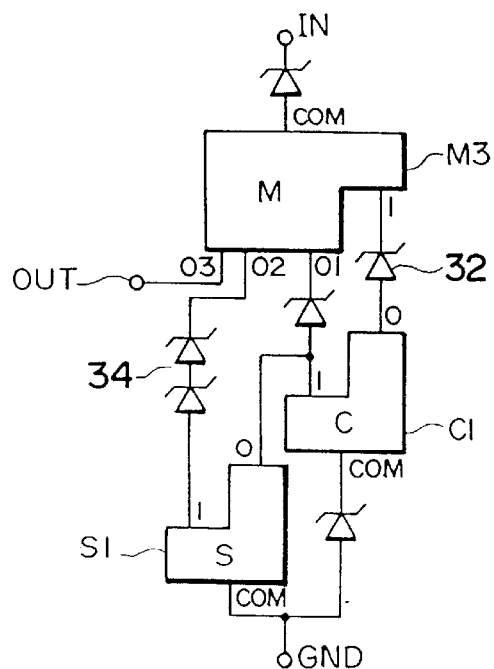
FIG. 11 shows a modification example of the circuit shown in FIG. 7 in such a way that several current mirror circuits are replaced with a current mirror circuit.

FIG. 11 is a block diagram showing an example of modification of the circuit shown in FIG. 7. Several current mirror circuits in the block diagram are replaced with a current mirror circuit. The current mirror circuits 35 and 36 are omitted because they are obvious to those skilled in the art.

All the output current of Cascade-connected current mirror circuits M1 and M2, and current mirror circuit 35 which are in active state is in proportion to an input current of the current mirror circuit M1. Thus, it is possible to replace the current mirror circuits M1 and M2, and current mirror circuit 35 with the current mirror circuit M3 which obtains the three output currents from the output terminals 01, 02 and 03 respectively by one input current. As shown in FIG. 11, the same function can be obtained by replacing with the current mirror circuit M3.

Figure 12:
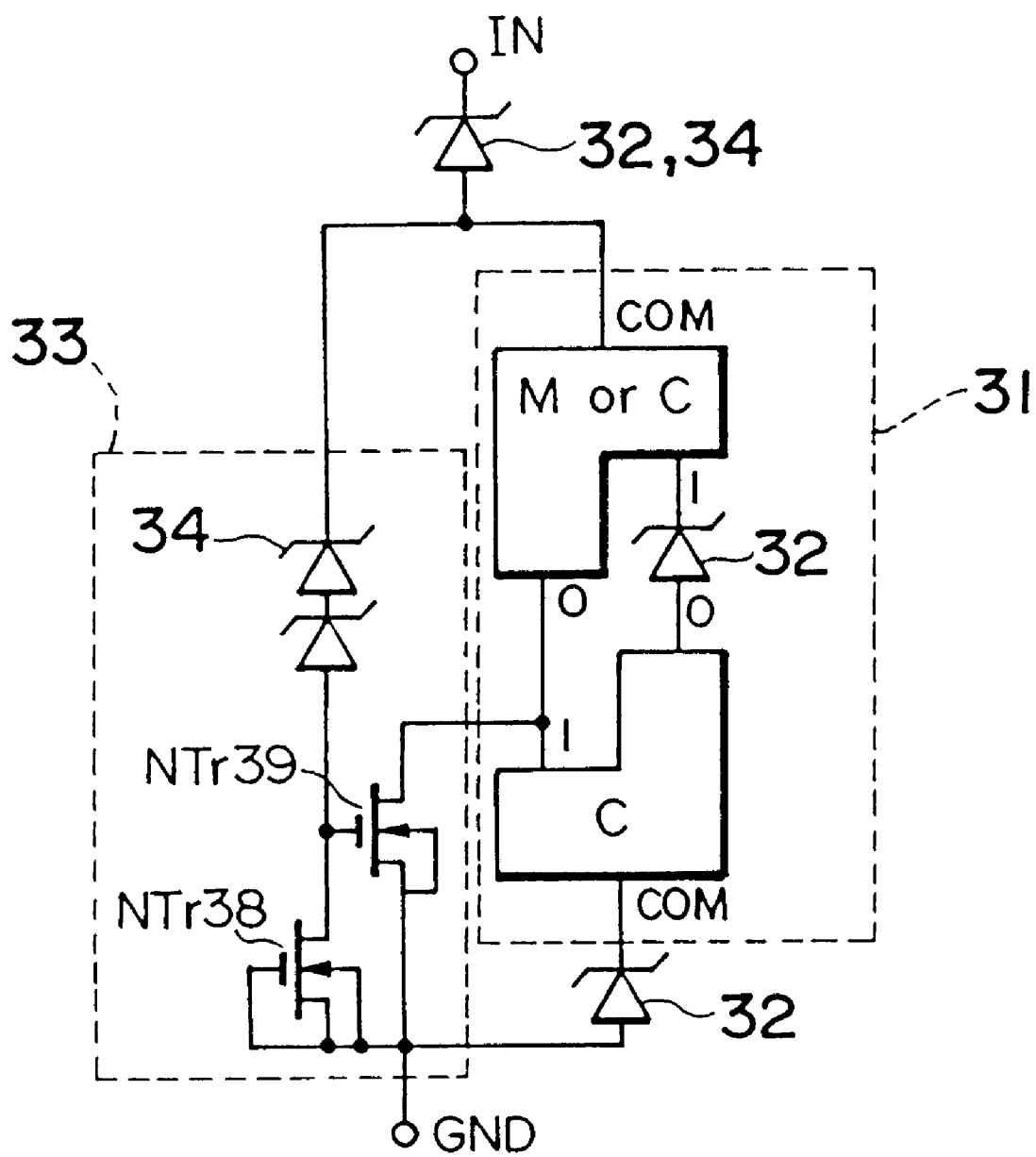
FIG. 12 illustrates an example circuit of that shown in FIG. 7 using MOS transistors for the feedback loop 33.

FIG. 12 shows an example circuit using MOS transistors for the feedback loop 33 according to FIG. 7. The current mirror circuits 35 and 36 are omitted because they are obvious to those skilled in the art.

The feedback loop 33 should only satisfy that the loop current amplification factor of the constant-current loop 31 is less than 1, and that the dissipation power during standby is zero. Therefore, like the circuit shown in FIG. 12, using the MOS transistors NTr38 and NTr 39 makes the circuit simpler.

FIG. 13(*a*) through (*e*) show circuits as other example configurations than FIG. 7, and show the constant-current loop 31 which linearly outputs.

The constant-current source typed current amplifier in the constant-current loop 31 can obtain a linear output like a current mirror circuit by adding transistors for obtaining the linear output.

[I] (3) Constant-current ON/OFF Typed Holding Circuit 50

Figure 14:
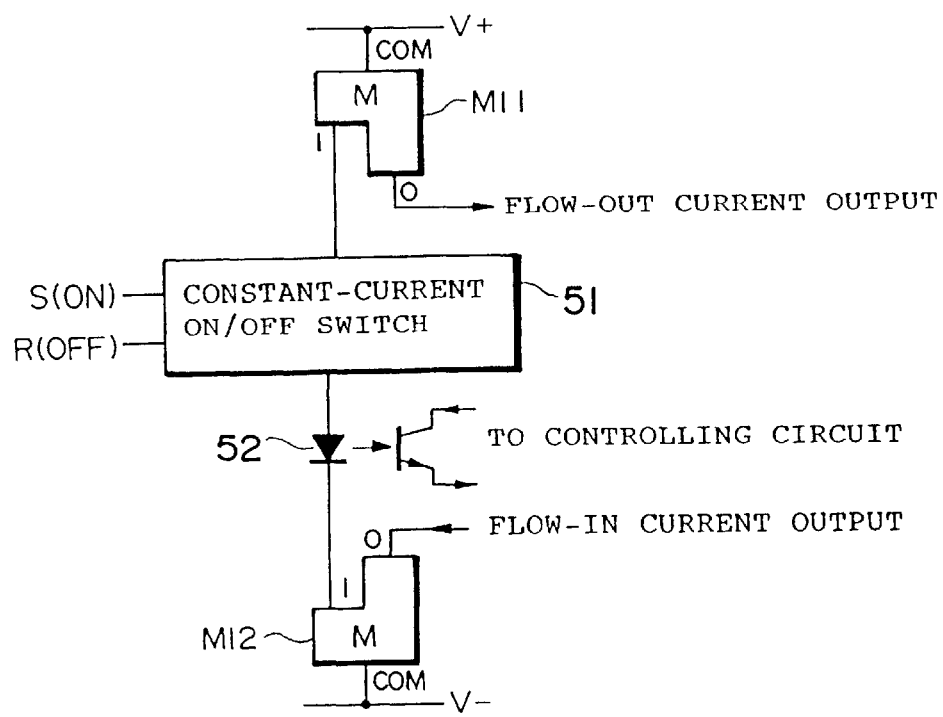
FIG. 14 shows an example configuration of the constant-current ON/OFF typed holding circuit 50 shown in FIG. 1.

FIG. 14 is a block diagram illustrating an example configuration according to the constant-current ON/OFF typed holding circuit 50 shown in FIG. 1. The constant-current ON/OFF typed holding circuit 50 has a current mirror circuit M11 made from the linear current mirror circuit as shown in FIG. 4, a constant-current ON/OFF switch circuit 51, an output circuit which, for example, is configured with a photo coupler 52, and a current mirror circuit M12 made from the linear current mirror circuit shown in FIG. 4.

The common terminal COM in the current mirror circuit M11 is connected to a power supply V+ which comes from the positive electrode terminal of the full-wave rectifier 20. The input terminal of the current mirror circuit M11 is connected to a current flowing-in terminal of the constant-current ON/OFF typed current switch 51. The current flowing-out terminal of the constant-current ON/OFF switch 51 is connected to the input anode terminal of the photo coupler 52. The input cathode terminal of the photo coupler 52 is connected to the input terminal I of the current mirror circuit M12. The common terminal of the current mirror circuit M12 is connected to the power supply V− which comes from the negative electrode terminal of the full-wave rectifier 20.

The constant-current ON/OFF typed switch 51 has a set input terminal S and a reset input terminal R. The current mirror circuit M11 has a flowing-out current as its output. The current mirror circuit M12 has a flowing-in current as its output. The photo coupler 52 outputs to other circuits which have different ground levels. Here, one of either the photo coupler 52 or the current mirror circuit M11 or the current mirror circuit M12 can be omitted when it is unnecessary according to the their following connected circuit.

The constant-current ON/OFF typed current switch 51 which will be described later in detail, becomes an on-state when a trigger current flows in from a set input terminal S. Thereby, a constant current flows between the current flowing-in terminal and the current flowing-out terminal. Otherwise, the constant-current ON/OFF typed current switch 51 becomes an off-state when a trigger current flows in from a reset-input terminal R, and the constant current becomes zero. When a constant current $i_{on}$ during on-state and an input threshold current $i_{th}$ are decided independently from each other by a band gap voltage according to the ratio in transistor size and a resistor size, the ratio of the constant current $i_{on}$ during on-state to the input threshold current $i_{th}$ can be kept constant.

Both the input circuit of the photo coupler 52 and the current mirror circuits M11 and M12 are connected to diodes respectively in forward direction. The ON/OFF states on the currents flowing on them are decided in accordance with the state on the constant-current ON/OFF typed switch 51.

The constant current $i_{on}$ which becomes on and off is transformed to a flowing-out current output signal by the current mirror circuit M11, and is transformed to a flowing-in current output signal, by the current mirror circuit M12. Moreover, in accordance with the constant current $i_{on}$ which becomes on and off, an on-signal and an off-signal are sent to the controlling circuit which has a different ground level through the photo coupler 52.

[1] (3) (i) A Configuration of the Constant-current ON/OFF Typed Current Switch in the Constant-current ON/OFF Typed Holding Circuit 50

Figure 15A:
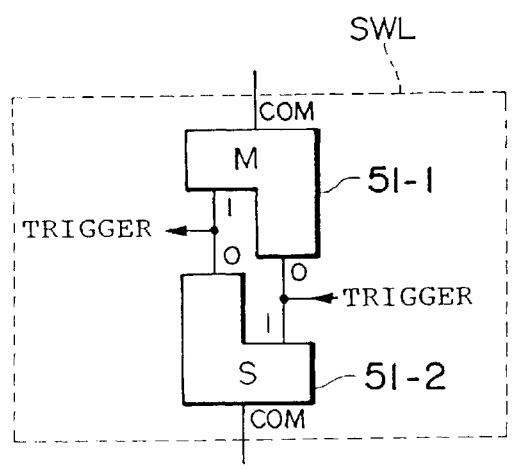
FIG. 15 shows elements configured in the constant-current ON/OFF current switch shown in FIG. 14.

FIG. 15 illustrates the constant-current ON/OFF typed current switch shown in FIG. 14.

The constant-current ON/OFF typed current switch 51 is made from the combination of the switch loop SWL and the constant-current loop ILP shown in FIG. 15.

The switch loop SWL has a current-mirror circuit 51-1 made from the current mirror circuit shown in FIG. 4 and a switch typed current amplifier 51-2 which is a non-linear current amplifier made from the switch typed amplifier 51-2. The input terminal I of the current mirror circuit 51-1 is connected to the output terminal O of the switch typed current amplifier 51-2, and the input terminal the input terminal I of the switch typed current amplifier 51-2 is connected to the output terminal O of the current mirror circuit 51-1. With the connections mentioned above, a current loop is made. The current amplification factor on a circuit making a trip among the current mirror circuit 51-1 and the switch typed current amplifier 51-2 is set to 1 when $i=i_{on}$. The current loop of the switch loop SWL has a current path between common terminals of the current mirror circuit 51-1 and the switch typed current amplifier 51-2. This operates as a switch to control on and off in the circuit by flowing a trigger current either to an input/output connection terminal of the current mirror circuit 51-1 or to the one of the switch typed current amplifier 51-2 and by making the current in the circuit either more than or less than $i_{th}$.

On the other hand, the constant-current loop ILP has a current mirror circuit 51-3 which has the same configuration as the current mirror circuit 51-1 and a constant-current source typed current amplifier 51-4 which is equivalent to the non-linear typed current amplifier shown in FIG. 5. The output terminal O of the constant-current source typed current amplifier 51-4 is connected to the input terminal I of the current mirror circuit 51-3. The output terminal O of the current mirror circuit 51-3 is connected to the input terminal of the constant-current source typed current amplifier 51-4. With the connections described above, a current amplification loop is made. When the constant-current loop ILP is made as mentioned above, the circuit between common terminals COMs of the constant-current source typed current amplifier 51-4 and the current mirror circuit 51-3 has a constant-current characteristic, as mention above in section [1] (2)(iii).

Figure 16:
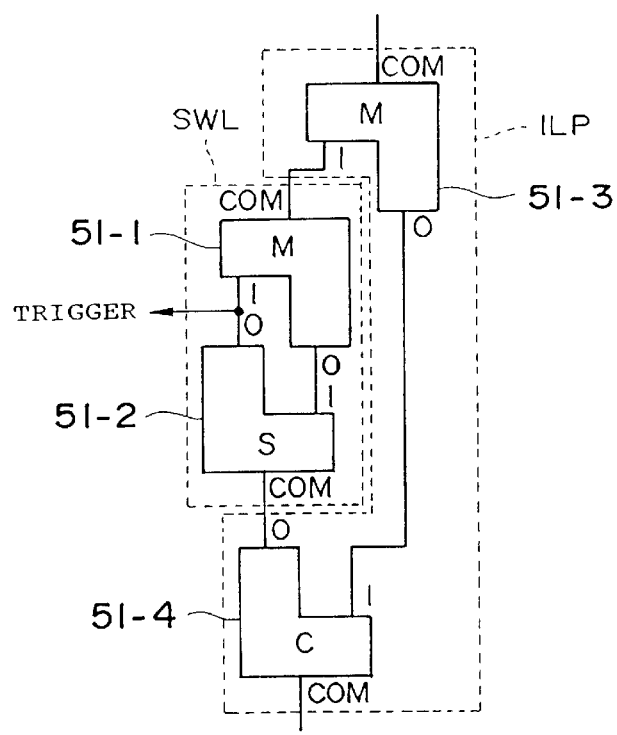
FIG. 16 illustrates a first specific example (part 1) of the constant-current ON/OFF current switch shown in FIG. 14.
Figure 17:
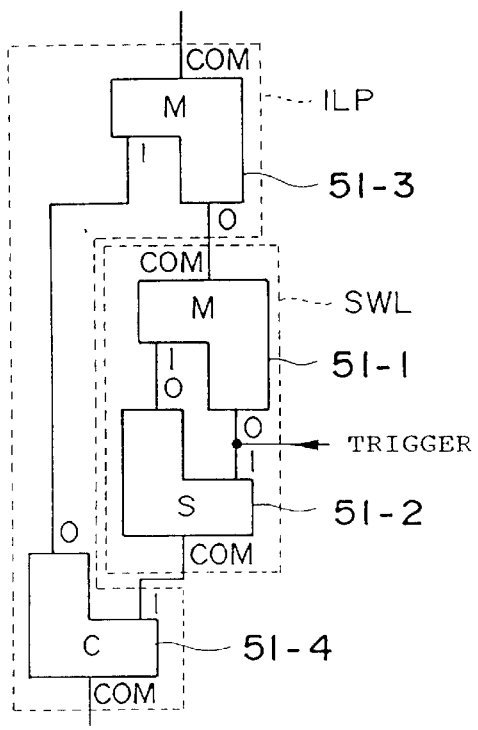
FIG. 17 illustrates a first specific example (part 2) of the constant-current ON/OFF current switch shown in FIG. 14.

[1] (3) (ii) The First Specific Example of the Constant-current ON/OFF Typed Current Switch FIG. 16 and FIG. 17 illustrates the first specific example of the constant-current ON/OFF typed current switch shown in FIG. 14.

The constant-current ON/OFF typed current switch shown in FIG. 16 has a configuration in that a switch loop SWL is inserted between an input terminal I of a current mirror circuit 51-3 in a constant-current loop ILP and an output terminal O of a constant-current source typed current amplifier 51-4. That is, the input terminal I of the current mirror circuit 51-3 is connected to a common terminal COM of the current mirror circuit 51-1 in the switch loop SWL, and the output terminal O of the constant-current source typed current amplifier 51-4 is connected to a common terminal COM of the switch typed current amplifier 51-2 in the switch loop SWL. In the configuration mention above, the current directions of the constant-current loop ILP and the switch loop SWL are the same.

The constant- current ON/OFF typed current switch 51 shown in FIG. 17 has a configuration in such a way that the switch loop SWL is inserted between the output terminal O of the current mirror circuit 51-3 in the constant-current loop ILP and the input terminal I of the constant-current source typed current amplifier 51-4. That is the output terminal O of the current mirror circuit 51-3 is connected to the common terminal COM of the current mirror circuit 51-1 in the switch loop SWL, and the input terminal I of the constant-current source typed current amplifier 51-4 is connected to the common terminal COM of the switch typed current amplifier 51-2 in the switch loop SWL. In this configuration, the current directions of the constant current loop ILP and the switch loop SWL are the same.

Moreover, the current mirror circuit 51-3 and the constant-current source typed amplifier 51-4 can share the current mirror circuits M11 and M12 and internal transistors in the constant-current typed ON/OFF holding circuit shown in FIG. 14.

Further, the current mirror circuit 51-3 and the constant-current source typed current amplifier 51-4 operates in the same manner even though n-type region and p-type region of transistors are inverted respectively and the current mirror circuit 51-3 and the constant-current source typed current amplifier 51-4 are exchanged with each other.

Figure 18:
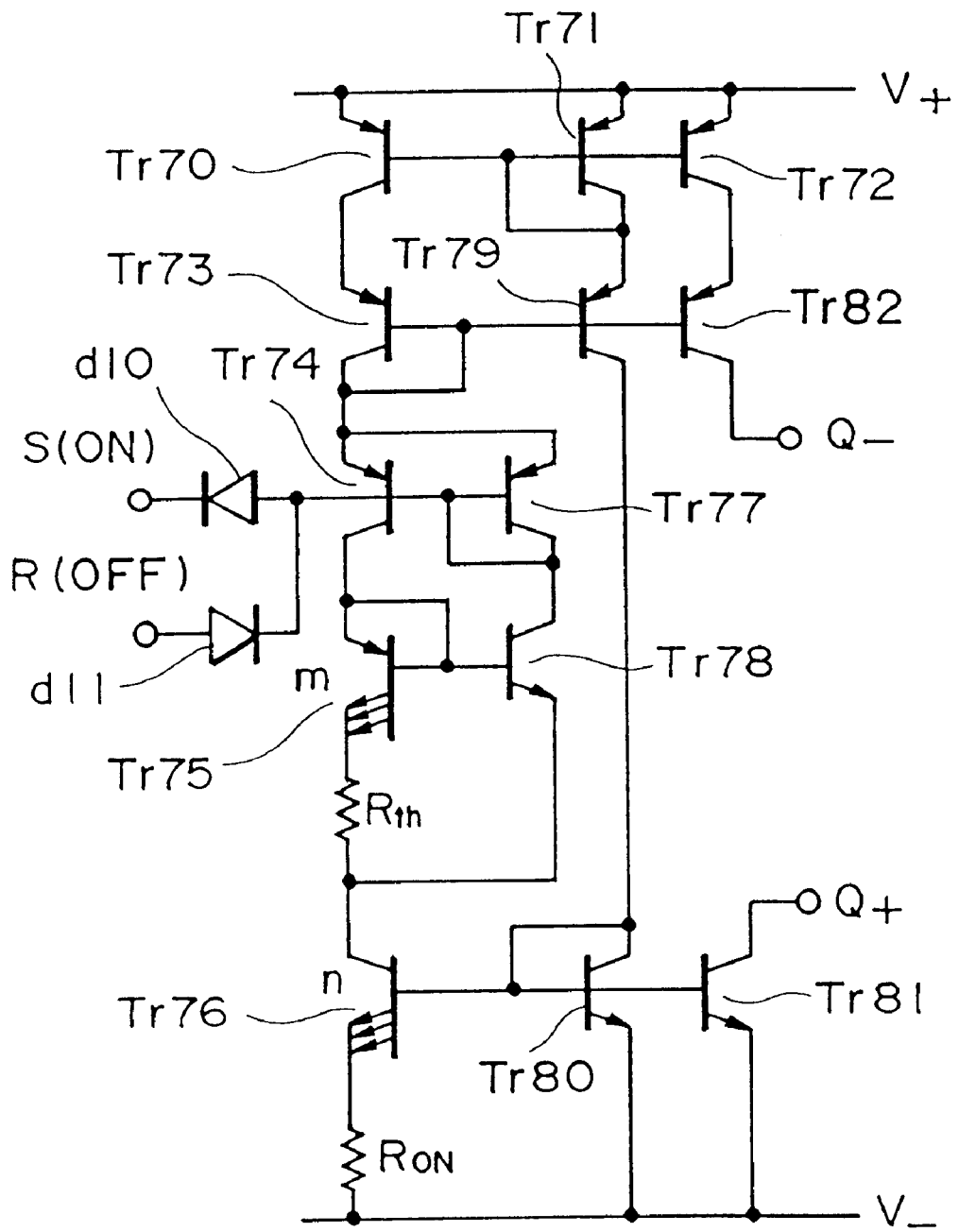
FIG. 18 illustrates a specific example of the constant-current ON/OFF typed holding circuit shown in FIG. 14 using the circuit shown in FIG. 16.
Figure 19B:
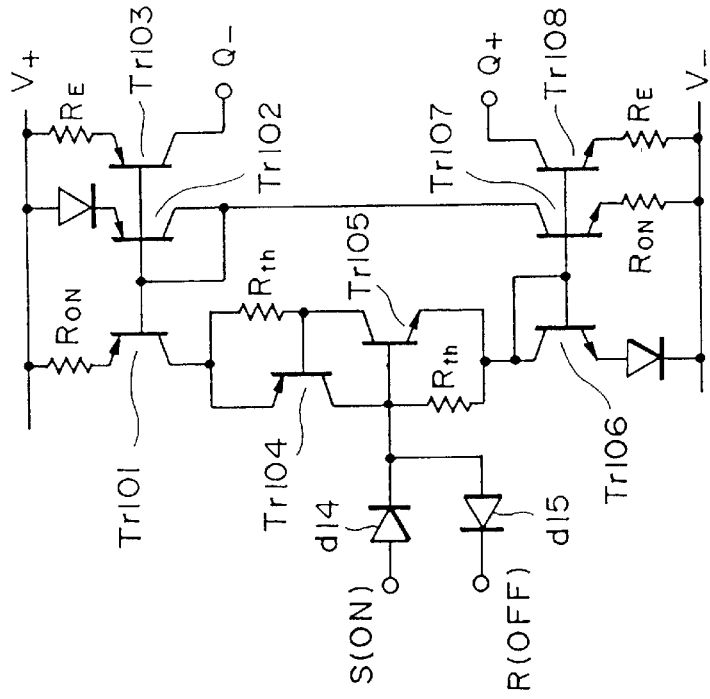
FIG. 19 illustrates a specific example of the constant-current ON/OFF typed holding circuit shown in FIG. 14 using to the circuit shown in FIG. 17.
Figure 19A:
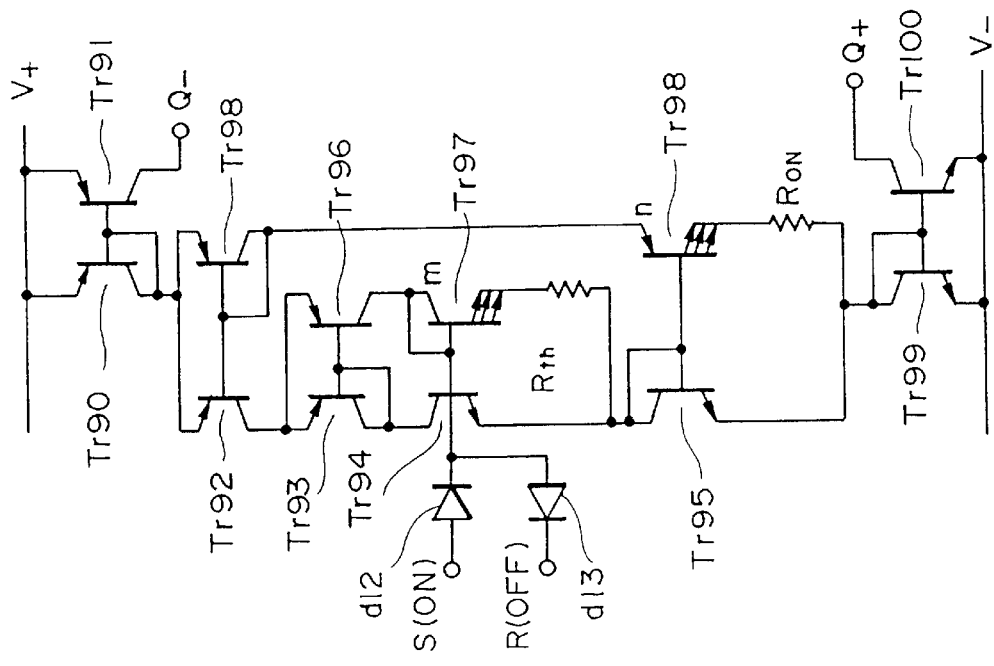

FIG. 18 illustrates an example of a specific circuit according to the constant-current ON/OFF typed holding circuit shown in FIG. 14 using the circuit combination shown in FIG. 16. FIG. 19(a) and (b) illustrate an example of circuits according to the constant-current ON/OFF typed holding circuit shown in FIG. 14 using the circuit shown in FIG. 17. Here, the photo coupler is omitted.

Next, how the constant-current ON/OFF typed current switch shown in FIG. 16 and FIG. 17 operates will be described.

In the constant-current loop ILP, even when a noisy voltage is applied to the constant current path without the switch loop SWL inserted, the constant current path is easily forced into an on-state flowing a constant current. However, when the switch loop is inserted and the switch is in an off-state, the constant current loop ILP is zero in its loop gain and therefore the constant current path can not turn on.

When tracing from a trigger input terminal till either a + common terminal COM or a − common terminal COM, there has to be a direction in which tracing can be possible (i.e., an input terminal→a common terminal→the input terminal→the common terminal). In FIG. 16, for example, tracing is possible in the direction the current mirror circuit 51-1→current mirror circuit 51-3. In the FIG. 17, tracing is possible in the direction the switch typed current amplifier 51-2→the constant-current source typed current amplifier 51-4. Thus, a trigger current which flows in forward direction to a diode can force both the internal and external loops SWL and ILP into an on-state at the same time.

When the on/off threshold current on the internal switch loop SWL is denoted by $i_{th}$, the constant current flowing on the external constant current loop ILP is denotes by $i_{on}$, and $i_{th} < i_{on}$, and when a trigger current more than $i_{th}$ flowing from the trigger terminal to the switch loop SWL is inputted, both the internal and external current amplification loops are forced into an on-state at the same time. Thereby, the internal switch loop SWL becomes stable in a short-circuit state while the external constant-current loop ILP becomes stable in a current flowing state. To force an off-state, it is only necessary to make a trigger current flow so that the current on the switch loop SWL is less than $i_{th}$.

Figure 20:
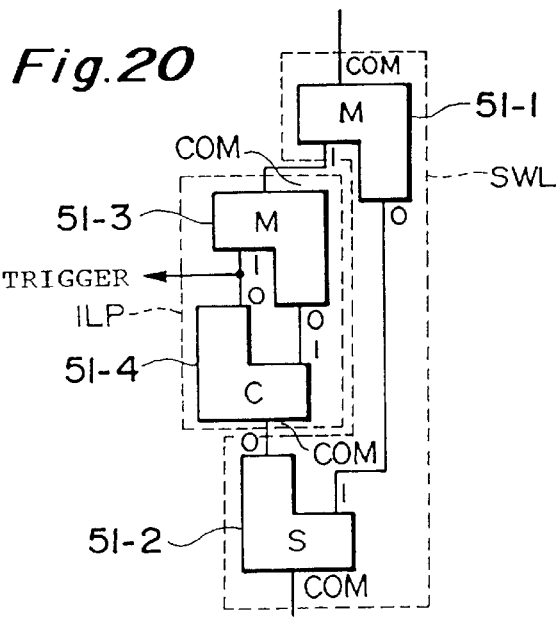
FIG. 20 illustrates a second specific example of the constant-current switch shown in FIG. 14.

[1] (3) (iii) The Second Specific Example of the Constant-current ON/OFF Typed Current Switch FIG. 20 illustrates the second specific example of the constant-current ON/OFF typed current switch shown in FIG. 14.

In the constant-current ON/OFF typed current switch 51, a constant-current loop ILP is inserted between the output terminal O of the switch typed current amplifier 51-2 and the input terminal I of the current mirror circuit 51-1 so that current directions agree. That is, the common terminal COM of the current mirror circuit 51-4 in the constant-current loop ILP is connected to the output terminal O of the switch typed current amplifier 51-2. The common terminal COM of the current mirror circuit 51-3 in the constant-current loop ILP is connected to the input terminal I of the current mirror circuit 51-1 in the switch loop SWL. Thus, a constant-current path in which a circuit between + and − common terminals COMs turns on or off is configured.

On the points where the constant-current loop ILP is inserted in the switch loop SWL, the input terminal I of the current mirror circuit 51-3, whose common terminal COM is connected to the input terminal I of the current mirror circuit 51-1, and the output terminal O of the constant-current source typed current amplifier 51-4 are a trigger input terminal to force both of the internal and external loops ILP and SWL into an on-state. That is, In the example shown in FIG. 20, the input terminal I of the current mirror circuit 51-3 is an input terminal inputting a on-trigger for the constant-current ON/OFF typed current switch 51. Otherwise, when p-type and n-type regions of transistors forming the current mirror circuit 51-3 and the constant-current source typed amplifier 51-4 are exchanged respectively and replaced in the constant-current loop ILP, the input terminal I of the constant-current source typed current amplifier 51-4 is a trigger input terminal for the constant-current ON/OFF typed current switch 51.

Figures 21A, 21B:
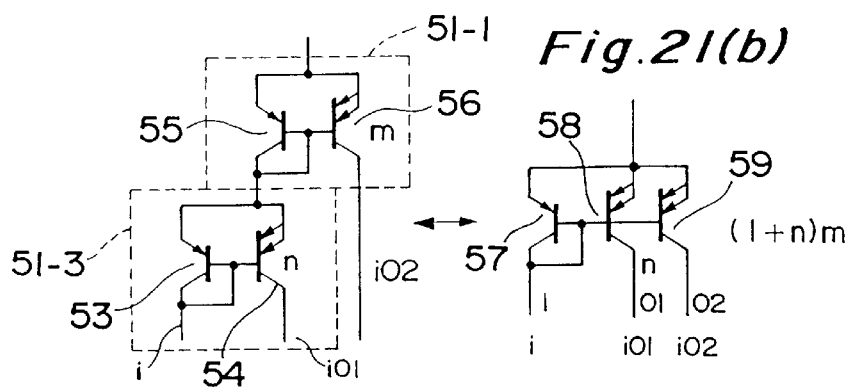
FIG. 21 illustrates a modification example of the constant-current ON/OFF typed current switch shown in FIG. 20.

FIG. 21(a), (b) and (c) illustrate circuits for describing an example of a modification of the constant-current ON/OFF typed current switch shown in FIG. 20.

Figure 21C:
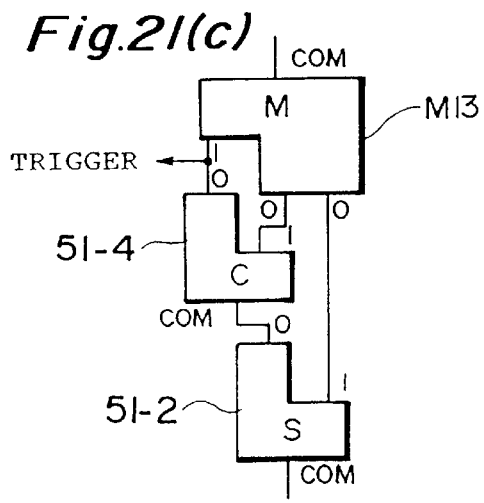

FIG. 21(a) and (b) show transistors of the current mirror circuits 51-1 and 51-3 while FIG. 21(c) shows the constant-current ON/OFF typed current switch.

As shown in FIG. 21(a), let us suppose that transistors 53 and 54 form the current mirror circuit 51-3 in the constant-current loop ILP and that the transistor 54 has n-times as much as the current amplification factor of the transistor 53. Also, let us suppose that transistors 55 and 56 form the current mirror circuit 51-1 in the switch loop SWL and that the transistor 56 has m-times as much as the current amplification factor of the transistor 55. Output currents $i_{o1}$ and $i_{o2}$ of the current mirror circuit 51-3 and the current mirror circuit 51-1 respectively are always in proportion to an input current i of the current mirror circuit 51-3. Thus, combination of the current mirror circuit 51-3 with the current mirror circuit 51-1 can replace the current mirror circuit M13 having an input and two outputs. In this case, the current mirror circuit M13 is made from the three of transistors 57, 58 and 59 as shown in FIG. 21(b). When the transistor 58 has n-times as much as the current amplification factor of the transistor 57 and when the transistor 59 has (1+n) m-times as much as the current amplification factor of the transistor 57, the output currents $i_{o1}$ and $i_{o2}$ are the same as the output current of the circuit shown in FIG. 21(a). Accordingly, the constant-current ON/OFF typed current switch shown in FIG. 20 can be modified to a circuit shown in FIG. 21(c).

Figure 22:
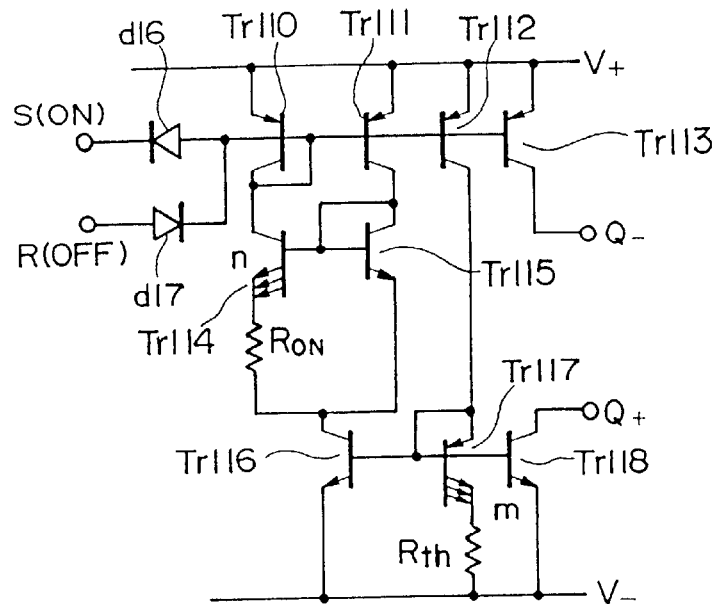
FIG. 22 illustrates the constant-current ON/OFF typed holding circuit shown in FIG. 14 using the circuit shown in FIG. 21.

FIG. 22 illustrates a specific example of the constant current ON/OFF typed holding circuit shown in FIG. 14 using the circuit combinations as shown in FIG. 21.

The constant-current ON/OFF typed holding circuit has a diode d16 whose cathode is connected to a set input terminal S, and a diode d17 whose anode is connected to a reset input terminal R. The cathode of the diode d17 is connected to the anode of the diode d16. The anode of the diode d16 is connected to four PNP transistors Tr110, Tr111, Tr112 and Tr113 on their bases, and to the transistor Tr110 on its collector.

The collector of the transistor Tr110 is further connected to the collector of the NPN transistor Tr114 while the emitter of the transistor Tr114 is connected to one end of a resistor. The collector of the transistor Tr111 is connected to both the collector and the base of a NPN transistor Tr115 and also to the base of the Transistor Tr114. The emitter of the transistor Tr115 is connected to the other end of the resistor Ron and also to the collector of a NPN transistor Tr116. The emitter of a transistor Tr116 is connected to the power supply V–.

The collector of the transistor Tr112 is connected to the collector and the base of a transistor Tr117 and also to the bases of the transistor Tr11G and a NPN transistor Tr118. The emitter of the transistor Tr117 is connected to the power supply V– via the resistor Rth. The collector of transistor Tr113 and of transistor Tr118 serve as a current flowing-out output terminal and a current flowing-in output terminal respectively.

Next, the operation of the constant-current ON/OFF typed current switch shown in FIG. 20 will be described.

As opposed to the constant-current ON/OFF typed current switch shown in FIG. 20, encapsulating switch loop SWL determines a on- or a of-state. When making a trip from a trigger input terminal through the common terminal of a current mirror circuit 51-1 in an external switch loop SWL, the trip is in the following order: an input terminal I→a common terminal COM→an input terminal I→common terminal COM. Accordingly, by forcing a trigger current to flow in forward direction of diode, both of the external and internal loops SWL and ILP can be turned into an on-state at the same time.

The on/off threshold current value of the external switch loop SWL is denoted by $i_{th}$, the constant-current value of the internal constant-current loop ILP is denoted by $i_{on}$, and $i_{th} < i_{on}$. When a trigger current, in which a current flowing into the switch loop SWL is more than $i_{th}$, is inputted from a trigger input terminal, both of the internal and external current amplification loops approach an on-state at the same time, and the external switch loop SWL is short-circuited (i.e., the switch typed current amplifier 51-2 is saturated), and also, the constant-current loop ILP is forced into an on-state which flows a current and becomes stable. Also, by the operation of the current mirror circuit 51-1, a current in proportion to the current $i_{on}$ flows between the output terminal O of the current mirror circuit 51-1 and the input terminal I of the constant-current source typed amplifier 51-2. In order to stop the current flowing, it is only necessary to input a trigger current so that a current flowing from any input points in the switch loop SWL is less than $i_{th}$.

Figure 23:
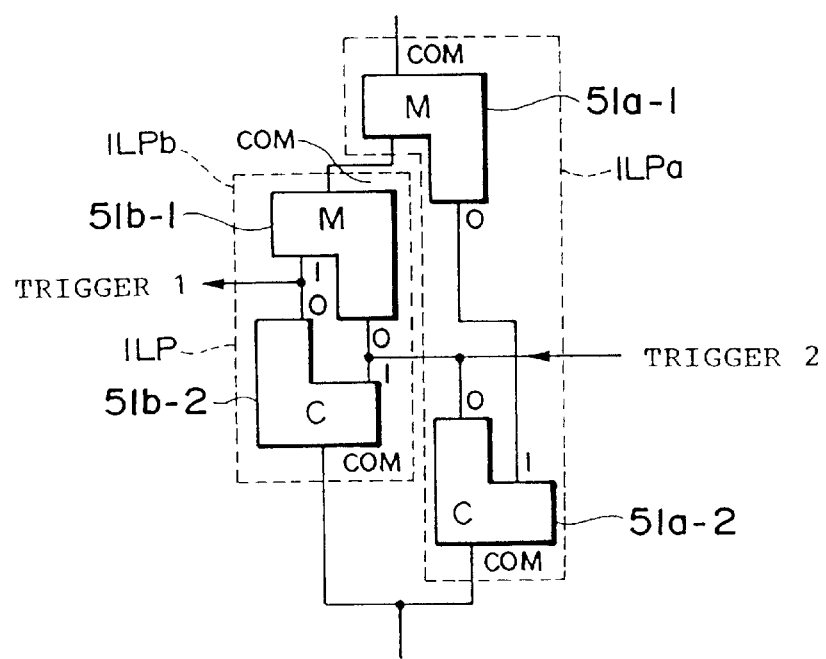
FIG. 23 illustrates a third specific example of the constant-current ON/OFF typed current switch.

[1] (3) (iv) A Third Specific Example of the Constant-current ON/OFF Typed Current Switch FIG. 23 is a block diagram showing the third specific example of the constant-current ON/OFF typed current switch.

In the aforementioned sections [1] (3) (ii) and [1] (3) (iii), the constant-current ON/OFF typed current switch is configured using the constant-current loop ILP and the switch loop SWL shown in FIG. 15. Just like the circuit shown in FIG. 23, a first and second constant-current loops ILPa and ILPb are able to be used to create another constant-current ON/OFF typed current switch.

The constant-current loop ILPa has a first linear current mirror circuit 51a-1 and a constant-current source typed current amplifier 51a-2 as a first non-linear current amplifier. The output terminal O of the current mirror circuit 51a-1 is connected to the input terminal I of the constant-current source typed current amplifier 51a-2. Further, the constant-current loop ILP has a second linear current mirror circuit 51b-1 and a constant-current source typed current amplifier 51b-2 as a second non-linear current amplifier. The output terminal O of the current mirror circuit 51b-1 is connected to the input terminal I of the constant-current source typed current amplifier 51b-2. The output terminal O of the constant-current source typed current amplifier 51b-2 is connected to the input terminal I of the current mirror circuit 51b-1. The common terminal COM of the current mirror circuit 51b-1 is connected to the input terminal I of the current mirror circuit 51a-1 in the constant-current loop ILPa. The common terminal COM of the constant-current source typed current amplifier 51b-2 is connected to the common terminal COM of the constant-current source typed current amplifier 51a-2 in the constant-current loop ILPa. The output terminal O of the current mirror circuit 51b-1 and the input terminal of the constant-current source typed current amplifier 5 1b-2 is connected to the output terminal O of the constant-current source typed current amplifier 51a-2.

The common terminal COM of the current mirror circuit 51a-1 and the joint point between the common terminals COM of the constant-current source typed current amplifiers 51a-2 and 51b-2 are the points of current paths. The input terminals I of the current mirror circuit 51b-1 and of the constant-current source typed current amplifier 51b-2 are trigger input terminals from which entire circuits are forced to turn a current flowing on or off.

Figure 24:
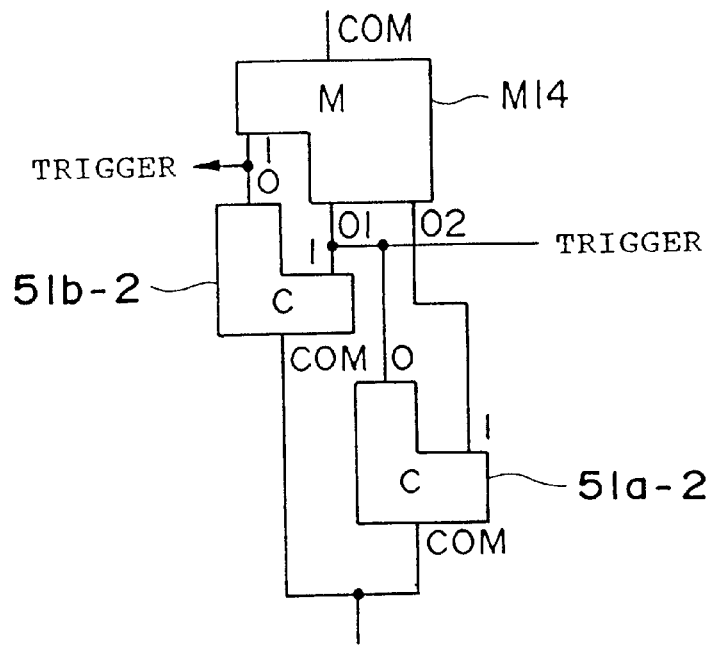
FIG. 24 illustrates a modification example of the circuit shown in FIG.23.

FIG. 24 shows an example modification of the circuit shown in FIG. 23.

The relation between the current mirror circuit 51a-1 and the current mirror circuit 51b-1 both shown in FIG. 23 is the one shown in Pig. 21. The current mirror circuit which is created by integrating the current mirror circuits 51a-1 and 51b-1 is shown in FIG. 24.

Figure 25:
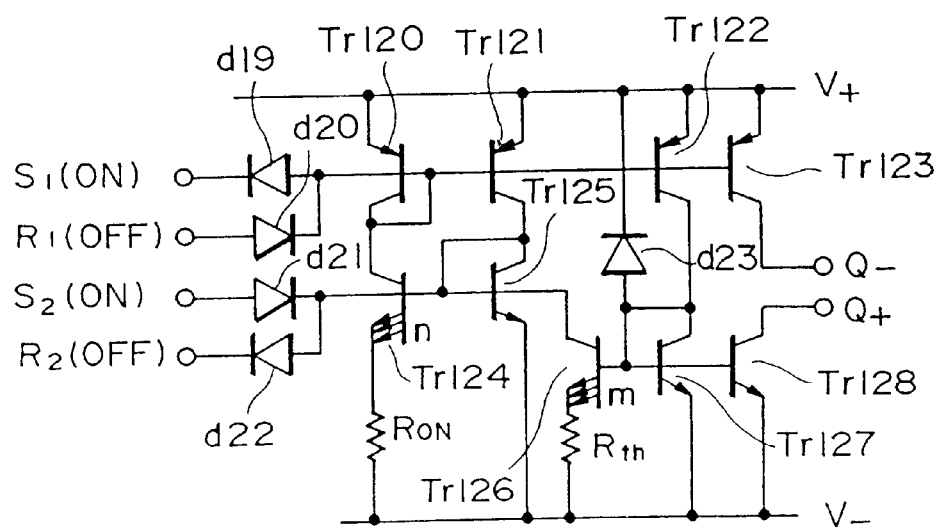
FIG. 25 illustrates a specific example of the constant-current ON/OFF typed holding circuit shown in FIG. 14 using the constant-current ON/OFF typed circuit switch shown in FIG. 24.

FIG. 25 shows a specific example of the constant-current ON/OFF typed holding circuit as shown in FIG. 14 using the constant-current ON/OFF typed current switch as shown in FIG. 24.

FIG. 25 illustrates set input terminals S1 and S2, and a reset input terminals R1 and R2. The constant-current ON/OFF typed current switch has a diode d19 whose cathode is connected to the set input terminal S1, a diode d20 whose anode is connected to the reset input terminal S2, a diode d21 whose anode is connected to the set input terminal S2, and a diode d22 whose cathode is connected to the reset input terminal R2. The anode of the diode d19 is connected to the cathode of the diode d20. The anode of the diode d19 is connected to the collector of the transistor Tr120 and the bases of respective four PNP transistors Tr120, Tr121, Tr122 and Tr123 whose emitters are connected to a power supply V+. The collector of the transistor Tr120 is connected to the collector of a NPN transistor Tr124. The emitter of the transistor Tr124 is connected to a power supply V− via a resistor Ron. The collector of the transistor Tr121 is connected to the collector of a NPN transistor Tr125, and the bases both of the respective transistors Tr125 and Tr124. The cathode of the diode d21 is connected to the anode of the diode d22. The cathode of the diode d21 is connected to the bases of the transistor Tr124 and Tr125, and the collector of the NPN transistor Tr126. The emitter of the transistor Tr125 is connected to the power supply V−.

The collector of the transistor Tr122 is connected to the collector of a NPN transistor Tr127, the three bases of the transistors Tr127, Tr126 and Tr128, and the anode of the diode d23. The cathode of the diode d23 is connected to the power supply V+. The emitter of the transistor Tr126 is connected to the power supply V− via the resistor Rth. The collector of transistor Tr123 and of transistor Tr128 serve as a current flowing-out output terminal and a current flowing-in output terminal respectively.

Next, the operation of the third specific example of the constant-current ON/OFF typed current switch will be described with reference to the example circuit shown in FIG. 23.

The constant-current source typed current amplifier 51b-2 and the current mirror circuit 51b-1 form the constant-current loop ILPb. When the output terminal O of the constant-current source typed current amplifier 51b-2 is not connected, on the path making a trip from the common terminal COM of the current mirror circuit 51a-1 through the current mirror circuit 51b-1 to the common terminal COM of the constant-current source typed current amplifier 51b-2, a current which is determined by the constant-current loop ILPb flows.

When the output terminal of the constant-current source typed current amplifier 51a-2 is connected as shown in FIG. 23, part of the input current of the constant-current source typed current amplifier 51b-2 is taken and the constant-current source typed current amplifier 51a-2 operates as a feedback loop to reduce the current of the constant-current loop ILPb.

The amount of the feedback is determined by the product of gains of the current mirror circuit 51a-1 and the constant-current source typed current amplifier 51a-2. Due to the property of the constant-current source typed amplifier 51a-2, when a current, which flows on the constant-current loop ILPb from which the current mirror circuit 51a-1 inputs, is small, an amount of the feedback is large. Conversely, when the current mentioned above is large, the amount of the feedback is small.

Due to the property as mentioned above, when a current less than the current value $i_{th}$ flows, at which the current should not flow, the feedback loop made from the constant-current source typed amplifier 51a-2 and the current mirror circuit 51a-1 operate effectively to make the loop current gain on the whole circuit less than 1, and thus the current goes to zero. In the vicinity of the current flows, the feedback loop made from the constant-current source typed current amplifier 51a-2 and the current mirror circuit 51a-1 can be neglected, and the constant current $i_{on}$ which is determined by the constant-current loop ILPb flows.

Next, in reference with the specific circuit shown in FIG. 25, the current $i_{on}$ and the current $i_{th}$ will be described. When the absolute temperature is denoted by T, Voltzmann's constant is denoted by k, an electric charge of an electron is denoted by q, the transistor size by n≈m, and the resistance of the resistor by $r_{th} \gg r_{on}$, the current $i_1$, which flows through the transistor Tr125, and the current $i_2$, which flows through the transistor Tr126, both in the vicinity of a current $i_{on}$ in an on-state, can be assumed to be $i_2 \ll i_1$. Thus, the following Expressions are affected.

$$i = i_1 \quad (6)$$

$$i = (kT/qr_{on})\ln(n) \quad (7)$$

$$i_{on} = 3 * i = 3(kT/qr_{on})\ln(n) \quad (8)$$

since, in the vicinity of the threshold current $i_{th}$, it can be approximated that i=0, the following Expressions are affected.

$$i_1 = i/n \rightarrow i_2 = i(n-1)/n \quad (9)$$

$$i = (kT/qr_{th})n(n-1)\ln(mn/(n-1)) \quad (10)$$

$$i_{th} = 3 * i \quad (11)$$

$$= 3(kT/qr_{th})n/\ln(n-1)\ln(mn/(n-1))$$

The both currents $i_{on}$ and $i_{th}$ are determined by the band-gap voltage according to a resistance and the ratio of transistor size. In both of the circuits, one of which is configured in such a way that P-type and N-type regions are inverted respectively, and the other of which is configured in such a way that the constant-current source typed current amplifier 51a-2 is exchanged with the current mirror circuit 51a-1, the currents $i_{on}$ and $i_{th}$ both are determined by the band-gap voltage according to a resistance and the ratio of transistor size.

By letting a trigger current flowing in or out from a trigger input terminal, the amount of current becomes either more than $i_{th}$, equal to, or less than $i_{th}$. Thereby, on and off operations can be conducted with current $i_{on}$ during an on-state and with an absence of current during an off-state respectively.

[ii] The Operation of the Polarity Inversion Detection Circuit Shown in FIG. 1

Figure 26:
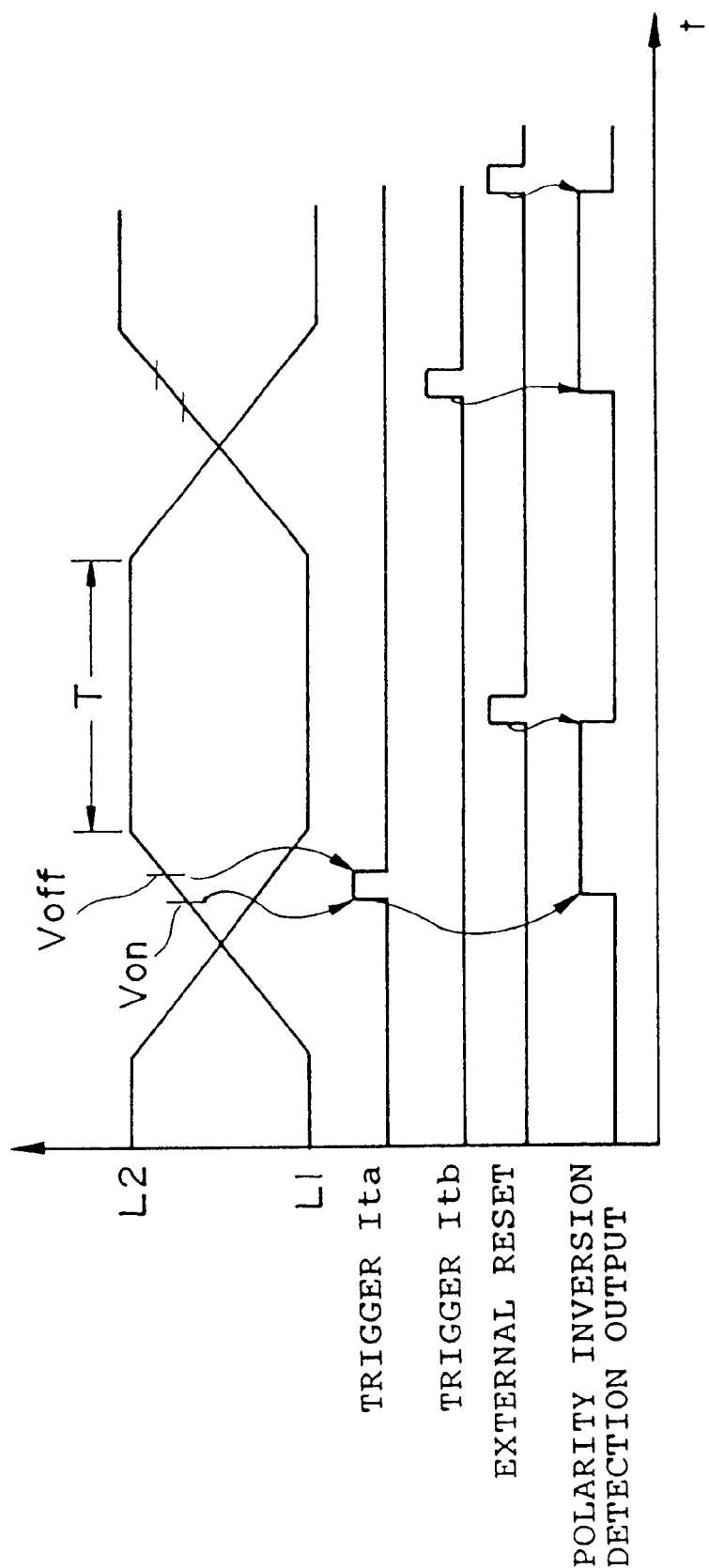
FIG. 26 is a timing chart to explain the operation of the circuit shown in FIG. 1.

FIG. 26 is a timing chart for explaining the operation of the circuit shown in FIG. 1. With reference to FIG. 26, the polarity inversion detection circuit of the first embodiment will be described.

A starting signal or a releasing signal from the exchange is given to a pair of the communication lines L1 and L2. Dependent on whether the starting or the releasing, the direction of signal inversion on the communication lines L1 and L2 is different. To begin with, an explanation will be made on the case that polarity inversion occurs in such a way that a first state, where the voltage on the communication line L1 is low and the voltage on the communication line L2 is high changes into a second state where the voltage on the communication line L1 is high and the voltage on the communication line L2 is low.

Upon the starting of polarity inversion, the voltage on the communication line L2 from the voltage on the communication line L1 decreases little by little, and soon the voltage between the communication line L1 and the communication line L2 approach zero. At the voltage zero, currents on all circuits are zero, and all the circuits are cleared.

Moreover, when the polarity inversion proceeds, the voltage on the communication line L1 from the communication line L2 increases. Accordingly, a power supply voltage, according to the voltage between the communication line L1 and the communication line L2, is supplied from the full-wave rectifier to the constant-current ON/OFF typed holding circuit 50, and the constant-current ON/OFF typed holding circuit 50 becomes able to operate properly. Since the ground terminals of the edge detection circuits 30A and 30B are connected to the negative electrode output terminal of the full-wave rectifier 20, it is clamped to the voltage which is higher by the forward voltage of the full-wave rectifier from the lower voltage side between the communication lines L1 and L2.

The input terminal of the edge detection circuit 30A is connected to the communication line L1. Between the input terminal and the ground terminal of the edge detection circuit 31A, a lower voltage than the voltage between the communication lines L1 and L2 is applied by the forward voltage of the rectifier diode. When the polarity inversion proceeds further, the applied voltage is forced beyond the voltage Von where a current starts flowing and a current Itri starts flowing to the edge detection circuit 30A. When the applied voltage rises further higher and beyond the voltage Voff where no current flows, the current Itri goes to zero and no current flows after then even though the applied voltage still increases. In summary, the edge detection circuit 30A outputs a first edge detection trigger current Ita in proportion to the current Itri only within the time when a voltage in the polarity inversion transition al period is between Von and Voff. That is, pseudo-differential calculus is performed.

On the other hand, since the input terminal of the edge detection circuit 30B is connected to the communication line L2 which is a low voltage side, and, between the input terminal and the ground terminal, a low voltage only for the forward voltage of the rectifier diode is applied, no current flows. Therefore, no trigger current is outputted from the edge detection circuit 30B.]

The trigger current Ita outputted from the edge detection circuit 30A forces the constant-current ON/OFF typed holding circuit 50 to be set via the OR circuit 40, and therefore a constant current starts flowing on the holding circuit 50. By the constant-current ON/OFF typed holding circuit 50, a short time pulse of the trigger current Ita is converted to a lasting polarity inversion detection signal and accordingly a polarity inversion information is outputted to the controlling circuit.

Upon finishing communication which is conducted after the polarity inversion information is detected, a reset signal is sent from the controlling circuit, thus the constant-current ON/OFF typed holding circuit 50 is reset and returns to a stand-by state. In the case that a polarity inversion occurs in such a way that a first state, in that the communication line L1 is on a high voltage and the communication line L2 is on a low voltage, is changed into a second state, in that the communication line L1 is on a low voltage and the communication line L2 is on a high voltage, after the communication lines L1 and L2 meet in the same voltage, the communication line L1 becomes a ground potential side and the communication line L2 becomes a high potential side. Thus, a second edge detection trigger current Itb is outputted from the edge detection circuit 30B and the edge detection circuit 30A stays in an off state. A polarity inversion can be detected by the same operation as described before, except for the operations of the edge detection circuit 30A and the edge detection circuit 30B are exchanged.

The current Ita and Itb are determined by the band-gap voltage of transistor indifferent with the change dV/dt of the input voltage. In a telemetering apparatus, small amount of current flows during stand-by and the time when a polarity inversion is detected. Thus, the voltage V1 sent from a switching system via the communication lines L1 and L2 is almost 48 V (volts). Accordingly, by determining both of the voltage Von, with which a current on each of the edge detection circuits 30A and 30B starts flowing, and the upper-limit voltage Voff, with which a current starts flowing, even though the voltage Vn is noisy during a time T as shown in FIG. 26, the input voltages of the edge detection circuits 30A and 30B are not below the voltage Voff. Therefore, no malfunction is made to output an error trigger.

0<Von<Voff<48 V(48 V−Voff)>(noise level Vn during stand-by)(12)

[III] A result of the Polarity Inversion Detection Circuit Shown in FIG. 1

As described before, the polarity inversion detection circuit of the first embodiment is created by the combination of the edge detection circuits 30A and 30B as described in the section [I] (2). The edge detection circuits 30A and 30B have the following advantages (1-1) to (1-4).

(1-1) Since any capacitor is not used at the polarity inversion edge detection circuit, any capacitor with large capacity is not necessary and it is suitable to make an IC (Integrated Circuit) in accordance with the circuit. Moreover, no current flows other than the time when a edge is detected and therefore a low power consumption can be attained.

(1-2) Output currents, or trigger currents Ita and Itb are not affected by the change dV/dt of the input pulse and determined by a given current value of the constant-current loop 31. Therefore, stable trigger currents can be attained indifferent with the wave shape of a input pulse.

(1-3) By setting the voltages Von and Voff, any malfunction caused by a noise can be prevented.

(1-4) Since there are both type of output signals, or a current flowing-in output and a current flowing-out output, degree of freedom on the constant-current ON/OFF typed holding circuit 50 which is located at the last step.

The polarity inversion detection circuit of the first embodiment uses the constant-current ON/OFF typed holding circuit 50 including the constant-current ON/OFF switch 51 as described in the section [I] (3). The constant-current ON/OFF typed switch 51 has advantages described in the sections (1-5) and (1-6) while the constant-current ON/OFF typed holding switch 50 has an advantage described in the section (1-7).

(1-5) The constant-current ON/OFF switch 51 can determine both of the current $i_{on}$ during an on-state and the threshold current $i_{th}$, which is used to separate the on-state and off-state, independently. When the constant-current source typed current amplifier, for example, the circuits shown in FIG. 5(b) and FIG. 5(d), and the switch typed current amplifier uses circuits such as shown in FIG. 6(b) and FIG. 6(e), whose the current $i_{on}$ during an on-state and the threshold current $i_{th}$ for separating the on- and off-states are determined by the band-gap voltage and the resistance, the ratio $ion/i_{th}$ is not affected by a temperature change or a dispersion on production.

(1-6) The current $i_{on}$ on the constant-current ON/OFF switch during an on-state and the threshold current $i_{th}$ for separating on-state and off-state must be created in such a fashion that they are larger than a noise level. However, since the ratio $i_{on}/i_{th}$ is stable, even though the current $i_{on}$ is lowered to make the ratio smaller, the constant-current ON/OFF switch can operate in a guaranteed manner. Also, because the current $i_{on}$ can be lowered, an amount of power consumption can be reduced.

(1-7) The constant-current ON/OFF typed holding circuit 50 flows complete current, which is turned on or off, to the current mirror circuits M11 and M12 as output circuits, and the photo coupler 52. Thus, it is a high efficient holding circuit.

Accordingly, the polarity inversion detection circuit shown in FIG. 1 has results as shown in the following sections.

(1-8) Conventional capacitor with a large capacity which is essential for a differential calculus operation is unnecessary, and an amount of power consumption is almost zero during stand-by.

(1-9) A malfunction during stand-by can be prevented.

(1-10) Because, during the time when the polarity is inverted, a constant level of a trigger currents Ita and Itb, which have nothing to do with the voltage change velocity dV/dt, can be obtained, the polarity inversion detection circuit with noise-proof can be attained.

(1-11) The current value Itri of the edge detection circuits 30A and 30B, the constant current value $i_{on}$ on the constant-current ON/OFF typed holding circuit 50 in an on-state and the input trigger current threshold current $i_{th}$ which is provided to distinguish an on-state and an off-state to go on the constant-current ON/OFF typed holding circuit 50, are determined by only the band-gap voltage in accordance with transistor sizes and resistance in the circuits. Thus, even though the ambient temperature changes, the ratio $(i_{on}/i_{th}):(Itri/i_{th})$ stays constant. Thus, even though each current value is lowered and a margin between currents is predetermined small amount (a current ratio is predetermined small amount), guaranteed operation is able to be made. Consequently, an amount of electric power consumption can be reduced, and the communication terminal using circuits according to the present invention can be created with a high number of parallel circuits.

(1-12) Any capacitor is not used at the polarity inversion edge detection circuit. Thus, just like in the time when a bell signal is inputted, several polarity inversions occur within a short period of time. Moreover, when the voltage between the communication lines is different dependent upon the polarity on the communication lines, current values stays constant, regardless of the frequency when a polarity inversion occurs. Thereby, a balance on the communication lines stays stable.

(1-13) Since the output signals of the edge detection circuits 30A and 30B are ORed in the OR circuit 40, conventional two holding circuits can be reduced into one circuit of the constant-current ON/OFF typed holding circuit 50. Therefore, the number of circuits can be reduced and externally attached parts (e.g. capacitor and photo coupler) can be reduced.

<<Second Embodiment>>

Figure 27:
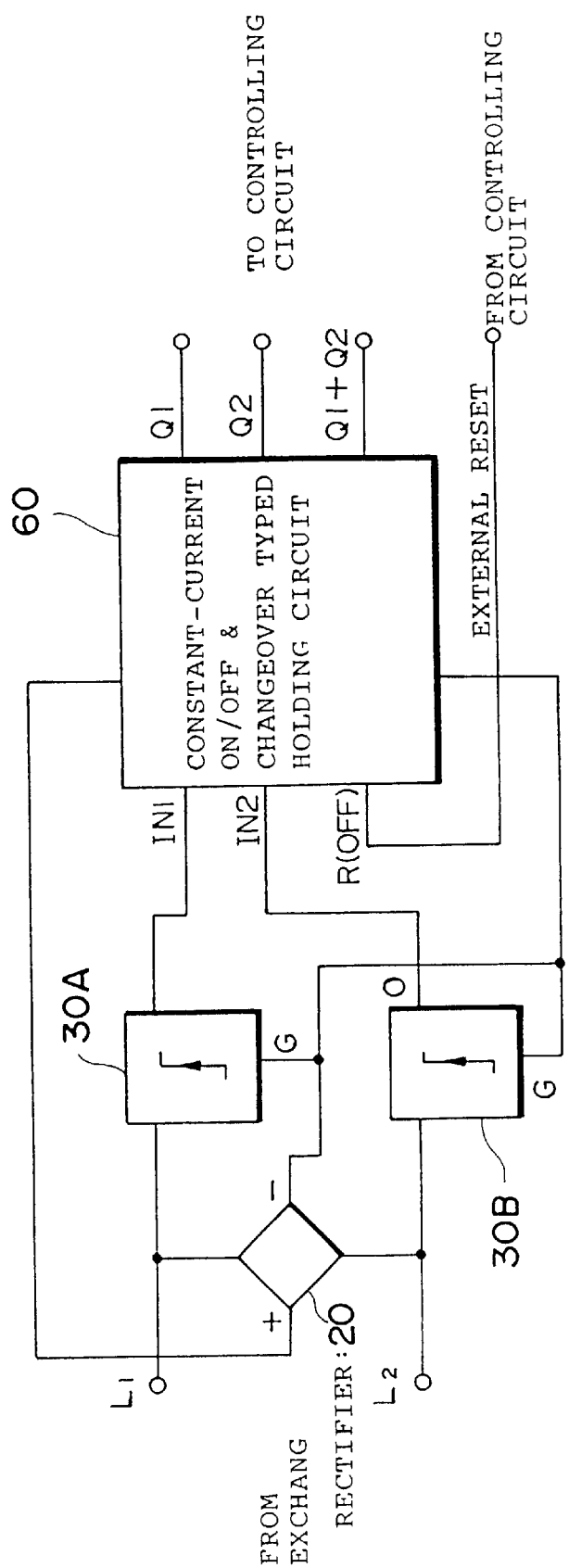
FIG. 27 illustrates the configuration of a polarity inversion circuit of the second embodiment according to the present invention.

FIG. 27 illustrates a configuration of the polarity inversion detection circuit of the second embodiment according to the present invention. Common reference numerals are attached to elements which are the same as the ones shown in FIG. 1.

The polarity inversion detection circuit is for a telemetering apparatus to detect polarity inversion information, as either a starting signal or a releasing signal, from a pair of the communication lines L1 and L2. The polarity inversion detection circuit has a full-wave rectifier 20 which outputs a constant polarity voltage by full-wave rectifying the current flowing on the communication lines L1 and L2, a first edge detection circuit 30A which detects a polarity inversion edge on either the starting signal or the releasing signal and outputs a first edge detection trigger current Ita, and a second edge detection circuit 30B which detects a polarity inversion edge on either the starting signal or the releasing signal and outputs a second edge detection trigger current Itb. The full-wave rectifier 20 and the edge detection circuits 30A and 30B have the same configurations as the ones described in the first embodiment, and they are connected to the communication lines L1 and L2 in the same manner as described in the first embodiment.

Between the positive electrode terminal (+) and the negative electrode terminal (−) of the full-wave rectifier 20, a constant-current ON/OFF & change-over typed holding circuit 60 is connected. The trigger currents Ita and I tb from the edge detection circuits 30A and 30B respectively is inputted to the constant-current ON/OFF & change-over typed holding circuit 60. Also, a reset signal from an external circuit is inputted. The constant-current ON/OFF & change-over typed holding circuit 60 has three output terminals. The three output terminals indicate a logic Q1 which corresponds to a leading edge of a polarity inversion on the communication line L1, a logic Q2 which corresponds to a leading edge on the communication line L2, and a logic (Q1+Q2) which corresponds to whether or not a polarity inversion occurs, respectively. That is, three states, or (Q1=1& Q2=0), (Q1=0& Q2=1) and (Q1=Q2=0) are indicated.

The configuration and operation [IV] of the constant-current ON/OFF & change-over typed holding circuit 60 and the operation [V] and effect [VI] of the polarity inversion detection circuit as shown in FIG. 27 will be described separately.

[IV] The Configuration and Operation of the Constant-current ON/OFF & Change-over Holding Circuit 60

Figure 28:
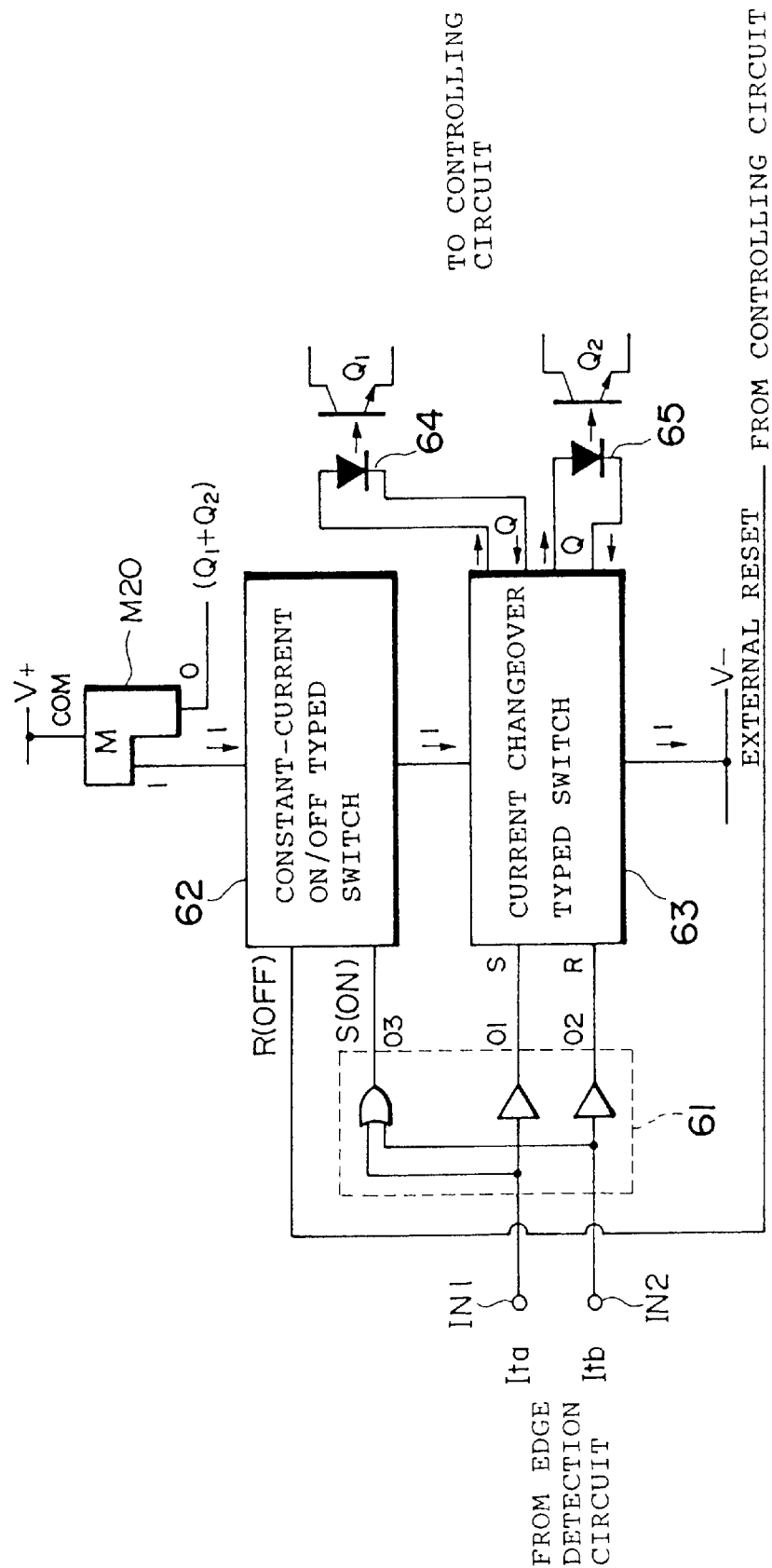
FIG. 28 illustrates the configuration of the constant-current ON/OFF & changeover typed holding circuit 60 shown in FIG. 27.

FIG. 28 illustrates a configuration of the constant-current ON/OFF & change-over typed holding circuit 60.

The constant-current ON/OFF & change-over typed holding circuit 60 has a current mirror circuit M20, an interface circuit 61, a constant current ON/OFF typed switch 62, a current change-over typed switch 63, and photo couplers 64 and 65 both of which are connected to the current change-over typed switch 63.

The current mirror circuit M20 is made from the current mirror circuit which is selected from the circuits shown in FIG. 4 described in the first embodiment. The common terminal COM of the current mirror circuit M20 is connected to a power supply V+. The constant-current ON/OFF typed switch 62 has the same configuration as the constant-current ON/OFF typed switch 62 shown in FIG. 14 through FIG. 24 in the first embodiment. The input terminal I of the current mirror circuit M20 is connected to a terminal of the constant-current flowing-in side of the constant-current ON/OFF typed switch 62. A terminal of the constant-current flowing-out side of the constant-current ON/OFF typed switch 62 is connected to the positive power supply terminal of the current change-over typed switch 63 while a negative power supply terminal of the current change-over typed switch 63 is connected to a power supply V−.

The current change-over typed switch 63 has current output terminals Q and Q/, and select either Q or Q/ to output a current according to the selection.

The photo coupler 64 as a first output circuit is connected to the current output terminal Q while the photo coupler 65 as a second output circuit is connected to the other current output terminal Q/. The destination of outputting from the photo couplers 64 and 65 is the controlling circuit which has different ground levels.

The trigger current Ita outputted from the edge detection circuit 30A indicates a polarity inversion on the starting side and the releasing side. The trigger current Ita is inputted to the input terminal IN1 of the interface circuit 61. The trigger current Itb outputted from the edge detection circuit 30B indicates a polarity inversion on the starting side and the releasing side. The trigger current Itb is inputted to the input terminal IN2 of the interface circuit 61.

The output terminal O1 corresponding to the input terminal IN1 of the interface circuit 61 is connected to the set terminal S of the current change-over typed switch 63. The output terminal O2 corresponding to the input terminal IN2 of the interface circuit 61 is connected to the reset terminal R of the current change-over typed switch 63. The output terminal O3, from which the result of OR operation of signals outputted from the input terminals IN1 and IN2 of the interface circuit, is connected to the set terminal S of the constant-current ON/OFF typed switch 62. A reset signal from the controlling circuit is inputted to the reset terminal R of the constant-current ON/OFF typed switch 62. The output terminal of the current mirror circuit M20 is the output terminal (Q1+Q2) of the constant current ON/OFF & change-over typed holding circuit 60.

[IV] (1) The Configuration and Function of the Current Change-over Typed Switch 63

Figure 29A:
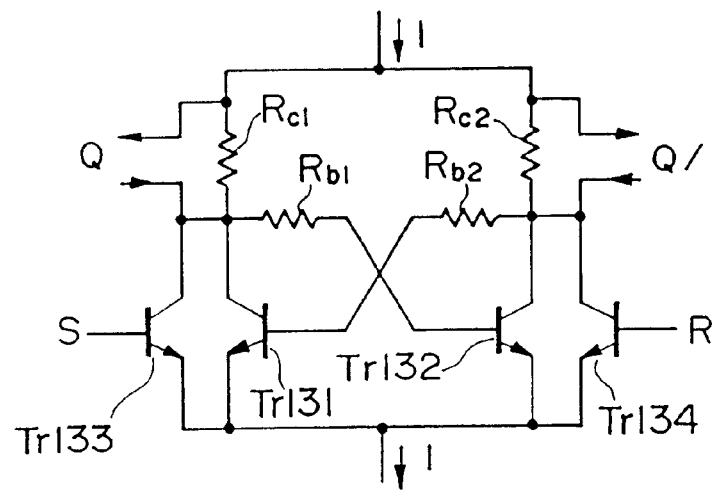
FIG. 29 illustrates a specific example of the current changeover typed switch 63 shown in FIG. 28.

FIG. 29(a) and (b) illustrate specific example circuits of the current change-over typed switch 63 shown in FIG. 28.

The circuit shown in FIG. 29(a) has four NPN transistors Tr131 through Tr134. Between the collector of a transistor Tr131 and a positive power supply terminal, a load resistor Rc1 is connected. Between the collector of a transistor Tr132 and a positive power supply terminal, a load resistor Rc1 is connected. Between the collector of the transistor Tr131 and the base of the transistor Tr132, a resistor Rb1 is connected, while, between the collector of the transistor Tr132 and the base of the transistor Tr13 1, a resistor Rb2 is connected.

The bases of a transistors Tr133 and Tr134 are a set input terminal S and a reset input terminal of the current change-over typed switch 63 respectively. The combination of transistors Tr133 and Tr134 form a trigger input buffer transistors. The collector of the transistor Tr133 as the trigger input buffer transistor is connected to the collector of the transistor Tr131. The collector of the transistor Tr134 as the trigger input buffer transistor is connected to the collector of the transistor Tr132.

The emitters of the transistors 131 through 134 all are connected to a negative power supply terminal. Both ends of the load resistor Rc1 are a current output terminal Q while both ends of the load resistor Rc2 is a current output terminal Q/. The photo couplers 64 and 65 (not shown) are connected to the current output terminals Q and Q/.

Figure 29B:
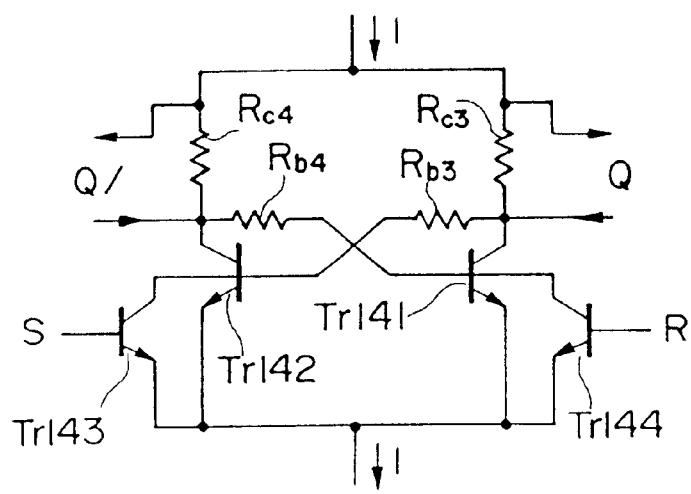

The circuit shown in FIG. 29(b) also has four NPN transistors Tr141 through Tr144. Between the collector of the transistor Tr141 and a positive power supply terminal, a load resistor Rc3 is connected. Between the collector of the transistor Tr142 and a positive power supply terminal, a resistor Rc4 is connected. Between the collector of the transistor Tr141 and the base of the transistor Tr142, a resistor Rb3 is connected while, between the collector of the transistor Tr142 and the base of the transistor Tr141, a resistor Rb4 is connected.

The bases of the transistors Tr143 and Tr144 are connected to a set input terminal S and a reset input terminal R respectively. The combination of the transistors 143 and 144 forms a trigger input buffer transistors. The collector of the transistor 14 as a trigger input buffer transistor is connected to the base of the transistor Tr142. The collector of transistor Tr144 as a trigger input buffer transistor is connected to the base of the transistor Tr141.

The emitters of the transistors 141 through 144 all are connected to the negative power supply terminal. Both ends of a load resistor Rc3 are current output terminals Q while both ends of a load resistor Rc4 are current output terminals Q/.

The circuits shown in FIG. 29(a) and (b) are a well-known positive feedback loop circuit. For example, when either a transistor Tr131 or a transistor Tr132 starts changing into an on-state, the other starts changing into an off-state. Any one of the transistors Tr131 and Tr132 can be turned into an on-state by a trigger current which is inputted from a set input terminal S or a reset input terminal R, and in a stable state one transistor is in an on-state while the other is in an off-state. The transistors Tr141 and Tr142 operate the same as the operations of the transistors Tr131 and 132.

[IV] (2) The Configuration of the Interface Circuit 61

FIG. 30(a) through (d) and FIG. 31(a) through (b) illustrate specific example circuits of the interface circuit shown in FIG. 28.

The interface circuit 61 has a configuration in that between a first circuit which is connected at the input terminals IN1 and IN2 and the constant-current ON/OFF typed switch 62 which is connected to an output terminal O3, and between the first circuit and the current change-over typed switch 63 which is connected to output terminals O2 and O3 the interface circuit 61 determines same current directions (a terminal IN1→a terminal O1) and (a terminal IN2→a terminal O2) so that the constant-current ON/OFF typed switch 62 and the current change-over typed switch 63 can be well-operated by output currents from the first circuit. Moreover, the interface circuit 61 realizes an OR operation between the input terminals IN1 and IN2 and determines same current direction ((the terminals IN1 and IN2)→a terminal O3).

An inversion of current directions is conducted by an internal current mirror circuit, and an OR operation is performed by a wired-OR configuration. When a trigger pulse current is inputted to the input terminal IN1, it is forwarded to both of the terminals O1 and O3. When a trigger pulse current is inputted to the input terminal IN2, it is forwarded to the terminals O2 and O3.

FIG. 30(a) shows an interface circuit which inputs on- and off-currents and which has current mirror circuits M21 and M22 both in which common terminals COM are connected to a power supply V−. The input terminal IN1 is connected to the output terminal O1 in the interface circuit and also connected to the input terminal I in the current mirror circuit M21. The output terminal O in the current mirror circuit M21 is connected to the output terminal O3 in the interface circuit via a wired OR 61a. The input terminal IN2 is connected to the output terminal O2 in the interface circuit and also connected to the input terminal I in the current mirror circuit M22. The output terminal O in the current mirror circuit M22 is connected to the output terminal O3 via the wired OR 61a.

FIG. 30(b) also shows an interface circuit which inputs an on- and off-current, and has current mirror circuits M23 and M24 both whose common terminals are connected to a power supply V−, and a current mirror circuit M25 whose common terminal is connected to a power supply V+. The input terminal IN1 is connected to the output terminal O1 in the interface circuit, and also connected to the input terminal in the current mirror circuit M23. The output terminal of the current mirror circuit M23 is connected to the input terminal I in the current mirror circuit M25. The input terminal IN2 is connected to the output terminal O2 in the interface circuit, and also connected to the input terminal I in the current mirror circuit M24. The output terminal in the current mirror circuit M25 is connected to the output terminal O3 in the interface circuit.

FIG. 30(c) shows an interface circuit which inputs an on- and off-flowing-out currents, and which has current mirror circuits M26 and M27, both of which have two outputs, whose common terminals are connected to a power supply V+. The input terminal IN1 is connected to the input terminal of the current mirror circuit M26 while the input terminal IN2 is connected to the input terminal I of the current mirror circuit M27. One output terminal of the current mirror circuit M26 is connected to the output terminal O1 of the interface circuit, the other output terminal is connected to the output terminal O3 of the interface circuit via a wired-OR 61c. One output terminal of the current mirror circuit M27 is connected to the output terminal O2 of the interface circuit while the other output terminal is connected to the output terminal O3 via the wired-OR 61c.

FIG. 30(d) also shows a interface circuit which inputs on- and off-flowing-out currents, and has current mirror circuits M28 and M29, both of which have two outputs, whose common terminals COM are connected to a power supply V+, and a current mirror circuit M30 whose common terminal is connected to a power supply V−. the input terminal IN1 is connected to the input terminal I of the current mirror circuit 28 while the input terminal IN2 is connected to the input terminal I of the current mirror circuit M29. One output terminal of the current mirror circuit M28 is connected to the output terminal O1 of the interface circuit while the other output terminal is connected to the input terminal I of the current mirror circuit M30 via a wired-OR 61d.

One output terminal of the current mirror circuit M29 is connected to the output terminal O2 of the interface circuit while the other output terminal is connected to the input terminal I of the current mirror circuit M30 via a wired-OR 61d. The output terminal O of the current mirror circuit M30 is connected to the output terminal O3 of the interface circuit.

Figure 31B:
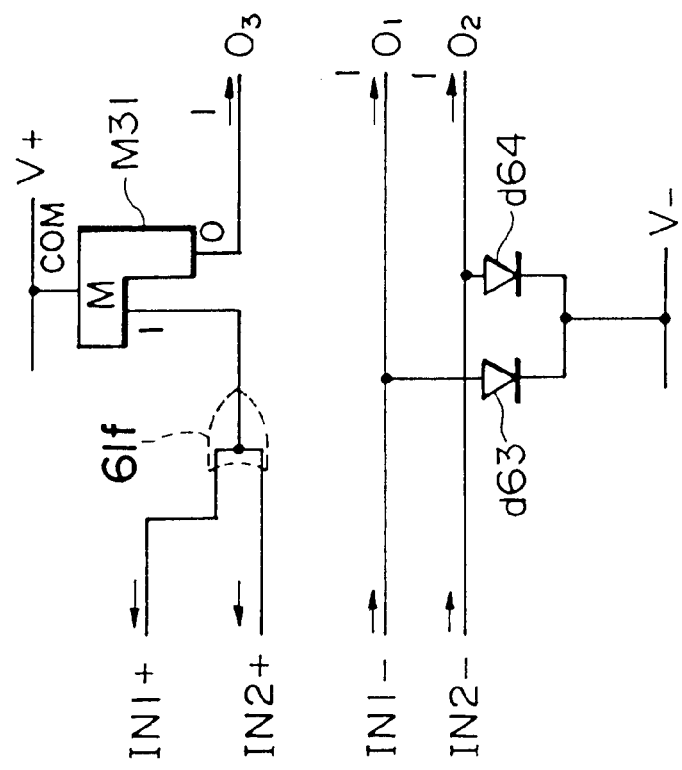
FIG. 31 illustrates an example configuration of the interface circuit 61 shown in FIG. 28.
Figure 31A:
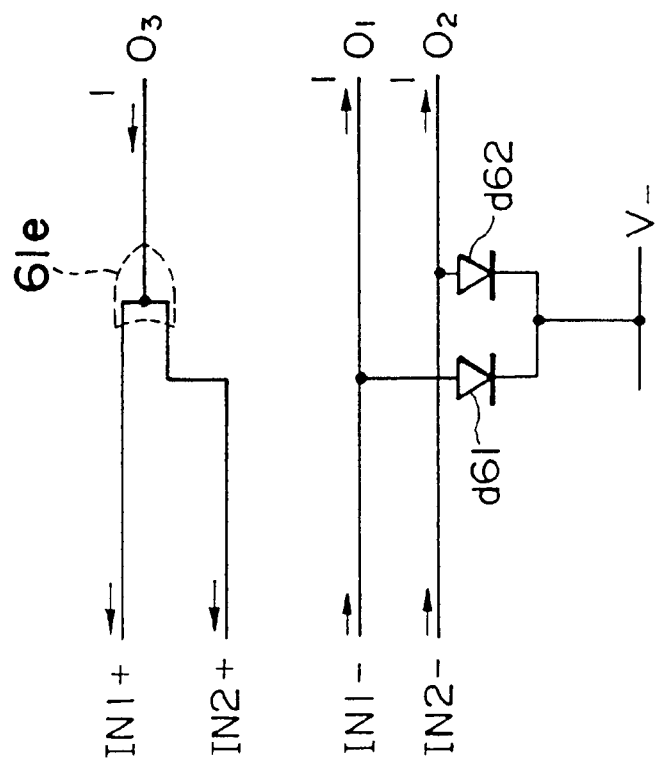

FIG. 31(a) shows an interface circuit whose input terminal has both current flowing-in and -out modes. The interface has diodes d61 and d62 whose cathodes both are connected to a power supply V−. A current flowing-in side of the input terminal IN1 is connected to the output terminal O1 of the interface circuit, and also connected to the anode of the diode d61. A current flowing-in side of the input terminal IN2 is connected to the output terminal O2 of the interface circuit, and also connected to the anode of the diode d62. Current output sides of the input terminals IN1 and IN2 are wired-OR connected (wired-OR 61e), and also connected to the output terminal O3 of the interface circuit.

FIG. 31(b) also shows an interface circuit whose input terminal has current flowing-in and -out modes, and has diodes d63 and d64, whose both cathodes are connected to a power supply V−, and a current mirror circuit M31 whose common terminal is connected to a power supply V+. A current flowing-in side of the input terminal IN1 is connected to the output terminal O1 of the interface circuit, and also connected to the anode of the diode d63. A current flowing-in side of the input terminal IN2 is connected to the output terminal O2 of the interface circuit, and also connected to an anode of the diode d64. Current flowing-out sides of the input terminals IN1 and IN2 are wired-OR connected (wired-OR 61f). The output side of the wired-OR 61f is connected to the input terminal of the current mirror circuit M31 while the output terminal of the current mirror circuit M31 is connected to the output terminal of the interface circuit.

FIG. 30(a) and (c) and FIG. 31(a) illustrate interface circuits each of which is used for a constant-current ON/OFF typed switch 62 (e.g. as shown in FIG. 16, FIG. 18, FIG. 20, FIG. 21, and FIG. 22) which is located at the last step and which turns into an on-state by a flowing-out current trigger. FIG. 30(b) and (d) and FIG. 31(b) illustrate interface circuits (e.g. as shown in FIG. 17 and FIG. 19) each of which turns into an on-state by a flowing-in current.

[IV] (3) Operation of Constant-current ON/OFF & Change-over Holding Circuit 60

During stand-by, currents of the trigger currents Ita and Itb and an external reset signal are zero, and the constant-current ON/OFF typed switch 62 is in an off-state. When the constant-current ON/OFF typed switch 62 is in an off-state, no current flows on the current change-over typed switch 63 and current mirror circuit M20, which is connected to the current change-over typed switch 63 in series, both of which are sandwiched between the power supply V+ and the power supply V−, and no output current on the current mirror circuit M20 flows. Also, no currents on the photo couplers 64 and 65 flow.

Here, when a trigger current Ita is inputted from the input terminal IN1, the trigger current Ita is supplied to both set input terminals S of the respective current change-over typed switch 63 and constant-current ON/OFF typed switch 62 form the interface circuit 61. Consequently, the constant-current ON/OFF typed switch 62 turns into an on-state, currents flows on the current change-over typed switch 63 and current mirror circuit M20, and thus a constant current flows from the output terminal O of the current mirror circuit.

At this time, when a set input current is inputted into the set terminal of the current change-over typed switch 63 inputs, a current is outputted from the current output terminal Q. Accordingly, a current flows on the photo coupler 64. Further, no current is outputted from the current output terminal Q/ and no current flows on the photo coupler 65.

When a trigger current Itb is inputted via the input terminal IN2 in a stand-by state, the trigger current Itb is supplied to the reset input terminal R of the current change-over typed switch 63 and the set input terminal S of the constant-current ON/OFF typed current switch 62 from the interface circuit 61. Consequently, the constant-current ON/OFF typed switch 62 turns into an on-state, currents flow on the current change-over typed switch 62 and the current mirror circuit M20, and a constant current is outputted from the output terminal O of the current mirror circuit M20.

At this time, when the current change-over typed switch 63 inputs a reset signal, a current is outputted from the current output terminal Q/. Accordingly, a current flows on the photo coupler 65. Further, no current is outputted from the current output terminal Q, and no current flows on the photo coupler 64.

When the constant-current ON/OFF typed switch 62 is in an on-state, inputting a trigger current into the reset input terminal R of the constant-current ON/OFF typed switch 62 forces the constant-current ON/OFF typed switch 63 into an off-state and stand-by state.

When the constant-current ON/OFF typed switch 62 is in an on state, the photo coupler 64 is in an on-state in accordance with a current outputting from the output terminal Q of the current change-over typed switch 63, the photo coupler 65 is in an off-state, and the current mirror circuit M20 continues to output a constant current, when a trigger current Itb is inputted from the input terminal IN2, the trigger current is inputted into both of the reset input terminal R of the current change-over typed switch 63 and the set input terminal S of the constant-current ON/OFF typed current switch 62. Thereby, a current is sent from the output terminal Q/ and flown into the photo coupler 65, and a current sent from the output terminal Q is stopped. That is, no current flows on the photo coupler 64. The current mirror circuit M20 continues to output a constant current.

When the constant-current ON/OFF typed switch 62 is in a on-state, the photo coupler 65 is in an on-state in accordance with a current outputting from the output terminal of the current change-over typed switch 63, the photo coupler 64 is in an off-state in accordance with no current supplied from the output terminal Q, and the current mirror circuit M20 continues outputting a constant current, when a trigger current Ita is inputted from the input terminal IN1, a trigger current is inputted to the set input terminals S of the current change-over typed switch 63 and the constant-current ON/OFF typed switch 62, and the output terminal Q outputs a current which flows on the photo coupler 64. The output terminal Q/ stops supplying a current and no current flows on the photo coupler 65. The current mirror circuit M20 continues outputting a constant current.

To summarize the description above, when the constant-current ON/OFF typed switch 62 receives a reset signal, all outputs return to an off-state. When the trigger current Ita is inputted from the input terminal IN1, the photo coupler 64 turns into an on-state and the photo coupler 65 turns into an off-state. When the trigger current Itb is inputted from the input terminal IN2, the photo coupler 65 turns into an on-state and the photo coupler 64 turns into an off-state. The current mirror M20 turns into an on-state to output a current when either a trigger current from the input terminal IN1 or a trigger current from the input terminal IN2 is inputted. That is, the result of a polarity inversion detection is held. It is only necessary that the constant-current ON/OFF typed switch 62, the current change-over typed switch 63, and the current mirror circuit M20 are connected in series, and thus the order of any arrangement in series among them is possible to operate the circuit in the same manner, except for the fact that a minor adjustment is necessary on interface circuits.

[V] Operation of the Polarity Inversion Detection Circuit Shown in FIG. 27

Figure 32:
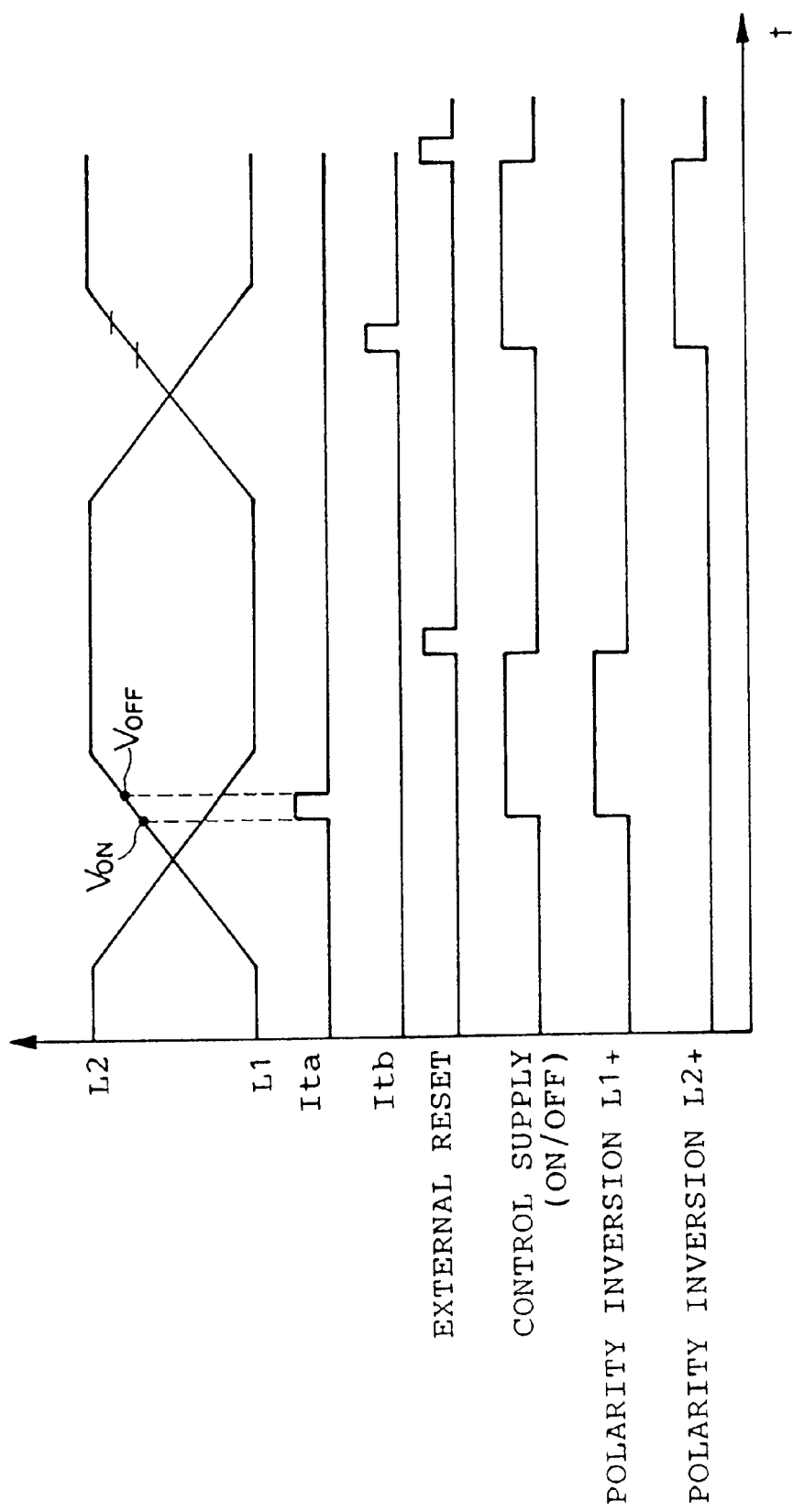
FIG. 32 is a timing chart to show the operation of the polarity inversion detection circuit shown in FIG. 27.

FIG. 32 is a timing chart showing the operation of the polarity inversion detection circuit shown in FIG. 27. With reference to FIG. 32, the operation of the polarity inversion detection circuit of the second embodiment will be detailed.

Dependent upon whether a starting or a releasing on the communication lines L1 and L2 is received, the direction of the polarity inversion on the communication lines L1 and L2 is opposite. To begin with, operations on the circuit when a polarity inversion occurs, from a first state, in that the communication line L1 is in a low electrical potential and the communication line L2 is in a high electrical potential, to a second state, in that the communication line L1 is in a high electrical potential and the communication line L2 is in a low electrical potential, will be described below.

When a polarity inversion starts, the electric potential from the communication line L2 to the communication line L1 drops gradually, and the potential difference between the communication lines L1 and L2 becomes zero. When the potential difference is zero, currents of whole circuits becomes zero and whole circuits are cleared.

Moreover, when the polarity inversion proceeds further, the electrical potential from the communication line L1 to the communication line L2 rises, and the constant-current ON/OFF & change-over typed holding circuit 60 is supplied with a power supply voltage according to the potential difference between the communication lines L1 and L2 from the full-wave rectifier 20, and the constant-current ON/OFF & change-over typed holding circuit 60 reaches an normally operable state.

Ground terminals G of the edge detection circuits 30A and 30B are connected to a negative electrode terminal (−), and thus electric potentials on the ground terminals G are clamped on a higher electric potential, by the forward voltage of a rectifier diode, than a lower electric potential side (L2 is a lower side at this time) between the communication lines L1 and L2.

The input terminal of the edge detection circuit 30A is connected to the communication line L1. Between the input terminal of the edge detection circuit 30A and the ground terminal G, a voltage is applied which is lower than the potential difference between the communication lines L1 and L2 by the forward voltage of a rectifier diode. When the polarity inversion proceeds furthermore, the voltage goes beyond the voltage Von where a current starts flowing, and a current Itri flows on the edge detection circuit 30A. When the voltage increases further and goes beyond the voltage Voff where no current flows, the current Itri becomes zero. After this, even though the voltage increases further, no current flows. The edge detection circuit 30A outputs the trigger current Ita in proportion to the current Itri only during a short time between Von and Voff wherein the voltage becomes, in the polarity inversion transient time. That is, a pseudo-differential calculus is attained. Further, the input terminal of the edge detection circuit 30B is connected to the communication line L2 which is in a lower electrical potential. Since a lower voltage by the forward voltage of a rectifier diode is applied between the input terminal and the ground terminal G, no current flows. Therefore, no trigger current is outputted from the edge detection circuit 30B.

Trigger currents outputted from the edge detection circuit 30A and 30B, as edge detection trigger signals, are inputted to the interface circuit 61 of the constant-current ON/OFF & change-over typed holding circuit 60. The interface circuit 61 generates a trigger signal which starts a change-over operation on the current change-over typed switch 63 by processing the signal level of the edge detection trigger current from the edge detection circuits 30A and 30B, and a trigger current which forces the constant-current ON/OFF typed switch 62 to change into an on-state by processing and ORing the signal level.

During stand-by, no current flows on the constant-current ON/OFF & change-over typed holding circuit 60. When the constant-current ON/OFF & change-over typed holding circuit 60 receives a trigger current Ita from the edge detection circuit 30A, it forces the constant-current ON/OFF typed switch 62 to be turned into an on-state, forces a constant current, which is a common current of the current change-over typed switch 63, and outputs a current from the output terminal Q of the current change-over typed switch 62 (and thus the photo coupler 64 is turned into an on-state).

Likewise, when a trigger current Itb is received from the edge detection circuit 30B, the constant-current ON/OFF & change-over typed holding circuit 60 forces the constant change-over typed switch 62 to be turned into an on-state, which causes a common constant current to be flown on the current change-over typed switch 63, and outputs a current from the output terminal Q/ of the current change-over typed switch 63 (and thus the photo coupler 65 is turned in an on-state).

Since a reset signal from an the controlling circuit causes the constant-current ON/OFF typed switch 62 to be turned into an off-state, the common current of the current change-over typed switch 63 becomes zero and no currents are outputted from the output terminals Q and Q/, and thus the photo couplers 64 and 65 are turned into an off-state.

Dependent upon the direction of a polarity inversion, only one of either the edge detection circuit 30A or the edge detection circuit 30B detects a polarity inversion edge and that operating circuit outputs either trigger pulse current Ita or Itb respectively. Accordingly, a current is outputted from either an output terminal Q or an output terminal Q/ of the constant-current ON/OFF & change-over typed holding circuit 60. When the constant-current ON/OFF & change-over typed holding circuit 60 does not need to hold a polarity inversion information, like when a communication is terminated, the constant-current ON/OFF & change-over typed holding circuit 60 is reset by a reset signal outputted from the controlling circuit and returns in a stand-by state (i.e. Q1=Q2=0, no current flows).

For example, when a polarity inversion occurs without a reset signal being not received from the controlling circuit, like when a bell signal is inputted, the edge detection circuits 30A and 30B output the trigger currents Ita and Itb alternatively in accordance with the polarity inversion. Accordingly, the constant-current ON/OFF & change-over typed holding circuit 60 outputs currents from the output terminals Q and Q/ alternatively. Next, a current is outputted from either the output terminal Q or the output terminal Q/ in accordance with the last polarity state.

In this case, also, when the constant-current ON/OFF & change-over typed holding circuit 60 does not need to hold the polarity inversion information, like when a communication is ended, it is reset by a reset signal from the controlling circuit and returns to a stand-by state.

[VI] Result of the Polarity Inversion Detection Circuit Shown in FIG. 27

As described above, the polarity inversion detection circuit of the second embodiment has a configuration in that a polarity inversion on the communication lines L1 and L2 is detected using the edge detection circuits 30A and 30B which is the same as the ones described in the first embodiment. It has the same advantages as described in the sections (1-1) through (1-7) in the first embodiment. Moreover, the polarity inversion circuit of the second embodiment has a constant-current ON/OFF & change-over typed holding circuit 60.

In the constant-current ON/OFF & change-over typed holding circuit 60, amount of currents both flowing on the photo couplers 64 and 65 are determined in accordance with the constant current of the constant-current ON/OFF typed switch 62 as same as described in FIG. 1. Thus, one resistor determines both current amounts without dispersion. In conventional ways, in order to have outputs from the photo couplers 64 and 65 both of which correspond to a starting and a releasing respectively, two holding circuits are necessary in accordance with the respective photo couplers. Therefore, there is a possibility that a malfunction in which both are turned into on-states occurs. However, in the embodiment of the present invention, three output states (i.e. only photo coupler 64 is on, only photo coupler is on, and both are off) are prepared by one circuit which is made from small number of parts, and thus any malfunction in that both are turned on are prevented from occurring.

Therefore, the polarity inversion detection circuit shown in FIG. 27 has the following (2-1) to (2-7) advantages.

(2-1) A large capacity of capacitor, which is essential for differential operation in conventional ways, is not necessary, and almost no power consumption is attained during stand-by;

(2-2) A malfunction during stand-by can be prevented;

(2-3) When the polarity inversion occurs, constant levels of trigger currents Ita and Itb, which have nothing to do with a potential change velocity dV/dt are, obtained. Thus, a polarity inversion detection circuit with noise-proof can be realized;

(2-4) The polarity inversion circuit has a configuration in that three current values, which are the current value Itri of the edge detection circuits 30A and 30B, the constant current value $i_{on}$ when the constant-current ON/OFF & change-over typed holding circuit 60 is in an on-state, and the input trigger current threshold current $i_{th}$ which separates the constant-current ON/OFF & change-over typed holding circuit 60 into whether an on-state or an off-state, are determined by both of the band-gap voltage, which is determined by the ratio of the transistor sizes in circuit, and resistors in circuit. Thus, even though an ambient temperature changes, the ratio of $(i_{on}/i_{th})$ and $(Itri/i_{th})$ can be kept at a constant value. Accordingly, even though each of the current values are decreased and margins among the current values are small (the ratio of the currents is small), guaranteed operation is able to be attained. Therefore, an amount of an electric power consumption can be reduced, and a communication terminal apparatus using the polarity inversion circuit as described above can be attained by a configuration of highly parallel circuits.

(2-5) Since no capacitor is used in the polarity inversion edge detection circuit, even when several polarity inversions occur within a short period of time and when the voltage between the communication lines differs dependent upon the positive and negative electric potential states, just like when a bell signal is inputted, a current value stays constant. Thus, a balance on the communication lines is not broken;

(2-6) The number of circuits and the number of externally attached parts (e.g. a capacitor and a photo coupler) can be reduced;

(2-7) Just like a bell signal, even when several polarity inversions occurs within a short period of time, guaranteed alternative currents can be outputted from the output terminals Q and Q/. Thus, the controlling circuit (not shown) can detect several alternative outputs without a reset within a short period of time and a bell signal by determining its frequency.

<<Third Embodiment>>

Figure 33:
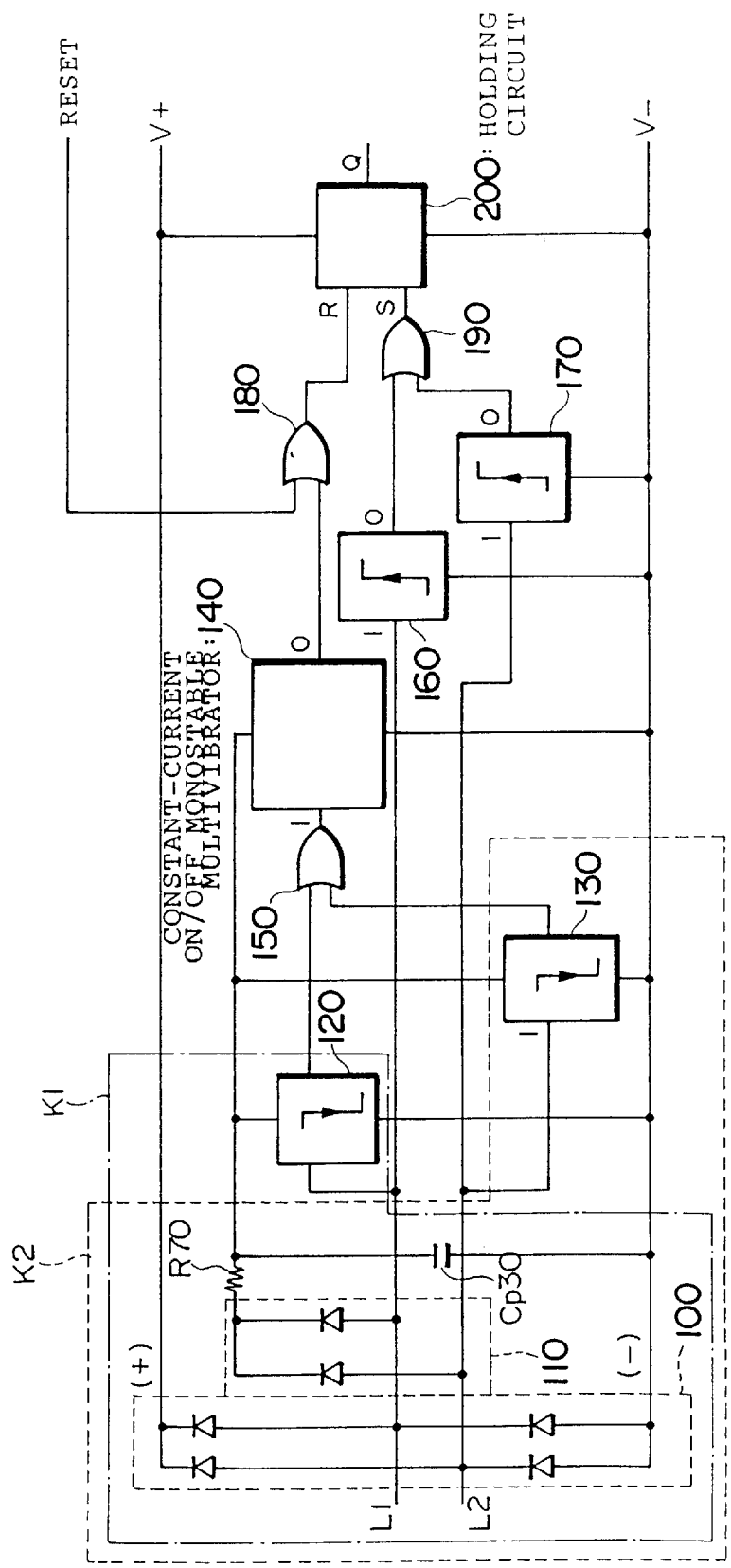
FIG. 33 illustrates whole configuration of a slow polarity inversion detection circuit of a third embodiment according to the present invention.

FIG. 33 illustrates the whole configuration of the slow polarity inversion detection circuit of the third embodiment in accordance with the present invention.

Telemetering communication can be available when a telephone line is not busy. There is the following difference between normal communication and telemetering communication Normal communication: Normal polarity inversion (which takes about 10 ms)+Bell ringing (by bell signal); and Telemetering communication: Slow polarity inversion (which takes about 290 ms)+No bell-ringing.

The conventional polarity inversion circuit and the polarity inversion detection circuits of the first and second embodiments can detect both of the above polarity inversions but, cannot distinguish between the slow polarity inversion and the normal polarity inversion, in which the time of the slow polarity inversion is longer than that of the normal polarity inversion. Thus, the two kinds of communications described above can only be distinguished by detecting whether or not a bell signal is sent after the polarity inversion.

A normal communication has 100% priority over a telemetering communication, which is possible when the line is not being used for normal communication. Therefore, for the communication to succeed, it is important that the telemetering communication be completed in the shortest possible time. The several seconds for determining whether a bell signal is received or not make the communication line unavailable. The slow polarity inversion detection circuit of the third embodiment detects a slow polarity inversion, that it to say, distinguish the slow polarity inversion from the normal inversion. This immediately permits starting of telemetering communication processing, independent from whether or not a bell signal follows.

The slow polarity inversion detection circuit shown in FIG. 33 has two rectifiers 100 and 110. The first rectifier 100 which rectifies in full-wave form the voltage between the communication lines L1 and L2 and provides the next circuit with power-supplies V+ and V−. The second rectifier 110 rectifies the voltage between the communication lines L1 and L2 and provides one electrode of a power supply capacitor Cp30 with a power supply via a current control resistor R70. The other electrode of the capacitor Cp30 is connected to the negative electrode terminal (−) of the rectifier 100. Between the connection point between the current control resistor R70 and capacitor Cp30, and the negative electrode terminal (−), two polarity inversion trailing edge detection circuits 120 and 130, and a constant current ON/OFF monostable multivibrator 140 are connected.

The polarity inversion trailing edge detection circuit 120, the full-wave rectifier 100, the rectifier 110, the resistor R70 and the capacitor Cp30 form a first polarity inversion trailing edge detection circuit K1 (described later), which detects a polarity inversion trailing edge whose electric potential descent on the communication line L1 is (H→0). The polarity inversion trailing edge detection circuit 130, the full-wave rectifier 100, the rectifier 110, the resistor R70 and the capacitor Cp30 form a second polarity inversion trailing edge detection circuit K2 (described later), which detects a polarity inversion trailing edge whose electric potential descent on the communication line L2 is (H→0). As a first detection signal generation circuit, an OR circuit 150 is placed on the output sides of the polarity inversion trailing edge detection circuits 120 and 130. Thus, output trigger currents from the polarity inversion trailing edge detection circuits 120 and 130 are processed, and the result is inputted to the constant-current ON/OFF monostable multivibrator 140. The constant-current ON/OFF monostable multivibrator 140 inputs a trigger current from the OR circuit 150 and outputs a constant-current pulse (i.e. a pulse for masking a polarity inversion detection on a normal communication).

Between the communication line L1 and the negative electrode terminal of the full-wave rectifier, a polarity inversion leading edge detection circuit 160 is connected to detect a polarity inversion leading edge when the electric potential rises (0→H) on the communication line L1. Between the communication line L2 and the negative electrode terminal of the full-wave rectifier 100, a second polarity inversion leading edge detection circuit 170 is connected to detect a polarity inversion leading edge when an electric potential rises (0→H) on the communication line L2. An OR circuit 190 is placed as a second detection signal generation circuit on the output sides of the polarity inversion leading edge detection circuits 160 and 170 to process output trigger currents from the polarity inversion leading edge detection circuits 160 and 170. Further, an OR circuit 180 is placed as a reset purge generation circuit on the output side of the constant-current ON/OFF monostable multivibrator 140, which responds to an external reset signal from the controlling circuit and an output signal from the constant-current monostable multivibrator 140.

The positive and negative electrode terminals of the full-wave rectifier 100 are connected to a holding circuit 200, which is supplied with power supplies V+ and V−. The set input terminal S of the holding circuit 200 is connected to the output terminal of the OR circuit 190, while the reset input terminal R of the holding circuit 200 is connected to the output terminal of the OR circuit 180. The holding circuit 200 is configured such that polarity inversion information is held in accordance with pulse currents from the respective OR circuits 180 and 190 and outputted to the controlling circuit.

The polarity inversion leading edge detection circuits 160 and 170 have the same internal configuration as the edge detection circuits 30A and 30B. The polarity inversion leading edge detection circuits 160 and 170 each performs a pseudo-differential operation using a circuit which outputs a constant current Itri when the applied voltage between the input terminal and the ground terminal is within the range from Von to Voff (on condition that Von<$V_{off}$). More specifically, the trigger currents Ita and Itb are outputted in accordance with a leading edge in which, on a communication line with a lower electric potential, the lower electric potential rises from zero to a higher electric potential.

The polarity inversion trailing edge detection circuits 120 and 130 (will be detailed later), have a configuration such that the edge detection circuits 30A and 30B, each with a current mirror diode and a backward-current-proof diode perform a pseudo-differential operation to detect a polarity inversion trailing edge. The polarity inversion trailing edge detection circuits 120 and 130, each outputs a constant current Itri when the electric potential difference between the positive power supply terminal and the input terminal is within the range from VL to VH (on condition that VL<VH). More specifically, a trigger current is outputted in accordance with a trailing edge in which, on a communication line with a higher electric potential, which is connected to the input terminal of the polarity inversion trailing edge detection circuit, the higher electric potential falls to zero.

The constant-current ON/OFF monostable multivibrator 140 is inputted the trigger current and outputs a guaranteed current pulse. Since the constant-current ON/OFF monostable multivibrator 140 (will be described in detail later)only outputs a pulse when current flows through it, thereby consuming no electric power during stand-by. The holding circuit 200 has a switch circuit which enables or disables current flow (the current flows when a set signal is inputted no current flows when a reset signal is inputted, on condition that a priority is given on the reset), a current mirror circuit, which outputs current in accordance with the output of the switch circuit, and a photo coupler which transfers polarity inversion information to the controlling circuit with a different ground level. The holding circuit 200, for example, can be configured in the same way as the circuit shown in FIG. 14 of the first embodiment.

OR circuits 150, 180 and 190 all perform an OR operation on current signals, which are realized with a wired-OR configuration.

Next, the configuration and function of the slow polarity inversion detection circuit shown in FIG. 33, the operation of the slow polarity inversion detection circuit, and the result of the slow polarity detection circuit will be described in the following sections [VII], [VIII] and [IX] respectively.

[VII] The Configuration and Function of the Slow Polarity Inversion Trailing Edge Detection Circuits K1 and K2

The polarity inversion trailing edge detection circuits K1 and K2, and the constant-current monostable multivibrator 140 will be described in subsections [VII] (1) and [VII] (2), respectively.

[VII] (1) Polarity Inversion Trailing Edge Detection Circuits K1 and K2

The polarity inversion trailing edge detection circuit is configured from a pulse trailing edge detection circuit for detecting a trailing edge of an input pulse. The pulse trailing edge detection circuit will be described in subsection [VII] (1) (i). The configuration of the polarity inversion trailing edge detection circuit and the operation of the polarity inversion trailing edge detection circuits K1 and K2 will be described in subsections [VII] (1) (ii) and [VII] (1) (iii), respectively.

[VII] (1) (i) Pulse Trailing Edge Detection Circuit

Figure 34:
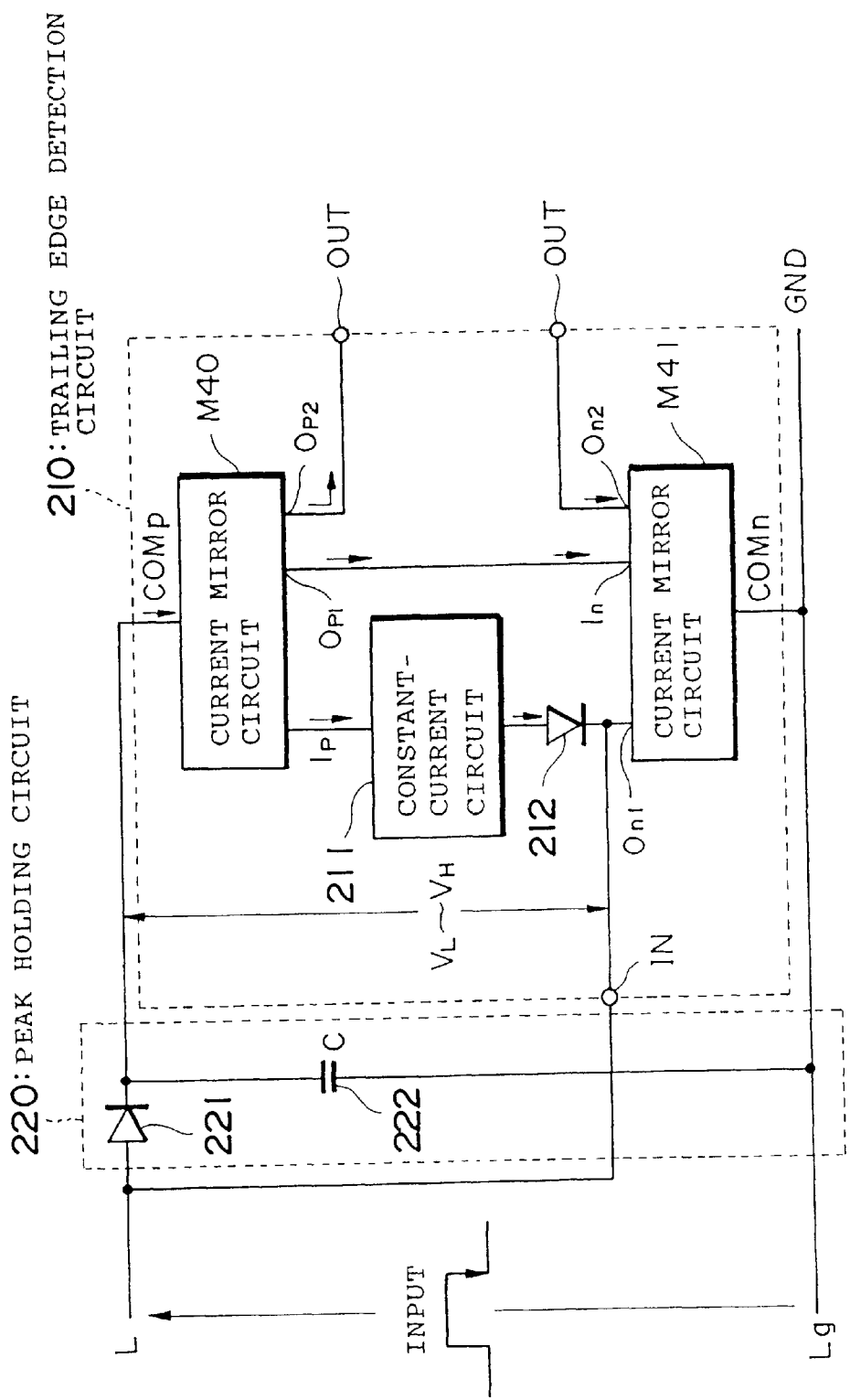
FIG. 34 illustrates a pulse trailing edge detection circuit.

FIG. 34 illustrates a configuration of the pulse trailing edge detection circuit.

The pulse trailing edge detection circuit has a trailing edge detection circuit 210 and a peak holding circuit 220. The trailing edge detection circuit 210 has a circuit 211, two linear current mirror circuit M40 and M41 and a backward-current-proof diode 212. In the circuit 211, constant current flows within a predetermined constant-voltage range. This is also used for the polarity inversion leading edge detection circuit. The first linear current mirror circuit M40 has a current flowing-out input terminal Ip, two current flowing-out output terminals Op1 and Op2, and a common terminal COMp to which current flows in, the total amount of which is equal to the total current flowing through the two current flowing-out output terminals Op1 and Op2. The second linear current mirror circuit M41 has a current flowing-in input terminal $I_{n1}$, two current flowing-in output terminals $O_{n1}$ and $O_{n2}$, and a common terminal COMn, from which current flows out, the amount of which is equal to the total amount flowing-out of the two current flowing-out output terminals $O_{n1}$ and $O_{n2}$. The peak holding circuit 220 has a rectifier diode and a capacitor 222 for the peak holding.

Figure 13A:
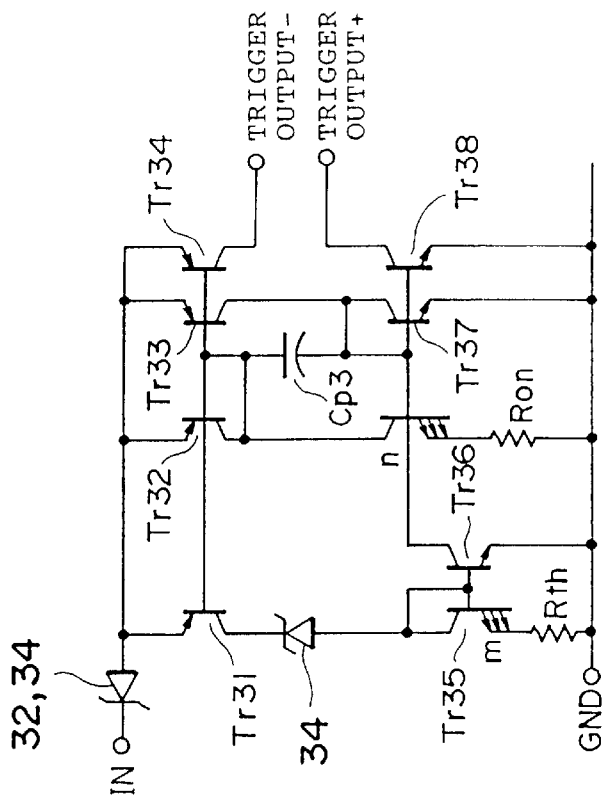
FIG. 13 shows another configuration of the circuits shown in FIG. 7.
Figure 13B:
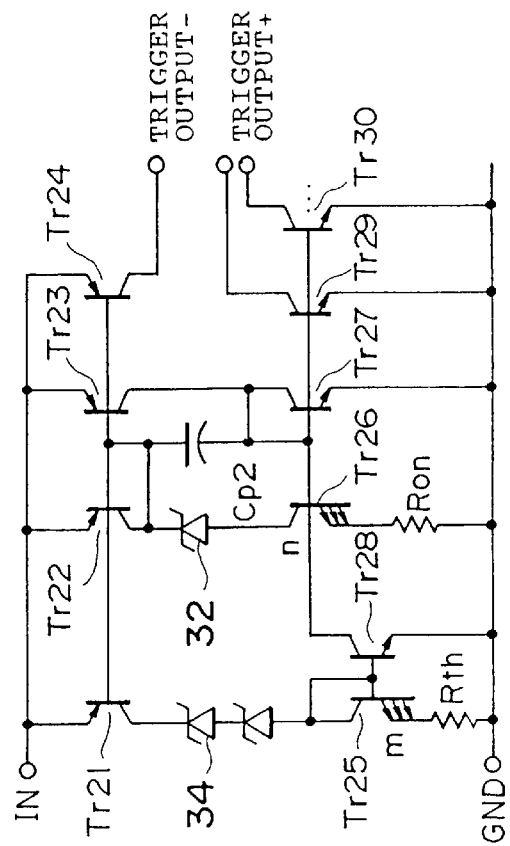
Figure 13C:
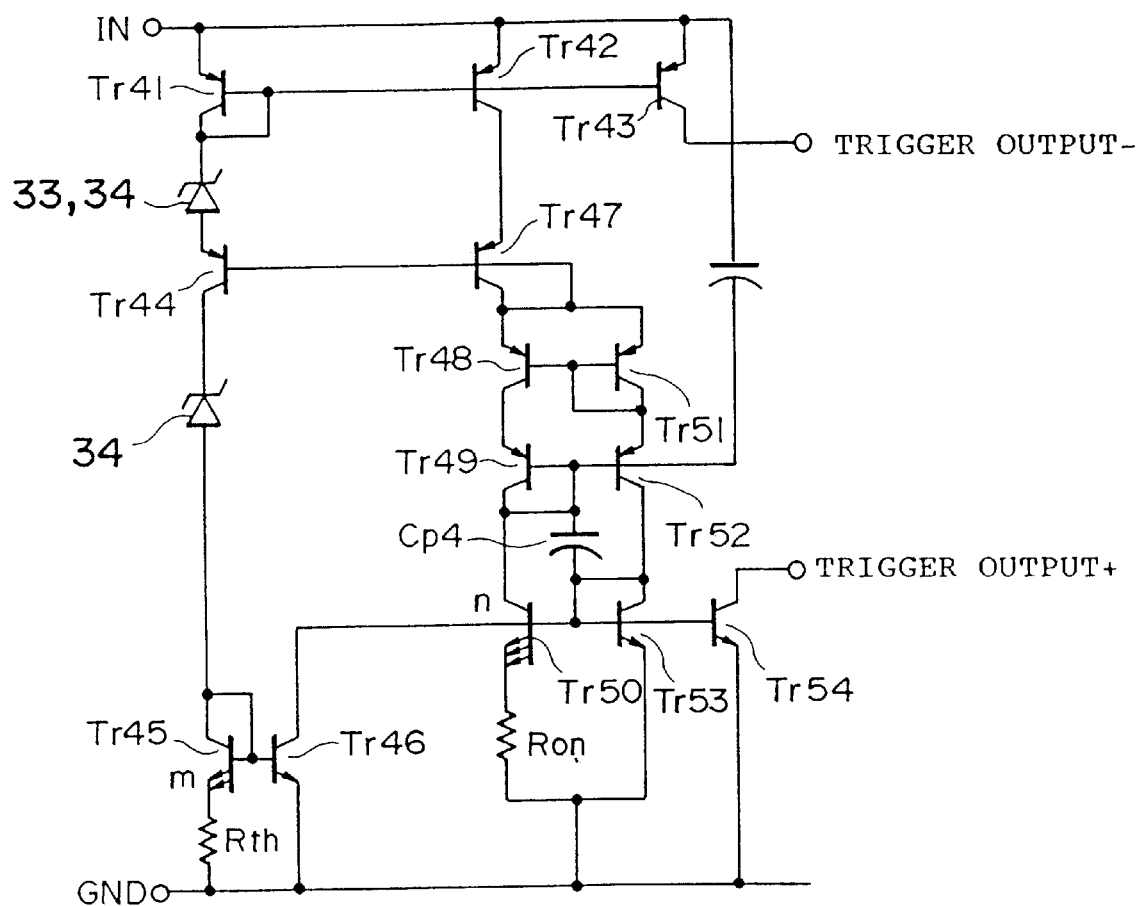
Figure 13E:
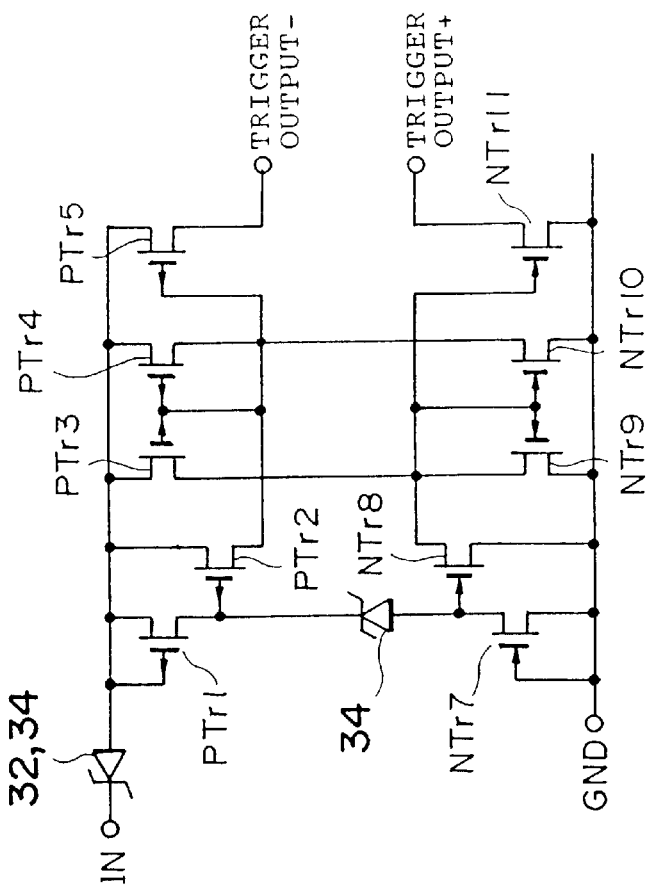
Figure 13D:
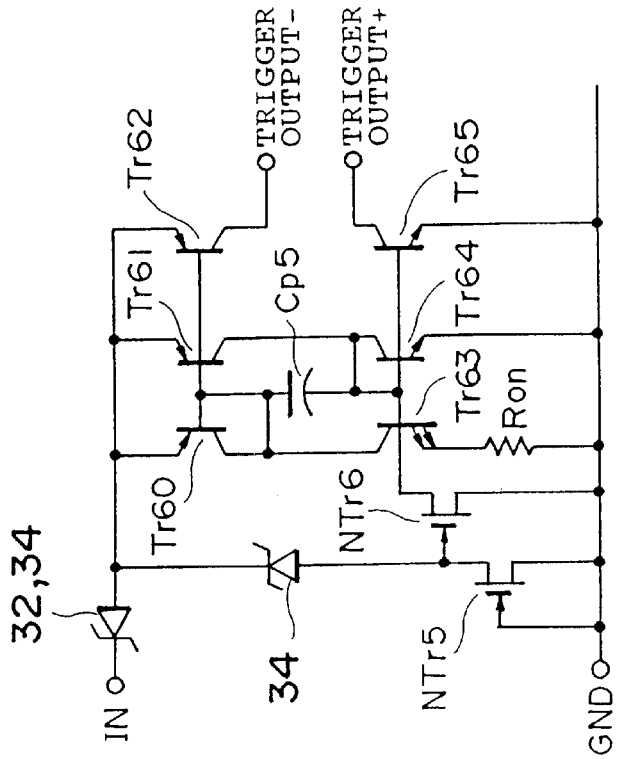

To create the circuit 211, in which a constant current flows within a given constant-voltage range, the constant current circuit shown in FIG. 13(a) and FIG. 13(d) in the first embodiment can be used.

Figure 35:
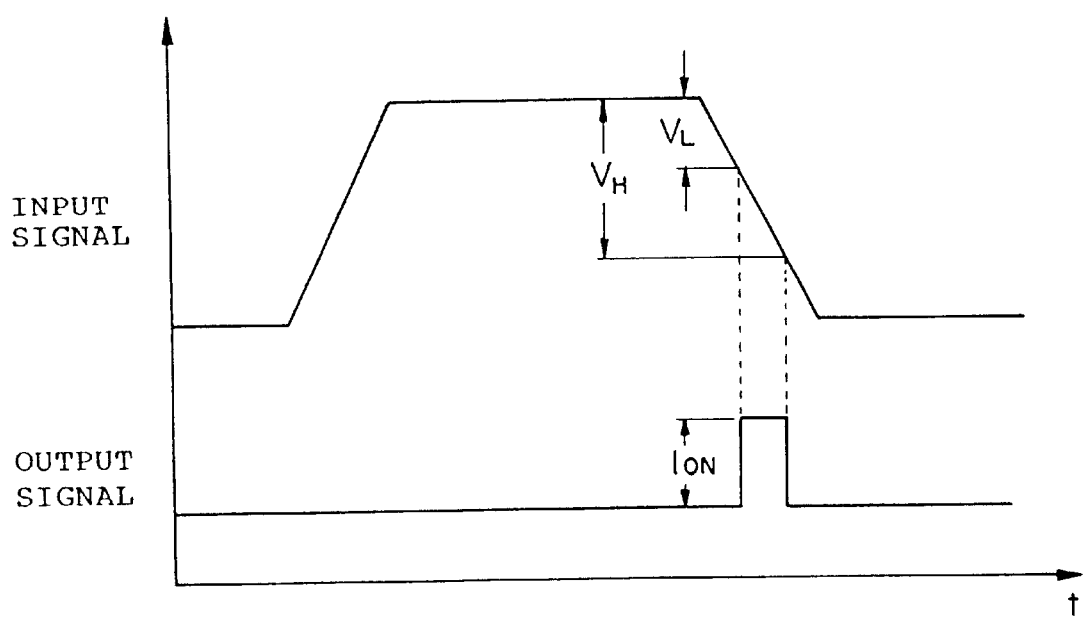
FIG. 35 shows an input voltage shape and an output current shape in the circuit 211, in which constant current flows within a determined and fixed voltage range in FIG. 34.

FIG. 35 shows wave-shapes of an input voltage and an output current in terms of the circuit 211 shown in FIG. 34 in which constant current flows within a predetermined constant voltage range.

As for connections in the trailing edge detection circuit 210, the common terminal COMp of the current mirror circuit M40 is used as a positive power supply terminal of the trailing edge detection circuit 210 while the common terminal COMn of the current mirror circuit M41 is used as a negative power supply terminal of the trailing edge detection circuit 210. Also, the input terminal Ip of the current mirror circuit M40 is connected to the current flowing-in terminal of the circuit 211. Moreover, the current flowing-out terminal of the circuit 211 is connected to the anode of the backward-current-proof diode 212. The input terminal In of the current mirror circuit M41 is connected to the output terminal Op1.

The cathode of the diode 212 is connected to the output terminal On1 of the current mirror circuit M41, which is an input terminal IN of the trailing edge detection circuit 210. The output terminal Op2 of the current mirror circuit M40 and the output terminal On2 of the current mirror circuit M41 are output terminals OUT of the trailing edge detection circuit 210, but either the output terminal Op2 or the output terminal On2 can be omitted if unnecessary.

In the peak holding circuit 220, with the anode of the diode 221 as an input terminal, and with the cathode of the diode 221 as an output terminal, the capacitor 222 is connected between the output terminal and a ground terminal. As for connections in the pulse trailing edge detection circuit, the input terminal of the trailing edge detection circuit 210 and the input terminal of the peak holding circuit 220 are both connected to the signal line L, and the output terminal of the peak holding circuit 220 is connected to the positive power supply terminal COMp of the trailing edge detection circuit 210. The negative power supply terminal COMn of the trailing edge detection circuit 210 and the ground line of the peak holding circuit 220 are both connected to a signal ground line Lg.

The current mirror circuit M40 in the trailing edge detection circuit 210 can be configured as a part of the circuit 211, and a specific example of this is shown in FIG. 36.

Figure 36A:
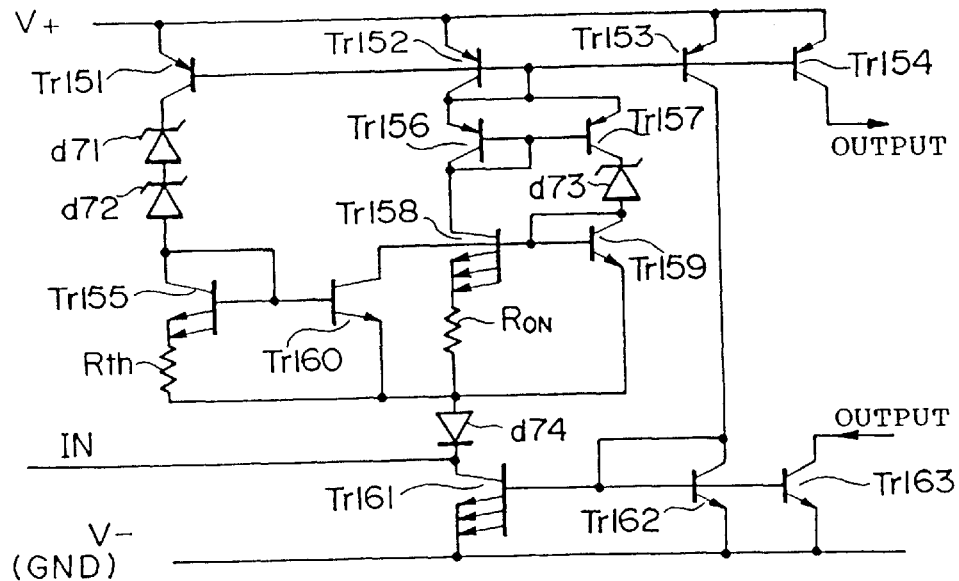
FIG. 36 shows a specific example of the trailing edge detection circuit 210 shown in FIG. 34.

FIG. 36(a) and (b) are specific example circuits of the trailing edge detection circuit 210 shown in FIG. 34.

The edge detection circuit shown in FIG. 36(a) has four PNP transistors Tr151 through Tr154 whose emitters are connected to a positive power supply terminal. The collector of the transistor Tr151 is connected to the cathode of a Zener diode d71 while the anode of the Zener diode d71 is connected to the cathode of a Zener diode d72. The anode of the diode d72 is connected to the collector and the base of a transistor Tr155, while the emitter of the transistor Tr155 is connected to one end of a resistor Rth. The collector of the transistor Tr152 is connected to the bases of the transistors Tr151 through Tr154, and also connected to the emitters of two PNP transistors Tr156 and Tr157. The collector of the transistor Tr156 is connected to the bases of the transistors Tr156 and Tr157 and also connected to the collector of an NPN transistor Tr158. The emitter of the transistor Tr158 is connected to one end of a resistor Ron.

The collector of the transistor Tr157 is connected to the cathode of a Zener diode d73 while the anode of the Zener diode d73 is connected to the bases of the transistor Tr158 and an NPN transistor Tr159 and the collectors of the NPN transistor Tr159 and an NPN transistor Tr160. The base of the transistor Tr160 is connected to the base of the transistor 155.

The other end of the resistor Rth, the other end of the resistor Ron, and the emitters of the transistors Tr159 and Tr160 are connected to the anode of a diode d74. The diode d74 is equivalent to the diode shown in FIG. 34. The cathode of the diode d74 is connected to the collector of the NPN transistor Tr161. The collector of the transistor Tr153 is connected to the base of the transistor Tr161, and to the base and the collector of the NPN transistor Tr163, and to the base of the transistor Tr163. The emitters of the transistors Tr161 through Tr163 are connected to a ground. The collector of the transistor Tr154 is the output terminal Op2 of the current mirror circuit M40 while the collector of the transistor Tr163 is the output terminal On2 of the current mirror circuit M41.

Figure 36B:
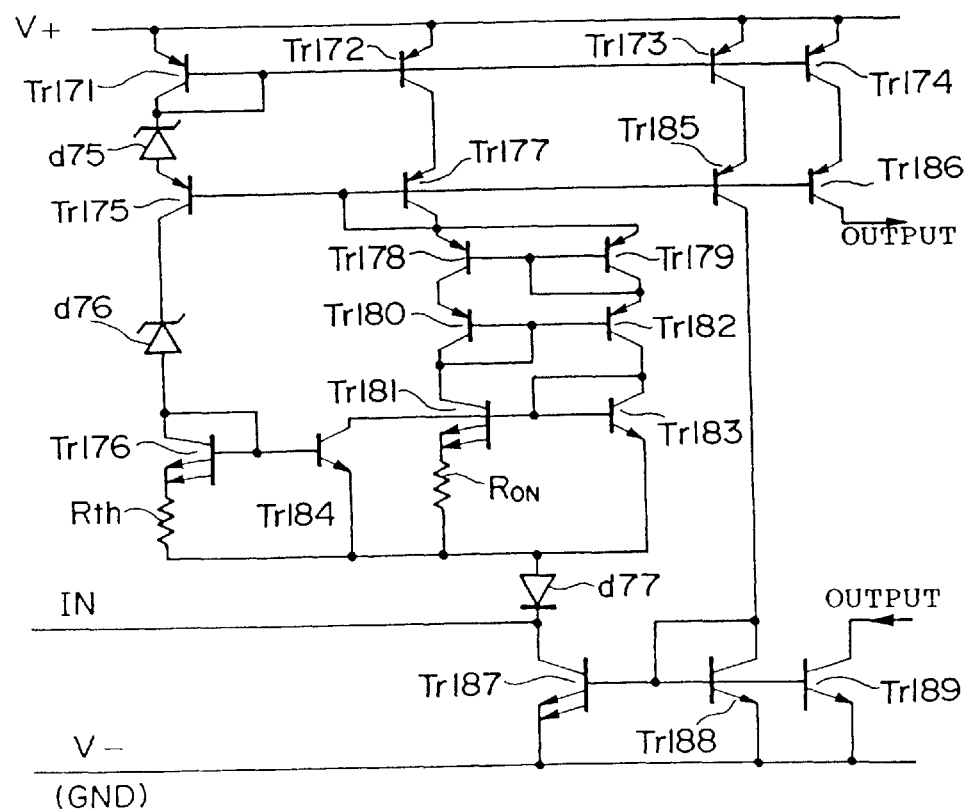

In the specific example circuit shown in FIG. 36(b), the emitters of four PNP transistors Tr171 through Tr174 are connected to the positive power supply terminal. The collector of the transistor Tr171 is connected to the bases of transistors Tr171 through Tr174, and connected to the cathode of a Zener diode d75. The anode of the diode d75 is connected to the emitter of a PNP transistor Tr175 while the collector of the transistor Tr175 is connected to the cathode of a Zener diode d76. The anode of the diode d76 is connected to the collector and the base of the NPN transistor Tr176 while the emitter of the transistor Tr176 is connected to one end of the resistor Rth.

The collector of the transistor Tr172 is connected to the emitter of a PNP transistor Tr177. The collector of the transistor Tr177 is connected to the bases of the transistor 177 and the transistor Tr175, and also connected to the emitters of the PNP transistors Tr178 and Tr179. The collector of the transistor Tr178 is connected to the emitter of the PNP transistor Tr180 while the collector of the transistor Tr180 is connected to the bases of the transistors Tr180 and Tr182 and to the collector of the transistor Tr181. The emitter of the transistor Tr181 is connected to one end of the resistor Ron.

The collector of the transistor Tr179 is connected to the bases of the transistors Tr178 and Tr179, and to the emitter of a PNP transistor Tr182. The base of the transistor Tr182 is connected to the base of the transistor Tr180. The collector of the transistor Tr182 is connected to the collector and the base of the NPN transistor Tr183, the base of the transistor Tr181, and the collector of the NPN transistor Tr184.

The base of the transistor Tr184 is connected to the base of the transistor Tr176.

Further, the collector of the transistor Tr172 is connected to the emitter of a NPN transistor Tr185. The collector of the transistor Tr174 is connected to the emitter of an PNP transistor Tr186. The bases of the transistors Tr185 and Tr186 are connected to the collector of the transistor Tr177.

The other end of the resistor Rth, the other end of the resistor Ron, the emitter of the transistor Tr183, and the emitter of the transistor Tr184 are connected to the anode of a diode d77. The diode d77 is equivalent to the diode shown in FIG. 34. The cathode of the diode d77 is connected to the collector of an NPN transistor Tr187 while the emitter of the transistor Tr187 is connected to the ground. The collector of the transistor Tr185 is connected to the base of the transistor Tr187, to the base and the collector of the NPN transistor Tr188, and to the base of the NPN transistor Tr189.

The collector of the transistor Tr186 is the output terminal Op2 of the current mirror circuit M40 while the collector of the transistor Tr189 is the output terminal On2 of the current mirror circuit M41.

The circuit 211, through which a constant current flows within a predetermined constant voltage, is designed in such a way that current flows within the range from VL to VH (where 0<VL<VH<Vp) wherein VL denotes the voltage by which current starts flowing, VH denotes the voltage by which current stops flowing, and Vp denotes the peak value of an input pulse.

The loop current amplification factor on the path making a trip from the current flowing-out input terminal Ip to the current flowing-in output terminal On1 (Ip→Op1→In→On1) is set to almost 1. In the case that the current amplification factor is less than 1, an input current starts flowing out when a trailing edge detection trigger current is outputted. Otherwise, in the case that the current amplification factor is 1 or more, when the trailing edge detection trigger current is outputted, an input current starts flowing in. Influence to the input current is minimum when the current amplification factor is almost 1.

Next, the operation of the pulse trailing edge detection circuit shown in FIG. 34 will be described.

When an electric potential on the input signal line L is zero, naturally, no current flows anywhere. When a pulse with a leading edge is inputted, the peak holding circuit 220 charges and holds the peak value of the pulse voltage, and supplies it to the positive power supply terminal COMp of the trailing edge detection circuit 210. The level of the input terminal IN of the trailing edge detection circuit 210 is the same as the peak voltage of an inputted pulse.

In this state, no voltage is applied to the circuit 211 in the trailing edge detection circuit 210 and thus no current flows. The backward-current-proof diode 212 prevents a backward voltage from being applied on the circuit 211 when the rising velocity of the inputted pulse is large.

When charging of the capacitor 222 is completed, no current flows into the peak hold circuit 220. During a trailing edge period of an inputted pulse, a voltage on the input terminal IN of the trailing edge detection circuit 210 falls in accordance with the falling of the inputted pulse. However, the positive power supply terminal COMp is kept at the peak voltage of the pulse which is outputted from the peak holding circuit 220. Between the positive power supply terminal COMp of the trailing edge detection circuit 210 and the input terminal IN, a voltage difference $\Delta V$ between the peak voltage of a pulse and an input voltage from the input terminal IN is applied. When the voltage drop in both the current mirror circuit M40 and the backward-current-proof diode 212 is neglected (in terms of the forward voltage of the diode), the voltage $\Delta V$ is applied to the circuit 211.

When the voltage $\Delta V$ reaches a voltage VL for forcing the circuit to start a current flowing, current starts flowing through the circuit 211, and then through the current mirror circuits M40 and M41, and thus the trailing edge detection circuit starts outputting a current.

Since the current difference between current flowing through the circuit 211 and an amplified current (with some delays) through two current mirror circuits M40 and M41 (Ip→Op1→In→On1), which amplifies the current flowing on the circuit 211, flows through the-input terminal IN, when the current amplification factor is less than 1, current flows out to the input terminal. Conversely, when the current amplification factor is 1 or more, current flows in. Moreover, when the current amplification factor is 1, the amount of current flowing-in is minimum.

When the voltage of the input signal falls and the voltage $\Delta V$ increases to reach a voltage VH where no current flows, no current will flow through the circuit 211, the current mirror circuits M40 and M41 and the trailing edge detection circuit 210.

As described above, a constant current, which is determined by the circuit 211, flows within a short time when the voltage $\Delta V$ on the a trailing edge of a pulse is between VL and VH. A pseudo-differential operation is made to detect the trailing edge of the pulse. This operation is made using the electric energy accumulated in the capacitor 222 in the peak holding circuit 220. When the input level returns to zero, no current flows through the trailing edge detection circuit 210 and the peak holding circuit 220. Accordingly, the peak holding circuit 220 holds an electric charge for detecting a trailing edge and outputting a its detection signal, and prepares for the next pulse trailing edge detection. That is, a pulse trailing edge is detected and thus a trigger current as shown in FIG. 35 is outputted.

The pulse trailing edge detection circuit as described above has the following advantages.

(1) A trailing edge of an input pulse can be detected;
(2) Without any capacitor, a differential operation circuit (a pseudo-differential operation) can be realized;
(3) A constant trigger output current can be obtained regardless of the velocity of a pulse trailing edge dV/dt and;
(4) The amount of electric power consumption, except during a pulse edge detection, can be zero.

Figure 37:
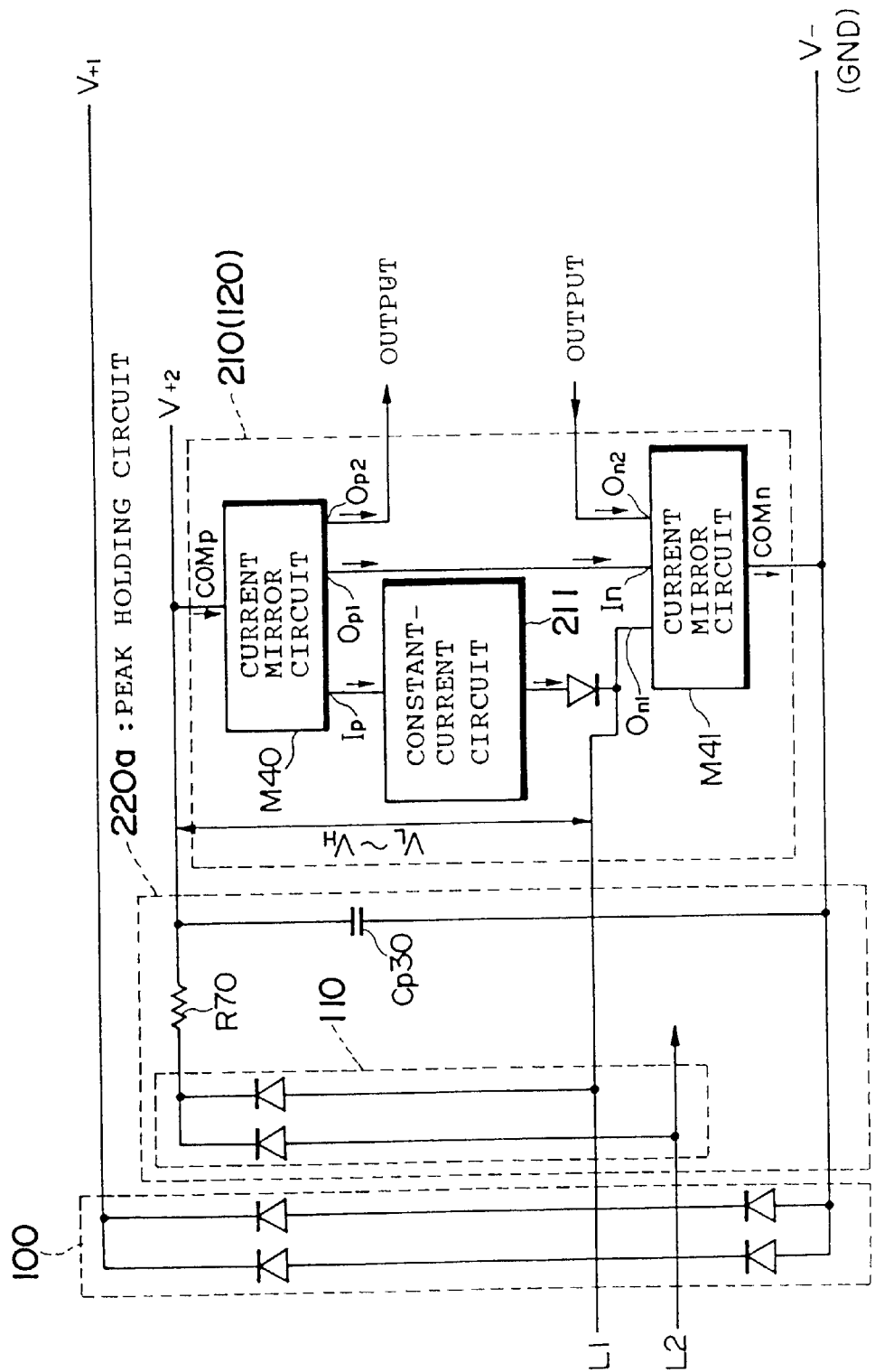
FIG. 37 illustrates a polarity inversion trailing edge detection circuit K1.

[VII] (1) (ii) Configuration of the First and Second Polarity Inversion Trailing Edge Detection Circuits FIG. 37 illustrates a configuration of the polarity inversion trailing edge detection circuit K1.

In the slow polarity inversion detection circuit shown in FIG. 33, the first and second polarity inversion trailing edge detection circuits connected to the balanced communication lines L1 and L2 are dependent upon the pulse trailing edge detection circuit shown in FIG. 34. A specific example of the first polarity inversion trailing edge detection circuit K1 is shown in FIG. 37.

The polarity inversion trailing edge detection circuit K1 is configured such that the peak holding circuit 220 in the pulse trailing edge detection circuit shown in FIG. 34 is replaced with the peak holding circuit 220a which comprises the full-wave rectifier 110, the current control resistor R70 and the power supply capacitor Cp30 as shown in FIG. 33. Moreover, the full-wave rectifier circuit 100 for supplying an electric power to a circuit connected to the peak holding circuit 220a is added. Thus, the circuit configuration of the polarity inversion trailing edge detection circuit 120 is designed similar to the polarity inversion trailing edge detection circuit 210.

The loop current amplification factor on the path, in the polarity inversion trailing edge detection circuit 210 (120) from the current flowing-out input terminal Ip of the first current mirror circuit M40 to the current flowing-in output terminal On1 (Ip→Op1→In→On1), is determined more than 1. The constant-current circuit 211 through which a constant current flows within a predetermined constant voltage range is configured such that a current flows within VL through VH (on condition that 0<Op1<In<On1) where VL denotes the voltage at which current starts flowing, VH denotes the voltage at which current stops flowing, and Vp denotes the voltage between the communication lines during stand-by. The constant-current circuit 211, on which a constant current flows within a predetermined constant voltage range, is designed in such a way that current flows within the voltage range from VL through VH (on the condition that 0<VL<VH<Vp). The communication line L1 is connected to the input terminal I of the polarity inversion trailing edge detection circuit 210. Accordingly, a polarity inversion trailing edge, in which the electric potential on the communication line L1 goes to zero (H→0), is detected.

Although the second polarity inversion trailing edge circuit K2 (not shown) has a similar configuration to that of the first polarity inversion trailing edge circuit K1, the polarity inversion trailing edge detection circuit 130 is created using the trailing edge detection circuit 210 shown in FIG. 34. The communication line L2 is connected to the input terminal IN of the polarity inversion trailing edge detection circuit 130. Accordingly, a polarity inversion trailing edge in which the electric potential on the communication line L2 goes to zero (H→0), is detected.

As a conclusion for this section, in order to detect polarity inversion trailing edges on both communication lines L1 and L2, two polarity inversion trailing edge detection circuits 120 and 130 for the communication lines L1 and L2, respectively are necessary. However, the full-wave rectifier 100 and the full-wave rectification peak holding circuit 220a can be shared.

[VII] (1) (iii) Function of the Polarity Inversion Trailing Edge Detection Circuits K1 and K2

The function of the first and second polarity inversion trailing edge detection circuits will be described in terms of their operation.

Detection of the polarity inversion trailing edge where a electric potential on the communication line L1 goes to zero (H→0) will be made.

During stand-by, since the amount of the consumed current on whole circuits is a degree of PN junction; leak currents of transistors, an output voltage V+1 of the full-wave rectifier 100 and an output voltage V+2 of the full-wave rectification peak holding circuit 220a both are almost the voltage between the communication; lines during stand-by.

When a polarity inversion occurs and the voltage on the communication line L1 starts falling, the output voltage V+1 of the full-wave rectifier 100 falls accordingly. The current flowing from the positive electrode terminal of the full-wave rectifier to a load resistor (not shown) is a PN junction leak current, and continues to flow nearly without any changes. Consequently, current continues to flow on the diode located at the negative side of the full-wave rectifier 100, and thus the negative power supply V− (i.e. ground) and the lower electric potential side of the communication line L2 are kept on the almost same level.

Further, the voltage between the output voltage V+2 of the full-wave rectification peak holding circuit 220a and the negative power supply V− is kept on the voltage of stand-by state by the electric charge stored in a capacitor Cp3 O. Therefore, a voltage difference Δ V, which is a drop-rate in that the voltage on the communication line L1 drops, is applied between the output voltage V+2 of the peak holding circuit 220a and the communication line L1. When the voltage difference Δ V reaches the voltage VL where current starts flowing through the circuit 211 in the polarity inversion trailing edge detection circuit 120, current flows on the polarity inversion trailing edge detection circuit 120, and thus a polarity inversion trailing edge detection output current starts flowing.

Further, on the communication line L2, a current difference between current flowing on the circuit 211 and an amplified current through two linear current mirror circuits M40 and M41 flows. Since the amplification factor is 1 or more, current flowing on the communication line L1 is in a direction flowing out from the exchange. Accordingly, there are the following results:

(1) No vibration occurs due to the constant-current operation; a positive feedback operation is made to cause the voltage between the communication lines to be small and an inputted wave-shape is sharpened;

(2) Observed from the exchange side, the slow polarity inversion detection circuit is considered as a load (i.e. when current starts flowing out to the exchange, there shall be seen as a power source exists in the communication terminal); and (3) Current flowing through the diode of the full-wave rectifier 100, which provides a connection between the negative polarity terminal, (or the negative power supply V− i.e. ground), and a communication line (i.e. the communication line L2 in the present circumstances) of a lower electric potential, is built-up to guarantee that they have equal electric potentials.

When the polarity inversion proceeds further and the voltage between the communication lines L1 and L2 becomes close to zero, the voltage difference Δ V becomes larger. Moreover, when the voltage difference Δ V reaches the voltage VH where no current flows, the current on the polarity inversion trailing edge detection circuit 120 becomes zero again, and the polarity inversion trailing edge detection output current also returns to zero.

As described above, within a short period of time when the difference voltage Δ V comes in the range between VL and VH in transient polarity inversion time, a constant current, which is determined in the circuit 211 in the polarity inversion trailing edge detection circuit 120, flows, and thus a pseudo-differential operation is made to detect a pulse trailing edge, in which the electric potential of the communication line L1 goes to zero (H→0).

When polarity inversion proceeds further and the communication line L1 comes to have a lower electric potential, the electric potential on the communication line L1 and the electric potential of the negative power supply V− (ground) become almost the same. Accordingly, voltage greater than VH continues to be applied to the polarity inversion trailing edge detection circuit 120, and thus no current flows.

When the polarity is completely inverted, the capacitor Cp30 is compensation-charged from the communication line L2 which has changed to have a higher electric potential afresh, no currents flow, and circuits return to in an stand-by state.

Further, the second polarity inversion trailing edge circuit, which has a polarity inversion trailing edge detection circuit 130, operates for the communication line L2 in the same manner.

Thus, the first and second polarity inversion trailing edge detection circuit operates as follows:

(1) A polarity inversion trailing edge, in which the voltage between the communication lines goes to zero (i.e. H→0), is detected;

(2) A differential operation (pseudo-differential operation ) circuit is realized without a capacitor;

(3) A constant trigger output current is outputted regardless of the polarity inversion velocity;

(4) Power consumption other than the time when a pulse trailing edge is detected is zero; and (5) The amount of the initial capacitor-charging current is large. Because a half-wave rectification peak holding circuit is used, a zero voltage state exists for a long period of time, during which the capacitor is discharged by a small amount of leakage current. Thus, the same amount of current as that of the initial capacitor-charging current flows, and thereby making the operation unstable. However, once the peak holding circuit has been charged by the full-wave rectifier 100, it remains charged on the peak voltage, preventing the circuit from entering long periods of low voltage. Thus, the edge detection circuit operates securely.

[VII] (2) Constant-current ON/OFF Monostable Multivibrator

Here, first constant-current ON/OFF monostable multivibrators and second constant-current ON/OFF monostable multivibrators, both of which can be used for the constant-current ON/OFF monostable multivibrator 140, will be described. A configuration of its first constant-current ON/OFF monostable multivibrator will be described in subsection [VII] (2) (i) and its function will be described in subsection [VII] (2) (ii). A configuration of the second constant-current ON/OFF monostable multivibrator will be described in subsection [VII] (2) (iii) and its operation will be described in subsection [VII] (2) (iv).

Figure 38B:
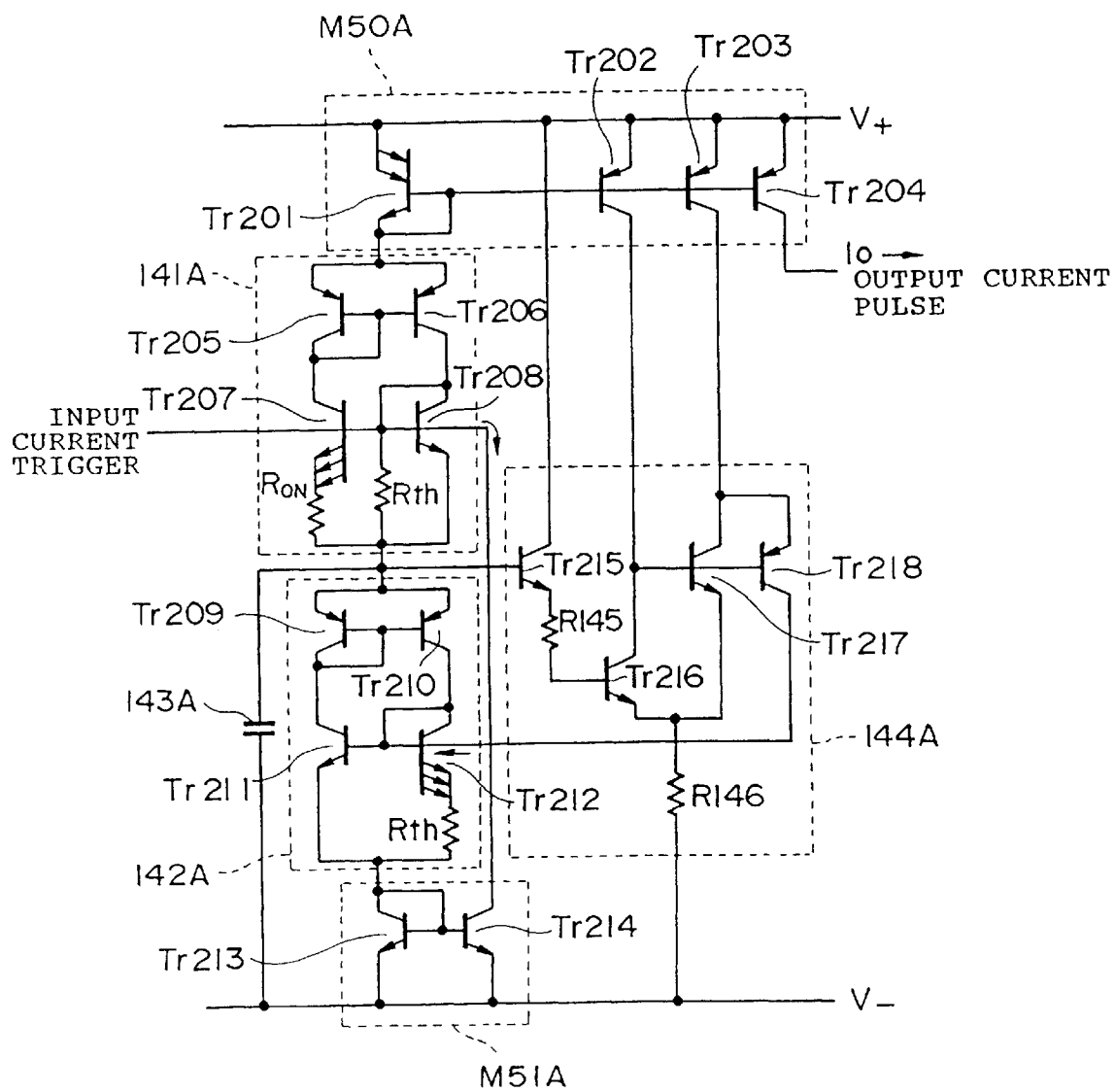
FIG. 38(b) shows a specific example of the first constant-current ON/OFF typed monostable multivibrator shown in FIG. 38(a)
Figure 41:
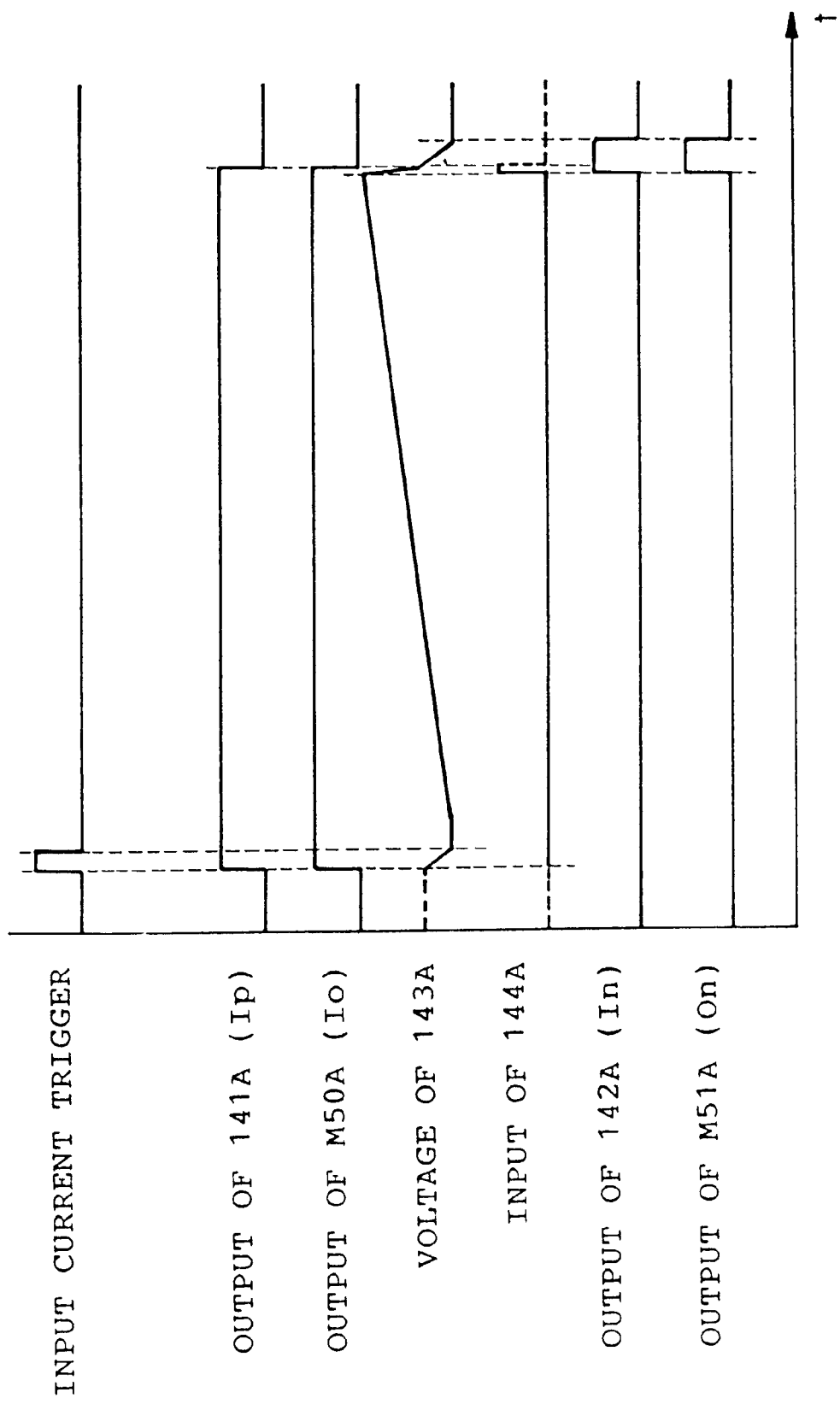
FIG. 41 is a timing chart showing the operation of the monostable multivibrator shown in FIG. 38(a)

[VII] (2) (i) Configuration of the First Constant Current ON/OFF Monostable Multivibrator FIG. 38(*a*) illustrates a configuration of the first constant-current ON/OFF monostable multivibrator, and FIG. 41 is a timing chart showing waveform thereof.

The first constant-current ON/OFF monostable multivibrator has a constant-current ON/OFF circuit 141 A, a switch circuit 142A, a time constant capacitor 143A, a first linear current mirror circuit M50A, a second linear current mirror circuit M51A and a Schmidt trigger circuit 144A. The constant-current ON/OFF circuit 141A enters an on-state to allow a constant current Ip to flow when it receives an input trigger pulse current Ii from a set input terminal S. Conversely, the constant-current ON/OFF circuit 141A enters an off-state not to allow the constant current Ip to flow when it receives an input trigger pulse current On from a reset input terminal R. The constant-current ON/OFF circuit 141A has a trigger threshold current Itri, which is used for distinguishing between an on-state and an off-state, and a fixed current $i_{on}$ during an on-state. The switch circuit 142 A enters an on-state when it receives as input a trigger signal from the set input terminal S and then enters a short-circuit state (i.e. a current flows which is controlled only by an on-state current). The switch circuit 142A returns to an off-state when no current flows into it. The switch circuit 142A has a trigger threshold current Itri for separating into an on- or off-state. The current mirror circuit M50A has a current flowing-out input terminal Ip and several current flowing-out output terminals Op1, Op2 and Op3, and a common terminal COM to which the total currents inputted and outputted flow in. The current mirror circuit M51A has a current flowing-in input terminal In and a current flowing-in output terminal On, and a common terminal COM to which the total current inputted and outputted flow in. The Schmidt trigger circuit 144A has a configuration such that voltage is inputted, current is outputted, and its operation is performed with a constant-current source as a load. No current is outputted when the input voltage is in 'Low' level, and current is outputted when the input voltage is in 'High' level.

The common terminal of the current mirror circuit M50A is connected to a positive power supply terminal V+. The current flowing-out terminal of the current mirror circuit M50A is connected to a current flowing-in terminal in the constant-current ON/OFF circuit 141A. The output terminals Op1 and Op2 of the current-mirror circuit M50A are connected as constant-current loads of the Schmidt trigger circuit 144A. The current flowing-out terminal in the constant-current ON/OFF circuit 141A is connected to a current flowing-in terminal on the current path of the switch circuit 142A, to one electrode of the capacitor 143A, and to the input terminal of the Schmidt trigger circuit 144A. A current flowing-out terminal of the switch circuit 142A is connected to the input terminal In of the current-mirror circuit M51A. The set input terminal S of the switch circuit 142A is connected to the output terminal of the Schmidt trigger circuit 144A. The output terminal On of the current mirror circuit M51A is connected to the reset input terminal R of the constant-current ON/OFF circuit 141A. The other electrode of the time constant capacitor 143A, the common terminal of the current mirror circuit M1A and the ground terminal of the Schmidt trigger circuit 144A are connected to a negative power supply V−.

The set input terminal S of the constant-current ON/OFF circuit 141A is the input terminal of the constant current ON/OFF monostable multivibrator 140. Meanwhile, the output terminal Op3 of the current mirror circuit M50A is the Output terminal of the constant current ON/OFF monostable multivibrator 140.

FIG. 38(*b*) illustrates a specific example of the first constant-current ON/OFF monostable multivibrator shown in FIG. 38(*a*).

The current mirror circuit M50A is made up of four PNP transistors Tr201 through Tr204 whose respective emitters are connected to a positive power supply V+. The bases of the transistors Tr201 through Tr204 are all connected to the collector of the transistor Tr201. The constant-current ON/OFF circuit 141A has two PNP transistors Tr205 and Tr206, whose respective emitters are connected to the collector of the transistor Tr201, and two NPN transistors Tr207 and Tr208 whose collectors are connected to the collectors of the transistors Tr205 and Tr206, respectively. The bases of the transistors Tr205 and Tr206 are both connected to the collector of the transistor Tr205. The bases of the transistors Tr207 and Tr208 are both connected to the collector of the transistor Tr206. The emitter of the transistor Tr207 is connected to one end of a resistor Ron. The bases of the transistors Tr207 and Tr208 are both connected to one end of a resistor Rth1.

The other end of the resistor Ron, the other end of the resistor Rthl and the emitter of the transistor Tr208 are all connected to the current flowing-in terminal of the switch circuit 142A. Between the current flowing-in terminal and the negative power supply V−, a capacitor 143A is connected.

The switch circuit 142A has two PNP transistors Tr209 and Tr210 whose respective emitters are connected to the current flowing-in terminal. The collectors of the transistors Tr209 and Tr210 are connected to the collectors of the NPN transistors Tr211 and Tr212 respectively. The bases of the transistors Tr209 and Tr210 are connected to the collector of the transistor Tr209. The bases of the transistors Tr211 and Tr212 are both connected to the collector of the transistor Tr210. The emitter of the transistor Tr212 is connected to one end of the resistor Rth. The other end of the resistor Rth and the emitter of the transistor Tr211 is connected to the collector of the NPN transistor Tr213, which is an input terminal In of the current mirror circuit M51A. In the current mirror circuit M51A, the collector of the transistor Tr213 is connected to the base of the transistor Tr213 and the base of the NPN transistor Tr214. The emitters of the transistors Tr213 and Tr214 are connected to the negative power supply V−. The collector of the transistor Tr214 is connected to the bases of the transistors Tr207 and Tr208, and to the trigger current input terminal of the first constant-current ON/OFF circuit.

The Schmidt trigger circuit 144A has an NPN transistor Tr215 whose collector is connected to the positive power supply V+, an NPN transistor Tr216 whose collector is connected to the collector of the transistor Tr202, an NPN transistor Tr217 whose collector is connected to the collector of the transistor Tr203, and a PNP transistor 218 whose emitter is connected to the collector of the transistor Tr203. The bases of the transistors Tr217 and Tr218 are both connected to the collector of the transistor Tr202. The emitter of the transistor Tr215 is connected to the base of the transistor Tr216 via an emitter resistor R145. The emitters of the transistors Tr216 and Tr217 are connected to the negative power supply terminal V− via an emitter resistor R146. The collector of the transistor Tr218 is connected to the bases of the transistors Tr211 and Tr212. The base of the transistor Tr215 is connected to both of the emitters of the transistors Tr209 and 210.

[VII] (2) (ii) Operation of the First Constant-current ON/OFF Monostable Multivibrator During stand-by, the constant-current ON/OFF circuit 141A is in an off-state. Since the Schmidt trigger circuit 144A is supplied with a current in proportion to the current flowing through the constant-current ON/OFF circuit 141A via the current mirror circuit M50A, no current flows through the Schmidt trigger circuit 144A in this state. Accordingly, the set current output from the Schmidt trigger circuit 144A to the switch-circuit 142A is zero.

There is the possibility that the constant-current ON/OFF circuit 141A and the switch circuit 142A both enter an on-state and currents flow through them as a result of a power source being switched on or the like. Therefore, in order for the constant-current ON/OFF circuit 141A to be reset reliably by the current mirror circuit M51A, the current amplification factor of the current mirror circuit M51A is predetermined accordingly (i.e. the loop current gain on the path from the constant-current ON/OFF circuit 141A through the current mirror circuit M51A, is set to less than 1).

When a trigger pulse current flows into the set input terminal S of the constant-current ON/OFF circuit 141A which is also an input terminal of the first constant-current ON/OFF monostable multivibrator, the constant-current ON/OFF circuit 141A enters an on-state. As a result, the current mirror circuit M50A transmits a current for activating the Schmidt trigger circuit 144A. At the same time, current is outputted from the first constant-current ON/OFF monostable multivibrator.

When the constant-current ON/OFF circuit 141A enters an on-state, the Schmidt trigger circuit 144A enters an active state. However, since the input terminal is connected to the capacitor 143A and is thus in a low voltage, the output current of the Schmidt trigger current 144A is zero.

Accordingly, no set input is applied to the switch circuit 142A, and the switch circuit 142A remains in an off-state. Thus, no current flows through the current mirror circuit M51A. As a result, charging of the capacitor 143A is started with the reset input of the constant-current ON/OFF circuit 141A remained in a zero state.

When the capacitor 143A is charged and the input to the Schmidt trigger circuit 144A reaches 'High' logical level, the Schmidt trigger circuit 144A outputs a current for setting the switch circuit 142A. The switch circuit 142A then enters an op-state, and forces the capacitor 143A to discharge, and forces the current mirror circuit M51A to come into operation to send the constant-current ON/OFF circuit 141A a reset current. The constant-current ON/OFF circuit 141A which has received the reset current then enters an off-state, stopping the charging of the capacitor 143A and forcing the input current of the current mirror circuit M50A to go to zero. Thus, no current is outputted from the current mirror circuit M50A, and no current is outputted from the first constant-current ON/OFF monostable multivibrator. Also, no current is supplied to the Schmidt trigger circuit 144A, and thus no current is outputted from it.

Although no current is outputted from the Schmidt trigger circuit 144A, the switch circuit 142A remains in an on-state (i.e. in a short-circuit state with only an on-state resistance), and the capacitor is discharged quickly. The switch circuit 142A returns to an off-state due to the absence of current by completion of discharging, and the first constant-current ON/OFF monostable multivibrator returns to a stand-by state.

As described above, the first constant-current ON/OFF monostable multivibrator outputs a constant current for the duration in which the capacitor 143A is being charged. The time constant (i.e. pulse width) of monostable multivibration is determined by the capacitance of the capacitor 143A, the amount of constant current flowing through the constant-current ON/OFF circuit 141A, and the input of a 'High' level value.

Figure 39:
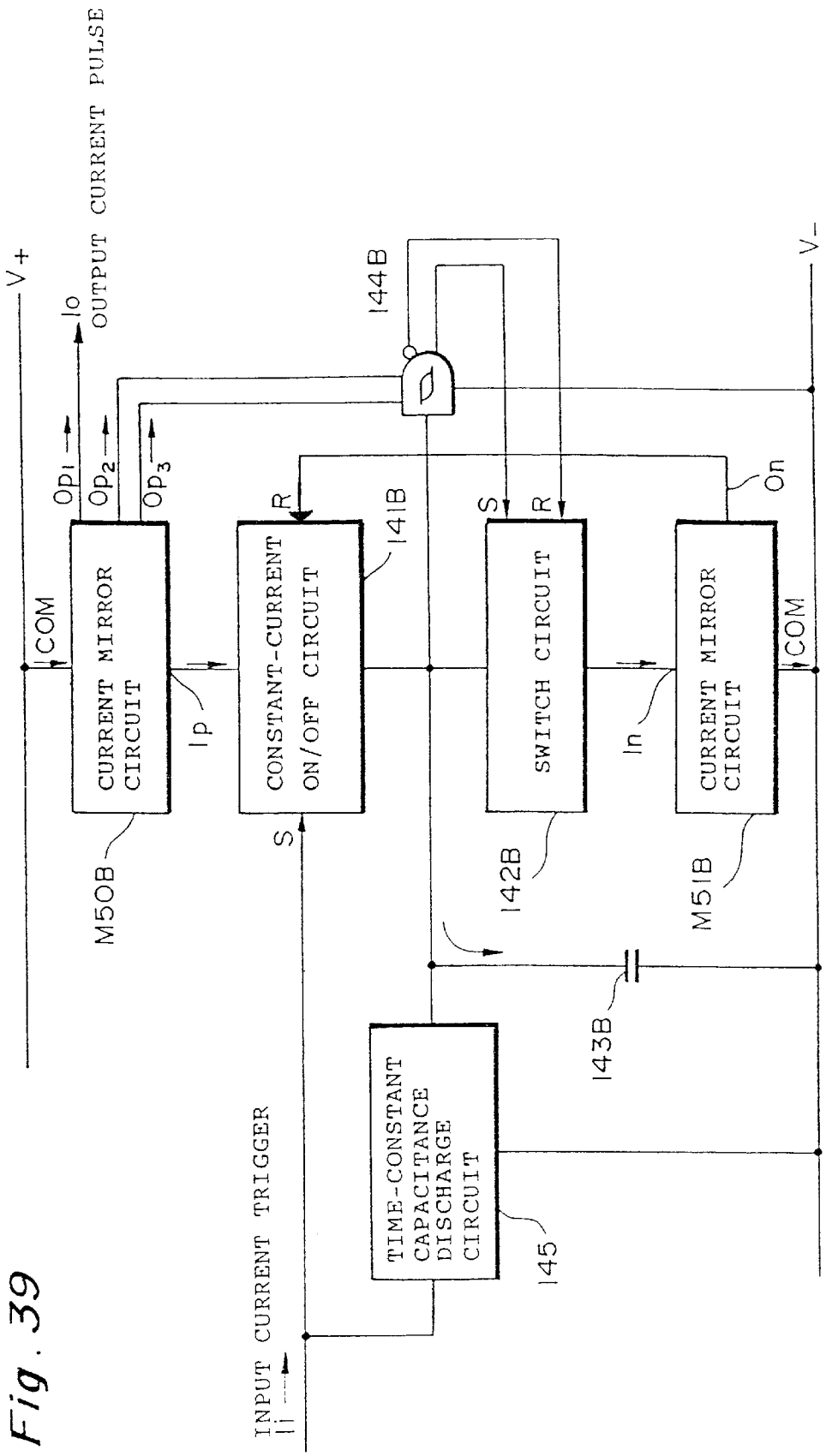
FIG. 39 shows a configuration of a second constant-current ON/OFF typed monostable multivibrator.

[VII] (2) (iii) Configuration of Second Constant-current ON/OFF Monostable Multivibrator FIG. 39 illustrates a configuration of the second constant-current ON/OFF monostable multivibrator.

The second constant-current ON/OFF monostable multivibrator has a constant-current ON/OFF circuit 141B, switch circuit 142B, a time constant capacitor 143B, a linear current mirror circuit M50B, a second linear current mirror circuit M51B, and a Schmidt trigger circuit 144B. In addition, the second constant-current ON/OFF monostable multivibrator has a time constant capacitance discharge circuit 145. The constant-current ON/OFF circuit 141B enters an on-state when it receives a trigger pulse in the set input terminal S, and thereby allows a constant current to flow. The constant-current ON/OFF circuit 141B stops current from flowing in when a trigger pulse current is received in the reset input terminal R. The switch circuit 142B enters an on-state when it receives a trigger signal in the set input terminal S and enters a short-circuit state (i.e. a current, which is controlled by only an on-state resistance, flows). The switch circuit 142B returns to an off-state when it receives a reset input current from the reset input terminal R or when no current comes to flow through it.

The current mirror circuit M50B has a current flowing-out input terminal Ip, several current flowing-out output terminals Op1, Op2 and Op3, and a common terminal COM into which the total amount of input and output current flows. Similarly, the current mirror circuit M51B has a current flowing-in input terminal In, a current flowing-in output terminal On, and a common terminal COM from which a total amount of an input and an output currents flows out. The Schmidt circuit 144B operates with a configuration such that voltage is inputted, current is outputted, and a constant-current source works as a load. The Schmidt trigger circuit 144B outputs an opposite-phase output current when the input voltage is in a 'Low' level, and it outputs a positive-phase output current when the input current is in a 'High' level. The time constant capacitance discharge circuit 145 forces the capacitor 143B to short-circuit and to be discharged.

The common terminal of the current mirror circuit M50B is connected to a positive power supply V+. The current flowing-out terminal of the current mirror circuit M50B is connected to a current flowing-in terminal on the current path in the constant-current ON/OFF circuit 141B. The output terminals Op1 and Op2 of the current-mirror circuit M50B are connected as constant-current loads of the Schmidt trigger circuit 144 B. The current flowing-out terminal on the current path in the constant-current ON/OFF circuit 141B is connected to the current flowing-in terminal on the current path of the switch circuit 142B, to one end of the capacitor 143B, to the input terminal of the Schmidt trigger circuit 144 B, and to the output terminal of the time-constant capacitance discharge circuit 145. The current flowing-out terminal in the current path in the switch circuit 142B is connected to the input terminal In of the current mirror circuit M51B. The set input terminal S of the switch circuit 142B is connected to the positive-phase output terminal of the Schmidt trigger circuit 144B. The reset input terminal R of the switch circuit 142B is connected to the opposite-phase output terminal of the Schmidt trigger circuit 144B. The output terminal On of the current mirror circuit M51B is connected to the reset input terminal R of the constant-current ON/OFF circuit 141B. The other electrode of the time constant capacitor 143B, the ground terminal of the time-constant capacitance discharge circuit 145, the common terminal COM of the current mirror circuit M51B and the ground terminal of the Schmidt trigger circuit 144B are connected to the negative power supply V−.

The set input terminal S of the constant-current ON/OFF circuit 141B is connected to the input terminal of the time-constant capacitance discharge circuit 145. The connection between them is an input terminal of the constant-current ON/OFF monostable multivibrator 140. The output terminal Op3 of the current mirror circuit M50B is an output terminal of the constant-current ON/OFF monostable multivibrator 140.

Further, in the case that the switch circuit 142B does not have a separate set input terminal S and reset input terminal R but has only one input terminal for both current inputting and outputting corresponding to the set and reset controls and vice versa, the Schmidt trigger circuit 144B will accordingly have one output terminal. When the input voltage is in a 'Low' level, a flowing-in output current is outputted, and when the input voltage is in a 'High' level, a flowing-out output current is outputted, and vice versa.

Figure 40:
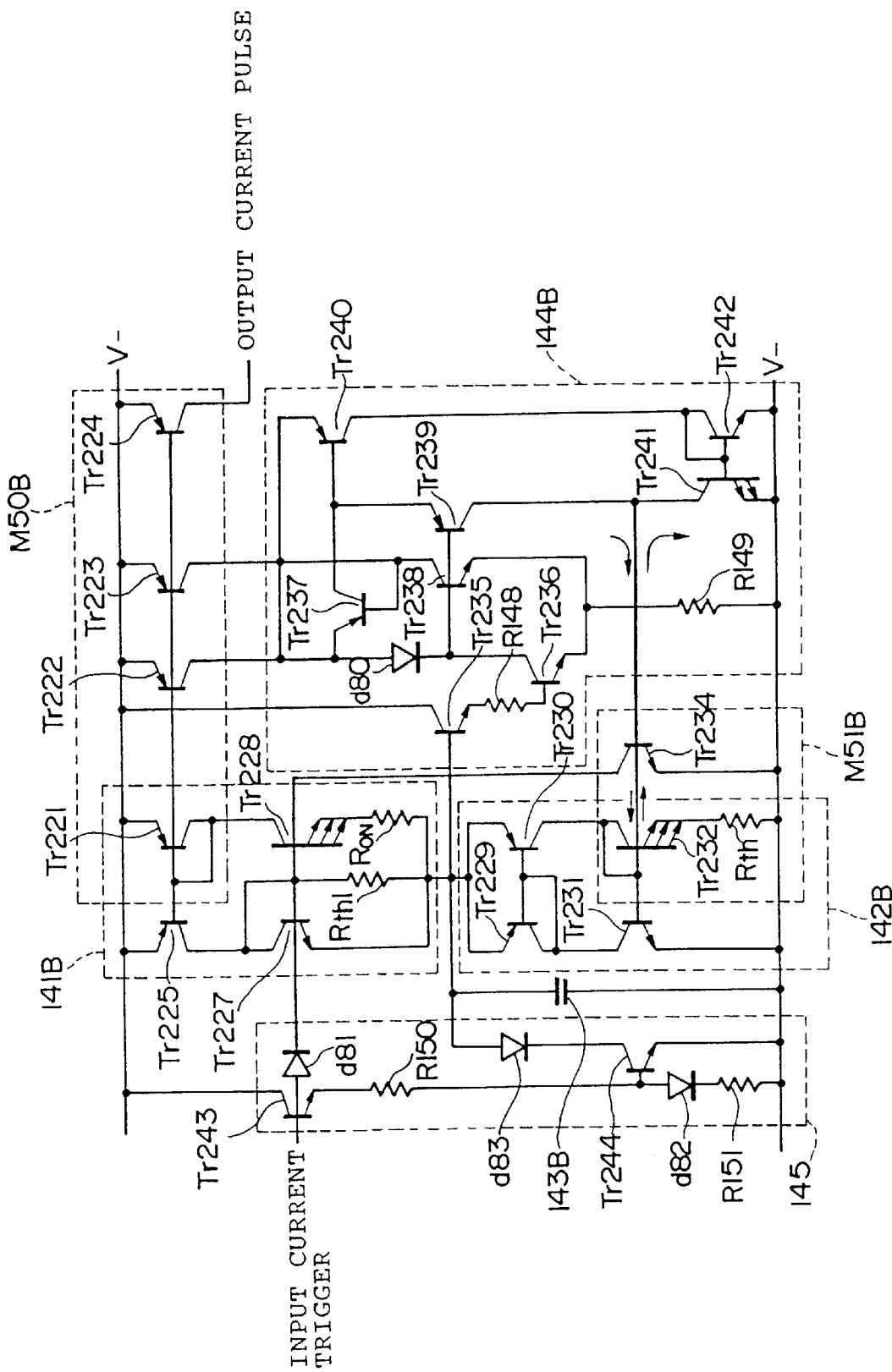
FIG. 40 shows a specific example configuration of the second constant-current ON/OFF typed monostable multivibrator shown in FIG. 39.

FIG. 40 illustrates a specific example circuit of the second constant-current ON/OFF monostable multivibrator.

The current mirror circuit M50B is made up of four PNP transistors Tr221 through Tr224 whose respective emitters are connected to the positive power supply terminal V+. The bases of the transistors Tr221 through Tr224 are all connected to the collector of the transistor Tr221.

The constant-current ON/OFF circuit 141B has a PNP transistor Tr225 whose emitter is connected to the positive power supply terminal V+, an NPN transistor Tr227 whose collector is connected to the collector of the transistor Tr225, and an NPN transistor Tr228 whose collector is connected to the collector of the transistor Tr221. In addition, the constant-current ON/OFF circuit 141B shares transistor Tr221 of the current mirror circuit M50B, and the base of the transistor Tr225 is connected to the collector of the transistor Tr221. The bases of the transistors Tr227 and Tr228 are both connected to the collector of the transistor Tr227 and to one end of the resistor Rthl. The emitter of the transistor Tr228 is connected to one end of the resistor Ron. The emitter of the transistor Tr227, the other end of the resistor Rthl, and the other end of the resistor Ron are all connected to the current flowing-in terminal of the switch circuit 142B. Moreover, between the current flowing-in terminal of the switch circuit 142B and the negative power supply V−, a capacitor 143B is connected.

The switch circuit 142B has two PNP transistors Tr229 and Tr230 whose respective emitters are connected to the current flowing-in terminal. The collectors of the transistors Tr229 and Tr230 are connected to the collectors of the NPN transistors Tr231 and Tr232 respectively. The bases of the transistors Tr229 and Tr230 are both connected to the collector of the transistor Tr229. The bases of the transistors Tr231 and Tr232 are both connected to the collector of the transistor Tr230. The emitter of the transistor Tr232 is connected to one end of the resistor Rth while the other end of the resistor Rth and the emitter of he transistor Tr231 are connected to the negative power supply terminal V−.

The current mirror circuit M51B shares the transistor Tr232 with the switch circuit 142B. The collector of the transistor Tr232 is an input terminal In of the current mirror circuit M51B. the collector of the transistor Tr232 is connected to the base of the NPN transistor Tr234. The emitter of the transistor Tr234 is connected to the negative power supply terminal V−. The collector of the transistor Tr234 is an output terminal On of the current mirror circuit M51B. The collector of the transistor Tr234 is connected to the bases of the transistors Tr227 and Tr228 which are a reset input terminal R of the constant-current ON/OFF circuit 141B.

The Schmidt trigger circuit 144B has an NPN transistor Tr235 whose collector is connected to the positive power supply terminal V+. The emitter of the transistor Tr235 is connected to the base of an NPN transistor Tr236 via an emitter resistor R148. The collector of the transistor Tr222 in the current mirror circuit M50B is connected to the anode of a diode d80. The cathode of the diode d80 is connected to the collector of the transistor Tr236. The collector of the transistor Tr222 is also connected to the emitter of the PNP transistor Tr237. The collector of the transistor Tr237 is connected to the collector of the NPN transistor Tr238, the emitter of the transistor Tr239, the base of the PNP transistor Tr240 and the collector of the transistor Tr223.

The base of the transistor Tr237 is connected to the collector of the transistor Tr237. The base of the transistor Tr238 and the base of the transistor Tr239 are both connected to the cathode of the diode d80. The emitter of the transistor Tr236 and the emitter of the transistor Tr238 are both connected to the negative power supply terminal V– via an emitter resistor R149. The collector of the transistor Tr239 is connected to the collector of the NPN transistor Tr241. The emitter of the transistor Tr241 is connected to the negative power supply V–. Further, the emitter of the transistor Tr240 is connected to the collector of the transistor Tr222. The collector of the transistor Tr240 is connected to the collector of the NPN transistor Tr242. The emitter of the transistor Tr242 is connected to the negative power supply V–. The bases of the transistors Tr241 and Tr242 are both connected to the collector of the transistor Tr242.

The joint between the collector of the transistor Tr239 and the collector of the transistor Tr241 is an unified output terminal of the Schmidt trigger circuit 144B. The joint is connected to the bases of the transistors Tr231 and Tr232 in circuit 142B, and to the base of the transistor Tr234 in the current mirror circuit M51B.

The time-constant capacitance discharge circuit 145 has an NPN transistor Tr243 whose collector is connected to the positive power supply terminal V+ and whose base is connected to the input terminal of the second constant-current ON/OFF circuit, and a diode d81 whose anode is connected to the input terminal. The emitter of the transistor Tr243 is indirectly connected to the base of the transistor Tr244 and the anode of a diode d82 via a resistor 150. The cathode of the diode d82 is indirectly connected to the negative power supply terminal V– via a resistor R151. The collector of the transistor Tr244 is connected to the cathode of the diode d83 whose anode is connected to one end of the capacitor 143B. The emitter of the transistor Tr244 is connected to the negative power supply terminal V–. Further, the cathode of the diode d81, whose anode is connected to the input terminal, is connected to the bases of the transistors Tr227 and Tr228.

FIG. 39 illustrates a specific example circuit in which a set terminal and a reset terminal are provided independently. FIG. 40 illustrates a specific example circuit in which one terminal plays the role of both set and reset controls that are distinguished by the flowing-in and flowing-out directions of flow.

[VII] (2) (iv) Operation of the Second Constant-current ON/OFF Monostable Multivibrator Since the structure of second constant-current ON/OFF monostable multivibrator, in which a guaranteed current pulse is outputted from an output terminal Op3 according to a trigger pulse input and in that the width of the guaranteed current pulse is determined, is the same as the structure of the first constant-current ON/OFF monostable multivibrator, a description of the structure of the second constant-current ON/OFF monostable multivibrator is omitted.

There is a possibility that the constant-current ON/OFF circuit 141B and the switch circuit 142B both enter an on-state and currents flow through them as a result of a power source being switched on or the like. In order for to the constant-current ON/OFF circuit 141B to be reset reliably by the current mirror circuit M51B, the current amplification factor (i.e. the value of the constant current and the lower limit of the current amplification factor) is necessary to be predetermined. Similarly, in order to reset the switch circuit 142B reliably when the Schmidt trigger circuit 144 B inputs a 'Low' level, the current amplification factor needs to be predetermined.

In FIG. 39 and FIG. 40, a time-constant capacity discharge circuit 145 is added, and the capacitor 143B for determining a time constant is forced to short-circuit and to be discharged when a trigger is inputted. While a pulse current is outputted, the capacitor 143B is in a state of being charged. In this state, when a trigger is inputted again, the capacitor 143B is short-circuited and discharged to return back to an initial state, and accordingly re-charging of the capacitor 143B restarts. In this manner, a re-trigger operation is attained.

There are two roles of the opposite-phase output terminal of the Schmidt trigger circuit 144B and the reset terminal of the switch circuit 142B. One of the roles is to force the switch circuit 142B to enter an off-state when the power source is turned on and when the constant-current ON/OFF circuit 141B and the constant-current ON/OFF circuit 142B are both turned on at the same time. The other role is to stabilize operation by temporally raising the current threshold value of the switch circuit 142B so as to strengthen a noise-proof ability while the constant-current ON/OFF monostable multivibrator outputs a pulse.

The function of the second constant-current ON/OFF monostable multivibrator will be summarized below.

(1) the second constant-current ON/OFF monostable multivibrator has a high power efficiency so that current flows only when a pulse is outputted, and no current flows during stand-by;

(2) the second constant-current ON/OFF monostable multivibrator has a wide voltage range of operation so that the operation is performed on a current operation basis, with the exception of the Schmidt trigger circuit 144B which determines an input voltage level;

(3) the second constant-current ON/OFF monostable multivibrator has a re-trigger function; and (4) the second constant-current ON/OFF monostable multivibrator has a reset function for the switch circuit 142B, which strengthens its guaranteed operation (i.e. no malfunction occurs by inputting a re-trigger signal).

Figure 42:
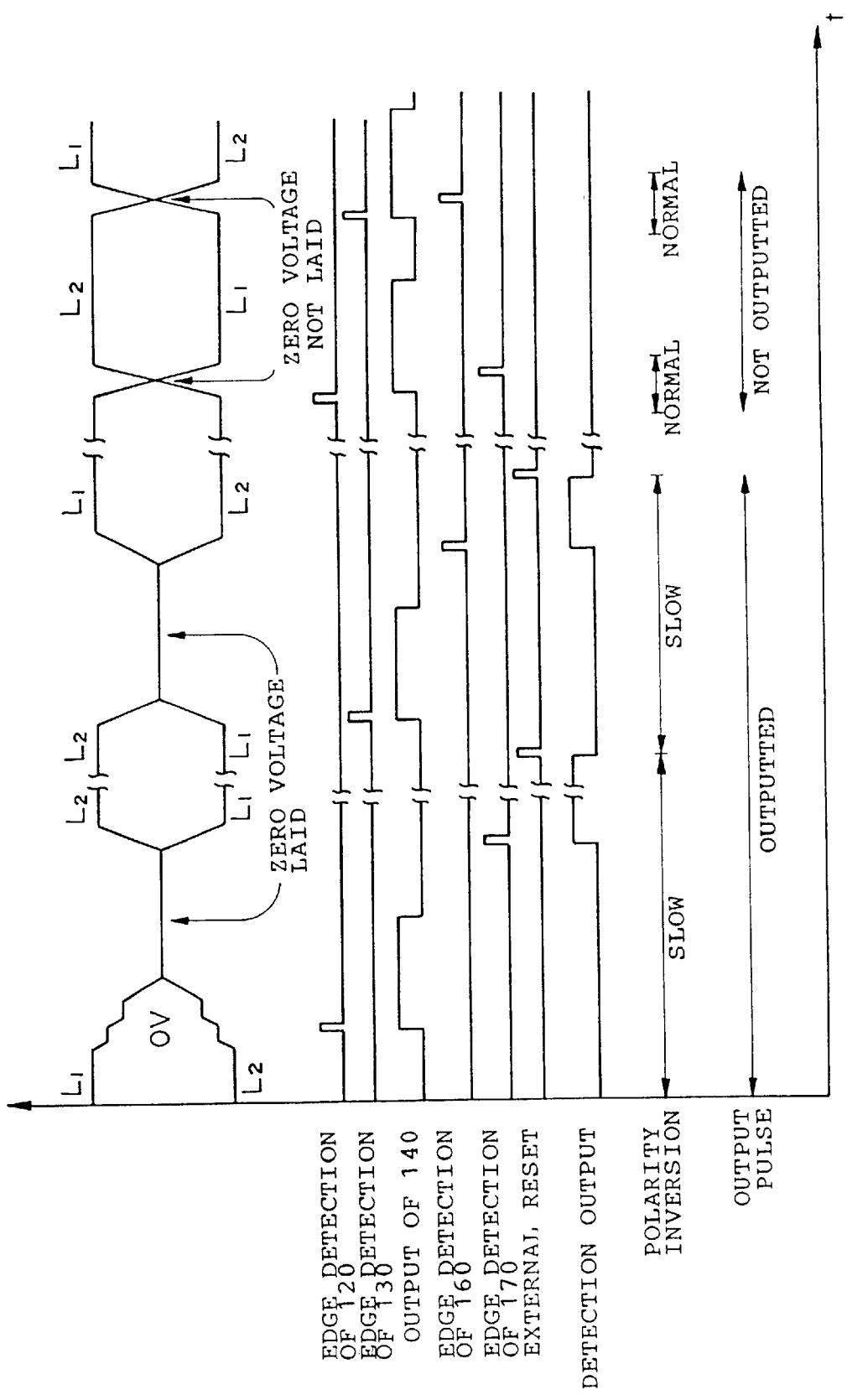
FIG. 42 is a timing chart showing the operation of the slow polarity inversion detection circuit shown in FIG. 33.

[VIII] Operation of the Slow Polarity Inversion Detection Circuit (FIG. 42)

The operation of the slow polarity inversion detection circuit will now be described. As shown in FIG. 33, he slow polarity inversion detection circuit is configured such that the positive power supply terminal V+ of the constant-current ON/OFF monostable multivibrator described in subsection [VII] (2) is indirectly connected to the output terminal of the rectifier 110, and the negative power supply terminal V– is connected to the negative electrode terminal of the rectifier 100.

As to the difference between a slow polarity inversion and a normal polarity inversion, in the case of the slow polarity inversion, after the polarity inversion starts, the voltage between the communication lines L1 and L2 temporarily becomes zero, stays in this middle state for 150 ms and then enters an opposite electric potential state opposite of that in the beginning. In the case of the normal polarity inversion, the polarity inversion occurs very sharply (i.e. approximately 10 ms) without the middle state.

FIG. 42 is a timing chart that shows the operation of the slow polarity inversion detection circuit shown in FIG. 33. With reference to FIG. 42, the operation of a slow polarity inversion detection circuit of the third embodiment will be described.

One example case of polarity inversion, in which a first state, in which the communication line L1 is on a 'High' electric potential and conversely the communication line L2 is on an 'Low' electric potential, shifts to a second state, in which the communication line L1 is on a 'Low' electric potential and the communication line L2 is on an 'High' electric potential, will be described.

During stand-by (the communication line is not utilized) when the communication line L1 is on a 'High' electric potential and the communication line L2 is on an 'Low' electric potential, the polarity inversion trailing edge detection circuits 120 and 130, the polarity inversion leading edge detection circuits 160 and 170, the constant-current ON/OFF monostable multivibrator 140 and the holding circuit 200 are all in an off-state with no current flowing therethrough.

Charging of the power source capacitor Cp30 is performed through the resistor R70. Since no currents flow into the polarity inversion trailing edge detection circuits 120 and 130 and the constant-current ON/OFF monostable multivibrator 140, the power source capacitor Cp30 is charged with an amount that is almost equal to the voltage between the communication lines. The electric potential of the positive power source terminal V+ of the polarity inversion trailing edge detection circuits 120 and 130 is kept as the electric potential during stand-by by the power source capacitor Cp30.

Further, when a polarity inversion starts, the electric potential on the input terminal I of the polarity inversion trailing edge detection circuit 120 falls to that of the electric potential on the, communication line L1. Accordingly, the electric potential difference Δ V between the input terminal I of the polarity inversion trailing edge detection circuit 120 and the positive power supply terminal V+ becomes larger, and during the time when the electric potential difference Δ V goes through a voltage range from Von through Voff, a constant current flows through the polarity inversion trailing edge detection circuit 120, causing it to output a corresponding trigger pulse current. A polarity inversion trailing edge detection trigger current is outputted between the beginning of the polarity inversion and the time when the voltage between the communication lines is zero.

The polarity inversion trailing edge detection trigger current goes through the OR circuit 150 and triggers for the constant-current ON/OFF typed monostable multivibrator 140. Accordingly, the constant-current ON/OFF typed monostable multivibrator 140 outputs a monostable current pulse for a constant period of time (e.g. about 100 ms). The monostable current pulse from the constant- current ON/OFF typed monostable multivibrator 140 goes through the OR circuit 180 to the reset terminal R of the holding circuit. The monostable current pulse works to force current flowing through the holding circuit 200 to be turned off.

At this time, the electric potential of the communication line L2 is almost the same as the electric potential on the negative electrode output terminal (−) of the full-wave rectifier 100, and thus the polarity inversion trailing edge detection circuit 130 and the polarity inversion leading edge detection circuit 170 both do not output current. Electrical energy stored in the power source capacitor Cp30 is used for the operations of the polarity inversion trailing edge detection circuits 120 and 130 and the constant-current ON/OFF monostable multivibrator 140 during the time from the beginning of the polarity inversion to the time when the voltage between the communication lines L1 and L2 is zero.

When the polarity inversion proceeds further, the electric potentials on the communication lines L1 and L2 are reversed. When the electric potentials are reversed, the electric potential on the communication line L1 becomes almost the same as the electric potential (ground level) on the negative electrode output terminal of the full-wave rectifier 100. At this time, the electric potential on the communication line L2 becomes the leading edge on the positive electric potential side, and when the voltage difference Δ V between the input terminal of the polarity inversion leading edge detection circuit 170, whose input terminal is connected to the communication line L2, and the ground terminal goes through the range from Von to Voff, a constant-current flows. Accordingly, the polarity inversion leading edge detection circuit 170 outputs a leading edge detection trigger current from the time when the voltage between the communication lines is zero to the time when the polarity inversion ends.

The trigger current is transmitted to the set terminal of the holding circuit 200 through the OR circuit 190. The trigger current works to force current on the holding circuit 200 to start flowing.

Further, in the normal polarity inversion process from the time when a electric potential difference between the communication lines L1 and L2 becomes zero to the time when the electric potentials of the communication lines L1 and L2 are completely reversed, the time when the electric potential difference is zero is a only brief moment. In the slow polarity inversion, however, the time when the electric potential difference is zero is about 150 ms. Thus, the period between the time when the trailing edge detection trigger current is outputted and the time when the leading edge detection trigger current is outputted is next to nothing (about 10 ms) in the normal polarity inversion, but is about 150 ms in the slow polarity inversion . So, there is a difference between them in terms of the aforementioned time. Accordingly, in the normal polarity inversion, when a set signal from the polarity inversion leading edge detection circuit is inputted to the holding circuit 200, a reset signal (a pulse 100 ms in width) from the constant-current ON/OFF monostable multivibrator 140 is also inputted. The set signal is masked in order to give the reset preference, and the holding circuit 200 can not enter an on-state. That is, the normal polarity inversion is not detected.

Further, in the slow polarity inversion, when a set signal from the polarity inversion leading edge detection circuit 170 is inputted to the holding circuit 200, the reset pulse from the constant-current ON/OFF monostable multivibrator 120 has already returned to zero. Thus, a set signal is not masked and this forces the holding circuit 200 to enter an on-state. Accordingly, the holding circuit 200 continues to output a holding signal. That is, a slow polarity inversion is detected.

As described above, a slow polarity inversion, in which the communication line L1 and L2 shift from 'High' to 'Low' and 'Low' to 'High' electric potential levels, respectively, is detected selectively. At the point of time when it becomes not longer necessary to hold the result of the slow polarity detection, a reset signal from the controlling circuit is given to the reset terminal R of the holding circuit 200 via the OR circuit 180, and accordingly, the holding circuit 200 is reset to return to a stand-by state.

Further, the detection of a polarity inversion, in which the communication lines L1 an L2 shift from 'Low' to 'High' and 'High' to 'Low' electric potential levels, respectively, can be easily attained by exchanging the polarity inversion trailing edge detection circuits 120 and 130, and exchanging the polarity inversion leading edge detection circuits 170 and 160.

Since a bell (ringing) signal has a large amplitude but no zero holding voltage between the communication lines exists, the bell signal is masked in the same manner as in the normal polarity inversion. Thus, there is zero probability that the bell signal will be detected as a polarity inversion information. However, since several polarity inversions occur in short period of time in series, the constant-current ON/OFF monostable multivibrator is necessary to be of a re-trigger-type.

[VIII] Result of the Slow Polarity Inversion Detection Circuit

The slow polarity inversion detection circuit shown in FIG. 33 has the following advantages.

(3-1) only slow polarity inversion information can be detected by making a distinction between a slow polarity inversion and a normal polarity inversion;

(3-2) only slow polarity inversion information can be detected by excluding a bell signal from a slow polarity inversion detection.

As mention ed above, just after a slow polarity inversion is selected and detected, it is possible to shift into a tele-metering communication processing mode. Accordingly, an idle time in a communication can be avoided.

<<Fourth Embodiment>>

Figure 43:
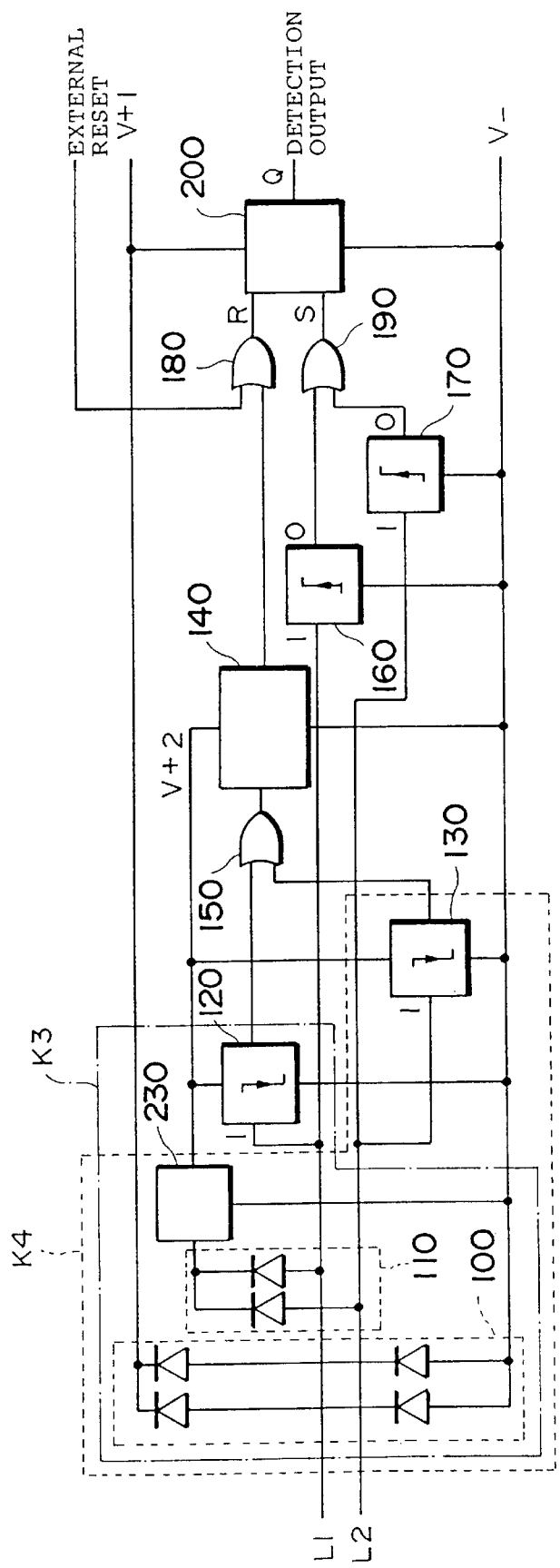
FIG. 43 shows a configuration of a slow polarity inversion detection circuit of a fourth embodiment according to the present invention.

FIG. 43 illustrates a slow polarity inversion detection circuit of the fourth embodiment according to the present invention. In FIG. 43, the same numerals are attached to the same elements as the ones shown in FIG. 33.

The slow polarity inversion detection circuit has the same rectifiers 100 and 110 which are connected to the communication lines L1 and L2, as mention ed in the third embodiment. Between the output terminal of the rectifier 110 and the negative electrode terminal (−) of the full-wave rectifier 100, a control power source circuit 230 is connected. Between the output terminal of the control power source circuit 230 and the negative electrode terminal (−) of the full-wave rectifier 100, a polarity inversion trailing edge detection circuit 120, a polarity inversion trailing edge detection circuit 130, and a constant-current ON/OFF monostable multivibrator 140 are connected.

The polarity inversion trailing edge detection circuit 120 together with the full-wave rectifier 100, the rectifier 110 and the control power source circuit 230 makes up a polarity inversion trailing edge detection circuit K3, as will be described later. The polarity inversion trailing detection circuit 120 detects a polarity inversion trailing edge in which an electric potential on the communication line L1 falls (H→0). The polarity inversion trailing edge detection circuit 130 together with the full-wave rectifier 100, the rectifier 110 and the control power source circuit 230 makes up a second polarity inversion trailing edge detection circuit K4 as will be described later. The polarity inversion trailing edge detection circuit 130 detects a polarity inversion trailing edge in which a electric potential on the communication line L2 falls (H→0). On the output sides of the polarity inversion trailing edge detection circuits 120 and 130, an OR circuit 150 is placed to combine their trigger output currents for input into the constant-current ON/OFF monostable multivibrator 140. The constant-current ON/OFF monostable multivibrator 140 receives a trigger current from the OR circuit 150 and outputs a constant-current pulse (i.e. a pulse to mask a normal polarity inversion ) for a fixed length of time.

Between the communication line L1 and the negative electrode terminal of the full-wave rectifier, a first polarity inversion leading edge detection circuit 160, which detects a polarity inversion leading edge in which an electric potential on the communication line L1 rises (0→H), is connected. Between the communication line L2 and the negative electrode terminal of the full-wave rectifier 100, a second polarity inversion leading edge detection circuit 170, which detects a polarity inversion leading edge in which an electric potential on the communication line L2 rises (0→H), is connected. At the output sides of the polarity inversion leading edge detection circuits 160 and 170, an OR circuit is placed to combine output trigger currents from the polarity inversion leading edge detection circuits 160 and 170. Further, at the output side of the constant-current ON/OFF monostable multivibrator 140, an OR circuit 180 is placed to combine a reset signal from the outside with an output signal from the constant-current ON/OFF monostable multivibrator 140.

The positive and negative electrode terminals of the full-wave rectifier 100 are both connected to the holding circuit 200 which operates with power supplies V+ and V− provided by the positive and negative electrode terminals. The set terminal S of the holding circuit 200 is connected to the output terminal of the OR circuit 190, while the reset terminal R of the holding circuit 200 is connected to the output terminal of the OR circuit 180. The holding circuit 200 is configured to hold a polarity inversion information, which it outputs to the controlling circuit in accordance with pulse output currents from the OR circuits 180 and 190.

The polarity inversion trailing edge detection circuits 120 and 130, the OR circuits 150, 180 and 190, the constant-current ON/OFF monostable multivibrator 140, the polarity inversion leading edge detection circuits 160 and 170, and the holding circuit 200 are the same ones as described in the third embodiment, and operate in the same manner as in the third embodiment.

The control power source circuit 230 has a current limiting function which is to prevent the exchange from malfunctioning by ensuring that the output current is less than a given constant, an output voltage limiting function which is to prevent a power source capacitor from breaking down, and an automatic starting function which is to prevent from operating in an unstable manner. Moreover, a power source capacitor enables it to continue to output a current for a given period of time even though the input voltage is zero. Also the control power source circuit 230 provides electric power to the polarity inversion trailing edge detection circuits 120 and 130, and to the constant-current monostable multivibrator 140.

Next, the configuration and function of the polarity inversion trailing edge circuit [IX], the operation of the slow polarity inversion detection circuit [X] and the result of the glow polarity inversion detection circuit [XI] of the fourth embodiment will be described.

Figure 44:
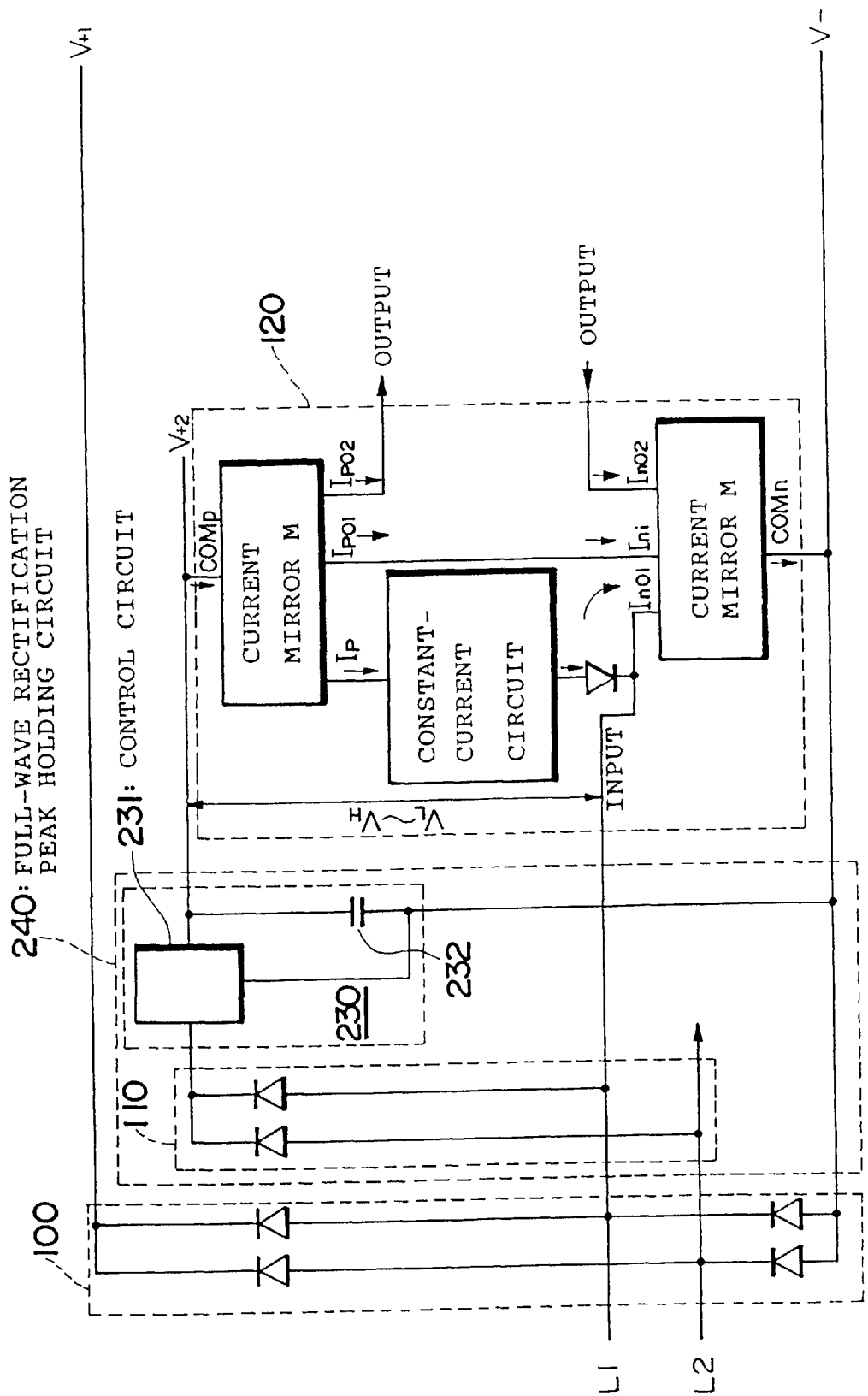
FIG. 44 shows a configuration of the polarity inversion trailing edge detection circuit K3 shown in FIG. 43.

[IX] Configuration and Function of the Polarity Inversion Trailing Edge Detection Circuit FIG. 44 illustrates a configuration of the polarity inversion trailing edge detection circuit K3 shown in FIG. 43.

The polarity inversion trailing edge detection circuit K3 is configured such that the peak holding circuit 220a of the polarity inversion trailing edge detection circuit K1 of the third embodiment is replaced with a full-wave rectification peak holding circuit 240, which has a limiter circuit to prevent excess current and excess voltage. The other components in the polarity inversion trailing edge detection circuit K3 are the same as those in the polarity inversion trailing edge detection circuit K1 in terms of configuration. The control circuit 231 and the power source capacitor 232 form the control power source circuit 230.

The full-wave rectification peak holding circuit 240, which has a limiter circuit to prevent excess current and excess voltage from occurring, has an excess-current preventing function, which is to control the maximum load current including a charge current for the capacitor 232, an excess-voltage preventing function, which is to control (or clamp) the maximum output voltage, and an electricity accumulating function which is to maintain operation of the load circuits when the input voltage is zero.

Two specific examples of the control power source circuit 230 will be described in subsections [IX] (1) and [IX] (2). The function of the polarity inversion trailing edge circuit shown in FIG. 44 will be described in section [IX] (3).

[IX] (1) Control Power Supply Circuit (Part 1)

Figure 45:
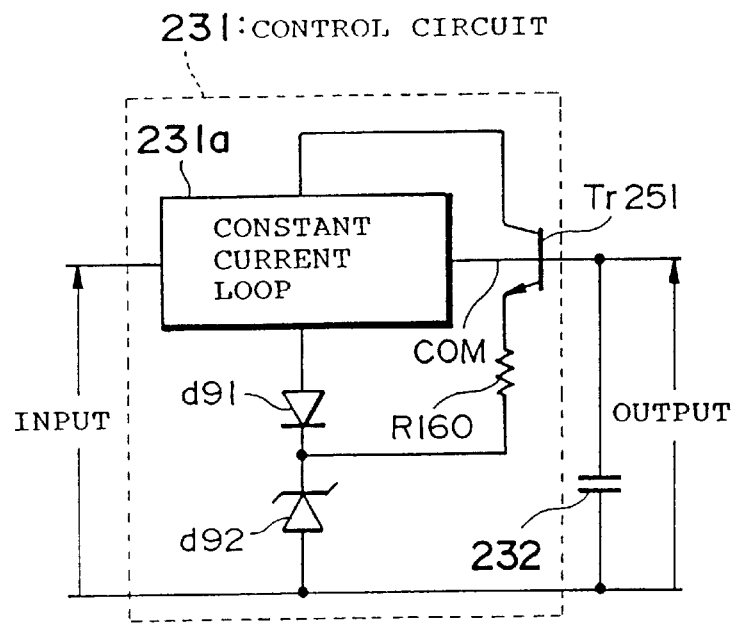
FIG. 45 shows an outline of a control power source circuit (part 1)
Figure 46:
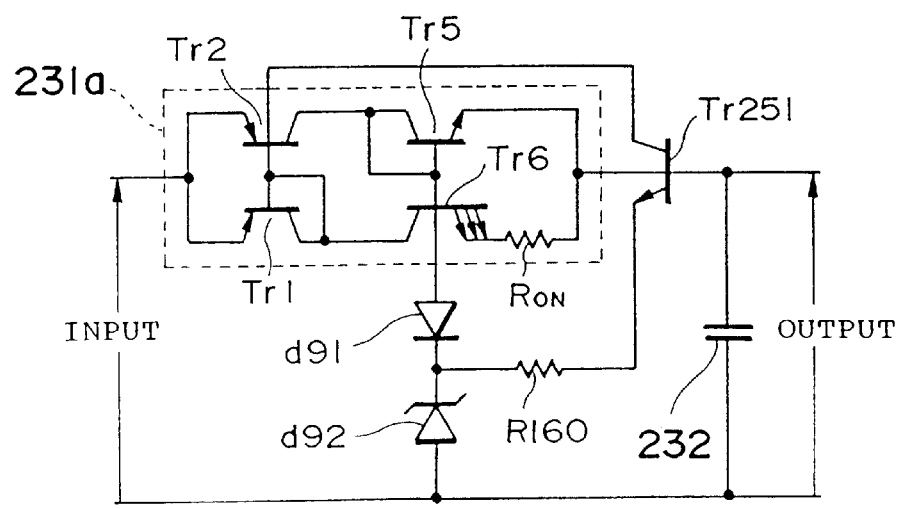
FIG. 46 illustrates a specific example of the circuit shown in FIG. 45.

FIG. 45 illustrates an outline of the control power source circuit (Part 1). FIG. 46 illustrates a specific example of the circuit shown in FIG. 45.

The control power source circuit has a constant-current loop 231a in its control circuit 231. The constant-current loop 231a, in turn, comprises a current mirror circuit as shown in FIG. 4 and a non-linear current amplifier as shown in FIG. 5. The current mirror circuit in FIG. 4 is made up of a current flowing-out input terminal I, a current flowing-out terminal O, and a common terminal COM, into which current flows, the amount of which is equal to the combined amount of current flowing through the input and output terminals I and O. The non-linear current amplifier, on the other hand, is made up of a current flowing-in input terminal I, a current flowing-out terminal O, and a common terminal COM, from which the combined amount of current flowing through the input and output terminals I and O flows.

The input terminal I and the output terminal O of the non-linear current amplifier are connected to the output terminal O and input terminal I of the linear current mirror circuit, respectively, so that loop current can be amplified. Constant current flows through the current path between the common terminal COM of the linear current mirror circuit and the common terminal COM of the non-linear current amplifier when voltage is applied.

FIG. 45 and FIG. 46 show control power source circuits in which the negative sides of their power sources are connected to the ground. The control power source circuit 230 has a level-shift diode d91, a Zener diode d92, a feedback NPN transistor Tr251, a guard resistor R160, and an output holding capacitor 232, which serves as a power source capacitor for a later circuit, as well as the current-loop 231a.

The current flowing-in terminal of the constant-current loop 231a is connected to the power source (positive side). The current flowing-out terminal, on the other hand, is used as an output terminal for the control power source circuit 230. Between said output terminal and the ground (the negative side of the power supply), an output holding capacitor 232 is connected. The joint input terminal of the non-linear current amplifier and the current mirror circuit in the constant-current loop 231a, which has a common terminal COM which is of current flowing-out type, is connected to the anode of the level-shift diode d91, the cathode of which is connected to the positive voltage terminal of a Zener diode d92. The negative voltage terminal of the diode d92 is connected to the ground.

The input terminal of the linear current mirror circuit or of the non-linear current amplifier in the current loop 231a with whose current flowing-in terminal as a common terminal COM, is connected to the collector of the transistor Tr251. The base of the transistor Tr251 is connected to the output terminal of the control power source circuit 230. The emitter of said transistor is connected via a resistor R160 to the joint of the cathode of the diode d91 and the positive voltage terminal of the diode d92.

The constant current value of the constant-current loop 231a is set to the maximum allowable current value for the power source. The breakdown voltage of the diode d92 is set to the maximum allowable load voltage (usually, slightly larger than the voltage between communication lines L1 and L2 during standby). The shift voltage of the diode d91 is set such that the transistor Tr251 will enter in a cut-off state when the constant-current loop 231a is in an active state. The amount of capacitance of the output holding capacitor 232 is set to a value with which a sufficient amount of electric charge can be held to guarantee that the load circuits will operate for a predetermined longest period of time while a bell signal is being input.

The resistor R160 controls the maximum amount of electric current when the constant-current loop 231a is activated.

It will be noted that, when the direction of current flowing through the constant-current loop 231a and the diodes d91 and d92 are reversed, and the transistor Tr251 is changed to a PNP-type transistor, the control power source circuit 230 becomes one for negative power supply.

Next, the operation of the power supply circuit 230 shown in FIG. 45 will be described.

The control power source circuit 230 has a two fold purpose to supply the load circuit with an electric power (wherein capacitor is needed), even when the voltage between the communication lines drops to almost zero, and to guard the output holding capacitor in the control power source circuit 230 against a possibly high input voltage, (or to be able to use a low withstand-voltage capacitor) when a bell signal is inputted or the like.

Voltage applied to the output holding capacitor 232, in which stored electric charge has been almost discharged, the voltage on the capacitor 232 increases. Accordingly, the constant-current loop 231a enter an on-state, that causes the holding capacitor 232 to be charged (when a load resistor is connected to this capacitor, charging time becomes longer). Even though load is small which is able to let a large amount of current flow through it, a constant current is kept on flowing by the operation of the constant-current loop 231a.

The breakdown voltage of the diode d91 is set to a value that is slightly larger than the voltage between the communication lines during standby thus the application of normal voltage will not cause a breakdown. When a bell signal or the like is inputted or a high voltage is applied between the communication lines, the diode d92 breaks down and pulls out part of the current flowing through the constant current loop 231 a. Thus, the output voltage of the control power source circuit 230 is clamped at the breakdown voltage of the diode d92.

During standby, since the load current is zero (more precisely, equal to the amount of PN junction leak current), current flowing through the control power source circuit becomes zero when the charging of the output holding capacitor 232 completes. Thus, the constant-current loop 231a enters either a cut-off state or a critical state between on-state and off-state.

If there is no feedback circuit made up of the transistor 251 and the resistor R160, when the constant-current loop 231a enters a cut-off state, the output voltage of the control power source circuit 230 which contains the output holding capacitor 232 falls slowly in accordance with the flow of a very small amount of load current. The voltage on the junction between the diodes d91 and d92 in the constant-current loop 231a likewise falls due to leak current of the diode d92 however, this voltage drop rate is fast because there is no output holding capacitor. As a result, the constant-current loop 231a enters a deeper cut-off state so that small amount of noise which may occur on the communication lines can not cause the constant current loop 231*a* to enter an active-state, thereby allowing the constant-current loop 231*a* to remain in the cut-off state for a long time. Even though the output terminal of the control power source circuit 230 is connected to the output holding capacitor 232, when long term discharging continues, the voltage on the output terminal falls and thus the operation of the load circuit is no longer guaranteed.

If, however, the transistor Tr251 and the resistor 160 are used, and the voltage on the junction between the diodes d91 and d92 falls according to the output voltage of the control power source circuit 230, forward-biased voltage is applied between the base and emitter of the transistor Tr251. Thus, current starts flowing on the collector of the transistor TR251, forcing the constant- current loop 231*a* to enter an on-state. As a result, the constant-current loop 231*a* resumes operation and charges the output holding capacitor 232. When the constant-current loop 232 resumes operation, the voltage on the junction between the diodes d91 and d92 returns to an initial state. Accordingly, the transistor Tr251 returns to a cut-off state. By the operations described above, the output of the control power source circuit 230 is kept at a voltage almost equal to that between the communication lines during standby.

When the voltage between the communication lines is zero (at the middle point of a slow polarity inversion), the electric charge stored in the capacitor 232 is used to supply power for the operation of the load circuit.

As described above, the control power source circuit 230 shown in FIG. 45 has the following advantages.

(1) Even when a high voltage is inputted, the output voltage can be clamped to less than predetermined value. It is therefore recommended that said clamp voltage be set to the withstand voltage of the output holding capacitor 232. (That is, a high withstand voltage is not required);

(2) Even when a bell signal (which has high frequency), is inputted (i.e. a high voltage is inputted), the output voltage is stable and is kept at a value that is almost equal to the voltage between the communication lines during standby. This prevents the malfunction of a circuit connected after the control power source circuit 230; and (3) Dissipation power during standby is zero (i.e. the amount of load current is zero).

[IX] (2) Control Power Supply Circuit (Part 2)

Figure 47:
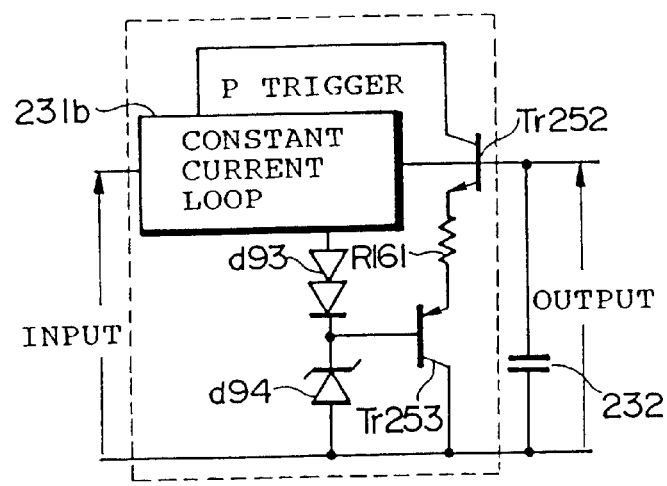
FIG. 47 illustrates an outline of a control power source circuit (part 2)
Figure 48:
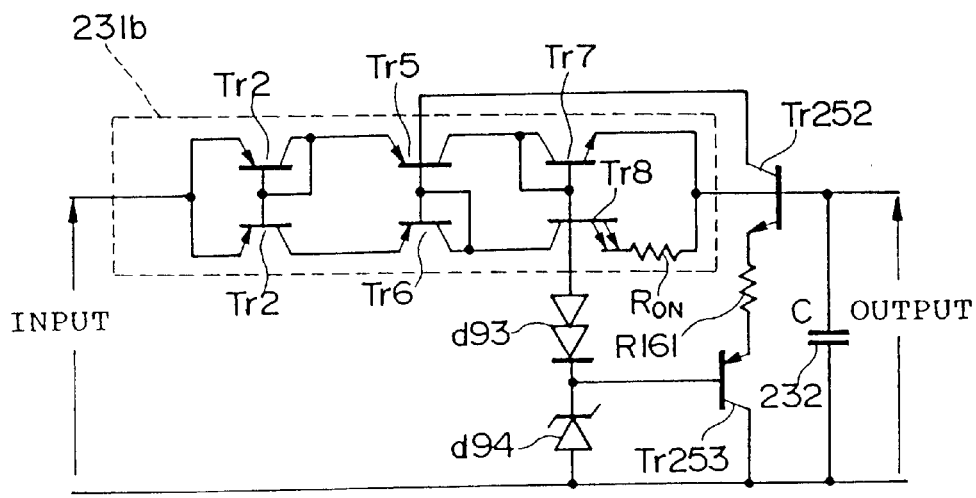
FIG. 48 illustrates a specific example of the circuit shown in FIG. 47.

FIG. 47 illustrates an outline of the control power source circuit (part 2). FIG. 48 illustrates a specific example of the circuit shown in FIG. 47.

The control power source circuit has a constant-current loop 231*b* in its control circuit 231. The constant-current loop 231*b* is made up of the current mirror circuit shown in FIG. 4 and the non-linear current amplifier shown in FIG. 5, in the same manner as the control power source circuit (part 1) described in subsection [IX] (1). The input terminal I of the non-linear current amplifier and the output terminal O of the liner current mirror circuit are connected, and the output terminal O of the non-linear current amplifier and the input terminal I of the linear current mirror circuit are connected. Thereby, loop current is amplified. Between the common terminal COM of the linear current mirror circuit and the common terminal COM of the non-linear current amplifier is set current path, through which a constant current flows.

FIG. 47 and FIG. 48 shows circuits in which the negative side of the power source is connected to the ground. The control power source circuit 230 has a level shift diode d93, a Zener diode d94, a firs feedback NPN transistor Tr252, a PNP transistor Tr253, a guard resistor R161 and an output holding capacitor 232, in addition to the constant-current loop 231*b*.

The current flowing-in terminal of the constant-current loop 231*b* is connected to a power source (positive side), and the current flowing-out terminal is used as an output terminal for the control power source circuit 230. The output holding capacitor 232 is connected between the output terminal of the control power source circuit 230 and the ground (a negative side of the power source). The joint input terminal of the non-linear current amplifier and the current mirror circuit in the constant-current loop, in which the current flowing-out terminal is used as a common terminal COM, is connected to the anode of the diode d93. The cathode of the diode d93 is connected to the positive voltage terminal of the diode d94, whose negative voltage terminal is connected to the ground. The input terminal of the linear current mirror circuit or of the non-linear current amplifier is connected to the collector of the transistor 252. The base of the transistor Tr252 is connected to the output terminal of the control power source circuit 230. The emitter of the transistor Tr252 is connected to the emitter of the transistor Tr253 via a resistor R161. The base of the transistor Tr253 is connected to the cathode of the diode d93 and the positive voltage terminal of the diode d94. The collector of the transistor Tr253 is connected to the ground.

The constant-current value of the constant-current loop 231*b* is set to the maximum allowable current value for the power source. The breakdown voltage of the diode d94 is set to the maximum allowable load voltage (usually, a slightly larger than the voltage between the communication lines during standby). The shift voltage of the diode d93 is set to one in which the transistors Tr252 and Tr253 will enter a cut-of state when the constant-current loop 231*b* is in an active state. The capacitance of the output holding capacitor 232 is set to a value with which a sufficient electric charge can be held so as to ensure operation of the load circuit for a predetermined maximum length of time while a bell signal is being input.

The resistor R161 controls the maximum amount of current when the constant-current loop 231*b* is activated.

It will be noted that, when the direction of the current flowing through the constant-current loop 231, and the diodes d93 and d94 are reversed, and when the PNP-type transistor Tr252 and the NPN-type transistor Tr253 are exchanged, a control power source circuit for negative power source can be created.

Next, the operation of the control power source circuit shown in FIG. 47 will be described.

The mechanism by which the output of the control power source circuit 230 shown in FIG. 47 is held is basically the same as that of the control power source circuit (part 1) shown in FIG. 45. The difference lies in the addition of a transistor Tr253 for restarting the constant-current loop 231*b* when it is in an off-state. In the control power source circuit of FIG. 45, the current for restarting the constant-current loop 231*a* is controlled by the leakage current of the diode d92. Therefore, when the amount of initial trigger current of the constant-current loop 231*a* is large, operation of said circuit becomes unstable. In the control power source circuit of FIG. 47, on the other hand, the diode is connected to the base of the transistor Tr253, which amplifies current (where the resistor R161 controls the starting trigger current). Therefore, restart of the constant-current loop 231*b* can be guaranteed.

As described above, the control power source circuit has the following advantages.

(1) Even when a high voltage is inputted, the output voltage is clamped to less than a predetermined value. Thus, the withstand-voltage of the output holding capacitor can be the clamped voltage (a capacitor having a high withstand-voltage is not necessary).
(2) Even when a bell signal which has a high frequency, is inputted (i.e. a high voltage is inputted), the output voltage is..stable and is almost equal to the voltage between the communication lines during standby). This prevents the malfunction of circuits connected after the control power source circuit.
(3) Dissipation power during standby is zero (load current is zero).
(4) The leakage current of the diode d94 is used to restart the constant-current loop 231b by amplifying the leakage current using the transistor Tr253. Thus, even despite the low leakage current of the diode d94 and the relatively large amount of restarting current needed by the constant-current circuit 231b, reliable circuit operation is guaranteed.

[IX] (3) Function of the Polarity Inversion Trailing Edge Circuit Shown in FIG. 44

FIG. 44 illustrates the polarity inversion trailing edge detection circuit for the communication line L1. The mechanism of detecting a polarity inversion trailing edge in which the communication line L1 goes to zero (H→0) is the same as that of the polarity inversion trailing edge detection circuit described in subsection [VII] (1) (iii). Further, when the input terminal of the polarity inversion trailing edge detection circuit is connected to the communication line L2, a pseudo-differential operation for detecting a polarity inversion trailing edge in which the voltage on the communication line L2 goes to zero (H→0), is realized. This point is the same as that made when discussing the polarity inversion trailing edge detection circuit in subsection [VII] (1) (iii).

By using the full-wave rectification peak holding circuit 240, which has a limiter for preventing excess current or excess voltage from being input, an excessive amount of current which may lead to a switching system malfunction is prevented from flowing through the communication lines when the capacitor 232 is being charged. Also, by a clamping function of preventing excess voltage from being input, the output of excess voltage is prevented even when a bell signal, which has a large voltage, is input. Therefore, breakdowns are prevented, and low withstand-voltage of the power source capacitor is obtained. To summarize, the polarity inversion trailing edge detection edge circuit shown in FIG. 44 has the following benefits.

(1) A polarity inversion trailing edge in which the voltage between the communication lines L1 and L2 goes to zero from a high voltage (H→0);
(2) Differential operation (pseudo-differential operation) circuit can be realized without a capacitor;
(3) A fixed trigger current can be obtained regardless of the rate of polarity inversion;
(4) Dissipation power is zero, except when a polarity inversion trailing edge is detected;
(5) Since excess current is prevented, a switching system malfunction can never occur;
(6) Even when only a low voltage is applied, a fixed amount of current flows. Therefore, the power source capacitor 232 is charged quickly; and
(7) Since the application of excess voltage to the capacitor 232 is prevented, said capacitor can be of low withstand-voltage.

[X] Operation of the Polarity Inversion Detection Circuit Shown in FIG. 43

The slow polarity inversion detection circuit shown in FIG. 43 is configured simply by replacing the combination of the resistor R70 and the power source capacitor Cp30 in FIG. 33 with the control power source circuit 230. The operation of the slow polarity inversion detection circuit in FOG. 43, which detects a slow polarity inversion in mixture of a slow polarity inversion and a normal polarity inversion, is the same as that of the slow polarity inversion detection circuit described in subsection [VIII] thus, description of this operation is omitted.

Here, supplementary explanation on the control power source circuit will be made. During standby, no current flows through the polarity inversion trailing edge detection circuits 120 and 130, the polarity inversion leading edge detection circuits 160 and 170, the constant-current ON/OFF monostable multivibrator 140, and the holding circuit. The control power source circuit 230 supplies a voltage that is almost equal to the voltage between the communication lines to the polarity inversion trailing edge detection circuits 120 and 130 and the constant-current ON/OFF monostable multivibrator 140. When load current (including charge current for the capacitor 232) is zero, no current flows through the control power source circuit 230.

When the voltage difference between the communication lines L1 and L2 is zero, in the middle level of a slow polarity inversion, the polarity inversion trailing edge detection circuit 120 and the. constant-current ON/OFF monostable multivibrator 140 operates using energy stored in the capacitor of the control power source circuit 230.

When a bell signal is input, an AC bell signal is added to the DC voltage between the communication lines after the polarity inversion occurs. As a result, the voltage between the communication lines becomes large, and this voltage when the communication line L1 is in 'High' level is different from that when it is the communication line L2 that is in 'High' level. The current route, in the slow polarity inversion detection circuit shown in FIG. 33, thorough the rectifier 100, the resistor R70 and the capacitor Cp30, which form a peak holding circuit, has a time constant equivalent to the CR product (i.e. the product of the resistance of the resistor R70 and the capacitance of the capacitor Cp30). When the time constant is small, and the period of time of inputting a bell signal is large, the voltage of the capacitor Cp30 changes with increase or decrease in accordance with the difference between a charged amount of capacitor Cp30 and an amount of dissipation charge through loads. In addition, due to the imbalance of the peak voltages, the slow polarity inversion detection operation (in the slow polarity inversion detection circuit) may become unreliable when predetermined conditions are not proper. Even in this case, however, the control power source circuit 230 of the slow polarity inversion detection circuit shown in FIG. 43 supplies a guaranteed output voltage to circuits located after it. Thus, malfunction is prevented.

[XI] Result of the Slow Polarity Inversion Detection Circuit Shown in FIG. 43

As described above, the slow polarity inversion detection circuit of the fourth embodiment has the following benefits.
(4-1) Distinction is made between a slow polarity inversion and the normal polarity inversion, and only slow polarity inversion is detected;
(4-2) A bell signal can be excluded from slow polarity inversion detection;
(4-3) Even when a bell signal is input, voltage applied to the power source capacitor 232 is clamped by the control power source circuit 230 to a value equal or close to the voltage between the communication lines during standby. Thus, a low withstand voltage capacitor can be used.

(4-4) Since the control power source circuit 230 causes constant current to flow even when only a low voltage is applied, capacitor recovery is faster.

<<Fifth Embodiment>>

Figure 49:
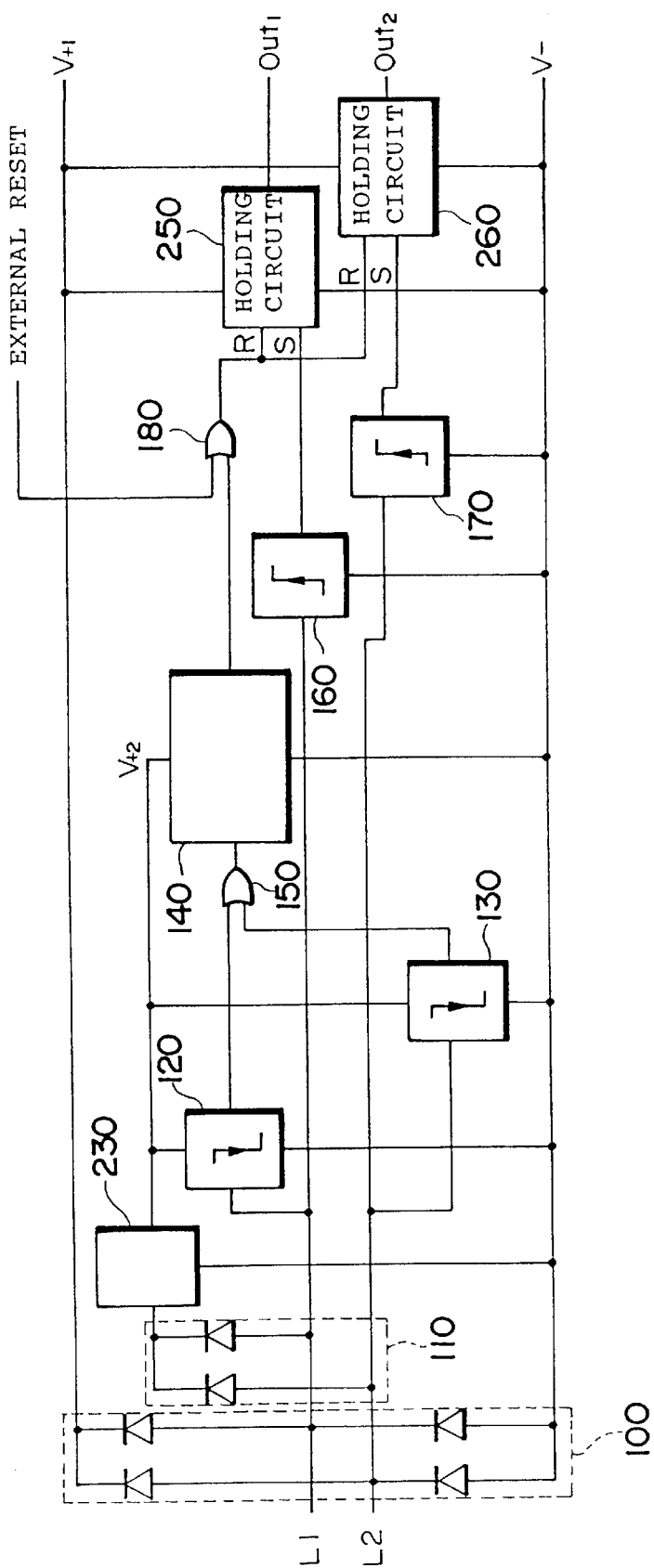
FIG. 49 illustrates a slow polarity inversion detection circuit of fifth embodiment according to the present invention.

FIG. 49 illustrates a slow polarity inversion detection circuit of the fifth embodiment according to the present invention. The same reference numerals are attached to the same elements in the circuit of FIG. 43.

The polarity inversion detection circuit has a rectifier 100, which is the same as that of the fourth embodiment, a rectifier 110, a control power source 230, polarity inversion trailing edge detection circuits 120 and 130, a constant-voltage ON/OFF monostable multivibrator 140, OR circuits 150 and 180, and polarity inversion leading edge detection circuits 160 and 170, which are all connected in the same manner as shown in FIG. 43.

The slow polarity inversion detection circuit shown in FIG. 49 has two holding circuits 250 and 260. The configuration of the holding circuits 250 and 260 are the same as that of the holding circuit 200 of the third and fourth embodiments. The output signal of the polarity inversion leading edge detection circuit 160 is inputted to the set input terminal S of the holding circuit 250. The output signal of the polarity inversion leading edge detection circuit 170 is inputted to the set terminal S of the holding circuit 260. The output signal of the OR circuit 180 is sent to the reset terminals of the holding circuits 250 and 260.

Figure 50:
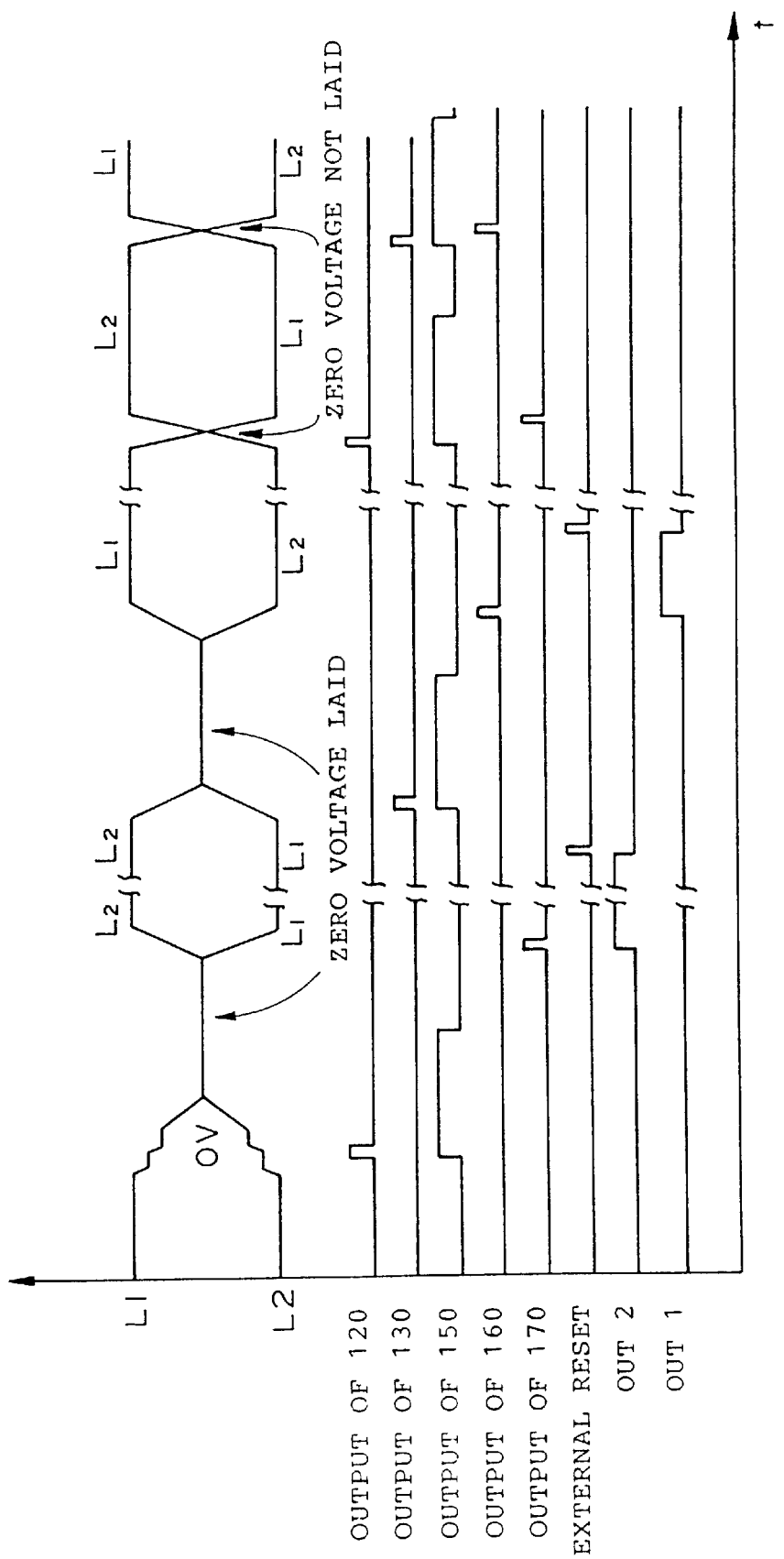
FIG. 50 is a timing chart showing the operation of the slow polarity inversion detection circuit shown in FIG. 49.

FIG. 50 is a timing chart showing the operation of the slow polarity inversion detection circuit shown in FIG. 49. With reference to FIG. 50, the operation of a slow polarity inversion detection circuit of the fifth embodiment will now be described.

The configuration of the slow polarity inversion detection circuit is almost the same as that of the slow polarity inversion detection circuit 2 shown in FIG. 43. Since the masking pulse generation of a detection trigger signal in the polarity inversion trailing edge detection circuits 120 and 130 is the same as that in the polarity inversion leading edge circuits 160 and 170, further description of this operation is omitted.

In the slow polarity inversion detection circuit of the fourth embodiment, an OR-operation of the edge detection trigger signals outputted from the polarity inversion leading edge detection circuits 160 and 170 is made. However, in the polarity inversion detection circuit of the fifth embodiment, the edge detection trigger signals are not ORed, but simply inputted to the holding circuits 250 and 260, respectively.

Since the edge detection trigger signals are not processed but inputted to said holding circuits, when a polarity inversion occurs in which the electric potential on the communication line L1 goes from 'Low' level to 'High' level, an edge detection trigger signal is outputted from the polarity inversion leading edge detection circuit 160 as shown in FIG. 50, and a slow polarity inversion detection trigger information Out1 for either restarting or releasing is outputted from the holding circuit 250. When the electric potential on the communication line L2 goes from 'Low' level to 'High' level, an edge detection trigger signal is outputted from the polarity inversion leading edge detection circuit 170, and a slow polarity inversion detection holding information Out2 for either releasing or starting is outputted from a holding circuit 260. A reset signal from the controlling circuit forces the holding circuits 250 and 260 to be reset and to enter a standby state.

As described above, the slow polarity inversion detection circuit of the fifth embodiment has the following benefits.

(5-1) Distinction is made between a slow polarity inversion and the normal polarity inversion, thus allowing only slow polarity inversion signal to be detected;

(5-2) A bell signal can be excluded from slow polarity inversion detection;

(5-3) When a bell signal is input, the control power source circuit 230 clamps a voltage applied to the power source capacitor 232 to a value equal or close to the voltage between the communication lines during standby, and thus a low withstand voltage capacitor can be used;

(5-4) A slow polarity inversion from 'Low' level to 'High' level on the communication line L1 can be distinguished from a slow polarity inversion from 'Low' level to 'High' level on the communication line L2 thereby allowing two distinct signals—one for start and one for releasing—to be output.

Further, even if the control power source circuit 230 is replaced with a power source circuit made up of the current control resistor R70 and the power source capacitor Cp30, another slow polarity inversion detection circuit for distinguishing between starting and releasing can be realized.

<<Sixth Embodiment>>

Figure 51:
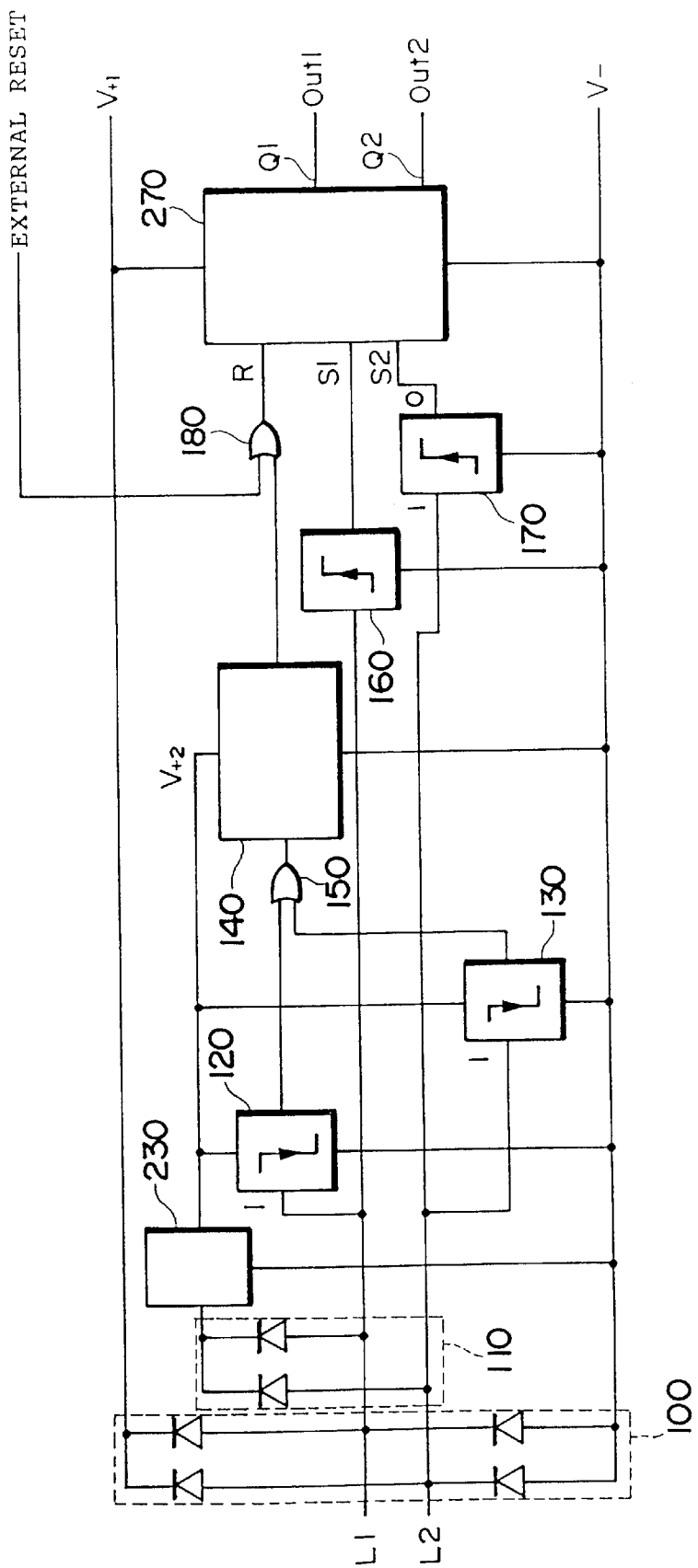
FIG. 51 illustrates a slow polarity inversion detection circuit of a sixth embodiment according to the present invention.

FIG. 51 illustrates a slow polarity inversion detection circuit of the sixth embodiment according to the present invention. The same reference numerals as in FIG. 43 and FIG. 49 are attached to the same elements in FIG. 51.

The polarity inversion detection circuit has rectifiers 100 and 110, a control power source circuit 230, polarity inversion trailing edge detection circuits 120 and 130, a constant-current ON/OFF monostable multivibrator 140, OR circuits 150 and 180, and polarity inversion leading edge detection circuits 160 and 170, which are all the same as in the fourth and fifth embodiments, and which are all connected in the same manner as in FIG. 43 and FIG. 49.

In addition, the slow polarity inversion detection circuit shown in FIG. 51 has a three-state holding circuit 270, which is made up of the constant-current ON/OFF & change-over typed holding circuit shown in FIG. 28 of the first embodiment. One set terminal S1 of the three-state holding circuit is connected to the output terminal of the polarity inversion leading edge detection circuit 160. A second set terminal S2 of the three-state holding circuit is connected to the output terminal of the polarity inversion leading edge detection circuit 170. The output signal from the OR circuit 180 is coupled to the reset terminal R.

The three-state holding circuit 270 has two output terminals Q1 and Q2. When a trigger signal is input to the set terminal S1, an on signal is output from the output terminal Q1. Similarly, when a trigger signal is input to the set terminal S2, an on signal is output from the output terminal Q2. Finally, when an input signal is sent to the reset terminal R, output signals from both output terminals Q1 and Q2 are turned off. That is, the three-state holding circuit 270 can enter one of three output states, namely, Q1 is in an on-state, Q2 is in an on-state, or Q1 and Q2 are both in an off-state.

Next, the operation of the slow polarity inversion detection circuit shown in FIG. 51 will be described.

The configuration of the slow polarity inversion detection circuit is almost the same as those of FIG. 43 and FIG. 49. It differs from the previous two in that an edge detection trigger signal is input to the three-state holding circuit 270, and that three output states issue from said holding circuit. Since the operation of mask pulse generation for a detection trigger signal in the trailing edge circuits 120 and 130, is the same as that in the polarity inversion leading edge circuits 160 and 170, description is omitted.

During standby, the output signals on the output terminals Q1 and Q2 in the three-state holding circuit 270 are both in an off-state (no current flows through the holding circuit). When a slow polarity inversion occurs, in which the electric potential on the communication line L1 changes from 'Low' level to 'High' level, an edge detection trigger current is outputted from the polarity inversion leading edge detection circuit 160 and input to the set terminal S1 in the holding circuit 270. A slow polarity inversion detection holding information for either starting or releasing is then output from the terminal Q1 of the holding circuit 270. Similarly when a slow polarity inversion occurs, in which the electric potential on. the communication line L2 changes 'Low' level to 'High' level, an edge detection trigger current is output from the polarity inversion leading edge detection circuit 170 and input to the set terminal S2 of the holding circuit 270. A slow polarity inversion detection holding information for either releasing or starting is then output from the output terminal Q2 of the holding circuit 270. When a reset signal is input from the controlling circuit, signal output from the output terminal Q1 or the output terminal Q2 is turned off, and the slow polarity inversion circuit returns to the standby state.

As described above, the slow polarity inversion detection circuit of the sixth embodiment has the following benefits.

(6-1) Distinction is made between a slow polarity inversion and the normal polarity inversion is made, and only slow polarity inversion;

(6-2) A bell signal can be excluded from slow polarity inversion detection;

(6-3) Even when a bell signal is input, the control voltage power source circuit 230 clamps the voltage applied to the capacitor 232 to a value equal or close to the voltage between the communication lines during standby. Thus, a low withstand voltage capacitor can be used;

(6-4) A slow polarity inversion from 'Low' electric potential to 'High' electric potential (L→H) on the communication line L1 can be distinguished from a slow polarity inversion from 'Low' electric potential to 'High' electric potential (L→H) on the communication line L2. Thus, two distinct signals-one for start and another for releasing-can be output;

(6-6) Two independent holding circuits may lead to a malfunction of the slow polarity inversion detection circuit when two are turned on at the same time. However, information output from the output terminals Q1 and Q2 of a single holding circuit 270 are exclusive from each other, and thus no such malfunction is possible;

(6-6) The output levels on the output terminals Q1 and Q2 are set by a common constant-current ON/OFF typed switch, and thus the output levels of the output terminals Q1 and Q2 are the same;

(6-7) In comparison with a configuration with two holding circuits, the number of circuit elements for the single holding circuit 270 is smaller.

Further, when the control power source circuit is made up of the current control resistor R70 and the power source capacitor Cp30, the aforementioned results except (6-3) can still be obtained.

<<Seventh Embodiment>>

Figure 52:
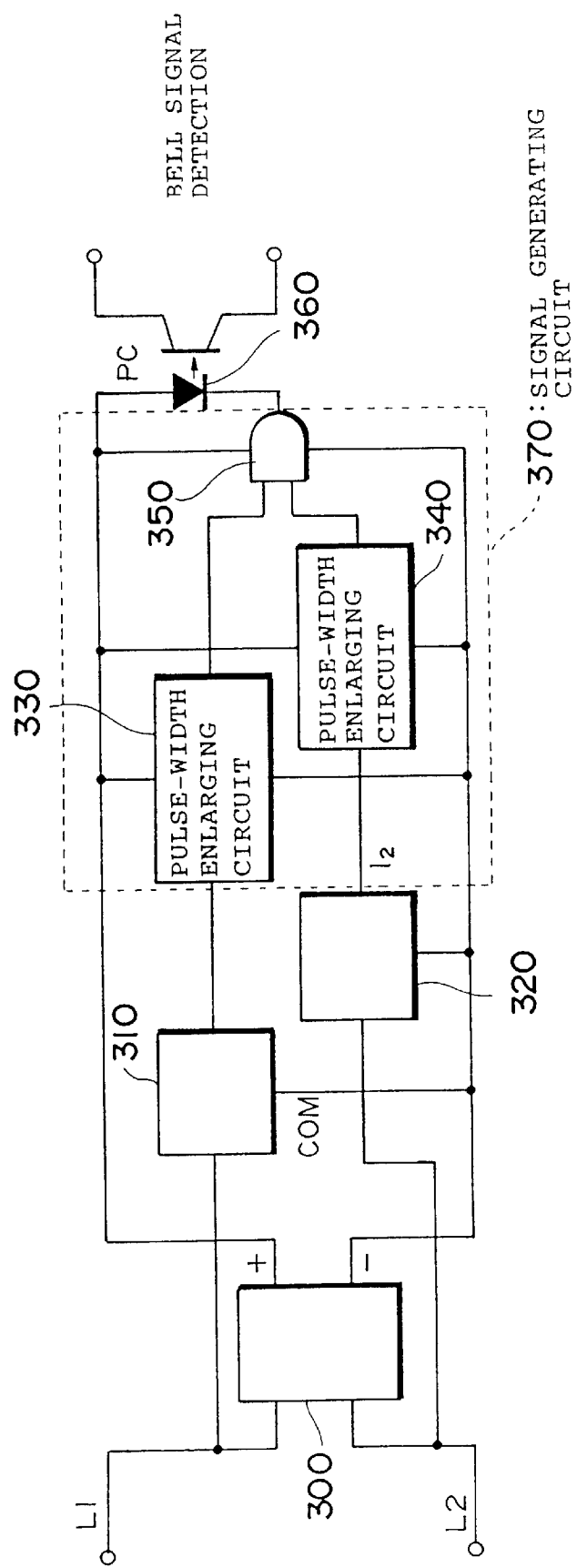
FIG. 52 shows an outline of a bell signal detection circuit of a seventh embodiment according to the present invention.
Figure 74:
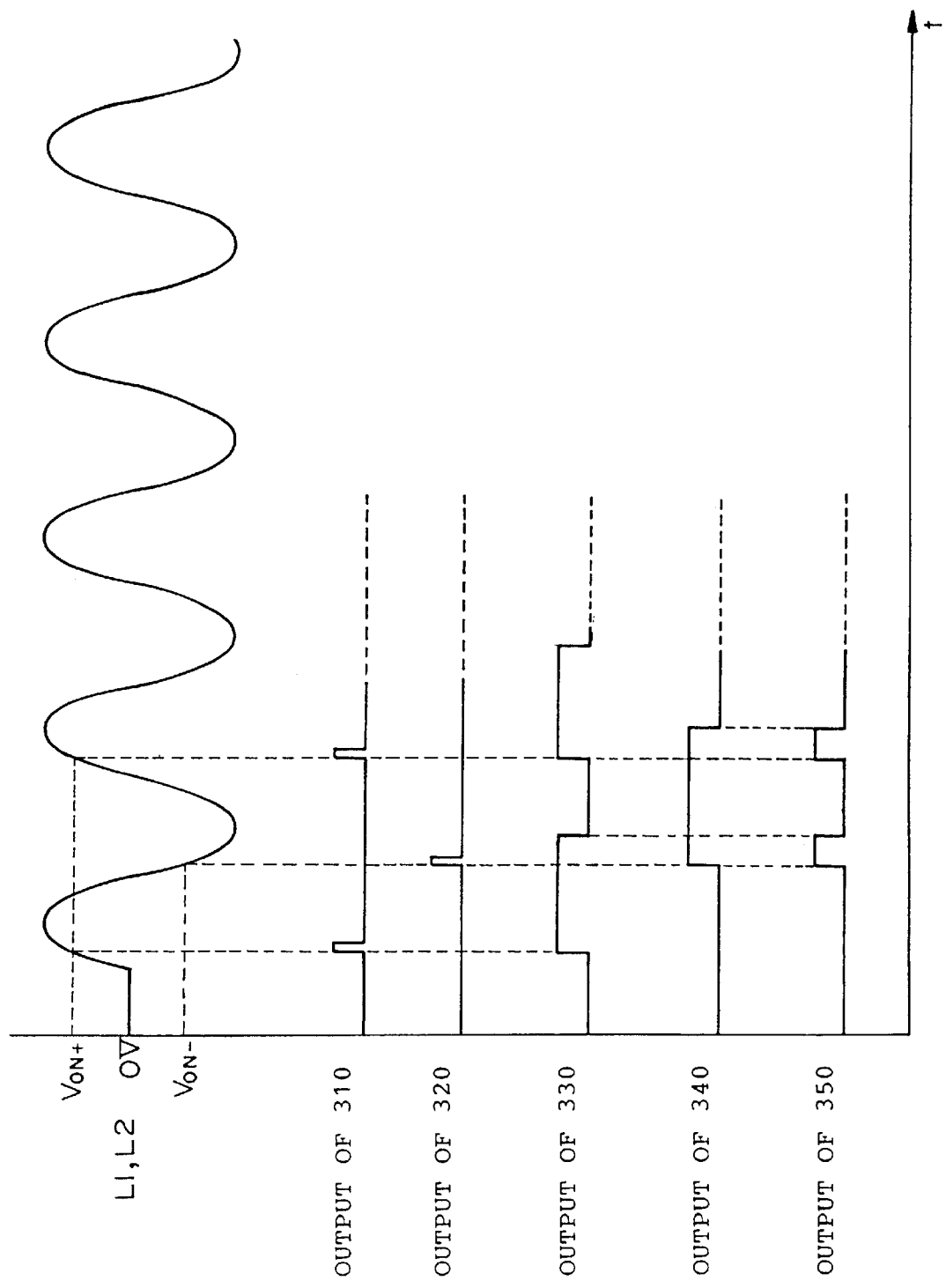
FIG. 74 is a timing chart showing the operation of a bell signal detection circuit.
Figure 75:
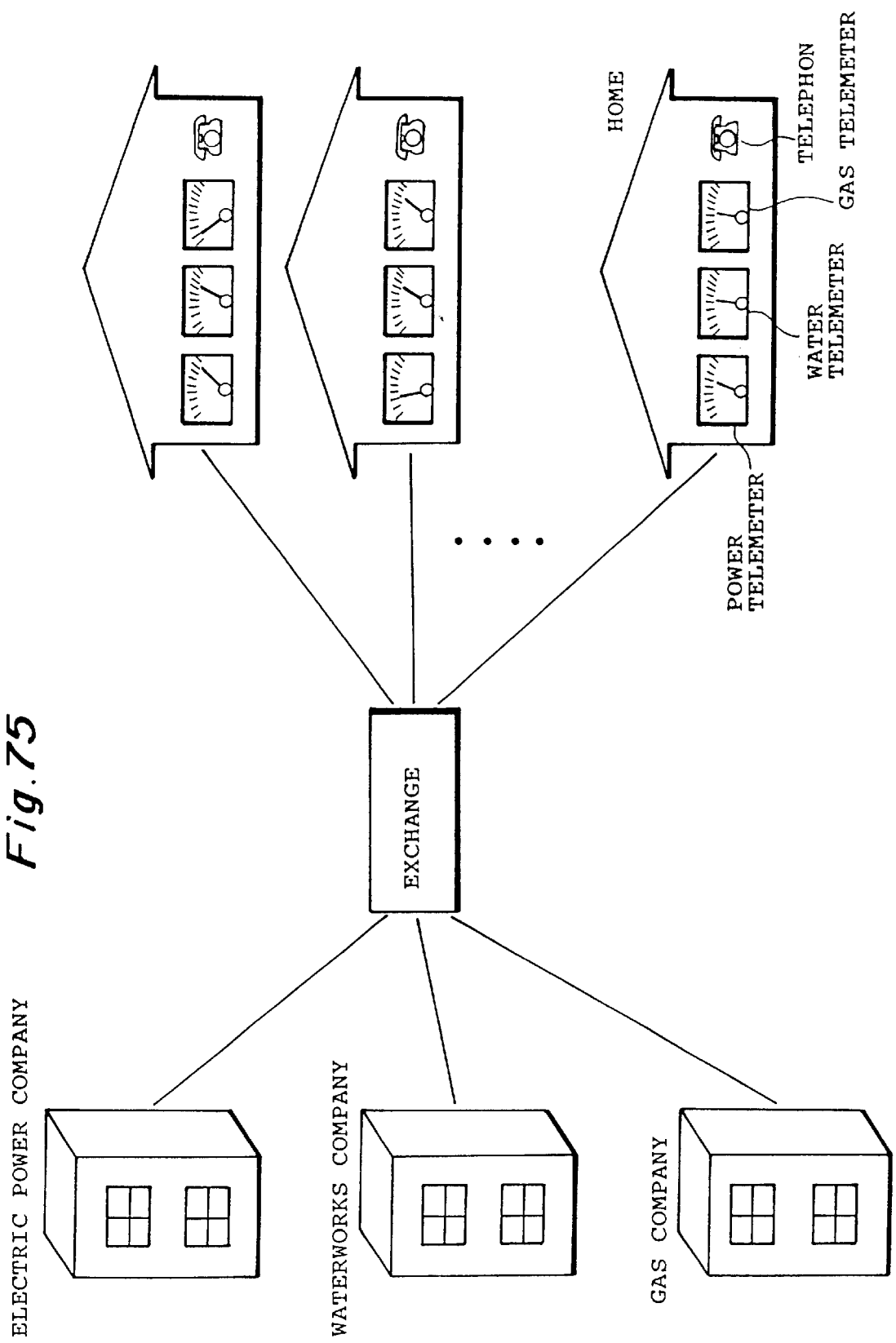
FIG. 75 illustrates a diagram showing a telemetering system.
Figure 76:
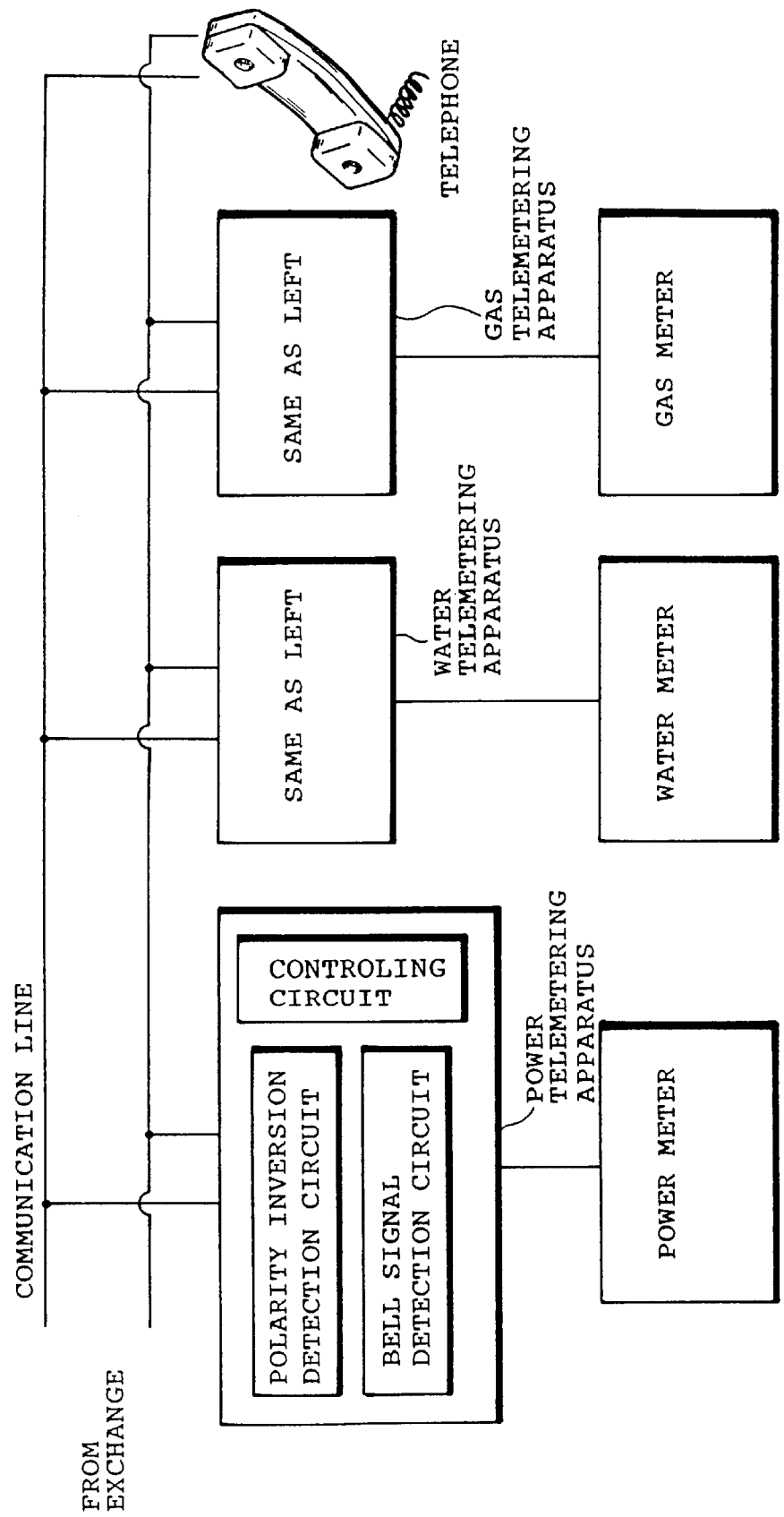
FIG. 76 illustrates a configuration of telemetering apparatus.
Figure 77A:
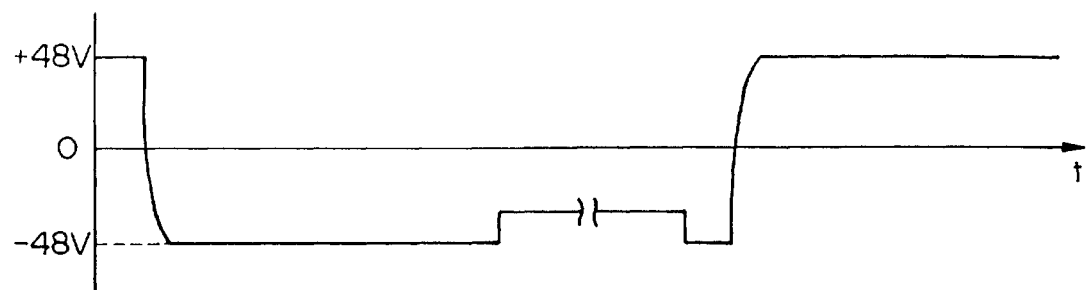
FIG. 77 is a timing chart of normal polarity inversion, slow polarity inversion, and calling bell signal.
Figure 77B:
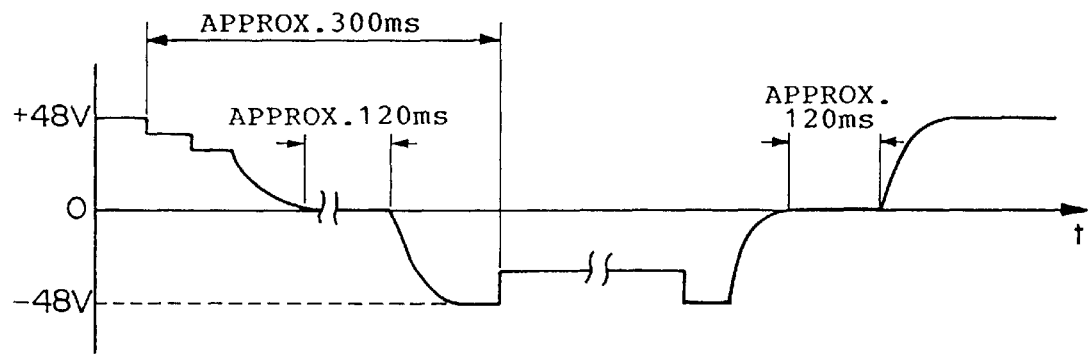
Figure 77C:
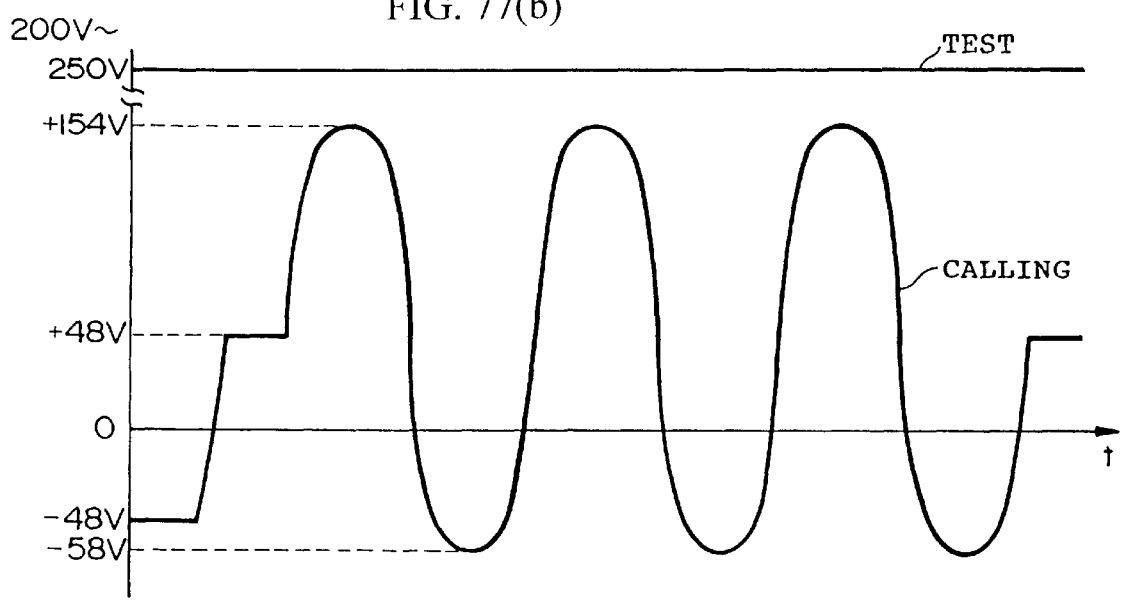

FIG. 52 outlines a bell signal detection circuit of the seventh embodiment according to the present invention, and FIG. 74 is a timing chart showing the operation thereof.

Figure 2:
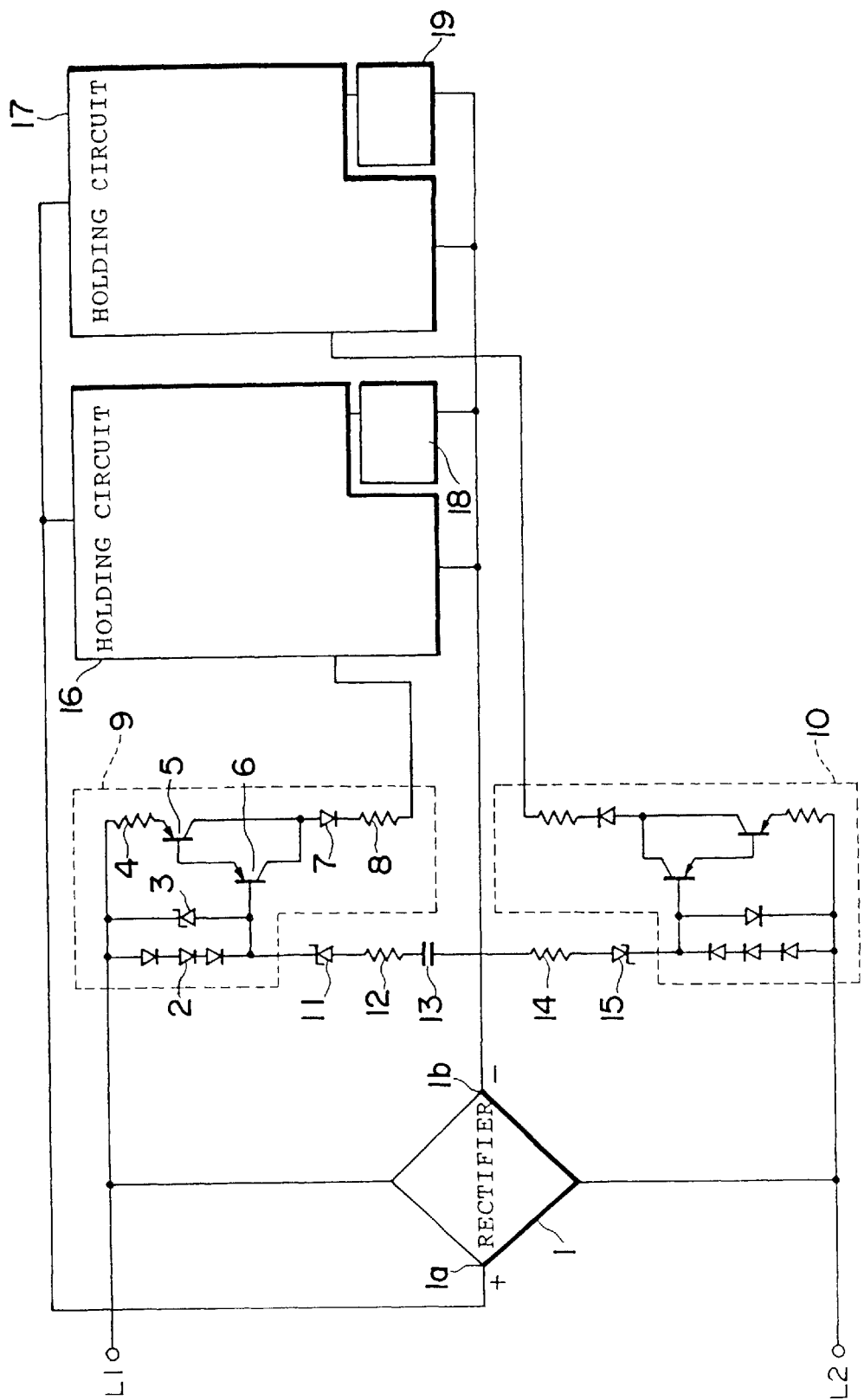
FIG. 2 illustrates a conventional polarity inversion detection circuit.

In a telemetering apparatus, it is necessary to distinguish between an telephone communication and a telemetering communication by detecting a polarity inversion of the communication lines L1 and L2. For this reason, the apparatus is equipped with a bell signal detection circuits. Conventional bell signal detection circuits detect a bell signal using a trigger pulse they comprise the Zener diodes 11 and 15 shown in FIG. 2, the resistors 12 and 14, the capacitor 13, and the polarity inversion detection amplification circuits 9 and 10. However, in conventional circuits, since a polarity inversion for indicating a signal arrival causes a detection trigger pulse to be outputted, the detection trigger pulse has to be rejected as an error pulse. Also, when a bell signal is detected, a series of short pulses (e.g. of 32 Hz which is twice the frequency of the bell signal) synchronous with the bell signal are generated. From the viewpoint of the controlling circuit, it is hard to deal with a series of short pulses. In the seventh embodiment of the present invention, Each pulse width in the series of short pulse is enlarged, thus resulting in easier bell signal detection.

The bell signal detection circuit shown in FIG. 52 has a full-wave rectifier 300 and two edge detection circuits 310 and 320. The full-wave rectifier 300 full-wave-rectifies the voltage between the communication lines L1 and L2 coming from the exchange and supplies power to circuits which are connected after it. The first edge detection circuit 310 detects a polarity inversion edge when the electric potential on the communication line L1 changes from 'Low' level to 'High' level. The second edge detection circuit 320 detects a polarity inversion edge when the electric potential on the communication line L2 changes from 'Low' level to 'High' level.

The first and second edge detection circuits 310 and 320 are configured such that a current mirror circuit for current output is added to the circuits shown in FIG. 7 and FIG. 13 or to the circuits shown in FIG. 10, FIG. 11, and FIG. 12.

The output side of the edge detection circuit 310 is connected to a pulse-width enlarging circuit 330. The output side of the edge detection circuit 320 is connected to a second pulse-width enlarging circuit 340. The pulse-width enlarging circuit 330, operating on voltage supplied by the rectifier 300, converts the trigger current from the edge detection circuit 310 into a voltage or current output in a logical '1' level, and continues to output this level during a fixed period of time or until a reset signal is input. Similarly the pulse-width enlarging circuit 340, operating on voltage from the rectifier 300, converts a second edge detection trigger current (from the edge detection circuit 320) into a voltage or current output in a logical '1' level, and continues to output the logical '1' level during a fixed period of time. The output terminals of the pulse-width enlarging circuits 330 and 340 are connected to an AND circuit 350, which experiences AND-operation on the output pulses from the pulse-width enlarging circuits 330 and 340. The pulse-width enlarging circuits 330 and 340, and the AND circuit 350, make up a signal generation circuit 370, which generates the final detection signal, (enclosed with a broken line in FIG. 52). The output of the AND circuit 350 is connected to a photo coupler 360, which provides means for outputting a bell signal. The photo coupler 360 outputs the output signal from the AND circuit 350 to the controlling circuit, which has a different ground level.

The pulse-width enlarging circuits 330 and 340 can use a variety of circuits such as an integration circuit made up of MOS transistors (which will be described in section [XII]), an integration circuit made up of bipolar elements (which will be described in section [XIII], and a monostable multivibrator (which will be described in section [XIV]. After the circuits are described, the operation and benefits of the bell detection circuit shown in FIG. 52 will be described in sections [XV] and [XVI], respectively.

[XII] Example in Which an Integration Circuit Made up of MOS Transistors is Used for the Pulse-width Enlarging Circuits 330 and 340

Figure 53:
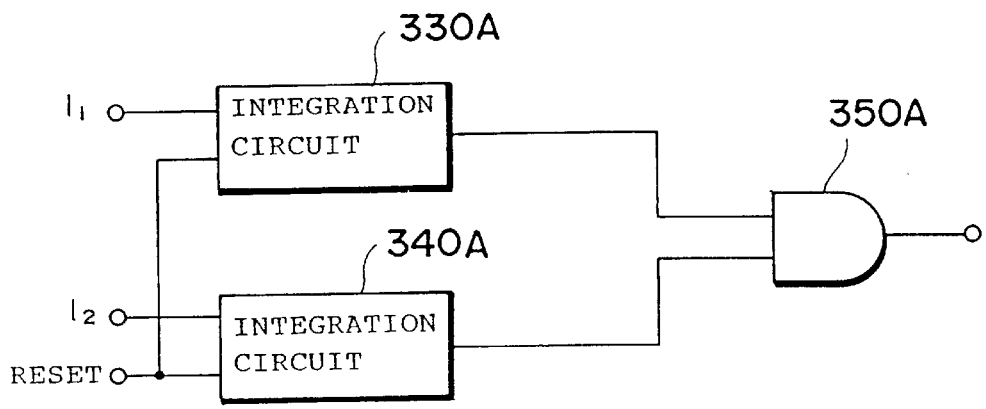
FIG. 53 shows a configuration (part 1) of a signal generation circuit 370 shown in FIG. 52.
Figure 54:
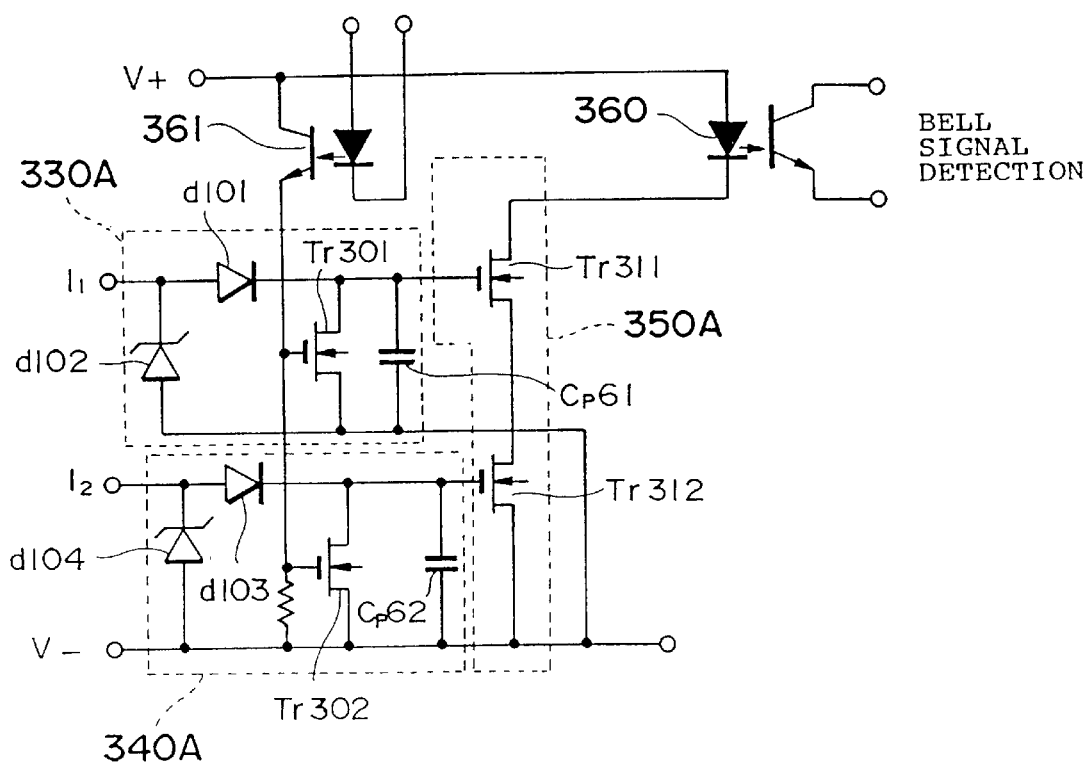
FIG. 54 shows a specific example of the circuit shown FIG. 53.

FIG. 53 illustrates a configuration (part 1) of the signal generating circuit 370. FIG. 54 illustrates a specific example of the circuit shown in FIG. 53.

When the pulse-width enlarging circuits 330 and 340 are made up of the integration circuits 330A and 340A, as shown in FIG. 53, the integration circuits 330A and 340A are input a reset signal. The output signals of the integration circuits 330A and 340A are input to an AND circuit 350A which has two input terminals.

The specific example of integration circuit 330A in FIG. 54 has a diodes d101, a Zener diode d102, a MOS transistor Tr301 and a capacitor Cp61. The integration circuit 340A has the same connections as those of the integration circuit 330A, and has a diode d103, a Zener diode d104, a MOS transistor Tr302 and a capacitor Cp62.

The AND circuit 350A is made up of MOS transistors Tr311 and Tr312 connected in series, to whose gates output signals from the integration circuits 330A and 340A are inputted, respectively. The MOS transistors Tr311 and Tr312, which are both connected in series, are connected to a photo coupler 360, which outputs a bell detection signal. The photo coupler 360 is activated when the MOS transistors Tr11 and Tr312 are both in an on-state. In addition, the specific example includes a photo coupler 361 for inputting a reset signal. When a reset signal is inputted from the outside, the transistors Tr301 and Tr302 in the integration circuits 330A and 340A are both turned on at the same time.

Trigger pulse currents outputted from the two pulse edge detection circuits 310 and 320 are provided to input terminals I1 and I2 of the integration circuits 330A and 340A, respectively. The trigger pulse currents go through backward-current-proof diodes d101 and d103, and charge (integrate) capacitors Cp61 and Cp62, respectively. In this way, voltage conversion is performed. Electric charge as a result of the integration of input current is stored in the capacitors Cp61 and Cp62.

When a long bell signal is received, excess charge occurs. However, this excess amount of charge is passed through Zener diodes d102 and d104, so that the excess amount does not charge the capacitor. When the photo coupler 361 receives current from the controlling circuit, the MOS transistors Tr301 and Tr302 both enter an on-state, the capacitors Cp61 and Cp62 are discharged, and thus the circuit shown in FIG. 64 enters a reset state.

Two integration output voltages (voltages between terminals of Cp61 and between terminals of Cp62) are processed at the AND circuit 350A. When a bell signal is inputted, the capacitors Cp61 and Cp62 are both charged. Accordingly, the AND circuit 350A is activated, and, through the photo coupler 360, a bell signal is sent to the controlling circuit. When a polarity inversion occurs, for starting or releasing the communication lines, either capacitor Cp61 or Cp62 is charged, and the AND circuit is not activated. That is, an erroneous signal is prevented from being outputted.

More specifically, when several polarity inversions occur within a fixed period of time from the moment of the first polarity inversion occurs to the moment when the circuits are reset, said inversions are taken to be indicative of a bell signal. Capacitors Cp61 and Cp62 have the function of holding this bell signal, which is reset when a reset signal from the controlling circuit is inputted.

[XIII] Example in Which an Integration Circuit Made Up of Bipolar Elements is Used in the Pulse-width Enlarging Circuits 330 and 340

Figure 55:
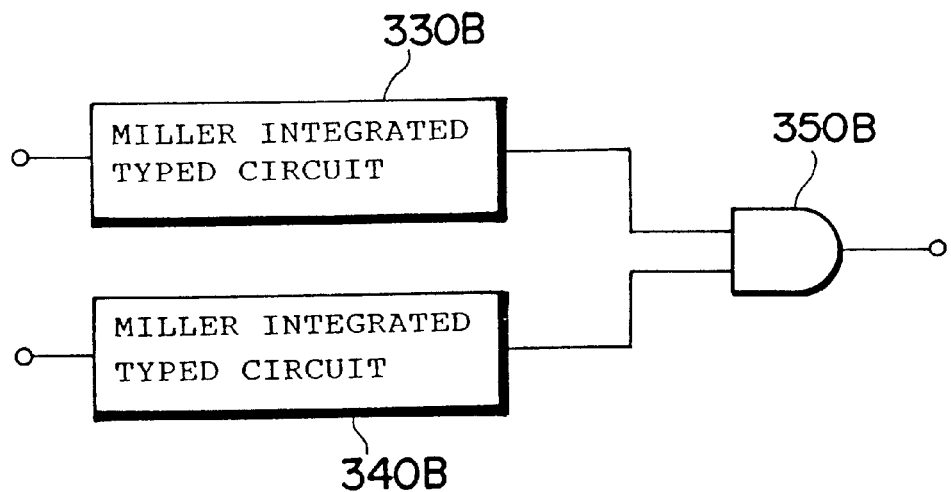
FIG. 55 shows a configuration (part 2) of the signal generation circuit 370 shown in FIG. 52.

FIG. 55 illustrates a configuration of the signal generation circuit 370 shown in FIG. 52, wherein a Miller integrator is used in the pulse-width enlarging circuits 330 and 340.

When the pulse-width enlarging circuits 330 and 340 in the signal generation circuit 370 are made up of Miller integrators 330B and 340B, the output sides of said integrators are connected to the two input terminals of the AND circuit 350B.

Next, a pulse-width enlarging circuit that uses an integration circuit made up of an first and a second bipolar element, will be described. Subsection [XIII] (1) and [XIII] (2) describe the first and second Miller integrator typed pulse-width enlarging circuit, respectively. In subsection [XIII] (3), a specific circuit according to the circuit shown in FIG. 55 will be described.

[XIII] (1) First Miller Integrator Typed Pulse-width Enlarging Circuit

Figure 56:
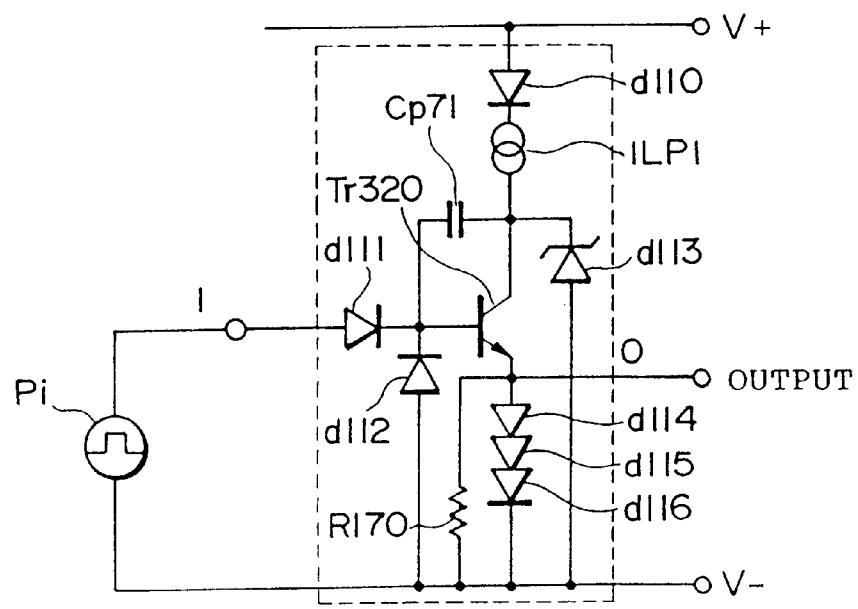
FIG. 56 illustrates a pulse-width enlarging circuit made up of a first miller integrator circuit.

FIG. 56 illustrates the first Miller integrator typed pulse-width enlarging circuit.

The first Miller integrator typed pulse-width enlarging circuit has a backward-current-proof diode d110 connected to a positive power supply V+, and a constant-current loop ILP1 connected to the diode 110 in series. The constant current loop ILP1 is connected to the collector of an NPN transistor Tr320. Between the base and the collector of the transistor Tr320, a capacitor Cp71 is connected. Between the base of the transistor Tr320 and input terminal of the first Miller integrator typed pulse-width enlarging circuit, a backward-current-proof dioded 111 is connected in forward direction toward the base of the transistor Tr320. Between the base of the transistor Tr320 and a negative power supply V−, a guard diode d112 is connected in forward direction toward the base of the transistor Tr320. Between the negative power supply V− and the collector of the transistor Tr320, a Zener diode d113, which prevents excess charge (excess voltage) from occurring, is connected in such a manner that the collector voltage of the transistor Tr320 is clamped to the Zener voltage. Between the emitter of the transistor Tr32 O and the negative power supply V−, a array of level shift diodes d114 through d116 is connected in such a manner that the emitter voltage of the transistor Tr320 is clamped to the level shift voltage. The diode array d114 through d116 is connected, in parallel, to an emitter resistor R170. The configuration of the constant-current loop ILP1 is the same as that of the constant-current loop ILP shown in FIG. 15. Further, the guard diode d112 can be omitted when no erroneous input and no power short break occur.

When the input terminal of the first Miller integrator typed pulse-width enlarging circuit shown in FIG. 56 is connected to a current pulse source Pi, and power supply V+ is supplied while no signal is being input, the constant-current loop ILP1 enters an on-state, and a capacitor Cp71 is charged. That is, according to Miller effect on the transistor Tr320, the capacitor Cp71 is charged by a charge current $i_{on}/\beta$, where $i_{on}$ denotes the output current of the constant-current loop ILP1, and $\beta$ denotes the common-emitter current amplification factor of the transistor Tr320. During charging, current $i_{on}$ flows through the junction of the diode array d114 through d116 and the emitter resistor R170, and a 'High' level is outputted.

When the terminal electric potential of the capacitor Cp71 reaches the breakdown voltage of the Zener diode d113 during charging, said diode is activated, allowing current $i_{on}$ to flow through it (the diode d113), and the terminal voltage of the capacitor Cp71 is clamped to the breakdown voltage. When the breakdown voltage is higher than the power source voltage, breakdown does not occur. Accordingly, since leakage current flows through the Zener diode d113, the constant-current loop ILP1 barely stays in an on-state and in a short-circuit state, and no current $i_{on}$ flows. Current flowing through the joint between the diode array d114 through d116 and the emitter resistance R170 drops to zero, and thus a 'Low' level is output. In order to prevent current from flowing during standby, the Zener voltage is set to a value higher than the power source voltage.

When a current pulse-width of t1 is inputted, according to Miller effect of the transistor Tr320, almost all of the input current $i_p$ in the current pulse flows through the capacitor Cp71, and the capacitor is discharged by q $(=i_p^* t1)$. When this occurs, the collector voltage of the transistor Tr320 falls by $\Delta V$ (=q/c), and the voltage difference between the terminals of the constant-current loop ILP1 increases. Thus, the constant-current loop ILP is turned on again. Accordingly, the charging of the capacitor Cp71 restarts. When the constant-current loop ILP1 enters an on-state, current flows through the joint of the diode array d114 through d116 and the emitter resistor R170, and a 'High' level is output. The constant-current loop ILP1 outputs current $i_{on}$ until $\Delta V$ becomes 0. During this period t2, charge current $(i_{on}/\beta)$ flows through the capacitor Cp71. This period of time, t2, is $(q^* \beta/i_{on})$ which is equivalent to $(t1^* i_p^*\beta/i_{on})$.

Therefore, when $\beta$, $i_p$, and $i_{on}$ are determined according to the expression $((\beta^*i_p/i_{on})>1)$, the width of the output pulse is wider than that of the input pulse. That is, the width of the pulse is widened. When polarity inversion occurs during charging, and when the full-wave rectifier output V+ is zero (the middle point of the polarity inversion), the charging is short-broken. However, due to the backward-current-proof diode d110, the capacitor Cp71 is neither charged nor discharged, so time information is kept even after charging restarts. When $\Delta V$ is 0, the circuit returns to a standby state.

When the transistor Tr320 is replaced with a Darlington connection-oriented configuration, the amplification factor $\beta$ becomes $\beta^2$. Pulse-width can therefore be enlarged more effectively. When a next current pulse $i_p$ is inputted while the capacitor Cp71 is being charged, said capacitor will be discharged immediately. The discharged amount will reflect the length of charging time (the length of the output pulse) after the last pulse is inputted. Moreover, when the number of input pulses increases, and thus when the capacitor Cp71 is discharged to reach the state in which the transistor Tr320 operates in a saturation region, no further discharging occurs, thus restricting the maximum value of the output pulse width.

As described above, the pulse-width enlarging circuit in FIG. 56 has the following benefits.
(1) Voltage pulse is obtained in accordance with a current pulse whose pulse-width is enlarged;
(2) Even though a short power break occurs due to a polarity inversion, time information is kept; and
(3) During standby, dissipation power is almost zero (only leakage current).

[XIII] (2) Second Integrator Typed Pulse-width Enlarging Circuit

Figure 57:
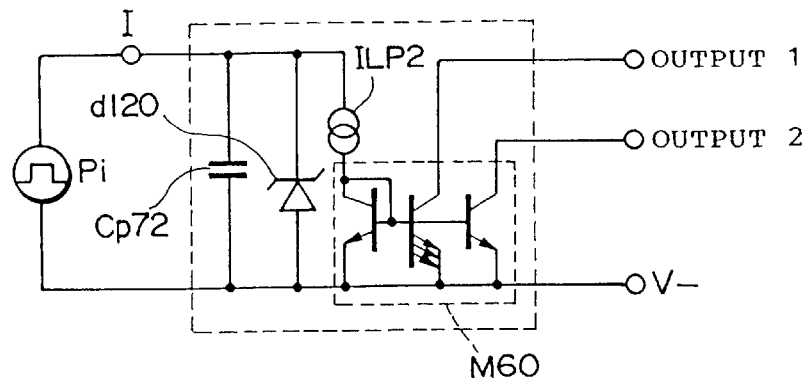
FIG. 57 illustrates a second integrator typed pulse enlarging circuit.

FIG. 57 illustrates the configuration of a second integrator typed pulse-width enlarging circuit.

In the second integrator typed pulse-width enlarging circuit, both a constant-current loop ILP2, which generates a reference current $i_{on}$ when voltage is applied, and the input terminal of a current mirror circuit M60, which converts the current $i_{on}$ generated by the constant-current loop ILP2 into an output current, are connected, in series, between an input terminal I and a ground terminal. Moreover, between the input terminal I and the ground terminal, a capacitor Cp72, which stores the part of the input current equal to an amount of excess electric charge, and a Zener diode d120, which prevents excess electric charge on the capacitor Cp72 from occurring, are both connected in parallel. The output terminal of the current mirror circuit M60 is an output terminal of the second integrator typed pulse-width enlarging circuit. The second integrator typed pulse-width enlarging circuit is configured as described above. When a photo coupler is connected either to the constant-current loop ILP2 in series, or between the output terminal of the current mirror circuit M60 and another power supply, output to a circuit with a different ground level can be made.

The input terminal I of the second integrator typed pulse-width enlarging circuit in FIG. 57 is connected to a current pulse source Pi. The current $i_p$ outputted by the current pulse source Pi, and the current ion, that flows through the constant-current loop ILP2, follow the relation $i_p>i_{on}$. When the input current pulse $i_p$, whose pulse-width is t3, is inputted, current $i_{on}$ flows through the constant-current loop ILP2, and, at the same time, an amount of current equal to the difference between $i_p$ and $i_{on}$ flows into the capacitor Cp72. Thus, capacitor Cp72 is charged, the amount of electric charge q being $((i_p-i_{on})^*t3)$. After the input current has dropped to zero, current continues to flow through the current loop ILP2 as a result of the discharging of the capacitor Cp72 by electric charge q for a period of time, t4, equal to $q/i_{on}$ $(=t3(i_p-i_{on})/i_{on})$. The length of the output signal is (t3+t4). When another current pulse $i_p$ is inputted before the capacitor Cp72 has been completely discharged, said capacitor Cp72 is recharged immediately. Thus, the charged amount reflect the length of discharging time (i.e. length of output pulse) after final pulse is inputted. Moreover, when the number of input pulses increases, and when the capacitor Cp72 is charged further up to the breakdown voltage of the Zener diode d120, the Zener diode d120 breaks down, thus preventing any further charging of the capacitor Cp72. Therefore, the maximum value of the output pulse-width is restricted, and at the same time, excess voltage is prevented from being stored in the capacitor Cp72.

As described above, the second integrator typed pulse-width enlarging circuit shown in FIG. 57 has following benefits.
(1) Current pulse, whose pulse-width is enlarged, is obtained;
(2) Another power source is not necessary (when the constant-current circuit ILP2 is connected to an output circuit in series); and
(3) Since the current amplification ratio is set to the current mirror circuit, a large amount of current can be outputted.

[XIII] (3) Description of Specific Example of the Signal Generation Circuit Shown in FIG. 55

Figure 58:
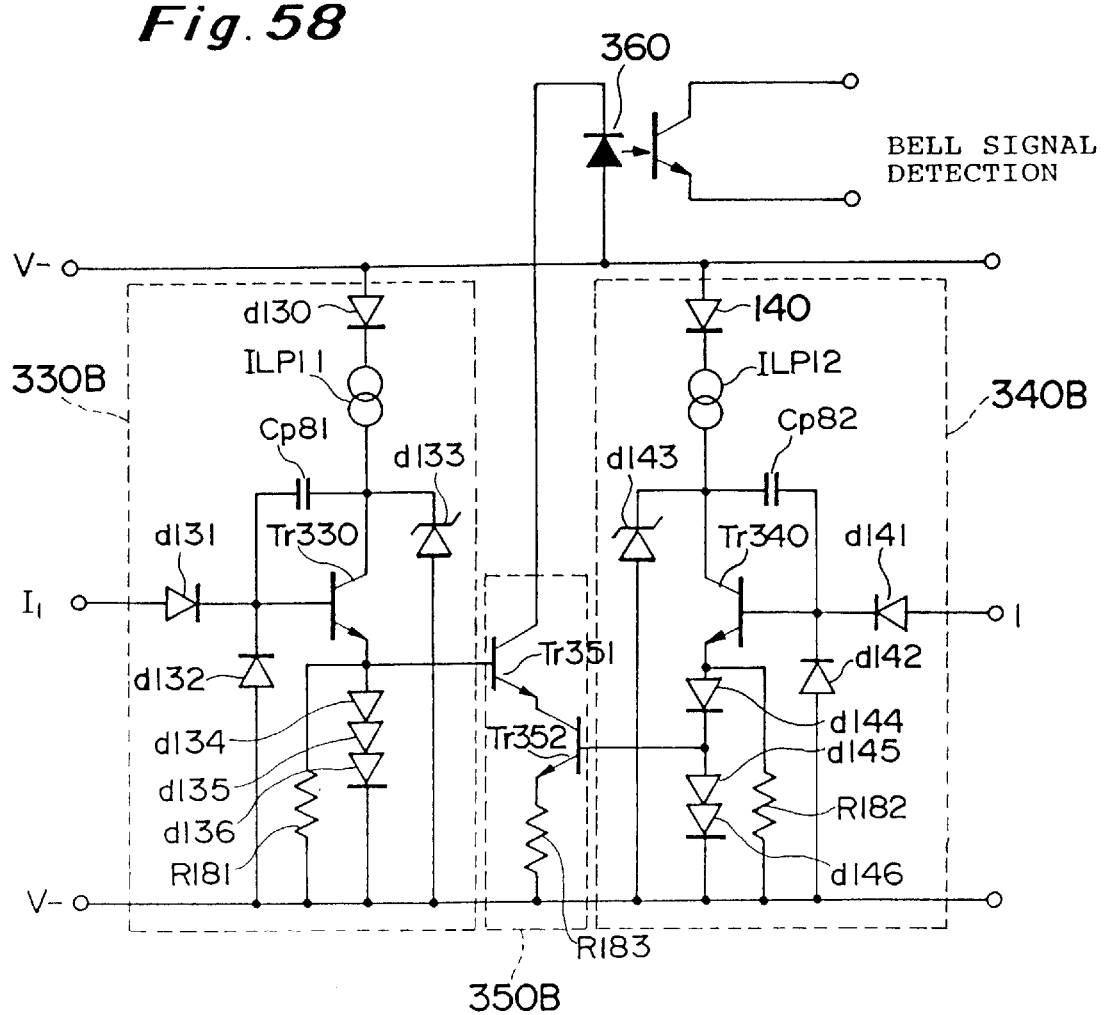
FIG. 58 shows a specific example of the signal generation circuit shown in FIG. 55.

FIG. 58 illustrates a specific example of the signal generation circuit shown in FIG. 55.

The signal generation circuit example uses an first Miller integrator typed circuit for the Miller integrator typed circuits 330B and 340B.

The Miller integrator typed circuit 330B, which is a first pulse-width enlarging circuit, has the same configuration as that of the circuit shown in FIG. 56. It has constant-current loop ILP11, through which constant current $i_{on}$ flows when voltage is applied, two backward-current-proof diodes d130 and d131, a guard diode d132, a Zener diode d133, a array of level shift diodes d134 through d136, a transistor Tr330, a resistor R181 and a capacitor Cp81.

The AND circuit 350B has transistors Tr351 and 352, and a resistor R183 which are all connected in series between a photo coupler 360 and a negative power supply V−.

During standby, due to the constant-current loops ILP11 and ILP12, the capacitors Cp81 and Cp82 are charged up to a state in which the voltage between the terminals of the capacitor Cp81 and the voltage between those of the capacitor Cp82 are both close to the voltage between the communication lines (i.e. the voltage between terminals of constant-current loop ILP11 and the voltage between terminals of constant-current loop ILP12 are almost zero, respectively), and thus no current flows through the pulse enlarging circuits 330B and 340B. When this happens, the voltage between the terminals of the resistor R181 and the voltage between the terminals of the resistor R182 both drop to zero. As a result, the AND circuit 350B receives inputs of logical level '0', and thus no current flows.

When a bell signal is received, and, accordingly, the pulse edge detection circuits 310 and 320 (FIG. 52) output current to the respective input terminals I1 and I2 of the pulse-width enlarging circuits 330B and 340B, the Miller effect of the transistors Tr330 and Tr340 ensures that almost all the current from I1 and I2 flow through capacitors Cp81 and Cp82, thus causing them to be discharged. Accordingly, the voltages between the terminals of the capacitor Cp81 and the voltage between those of the capacitor Cp82 drop. According to the amount of decrease in the voltages between the terminals of Cp81 and between those of Cp82, the voltages between the terminals of the constant current loop ILP11 and between those of the constant-current loop ILP12 rise, respectively. Thus, constant current $i_{on}$ can flow through the constant-current loops ILP1 and ILP2. The constant current $i_{on}$ continues to flow until the charge-state of the capacitors Cp81 and Cp82 returns to a standby-state. During charging, the capacitors Cp81 and Cp82 operate as capacitors, each of whose capacitance is β times as many as an ordinary capacitor would have, as a result of the Miller effect of the transistors Tr330 and Tr340. When current $i_{on}$ flows through the constant-current loops ILP11 and ILP12, emitter voltages of the transistors Tr330 and Tr340, which are both output circuits of the pulse-width enlarging circuits 330B and 340B, rise and the AND circuit 350B receives as input two logical '1's. Accordingly, the AND circuit 350B is turned on, and the photo coupler 360 is activated, resulting in a bell detection signal being transferred to the controlling circuit. As long as constant current $i_{on}$ flows, the bell detection signal will continue to be outputted.

In a single polarity inversion that stands for either the starting or the releasing of communication, constant current $i_{on}$ flows either through the constant-current loop ILP11 or the constant-current loop ILP12. Thus, the AND circuit 350B cannot be turned on. The Zener diodes d133 and d143 operate to prevent excess charging when an abnormally high voltage is applied. In order to suppress power dissipation during standby, the Zener voltage needs to be set to a value slightly higher than the voltage between the communication lines during standby.

[XIV] Example Using Monostable Multivibrator for the Pulse-width Enlarging Circuits 330 and 340

Figure 59:
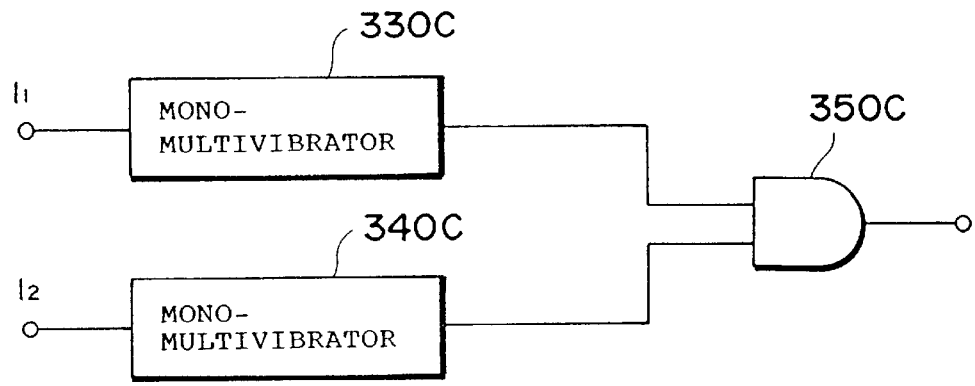
FIG. 59 shows a configuration (part 3) of the signal generation circuit shown in FIG. 52, in which the pulse width enlarging circuit is made up of a monostable multivibrator.

FIG. 59 illustrates a configuration (part 3) of the signal generation circuit shown in FIG. 52 in which a monostable multivibrator is used for each of the pulse-width enlarging circuits.

In this signal generation circuit, the output terminals of the pulse-width enlarging circuits 330C and 340C are connected to the two input terminals of the AND circuit 350C. The monostable multivibrator used for each of the pulse-width enlarging circuits 330C and 340C is the same as any one of the monostable multivibrators shown in FIG. 38(a) through FIG. 40.

The operation of a signal generation circuit that uses a monostable multivibrator is almost the same as that of a signal generation circuit that uses a Miller integrator typed circuit. When a Miller integrator circuit is used, the width of a bell detection signal pulse after a bell signal ends is unstable. When a monostable multivibrator is used, however, the width is fixed and is determined by the width of the pulse the monostable multivibrator outputs.

When a monostable multivibrator is used for bell signal detection, even for the period of time when no power is dissipated during a polarity inversion, power supply to the monostable multivibrator must continue. Therefore, a power source capacitor or a control power source circuit or the like has to be added as a power source. Moreover, when a retriggerable monostable multivibrator is used so that the pulse width of the monostable multivibrator can be more than one cycle of a bell signal, a continuous pulse can be obtained when a bell signal is received. One of the circuits shown in FIG. 45 through FIG. 48, which are described in the fourth embodiment, is used for the control power source circuit.

When the monostable multivibrator is used for the pulse-width enlarging circuits 330C and 340C, the AND circuit 350C has to be configured according to the current output by the multivibrator.

Figure 60A:
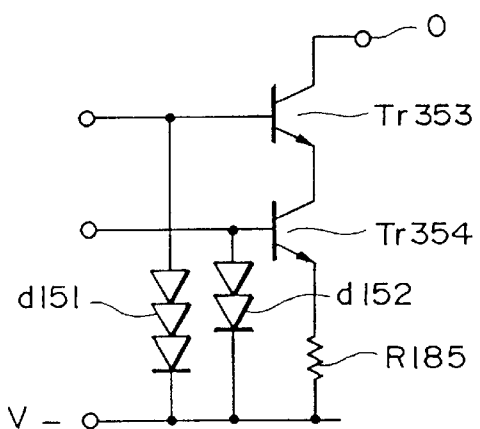
FIG. 60 illustrates a configuration of a AND circuit 350C shown in FIG. 59.

FIG. 60(a) and (b) illustrate example configurations of the AND circuit 350C shown in FIG. 59.

The AND circuit 350C shown in FIG. 60 has an NPN transistor Tr353 whose collector is connected to the output terminal O, and another NPN transistor Tr354 whose collector is connected to the emitter of the NPN transistor Tr353. The emitter of the transistor Tr354 is connected to a negative power supply V– via a resistor R185. The base of the transistor Tr353 receives an input current pulse from the pulse-width enlarging circuit 330C made of a monostable multivibrator this input current is voltage-clamped by a array of diodes d151. The base of the transistor Tr354 receives a current pulse from the pulse-width enlarging circuit 340C made of a monostable multivibrator again, this current pulse is voltage-clamped by a array of diodes d152.

Figure 60B:
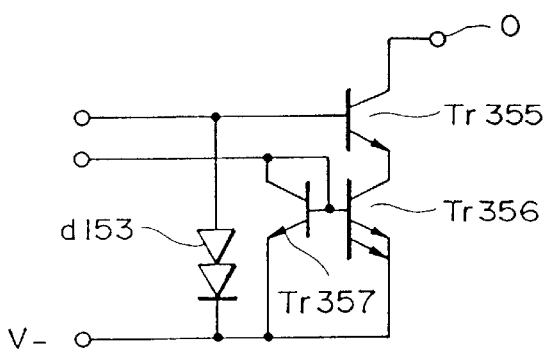

The AND circuit 350C shown in FIG. 60(b) has an NPN transistor Tr355 whose collector is connected to the output terminal O, an NPN transistor Tr356 whose collector is connected to the emitter of the transistor Tr355, and an NPN transistor Tr357 whose base and collector are both connected to the base of the transistor Tr356. The emitter of the transistor Tr357 is connected to a negative power supply V–. The emitter of the transistor Tr356 is also connected to the negative power supply V–.

The base of the transistor Tr355 receives a current pulse from the pulse-width enlarging circuit 330C, that is voltage-clamped by a array of diodes d153. The transistors Tr356 and Tr357 make up a current mirror circuit, to which a current pulse outputted from the pulse-width enlarging circuit 340C is inputted.

The signal generation circuit 370 shown in FIG. 55 can be created using an AND circuit and a second integrator typed pulse-width enlarging circuit which outputs current as shown in FIG. 57. In this case, the AND circuit is configured such that the PN polarity of each region of transistors and diodes and the power source polarity in FIG. 60(a) and (b) are reversed.

[XV] Operation of Bell Signal Detection Circuit Shown in FIG. 52

The operation of the bell signal detection circuit, in which the signal generation circuit 370 is made up of integration circuits, Miller integrator typed circuits or monostable multivibrators as described in sections [XI] through [XIII] will now be described.

The full-wave rectifier 300 rectifies the voltage between the communication lines L1 and L2 to generate a positive power supply V+ and a negative power supply V− for the pulse-width enlarging circuits 330 and 340 and the AND circuit 350. The edge detection circuit 310 outputs an edge detection trigger current for a short period of time when a polarity inversion where the electric potential on the communication line L1 changes from 'Low' level to 'High' level occurs. The edge detection trigger current in pulse-shape form flows through the pulse-width enlarging circuit 330 and its pulse-width is enlarged, for example, so that it is larger than one cycle of a bell signal (at the middle of a bell signal reception, after and before small pulses make a connection). In the same manner, the second pulse edge detection circuit 320 outputs a second edge detection trigger current when a polarity inversion occurs, in which an electric potential on the communication line L2 changes from 'Low' level to 'High' level. The trigger current flows through the pulse-width enlarging circuit 340 and is enlarged to a width greater than one cycle of pulse width of a bell signal.

When a bell signal is received, trigger current detection pulses phase-shifted by half a cycle of a bell signal cycle, are outputted from each of the edge detection circuits 310 and 320. Both trigger current detection pulses are then enlarged by the pulse-width enlarging circuits 330 and 340 to more than one cycle of pulse width. The AND circuit experiences AND-operation on these longer pulses outputted from the respective pulse-width enlarging circuits 330 and 340, and outputs a row of pulses, which may have short-breaks when no power dissipation occurs. In the portion of short-break in the row of pulses, the AND circuit 350 does not operate in accordance with the output from the rectifier 300. The portion of the short-break in the row of pulses is short period of time in short impulse. The row of pulses outputted from the AND circuit 350 is actually a detection signal, which is transferred to the controlling circuit via the photo coupler 360.

In a single polarity inversion standing for either the start or the releasing of communication, either a polarity inversion detection trigger pulse or its enlarged longer pulse, is outputted. Thus, the AND circuit 350 does not output anything. That is, when normal polarity inversion occurs, no malfunction signal is outputted.

[XVI] Results of the Bell Signal Detection Circuit Shown in FIG. 52

The bell signal detection circuit as described above has the following benefits.

(7-1) A bell signal detection circuit, which does not output any malfunction signal when a polarity inversion other than a bell signal occurs, can be attained;

(7-2) A row of wider pulses is outputted as a bell detection signal in stead of the conventional row of the short pulses;

(7-3) Because a bell detection signal is a row of wider short pulses, the effective electric power for detection increases.

<<Eighth Embodiment>>

Figure 61:
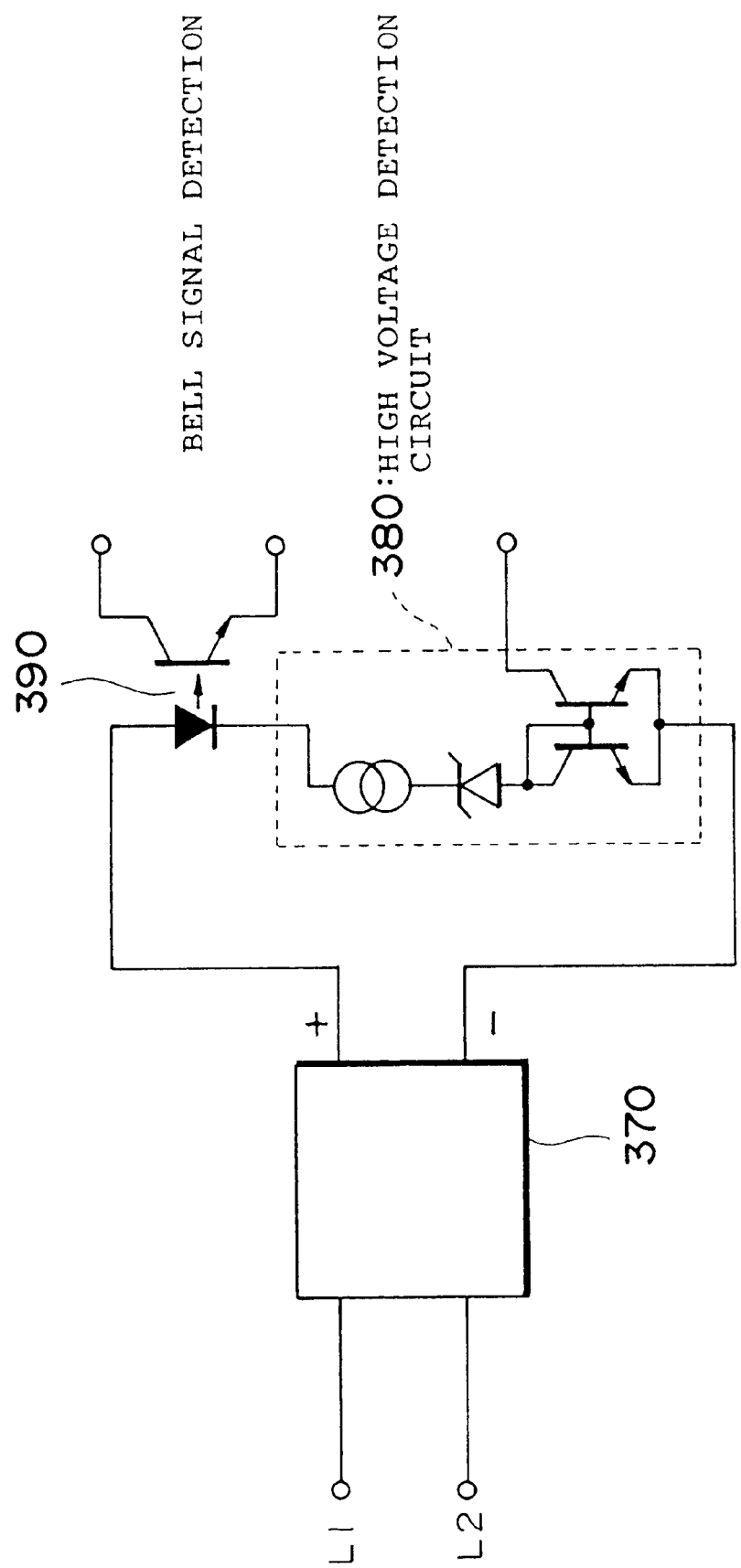
FIG. 61 illustrates a bell signal detection circuit of a eighth embodiment according to the present invention.

FIG. 61 shows a bell signal detection circuit of the eight embodiment according to the present invention.

The bell signal detection circuit has a full-wave rectifier 370, a high voltage detection circuit 380 and a photo coupler 390. The full-wave rectifier 370 full-wave rectifies voltage between the communication lines L1 and L2 and provides a positive power supply V+ and a negative power supply V− to subsequent circuits. The high voltage detection circuit 380 allows a constant current to flow through when it detects a voltage larger than a predetermined value. The photo coupler 390 provides a bell signal sending means for sending a bell detection signal to the controlling circuit with a different ground level.

The high voltage detection circuit 380 and the photo coupler 390 are connected to each other in series between the positive and the negative power supplies V+ and V−, supplied by the full-wave rectifier 370.

Figures 62A, 62B, 62C:
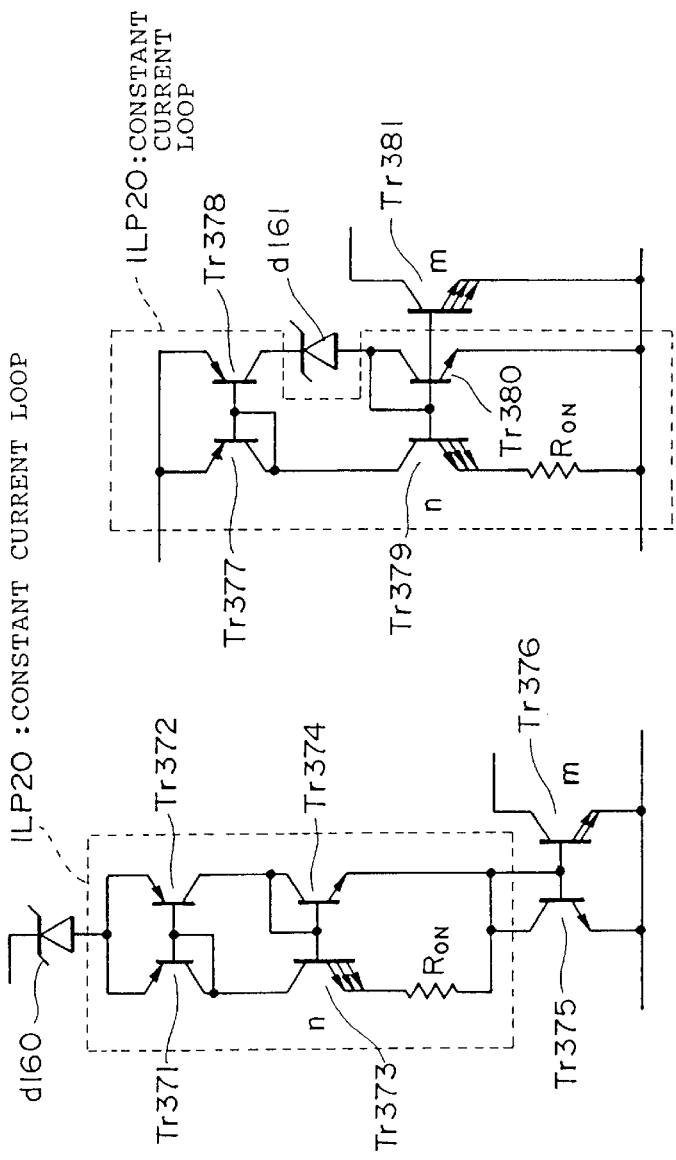
FIG. 62 illustrates a high-voltage detection circuit shown in FIG. 61.

FIGS. 62(a) through (c) details the high voltage detection circuit shown in FIG. 61. FIG. 62(a) is a block diagram. FIGS. 62(b) and (c) show specific examples of said detection circuits.

As shown in FIG. 62(a), the high voltage detection circuit 380 has a constant-current loop ILP20, a constant-voltage device 381 and a current mirror circuit M70. A constant current flows through the constant-current loop ILP20 when more than a predetermined voltage is applied. The constant-voltage device 381, which is connected to the constant-current loop ILP20 in series or connected inside the constant-current loop ILP20, provides a voltage on which current starts flowing to the constant-current loop ILP20. The current mirror circuit M70, which is connected to the constant-current loop ILP20, converts current flowing through the constant-current loop ILP20 into an output current. The current-mirror circuit M70 can be omitted when connections to the controlling circuit make it unnecessary.

Figure 15B:
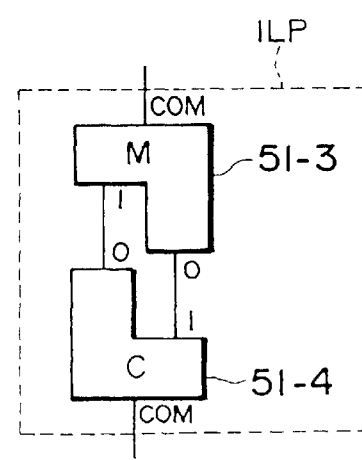

The constant-current loop ILP20, the configuration of which is the same as that of the circuit shown in FIG. 15(b), has a non-linear current amplifier and a linear current mirror circuit. The non-linear current amplifier has a current flowing-in input terminal I, a current flowing-in output terminal O and a common terminal COM to which flows the combined amount of current flowing through the terminals I and O. Said amplifier has the maximum current gain in vicinity of zero of inputting current and has the property that current gain decreases monotonously to zero as input current increases. The linear current mirror circuit has a current flowing-out input terminal I, a current flowing-out terminal O and a common terminal COM, to which the combined amount of current flowing through the terminals I and O flows. The input terminal I of the non-linear current amplifier is connected to the output terminal O of the linear current mirror circuit, and the output terminal O of the non-linear current amplifier is connected to the input terminal I of the linear current mirror circuit. Thereby, loop current amplification is attained. The path between the common terminal COM of the linear current mirror circuit and the common terminal COM of the non-linear current amplifier is for constant current to flow. By connecting the high voltage detection circuit as described above to the rectifier 370 and the photo coupler 390, respectively, a bell signal detection circuit is created.

In the circuit shown in FIG. 62(b), the constant-current loop ILP20 is made up of two PNP transistors Tr371 and Tr372, two NPN transistors Tr373 and Tr374 and a resistor Ron. The constant-voltage device 381 in FIG. 62(a) is made up of a single Zener diode d160 in FIG. 62 (b). The current mirror circuit M70 is made up of two NPN transistors Tr375 and Tr376. In the circuit shown in FIG. 62(c), the constant-current loop ILP20 is made up of two PNP transistors Tr377 and Tr378, two NPN transistors Tr379 and Tr380 and a resistor Ron. The constant-voltage device 381 is made up of a Zener diode d161 that is embedded in the constant-current loop ILP20. The current mirror circuit M70 is made up of a single NPN transistor Tr381, which cooperates with Tr380.

In the circuits shown in FIG. 62(b) and (c), the constant-current loop ILP20 cannot be turned on until the Zener diodes d160 and d161 break down. By determining the breakdown voltages of the Zener diodes d160 and d161, a detection voltage can be set. Constant current is outputted to the controlling circuit via the current mirror circuit M20 when said circuit is activated.

Therefore, the high voltage detection circuit shown in FIG. 62 (a) through (c), which is configured such that the number of parts is small and capacitor is used, is able to detect when an applied voltage is more than a predetermined voltage in order to allow a constant current to flow.

Next, the operation of the bell signal detection circuit shown in FIG. 61 will be described.

Usually, the exchange supplies a DC voltage of 48 V to a terminal apparatus connected to communication lines via a communication line resistance (less than 2 k Ω). The communication line resistance during standby is more than 10 M Ω. Thus, the voltage between the communication lines is almost, but less than, 48V.

When a bell signal is inputted, an AC voltage of 75 Vrms is added to a DC voltage of 48V. Thus, the maximum value of the voltage amplitude provided from the exchange is 48±75 √2V. When the bell signal is full-wave-rectified, it is transformed into a pulsation current in which peak values of 58V and 154V appear alternatively. Even if a polarity inversion detection circuit or the like operates on a terminal and thus a 1 mA current flows, due to the voltage drop through the communication lines being less than 2V, the bell signal reception peak voltage at the terminal exceeds 48 V. The voltage Von, on which current starts flowing through the high-voltage detection circuit 380, is set to a value that is larger than the voltage from the exchange during standby but less than the low side peak voltage of the rectified bell signal (pulsation current), in which the voltage drop through the communication lines is taken into account. Equation 13 expresses these relationships compactly. A bell signal flows only when it exceeds the voltage set above.

(48+(noise level between communication lines))<Von<(5-2) (V)(13)

Said signal flows through the photo coupler 390, which outputs a bell detection signal to the controlling circuit. Since the amount of current that flows is constant, even though the peak voltages are not balanced in terms of the direction of polarity inversions, the amount of current is the same (however, a difference exists in terms of the angle of the current).

When the voltage Von of the high-voltage detection circuit 380 falls and approaches 48 V, the angle of the current flowing as a bell detection signal becomes wider (i.e. the current short break during polarity inversion becomes shorter), but the possibility of malfunction due to noise becomes higher. Conversely, when the voltage Von is set to a high level, the provability of noise is reduced, but the angle of current flow of the bell detection signal becomes narrower (i.e. current short break time during polarity inversion becomes longer). When the voltage Von is set to the range from 58V to 154V, the high-voltage detection circuit 380 can work well as a bell signal detection circuit. However, current flows only during a part of the higher half-cycle region, specifically, around the peak voltage of the pulsation current (i.e. half-wave current). Thus, the selection of the appropriate voltage has to take these into consideration.

Figure 63:
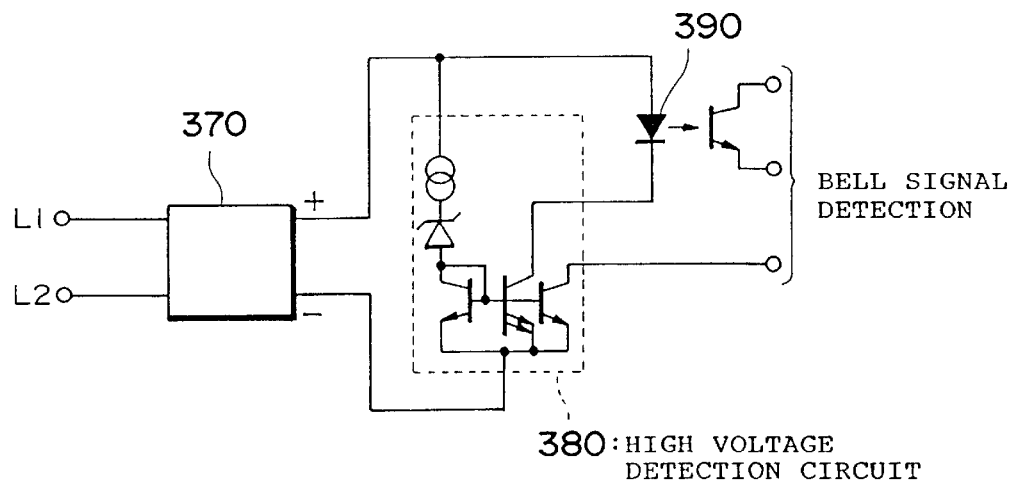
FIG. 63 shows a modification example of the circuit shown in FIG. 61.

FIG. 63 illustrates a modification of the circuit shown in FIG. 61.

The modified example circuit is configured such that the photo coupler 390 is driven by the current mirror circuit in the high-voltage detection circuit. The high-voltage detection circuit 380 operates in the same manner as described previously.

As described above, the bell signal detection circuit of the eighth embodiment has the following benefits.

(8-1) A bell signal detection circuit can be realized that does not output a malfunction signal when a polarity inversion other than a bell signal occurs;

(8-2) Conventional bell detection signal, which is a row of short pulses, can be widened (to a row of wider short pulses);

(8-3) A bell signal detection circuit can be realized, which is made up of a small number of parts without any capacitor.

<<Ninth Embodiment>>

Figure 64:
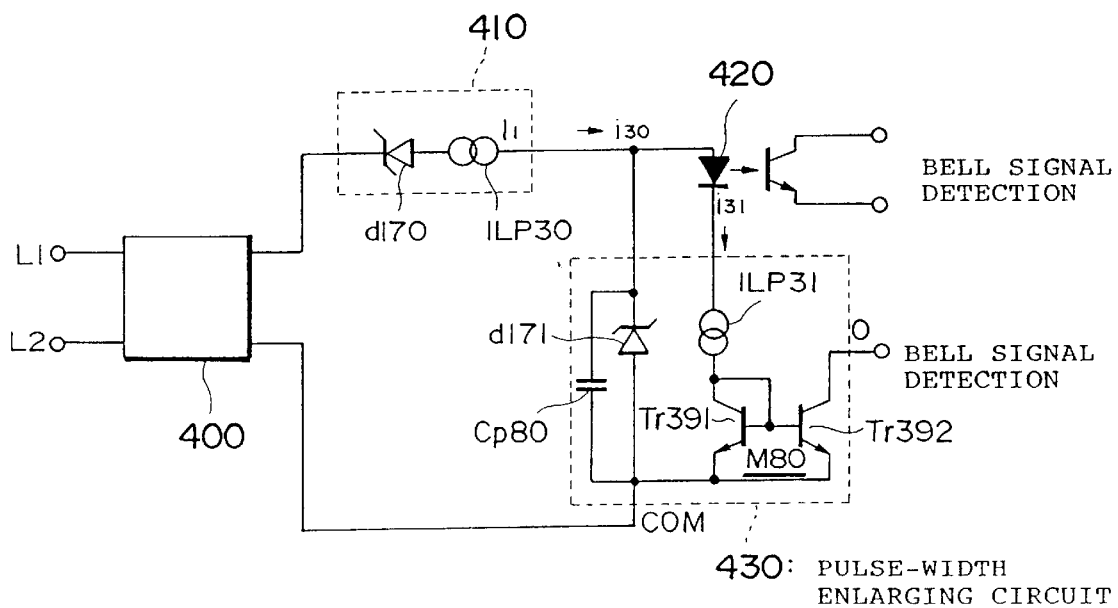
FIG. 64 illustrates a bell signal detection circuit of a ninth embodiment according to the present invention.

FIG. 64 illustrates a bell signal detection circuit of the ninth embodiment according to the present invention.

This bell signal detection circuit has a full-wave rectifier 400, a high-voltage detection circuit 410, a photo coupler 420 and a pulse-width enlarging circuit 430. The full-wave rectifier 400 full-wave rectifies the voltage between the communication lines L1 and L2 from the exchange, and supplies power to circuits located after the full-wave rectifier 400. The high-voltage detection circuit 410 detects an applied voltage larger than a predetermined voltage, and causes constant current to flow. The photo coupler 420, which is a bell signal sending means, outputs bell signal detection information to the controlling circuit with a different ground level. The pulse-width enlarging circuit 430 enlarges the width of current flowing through the photo coupler 420.

The high-voltage detection circuit 410 has a Zener diode d170 as constant-voltage device and a constant-current loop ILP30, which has the same configuration as the constant-current loop ILP20 of the eighth embodiment, in connected series. In another way, the high-voltage detection circuit 410 is configured such that the constant-voltage device is internally connected to the constant-current loop ILP30. The pulse-width enlarging circuit 430 has a constant-current loop ILP31, a current mirror circuit M80, a capacitor Cp80 and a Zener diode d171. The constant-current loop ILP31, which is connected to the photo coupler 420, provides current to the photo coupler 420. Using two NPN transistors Tr391 and Tr392, the current mirror circuit M80 sends a bell detection signal to subsequent circuits (i.e. circuits connected after the current mirror circuit M80), having the same ground level as the current mirror circuit M80. The capacitor Cp80 stores an electric charge in order to keep current flowing through the photo coupler 420. The Zener diode d171 prevents the accumulation of excess electric charge in the capacitor Cp80. The current mirror circuit M80 can be omitted when not needed by subsequent circuits.

The bell signal detection circuit shown in FIG. 64 is configured such that the pulse-width enlarging circuit 430 is added to the bell signal detection circuit of the eighth embodiment. The principle of bell signal detection is the same as that of eighth embodiment, and thus description of the whole operation is omitted except for a description of the added pulse-width enlarging circuit 430 will be made.

Given that $i_{30}$ denotes the amount of current flowing through the constant-current loop ILP30 in the high-voltage detection circuit 410, and that $i_{31}$ denotes an amount of current flowing through the constant-current loop ILP31 in the high-voltage detection circuit 430, the values $i_{30}$ and $i_{31}$ are set according to the relation $i_{30}>i_{31}$. When a bell signal is rectified, and thus when current $i_{30}$ in a high-voltage region of the voltage outputted from the rectifier 460 flows, current 131 flows through the photo coupler 420 according to the constant-current loop ILP31 in the pulse-width enlarging circuit 430. Accordingly, the remaining current (i.e., $i_{30}-i_{31}$) charges Cp80. After that, when current $i_{30}$ ceases to flow because the short impulse voltage from the rectifier 400 enters a low-voltage region, with the electric charge in the capacitor Cp80 as a energy power source, the constant-current loop ILP31 causes constant current $i_{31}$ to flow through the photo coupler 420 continuously.

The constant current $i_{31}$ keeps on flowing till no electric charge for discharging exists.

Let T denote the period of a bell signal, and T1 and T2 denote the charging and discharging, respectively. Further, let Q1 and Q2 be:

$$Q1=(i_{30}-i_{31})*T1$$

$$Q2=i_{31}*T2$$

where $T \geq (T1+T2)$

Here, when Q1 and Q2 are set so that the relation (Q1>Q2) is satisfied, the remaining amount available for discharge (Q1−Q2) is stored in every cycle of a bell signal, and thus T becomes T1+T2. Thus, a bell detection signal can be outputted continuously, allowing the current mirror circuit M80 to output current continuously to subsequent (i.e. circuits connected after the current mirror circuit M80). The voltage between the terminals of the capacitor Cp80 rises according to the remaining charge available for discharge, and when it reaches up to the Zener voltage of the Zener diode 171, it is clamped onto said Zener diode's breakdown voltage.

Figure 65:
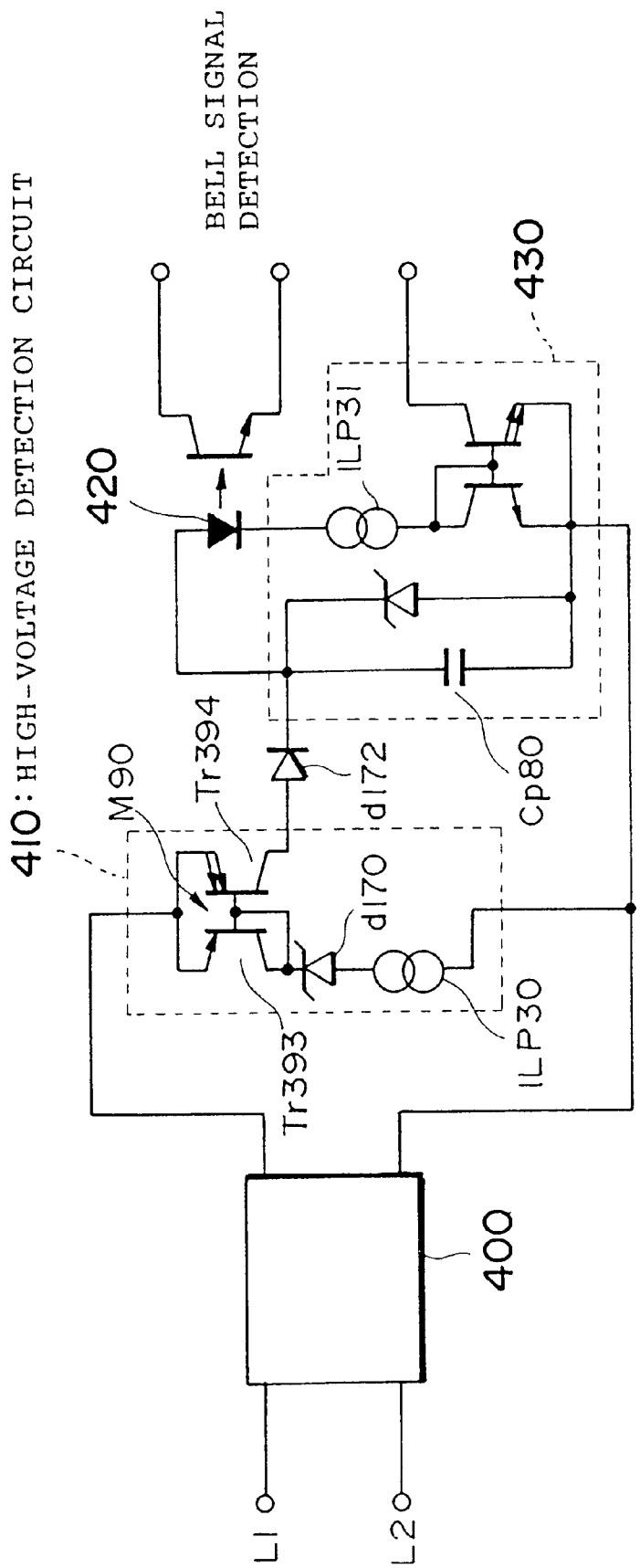
FIG. 65 illustrates a bell signal detection circuit which shows a modification example of the circuit shown in FIG. 64.

FIG. 65 illustrates a modification of the bell signal detection circuit shown in FIG. 64.

The bell signal detection circuit is configured such that a current mirror circuit M90 including PNP transistors Tr393 and Tr394 is added to the high-voltage detection circuit 410. The output terminals of the current mirror circuit M90, which is connected to the output terminals of the full-wave rectifier 400 in parallel, is connected to the input terminals of the pulse-width enlarging circuit 430 via a backward-current-proof diode d172. The bell signal detection circuit shown in FIG. 65 operates in the same manner as the circuit shown in FIG. 64.

As described above, the bell signal detection circuit of the embodiment has the following benefits.

(9-1) When a polarity inversion other than a bell signal occurs, a bell signal detection circuit can be realized that does not output any malfunction signal;

(9-2) When the output voltage of the full-wave rectifier 400 during a polarity inversion is zero, a completely continuous long pulse of bell detection signal without short breaks can be outputted.

<<Tenth Embodiment>

Figure 66:
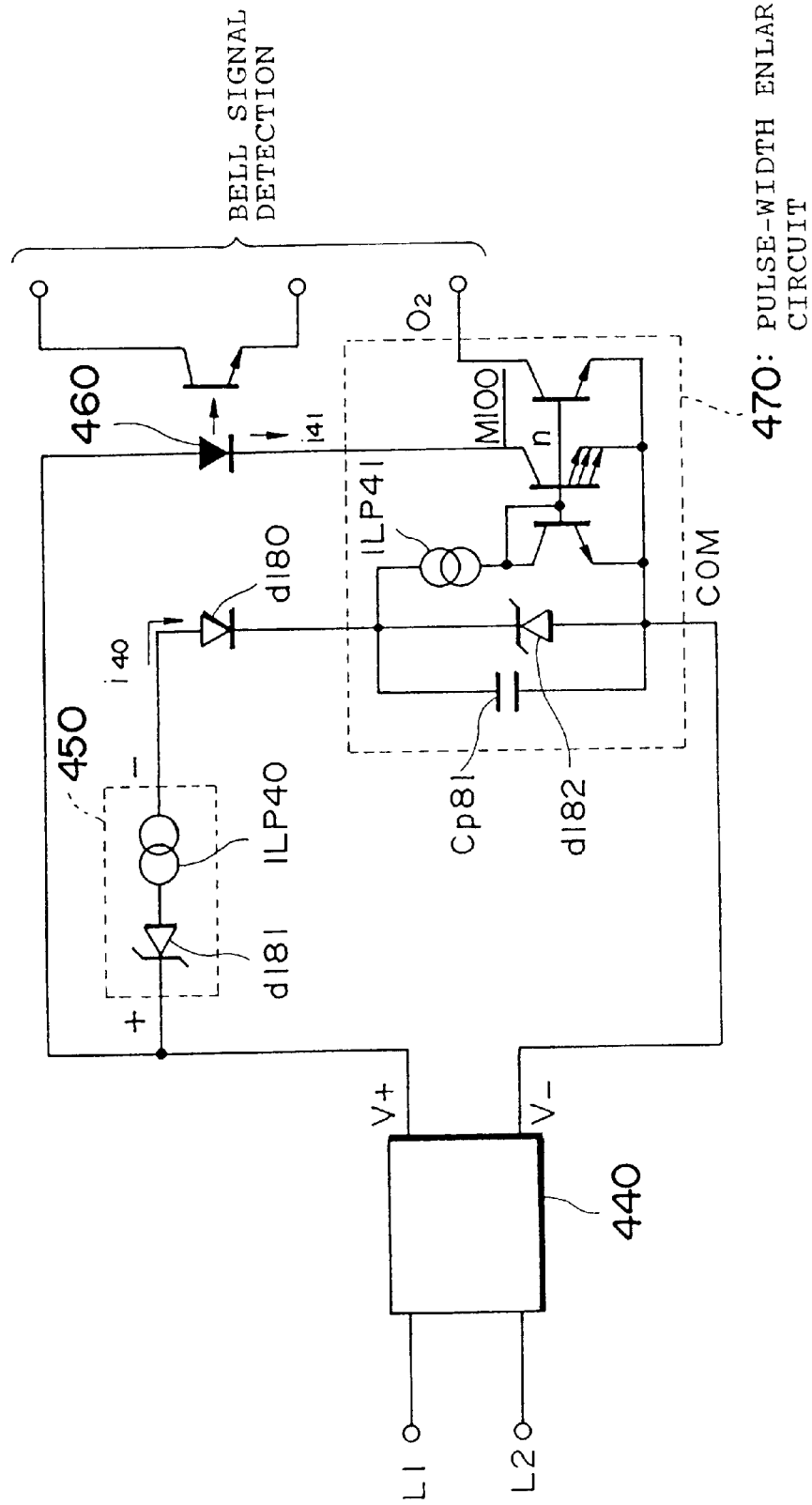
FIG. 66 illustrates a bell signal detection circuit of a tenth embodiment according to the preset invention.

FIG. 66 illustrates a bell signal detection circuit of the tenth embodiment according to the present invention.

The bell signal detection circuit has a full-wave rectifier 440, a high voltage detection circuit 450, a photo coupler 460, a pulse-width enlarging circuit 470 and a backward-current-proof diode d180. The full-wave rectifier 440 full-wave-rectifies the voltage between the communication lines L1 and L2 from the exchange, and then supplies power to the circuits connected to it. The high-voltage detection circuit 450 detects an applied voltage that is larger than a predetermined voltage, allowing constant current to flow when this occurs. The photo coupler 460, which is used as a bell signal sending means, whose power source terminal is connected to the positive power supply V+ outputted by the full-wave rectifier 440, outputs a bell detection signal to the controlling circuit with a different ground level. The pulse-width enlarging circuit 470 enlarges the pulse width of the pulse current flowing through the photo coupler 460. The backward-current-proof diode d180 is connected between the high voltage detection circuit 450 and the pulse-width enlarging circuit 470.

The high-voltage detection circuit 450 has a Zener diode d181, which is the same as that of the high-voltage detection circuit 410 of the ninth embodiment, and a constant-current loop ILP40. The pulse-width enlarging circuit 470 has a constant-current loop ILP41, a current mirror circuit M100, a capacitor Cp81 and a Zener diode d182. The constant-current loop ILP41 determines a current standard for current flowing through the photo coupler 460. The current mirror circuit M100, which is connected to the constant-current loop ILP41 in series, causes an amount of current a predetermined number times (n times) the current standard to flow through the photo coupler 460, and outputs a bell detection signal to circuits connected after the current mirror circuit M100, wherein the circuits has the same ground level as the current mirror circuit M100. The capacitor Cp81 stores electric charge that will allow a bell detection signal to be outputted for a fixed period of time. The Zener diode d182 prevents the capacitor Cp81 from being overcharged. The output transistor for the circuits connected after the current mirror circuit M100 can be omitted when it is unnecessary to transmit the bell detection signal to these circuits.

Next, the operation of the bell signal detection circuit shown in FIG. 66 will be described.

The bell signal detection circuit of the tenth embodiment uses an improved version of the pulse-width enlarging circuit of the ninth embodiment. The basic operation of the bell signal detection circuit and of its pulse-width enlarging circuit, by means of which current flows through the photo coupler 460 even when no current flows through the high-voltage detection circuit 450, is the same as that of the bell signal detection circuit of the ninth embodiment in terms of operation principle, and so its description is omitted. Here, the operation of the improved pulse-width enlarging circuit will be described.

The capacitor Cp80 of bell signal detection circuit of the ninth embodiment must have a large capacity since the change stored in it will be used to provide current $i_{31}$ to the photo coupler 420 when no current flows through the high-voltage detection circuit 410. When voltage mixed with a bell signal is rectified together with a power supply from the exchange, pulsation current is generated, in which a very large voltage of 154V and a relatively smaller (but still large) voltage of 58V appear alternately. Accordingly, long term current flows through the high-voltage detection circuit 410 during the phase when very large voltages are inputted conversely, short term current flows through it during the phase when large voltages are inputted. Thus, observed from the power supplier, unbalanced current occurs.

In the pulse-width enlarging circuit 470 of the bell signal detection circuit of the tenth embodiment, current $i_{40}$ flowing through the constant-current loop ILP40, current $i_{41}$ flowing through the constant-current loop ILP41, and the capacity of the capacitor Cp81 are each less than their respective counterpart in the bell signal detection circuit of the ninth embodiment. The current flowing through the photo coupler 460 from the bell signal detection circuit is amplified by the current mirror circuit M100. The amplified current, whose amount is constant regardless of peak values of the rectified pulsation current (even when voltage larger than the forward voltage of the diode is applied, the same amount of current flows), flows outside of the pulse-width enlarging mechanism. Therefore, observed from the power supplier, current balance is improved.

Further, even though short current breaks occur in the photo coupler 460 when no electric power is supplied during a polarity inversion, the length of such breaks is very short.

The backward-current-proof diode d180 prevents the electric charge in the capacitor Cp81 from discharging and from flowing backward through the high-voltage detection circuit 450 when the current $i_{40}$ flowing through the high-voltage detection circuit 450 is zero. If the high-voltage detection circuit 450 has enough capability to prevent backward-flowing, the diode d180 can be omitted.

Figure 67:
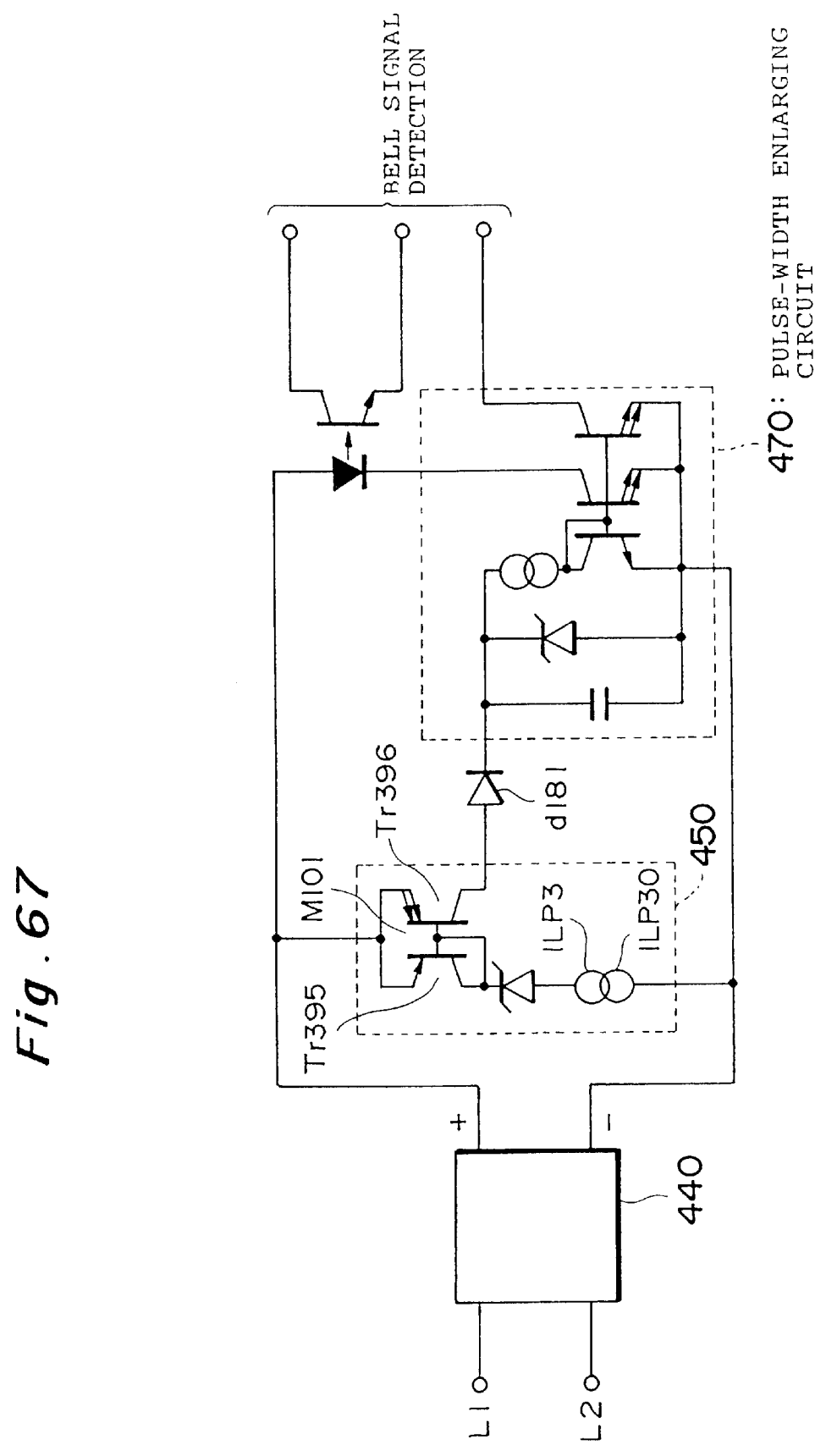

FIG. 67 illustrates a modification of the bell signal detection circuit shown in FIG. 66.

In the modified bell signal detection circuit, a current mirror circuit M101 made up of the PNP transistors Tr395 and Tr396 is added to the high-voltage detection circuit 450 which is connected to the output side of the full-wave rectifier 440. The output terminal of the current mirror circuit M101 is connected to the input terminal of the pulse-width enlarging circuit 470 via a backward-current-proof diode d181. The modified bell signal detection circuit shown in FIG. 67 operates in the same manner as the circuit shown in FIG. 66.

The modified bell signal detection circuit of the tenth embodiment has the following benefits.

(10-1) a bell signal detection circuit is realized, which does not output a malfunction signal when a polarity inversion other than a bell signal occurs;

(10-2) A conventional bell detection signal which is a row of short pulses can be transformed to a row of wider short pulses (except that short break occurs only when the full-wave rectifier outputs zero level during a polarity inversion);

(10-3) The capacitor Cp81 can be of smaller capacity than the capacitor Cp80;

(10-4) Observed from the power supplier, supplied current is well-balanced.

<<Eleventh Embodiment>>

Figure 68:
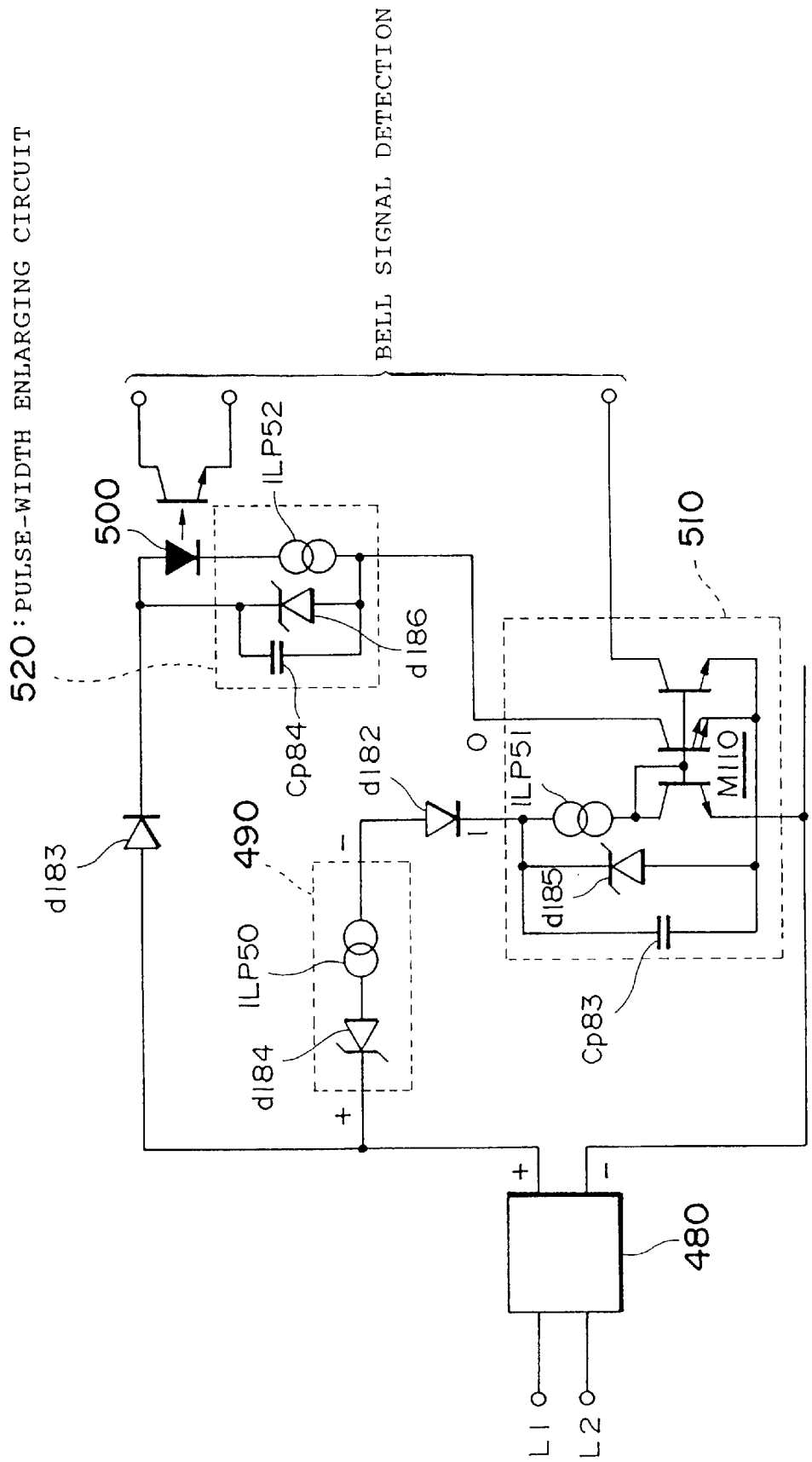
FIG. 68 illustrates a bell signal detection circuit of a eleventh embodiment according to the present invention.

FIG. 68 illustrates a bell signal detection circuit of the eleventh embodiment according to the present invention.

The bell signal detection circuit has a full-wave rectifier 480, a high-voltage detection circuit 490, a photo coupler 500, two pulse-width enlarging circuits 510 and 500, and two backward-current-proof diodes d182 and d183. The full-wave rectifier 480 full-wave-rectifies voltage between the communication lines L1 and L2 from the exchange. The high-voltage detection circuit 490 detects an applied voltage larger than a predetermined voltage, and causes constant current to flow as a result. The photo coupler 500 transmits a bell detection signal to the controlling circuit having a different ground level. The first pulse-width enlarging circuit 510 enlarges the width of the current output by the high-voltage detection circuit 490. The backward-current-proof diode d182, which is connected between the high-voltage detection circuit 490 and the pulse-width enlarging circuit 510, prevents current from flowing back through the pulse-width enlarging circuit 510. The second pulse-width enlarging circuit 520 outputs current continuously to the photo coupler 500 when the full-wave rectifier 480 outputs zero voltage during the polarity inversion that occurs while a bell signal is being inputted. The backward-current-proof diode d183, which is connected between the positive power supply terminal of the rectifier 480 and the pulse-width enlarging circuit 520, prevents backward-current from flowing through the pulse-width enlarging circuit 520.

The high-voltage detection circuit 490 has a Zener diode, which is the same as that of the high-voltage detection circuit 410 of the ninth embodiment, and a constant-current loop ILP50.

The pulse-width enlarging circuit 510 has a constant-current loop ILP51, a current mirror circuit M110, a capacitor Cp83 and a Zener diode d185. The constant-current loop ILP51 determines a current standard for current flowing through the pulse-width enlarging circuit 520. The current mirror circuit M110, which is connected to the constant-current loop ILP51 in series, causes an amount of current (equal to n times the amount of the current standard, where n is a predetermined number) to flow through the pulse-width enlarging circuit 520, and transmits a bell detection signal to subsequent circuits, said circuits having the same ground level as the current mirror circuit M10. The capacitor Cp83 stores electric charge that allows a bell detection signal (current) to continue to output when no current comes from the high-voltage detection circuit 490 during a bell signal detection. The Zener diode d185 prevents excess current from charging the capacitor Cp83.

The pulse-width enlarging circuit 620 has a constant-current loop ILP52, a capacitor Cp84 and a Zener diode d186. The constant-current loop ILP52 determines a current standard for current flowing through the photo coupler 500. The capacitor Cp84 stores electric charge to keep current flowing into the photo coupler 500 when the output voltage from the full-wave rectifier 480 is zero (during a polarity inversion while a bell signal is being input). The Zener diode d186 prevents the capacitor Cp84 from being excess-charged. Further, the output transistor of the current mirror circuit M110, which is for circuits connected after the current mirror circuit M110, can be omitted when there is no need to transmit the bell detection signal to said circuits.

Next, the operation of the bell signal detection circuit shown in FIG. 68 will be described.

The bell signal detection circuit shown in FIG. 68 is configured such that a second pulse-width enlarging circuit 620 is added to the bell signal detection circuit of the tenth embodiment. The process of bell signal detection and the operation of the first pulse-width enlarging circuit 510 for enlarging the pulse width of current continuously flowing through the photo coupler 500, even when no current flows through the high-voltage detection circuit 490, are the same as those of the bell signal detection circuit of the tenth embodiment. Thus, a description of these will be omitted, and only the operation of the pulse-width enlarging circuit 520 will be described.

In the bell signal detection circuit of the tenth embodiment, it is possible to use a capacitor Cp81 of smaller capacity, so that current balance, when observed from the exchange, is improved drastically. However, there remains a weak point in that a bell detection signal short-breaks when the voltage outputted from the full-wave rectifier 440 is zero, which occurs during a polarity inversion when a bell signal is received. This weak point can be solved using the pulse-width enlarging circuit 520 in this way: the pulse-width enlarging circuit 520 drives the photo coupler 500 even when the output voltage from the full-wave rectifier 480 is zero. This is attained by charging and discharging the capacitor Cp84 of the pulse-width enlarging circuit 520.

Figure 69:
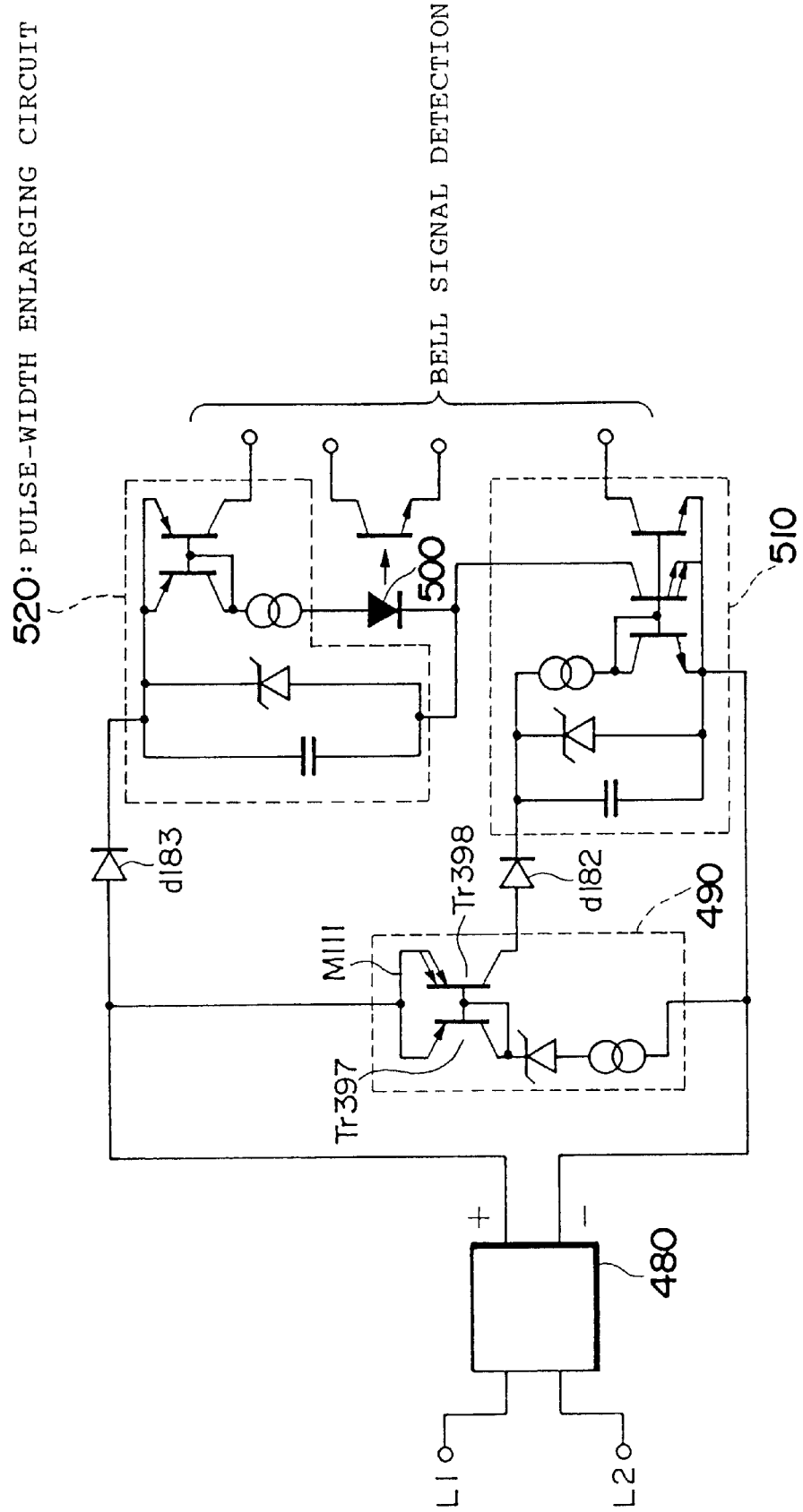
FIG. 69 illustrates a bell signal detection circuit which is a modification example of the circuit shown in FIG. 68.

FIG. 69 illustrates a modification of the bell signal detection circuit shown in FIG. 68.

In the modified bell signal detection circuit, the PNP transistors Tr397 and Tr398 are added to the high-voltage detection circuit 490, and the output terminals of the full-wave rectifier 480 are connected to these circuits in parallel. Moreover, the output terminal of the high-voltage detection circuit 490 is connected to the input terminal of the pulse-width enlarging circuit 510 via a diode d182. The bell signal detection circuit shown in FIG. 69 operates in the same manner as the circuit shown in FIG. 68.

The bell signal detection circuit of the eleventh embodiment has the following benefits.

(11-1) A bell signal detection circuit can be realized, which does not output any malfunction signal when a polarity inversion other than a bell signal occurs;

(11-2) Even when no output current from the full-wave rectifier 480 flows during a polarity inversion, a bell detection signal can be obtained, which is a completely continuous long pulse;

(11-3) The capacity of the capacitor Cp83 can be smaller than that of the capacitor Cp80 of the ninth embodiment;

(11-4) Observed from the power supplier, current is well-balanced.

<<Twelfth Embodiment>>

FIG. 70(*a*) and (*b*) illustrates a bell signal detection circuit of the twelfth embodiment according to the present invention. The circuit in FIG. 70(*a*) corresponds to that in FIG. 61. The circuit in FIG. 70(*b*) corresponds to that in FIG. 63.

The bell signal detection circuit has a full-wave rectifier 550, a constant-current pulse outputting circuit 560 and a photo coupler 570. The full-wave rectifier 550 full-wave-rectifies voltage between the communication lines L1 and L2 from the exchange, and provides a positive and negative power supplies via the positive and negative electrode terminals V+ and V−, respectively. The constant-current pulse outputting circuit 560 outputs constant current only when the voltage between the positive and negative electrode terminals is within a predetermined range. The photo coupler 570, which is means for sending a bell signal, transmits a bell detection signal to the controlling circuit having a different ground level.

The constant-current pulse outputting circuit 560 is made up, for example, of one of the circuits shown in FIG. 3, FIG. 7 or FIG. 13, and the circuit to which one of the circuits shown in FIG. 10 through FIG. 12 is connected.

In the constant-current pulse outputting circuit 560, the predetermined high voltage V2 is set to less than the lower limit (about 200V) of the voltage between the communication lines when an insulation test for a telephone device is made. The predetermined low voltage V1 is set to a value (about 48V) larger than the voltage between the communication lines L1 and L2 during standby. Further, when a current mirror circuit for outputting is not necessary (in the constant-current pulse outputting circuit 560, which flows constant current only between predetermined high voltage and low voltage), for connection to a subsequent circuit, the current mirror circuit can be omitted.

The operation of the bell signal detection circuit shown in FIG. 70 is the same as that of the eighth embodiment, so its description is omitted.

As stated earlier, there is an insulation test in which high voltages are sent through the communication lines L1 and L2. The predetermined high voltage V2 of the constant-current pulse outputting circuit 560 is set to less than a lower limit voltage determined during the insulation test. When a steady-state voltage is applied between the communication lines, exceeding the voltage V2, no current flows through the constant-current pulse outputting circuit 560. During the transient state before reaching the steady-state voltage in the insulation test, current flows only for a brief moment when the transient voltage enters the voltage range V1–V2.

The bell signal detection circuit of the twelfth embodiment has the following benefits.

(12-1) A bell signal detection circuit can be realized, which does not output a malfunction signal when a polarity inversion other than a bell signal occurs;

(12-2) A bell signal detection circuit can be realized without any capacitor;

(12-3) A bell signal detection circuit can be realized using a small number of parts;

(12-4) When an insulation test is performed, a high voltage is applied to the communication lines. During the insulation test, only isolated short impulses may be outputted. Thus, the bell signal detection circuit passes the insulation test.

<<Thirteenth Embodiment>>

Figure 71A:
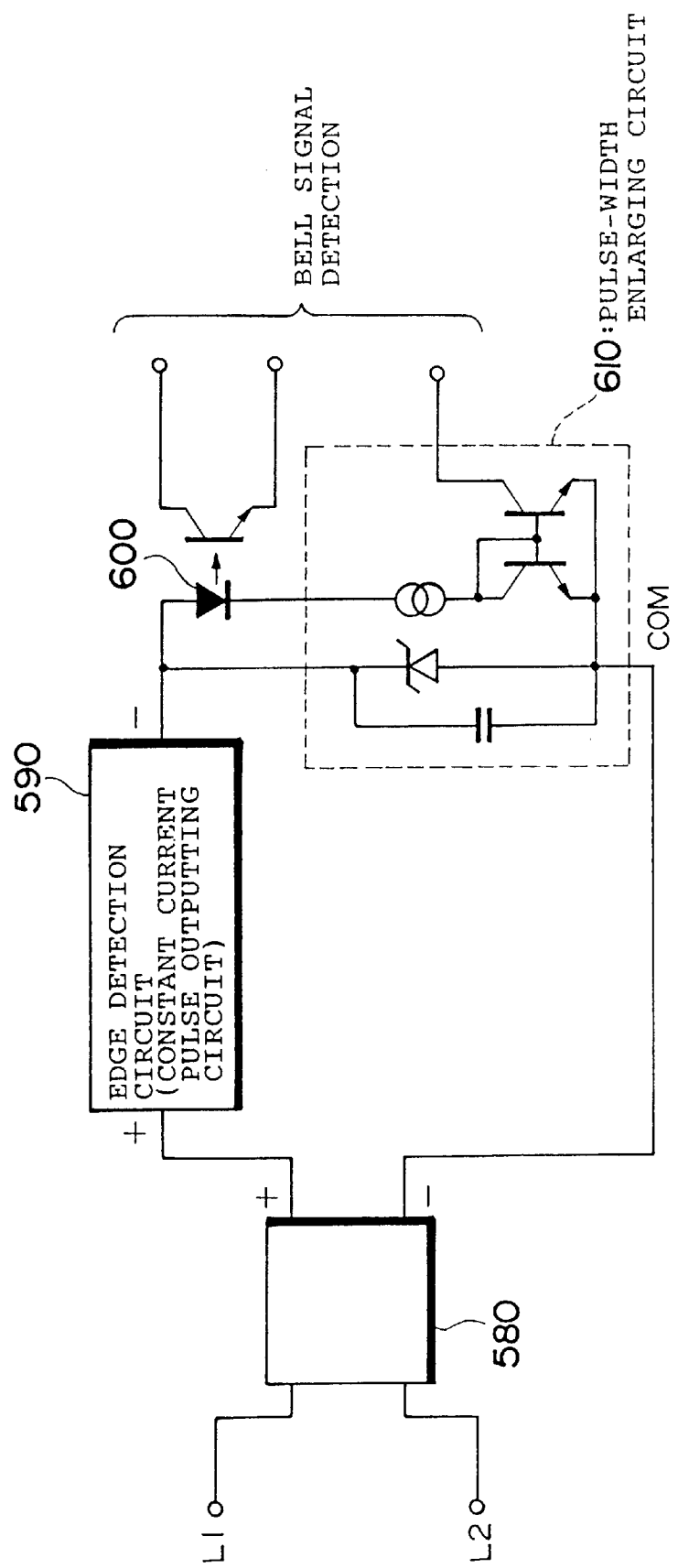
FIG. 71 illustrates a bell signal detection circuit of a thirteenth embodiment according to the present invention.
Figure 71B:
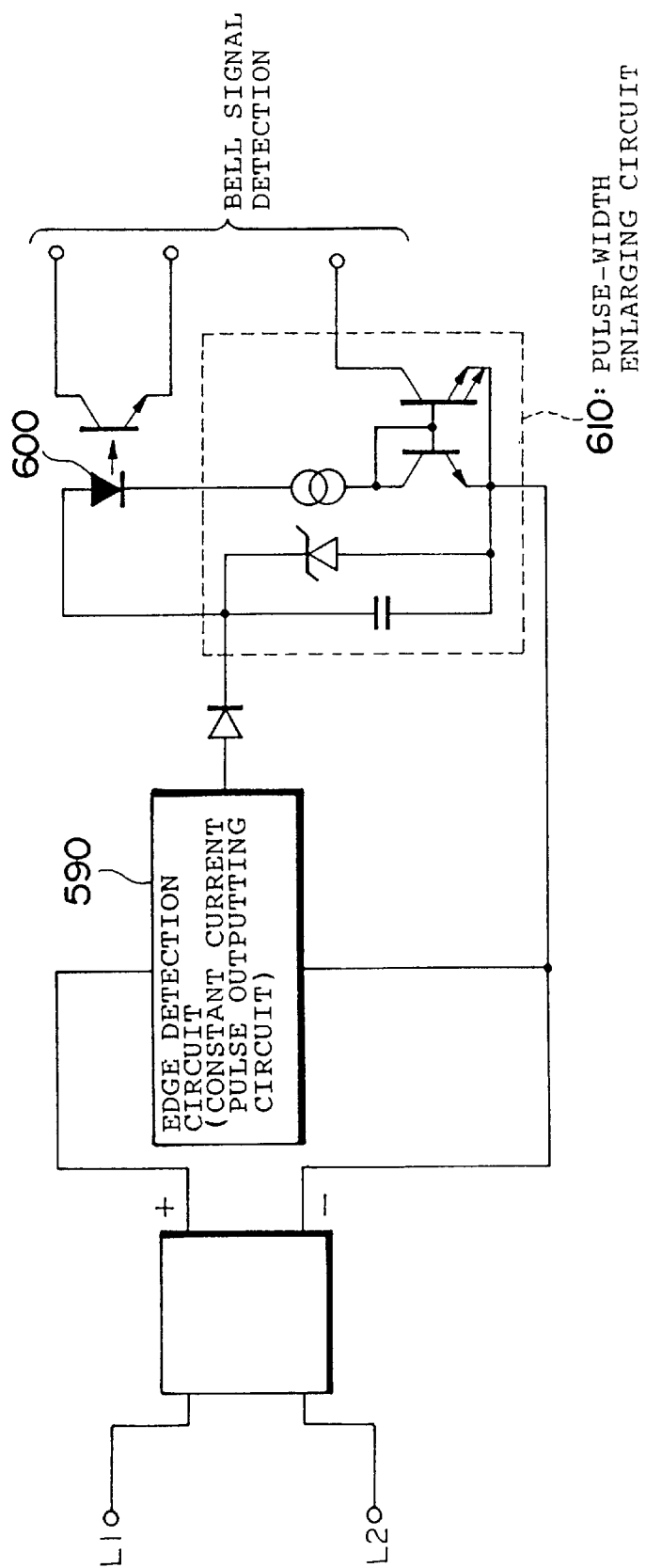

FIG. 71(*a*) and (*b*) illustrate bell signal detection circuits (part 1 and part 2) of the thirteenth embodiment according to the present invention. FIG. 71(*a*) corresponds to FIG. 64 while FIG. 71(*b*) corresponds to FIG. 65.

The bell signal detection circuit shown in FIG. 71(*a*) has a full-wave rectifier circuit 580, a constant-current pulse outputting circuit 590, a photo coupler 600 and a pulse-width enlarging circuit 610. The full-wave rectifier 580 full-wave rectifies voltage between the communication lines L1 and L2 from the exchange. The constant-current pulse outputting circuit 590 outputs constant current when the voltage between the positive and negative electrode terminals of the full-wave rectifier 680 is between a predetermined range. The photo coupler 600, which is used as a bell signal sending means, transmits a bell detection signal to the controlling circuit using a different ground level. The pulse-width enlarging circuit 610 enlarges the width of the current flowing through the photo coupler 600.

The constant-current pulse outputting circuit 590 has the same configuration as the constant-current pulse outputting circuit 560 of the twelfth embodiment, while the pulse enlarging circuit 610 has the same configuration as the pulse enlarging circuit shown in FIG. 64, which is of the ninth embodiment. Thus, the bell signal detection circuit shown in FIG. 71 (*a*) is configured such that the high voltage circuit shown in FIG. 64 is replaced with a constant-current outputting circuit. The predetermined high and low voltages of the constant-current pulse outputting circuit 590 are set in the same manner as in the twelfth embodiment that is, they are set so that the sum of the predetermined high voltage and the voltage of the Zener diode of the pulse-width enlarging circuit 610 is less than the lower limit voltage obtained from the insulation test.

The bell signal detection circuit shown in FIG. 71(*b*) is configured such that the high voltage detection circuit 410 in the bell signal detection circuit shown in FIG. 65 is replaced with the constant-current pulse outputting circuit 590. The predetermined high voltage of the constant-current pulse outputting circuit 590 is set in the same manner as that of the constant-current pulse outputting circuit 560.

The bell signal detection operation is the same as that of the bell signal detection circuit of the ninth embodiment. The operation of responding to an applied voltage for the insulation test is the same as that of the bell signal detection circuit of the twelfth embodiment.

As described above, the bell signal detection circuit of the thirteenth embodiment has the following benefits.

(13-1) A bell signal detection circuit is realized, which does not output any malfunction signal when a normal polarity inversion other than a bell signal occurs;

(13-2) When the full-wave rectifier outputs zero voltage in a polarity inversion, a bell detection signal that is a completely continuous long pulse can be outputted;

(13-3) A high voltage is applied to the communication lines when an insulation test is performed. During the insulation test, isolated short impulses are only outputted, and the bell signal detection circuit passes the insulation test.

<<Fourteenth Embodiment>>

Figure 72A:
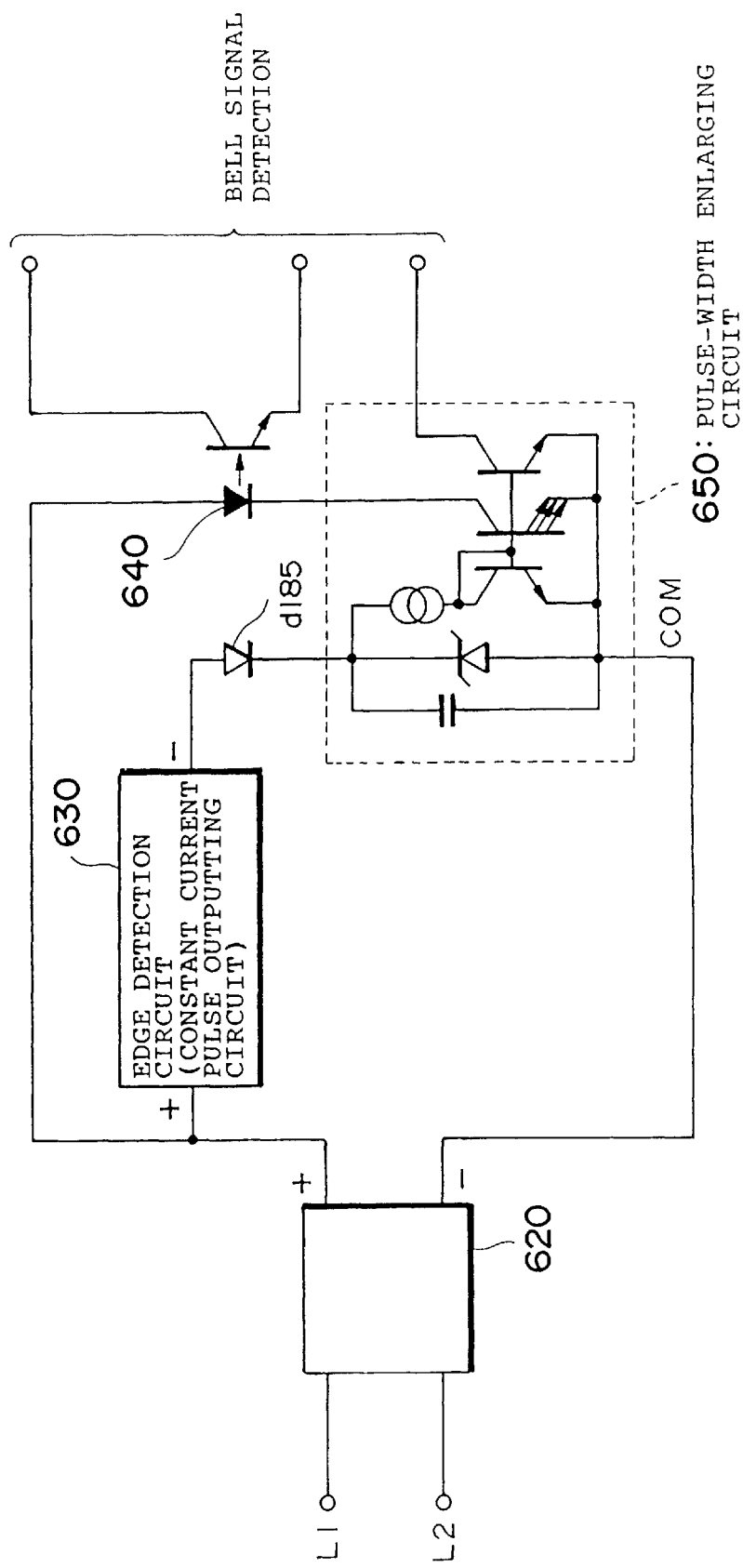
FIG. 72 illustrates a bell signal detection circuit of a fourteenth embodiment according to the present invention.
Figure 72B:
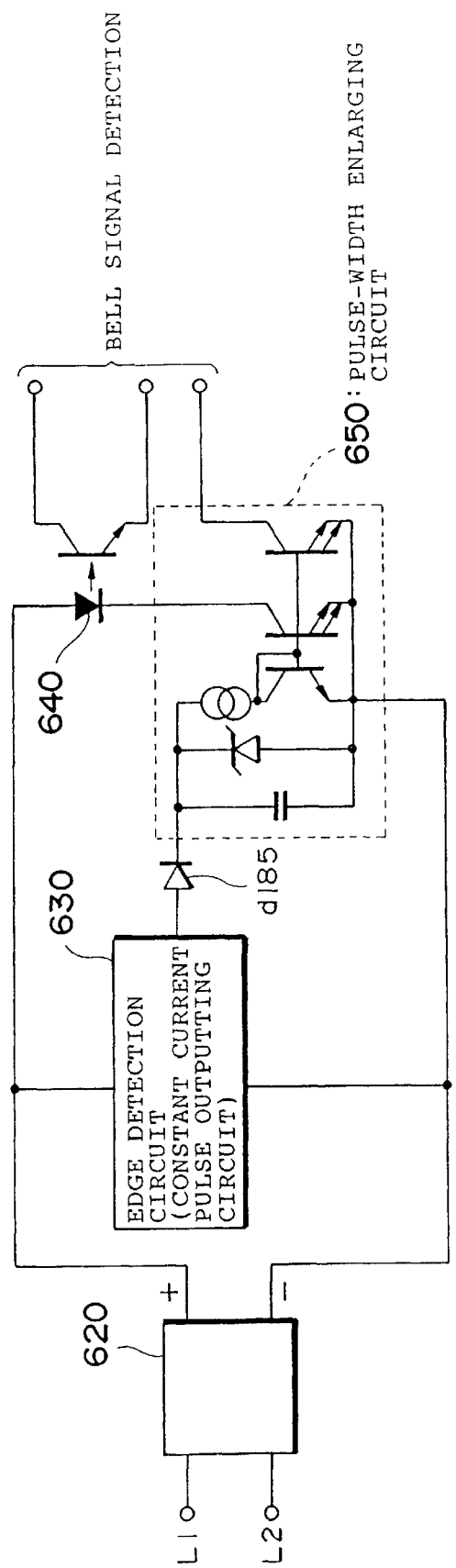

FIG. 72(*a*) and (*b*) illustrate bell signal detection circuits of the fourteenth embodiment according to the present invention. FIG. 72 (a) corresponds to FIG. 72(b) while FIG. 72(b) corresponds to FIG. 67.

Each of these bell signal detection circuits has a full-wave rectifier 620, a constant-current pulse outputting circuit 630, a photo coupler 640, a pulse-width enlarging circuit 650 and a backward-current-proof diode d185. The full-wave rectifier 620 full-wave-rectifies voltage between the communication lines from the exchange, and supplies electric power via positive and negative electrode terminals V+ and V− to subsequent circuits. The constant-current pulse outputting circuit 630 causes constant current to flow when the voltage between the positive and negative electrode terminals is within a predetermined voltage range. The photo coupler, which is used as a bell signal sending means, whose power source terminal is connected to the positive power supply V+ outputted from the full-wave rectifier 620, transmits a bell detection signal to the controlling circuit having a different ground level. The pulse-width enlarging circuit 650 enlarges the pulse width of the current flowing through the photo coupler 640. The backward-current proof diode d185 is connected between the constant-current pulse outputting circuit and the pulse-width enlarging circuit 650.

The constant-current pulse outputting circuit 630 has the same configuration as that of the constant-current pulse outputting circuit 560 of the twelfth embodiment. The full-wave rectifier 620, the photo coupler 640, the pulse-width enlarging circuit 650 and the diode d185 are the same as those of the tenth embodiment.

In the bell signal detection circuit shown in FIG. 72(a), the high voltage detection circuit 450 of the bell signal detection circuit shown in FIG. 66 is replaced with the constant-current pulse outputting circuit 630. Further, the full wave rectifier 620, which is the same as that shown in FIG. 66, the constant-current pulse outputting circuit 630, the photo coupler, a pulse-width enlarging circuit 650 and the diode d185 are connected. Similarly, in the bell signal detection circuit shown in FIG. 72(b), the high voltage detection circuit 450 of the bell signal detection circuit shown in FIG. 67 is replaced with the constant-current pulse outputting circuit 630. Further, the full-wave rectifier 620, which is the same as that shown in FIG. 67, the constant-current pulse outputting circuit 630, the photo coupler 640, the pulse-width enlarging circuit 650 and the diode d185 are connected.

In the bell signal detection circuit shown in FIG. 72(a), the predetermined high and low voltages of the constant-current pulse outputting circuit 630 is determined in the same manner as those of the twelfth embodiment, being set so that sum of the predetermined high voltage and the Zener voltage of the Zener diode in the pulse-width enlarging circuit 610 is less than the lower limit voltage determined during the insulation test.

In the bell signal detection circuit shown in FIG. 72(b), the predetermined high voltage of the constant-current pulse outputting circuit 630 is set in the same manner as that of constant-current pulse outputting circuit 560 of the twelfth embodiment.

The bell signal detection operation of these circuits are the same as that of the bell signal detection circuit of the tenth embodiment. Responding to an applied voltage in the insulation test is the same as that in the bell signal detection circuit of the twelfth embodiment.

Thus, the bell detection circuit of the fourteenth embodiment has the following benefits.

(14-1) A bell signal detection circuit can be realized, which does not output any malfunction signal when a polarity inversion other than a bell signal occurs;

(14-2) A conventional row of short impulses making up a detection output signal can be changed into a row of pulses with wider pulse widths (except when the full-wave rectifier outputs zero voltage during a polarity inversion, in which case short breaks occur in the detection signal);

(14-3) The capacity of the embedded capacitor can be smaller than that of the capacitor of the thirteenth embodiment;

(14-4) Observed from the power supplier, supplied current is well-balanced;

(14-5) A high voltage is applied to the communication lines when an insulation test is performed. During the insulation test, isolated short impulses are only outputted, and the bell signal detection circuit passes the insulation test.

<<Fifteenth Embodiment>>

Figure 73A:
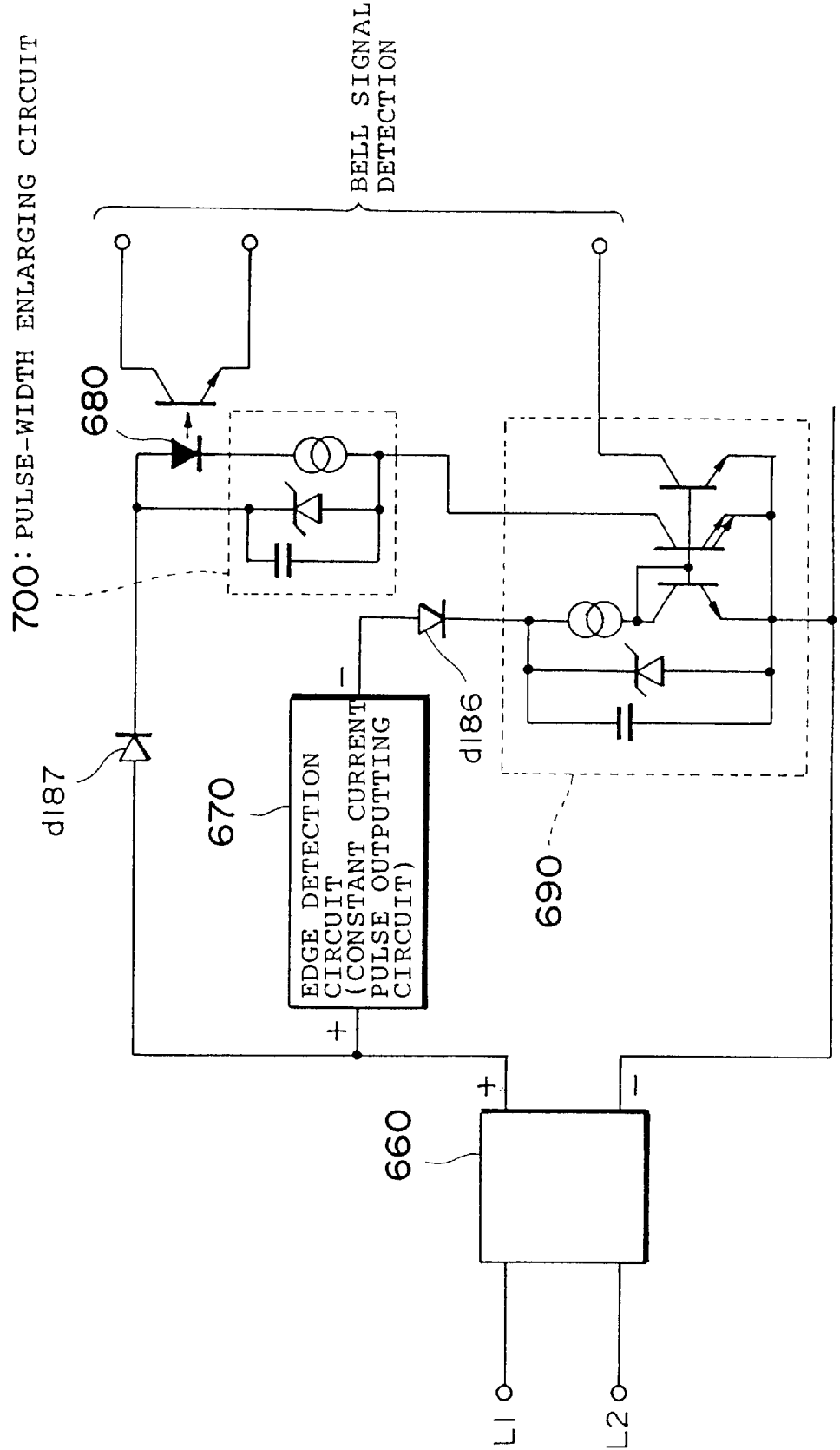
FIG. 73 illustrates a bell signal detection circuit of a fifteenth embodiment according to the present invention.
Figure 73B:
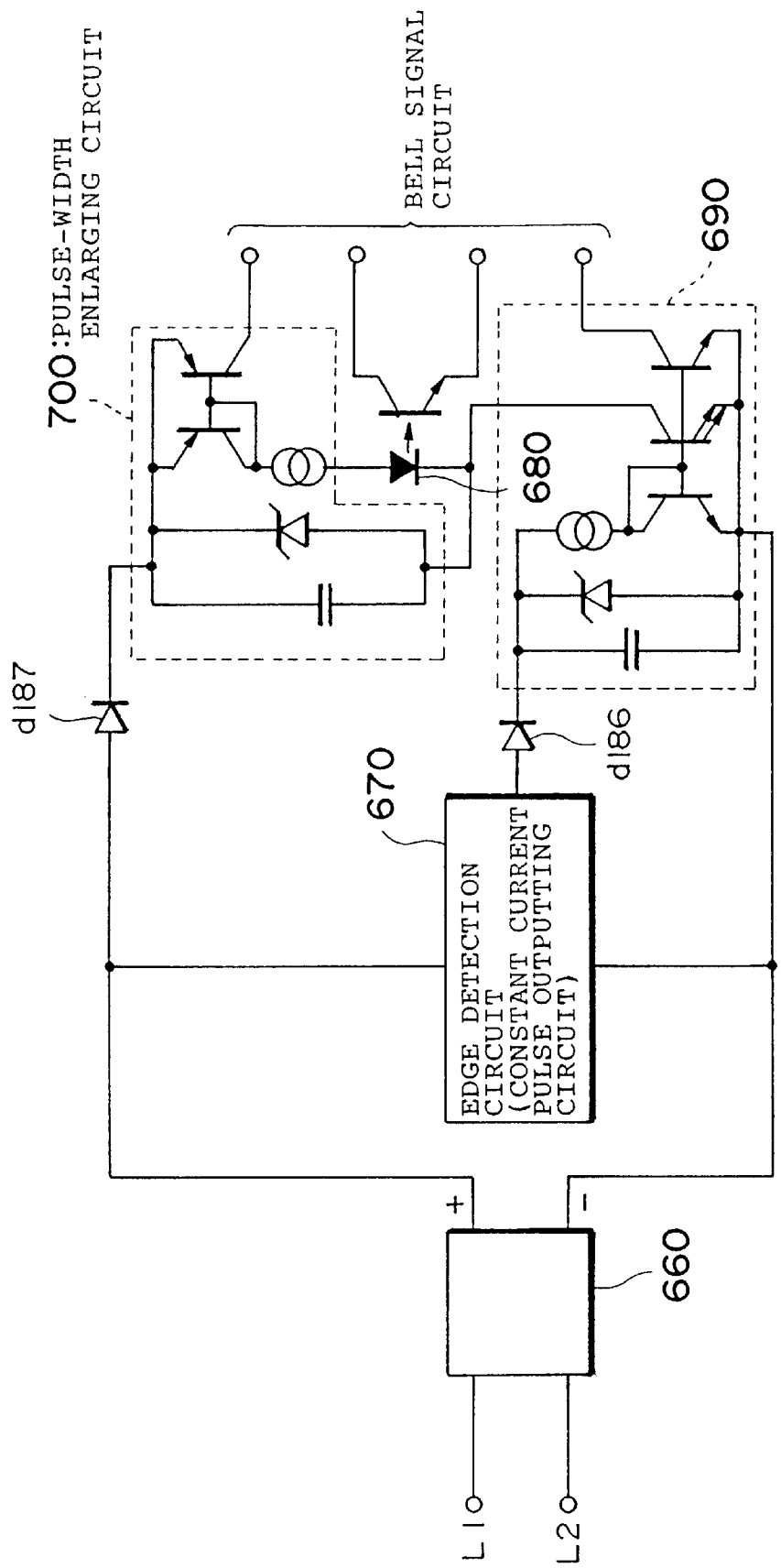

FIG. 73(a) and (b) illustrate bell signal detection circuits of the fifteenth embodiment according to the present invention. FIG. 73.(a) corresponds to FIG. 68 while FIG. 73(b) corresponds to FIG. 69.

Each of these bell signal detection circuits has a full-wave rectifier 660, a constant-current pulse outputting circuit 670, a photo coupler 680, thus pulse-width enlarging circuits 690 and 700, and two backward-current-proof diodes d186 and d187. The full-wave rectifier 660 full-wave-rectifies voltage between the communication lines L1 and L2 from the exchange, and supplies electric power via positive and negative electrode terminals to subsequent circuits. The constant-current pulse outputting circuit 670 is configured in the same manner as the constant-current pulse outputting circuit 560 in the bell signal detection circuit of the twelfth embodiment. The configurations of the full-wave rectifier circuit 660, the photo coupler 680, the pulse-width enlarging circuits 690 and 700 and the diodes d186 and d187 are the same as those of the corresponding circuits of the eleventh embodiment.

In the bell signal detection circuit shown in FIG. 73(a), the high-voltage detection circuit 490 of the bell signal detection circuit shown in FIG. 68 is replaced with the constant-current pulse outputting circuit 670, which is connected to the full-wave rectifier circuit 660, the constant-current pulse outputting circuit 670, the photo coupler 680, the pulse-width enlarging circuits 690 and 700 and the diodes d186 and d187. In the bell signal detection circuit shown in FIG. 73(b), the high-voltage detection circuit 490 of the bell signal detection circuit shown in FIG. 69 is replaced with a constant-current pulse outputting circuit 670, and the full-wave rectifier 660 which is identical to that shown in FIG. 69, the photo coupler 680, the pulse-width enlarging circuits 690 and 700 and the diodes d186 and d187 are connected to it.

In the bell signal detection circuit shown in FIG. 73(a), the high and low voltages of the constant-current pulse outputting circuit 670 are determined in the same manner as in the twelfth embodiment. The sum of the high voltage and the Zener voltage of the Zener diode in the pulse-width enlarging circuit 690 is determined so that it is less than the lower limit of an insulation test voltage.

In the bell signal detection circuit shown in FIG. 73(b), the high voltage of the constant-current pulse outputting circuit is determined in the same manner as that of the constant-current pulse outputting circuit 560 of the twelfth embodiment.

The bell signal detection operation in the above bell signal detection circuits is the same as that of the bell signal detection circuit of the eleventh embodiment. The responding operation o responding to an applied voltage in insulation test is the same as that of the bell signal detection circuit of the twelfth embodiment.

The bell signal detection circuits of the fifteenth embodiment each have the following benefits.

(15-1) A bell signal detection circuit can be realized, which does not output any malfunction signal when a polarity inversion other than a bell signal occurs;

(15-2) When the full-wave rectifier outputs zero voltage during a polarity inversion, a bell detection signal that is completely continuous long pulse can be outputted;

(15-3) Internal capacitors can be smaller;

(15-4) Observed from the power supplier, the supplied current is well-balanced;

(15-5) A high voltage is applied to the communication lines when an insulation test is performed. During the insulation test, isolated short impulses are only outputted, and the bell signal detection circuit passes the insulation test.

It will be noted that the present invention is not limited to the embodiments that is, a variety of modifications above the embodiment can be made. For example, the circuit shown in FIG. 3, which is used for the edge detection circuits 30A and 30B, can be connected to a light-emitting device and an isolator in series, or to an input terminal of the current mirror circuit, and, the output terminal of the current mirror circuit can be connected to a light-emitting device and to an isolator. Moreover, the voltage Von can be set to the lower limit of the normal voltage of a power supply while the voltage Voff, to the upper limit. In this way, a DC power source monitoring circuit for monitoring the DC power supply can be configured. That is, the light-emitting device and the isolator operate while a normal voltage is being outputted.

In the constant-current monostable multivibrator shown in FIG. 38(a) through FIG. 40, the minimum working voltage for said multivibrator is a little large, the maximum working voltage dependents on its device withstand voltage. That is, the operating voltage range is wide and dissipation power during standby is almost zero. Therefore, the constant-current monostable multivibrator can be used as a delay circuit for various apparatus, or as a time-constant circuit to force them to be turned on.

The control power source circuit 230 operates to prevent excess current from flowing, and for this the constant-current loops 231a and 231b are inserted. Moreover, when a large voltage is applied, the Zener diodes d92 and d94 operate. That is, when no load is connected, dissipation of power is zero. Thus, the control power source circuit 230 can be used as a voltage surge suppresser, which stays connected. Moreover, when setting is made in such a way that the diodes d92 and d94 are always in an on-state, a voltage determined by diodes d92 and d94 is outputted when a low amount of current is outputted. Also, when the load is heavy, a constant-current determined by the constant-current loops 231a and 231b is outputted. That is, the control power source circuit 230 works as a power source circuit for supplying a constant current and a constant voltage. Thus, by connecting a full-wave rectifier before the control power source circuit 230, a DC power source, which has the characteristic of constant voltage and constant current, can be created.

Further, in the circuits according to the present invention described so far, the negative output side of the full-wave rectifier is used as a ground while the positive output side is used as a power supply. When the p-type region and n-type region of transistors are reversed, and the direction of the anodes and cathodes of diodes are likewise reversed, the same function as the circuits can be attained in which the positive output side of the full-wave rectifier circuit is used as a ground while the negative output side is used as a power supply.

What is claimed is:

1. A monostable multivibrator that dissipates substantially no electric power when outputting no current, the monostable multivibrator comprising:
   a current permission circuit which permits a first current and a second current to flow in response to an input trigger; and
   a current forbidding circuit which forbids the first current from flowing upon expiration of a specific period from the occurrence of the trigger, the current forbidding circuit including a capacitor that is charged by the second current to develop a voltage, and a voltage detection circuit which detects when the voltage reaches a specific voltage, the flow of the first current being stopped upon detection that the voltage has reached the specific voltage,
   wherein the voltage detection circuit is activated by the second current.

2. The monostable multivibrator as set forth in claim 1, further comprising a discharging circuit which discharges the capacitor.

3. The monostable multivibrator as set forth in claim 1, further comprising a current discharging circuit which discharges the capacitor to allow the capacitor to recharge in response to a subsequent trigger before the detection that the voltage developed by the capacitor has reached the specific voltage.

4. A monostable multivibrator that dissipates substantially no electric power when outputting no current, the monostable multivibrator comprising:
   a current permission circuit which permits a constant current to flow in response to an input trigger; and
   a current forbidding circuit which forbids the constant current from flowing upon expiration of a specific period from the occurrence of the trigger, the current forbidding circuit including a capacitor that is charged by the constant current,
   wherein the current permission circuit comprises a current mirror circuit and a constant-current ON/OFF circuit that is connected to the current mirror circuit, the constant-current ON/OFF circuit receiving the trigger and being in an ON state thereafter until it receives a reset signal, the capacitor being connected to the constant-current ON/OFF circuit to receive the constant current.

5. The monostable multivibrator as set forth in claim 4, wherein the current forbidding circuit further comprises another current mirror circuit, a Schmidt trigger having an input that is connected to the constant-current ON/OFF circuit, and a switch circuit that is connected between the another current mirror circuit and the constant-current ON/OFF circuit, the switch circuit having a set input and the Schmidt trigger having an output that is connected to the set input.

6. The monostable multivibrator as set forth in claim 5, wherein the Schmidt trigger additionally has an inverted output and the switch circuit additionally has a reset input that is connected to the inverted output, and further comprising a time-constant capacitance discharge circuit that receives the trigger and that is connected to the capacitor and the input of the Schmidt trigger.

7. The monostable multivibrator as set forth in claim 4, wherein the current forbidding circuit further comprises a Schmidt trigger having an input that is connected to the capacitor.

8. The monostable multivibrator as set forth in claim 7, wherein the Schmidt trigger is selectively actuated by the current mirror circuit of the current permission means.

9. The monostable multivibrator as set forth in claims 1, wherein the current permission circuit comprises:
   a current mirror circuit; and
   a constant-current ON/OFF circuit connected to the current mirror circuit, the constant-current ON/OFF circuit receiving the input trigger and, upon receiving the input trigger, entering an ON state and remaining in the ON state until receiving a reset signal.

10. The monostable multivibrator as set forth in claim 1, wherein the current forbidding circuit further comprises:
    a switch circuit connected to an output of the current permission circuit; and
    a current mirror circuit connected to an output of the switch circuit, an output of the current mirror circuit being connected to an input of the current permission circuit.

11. The monostable multivibrator as set forth in claim 10, wherein the current forbidding circuit further comprises a Schmidt trigger circuit, the Schmidt trigger circuit receiving an output of the current permission circuit and having its output connected to an input of the switch circuit.

12. A monostable multivibrator comprising:
    a first current mirror circuit;
    a constant-current ON/OFF circuit receiving as one input an input trigger and as a second input an output of the first current mirror circuit;
    a switch circuit receiving as an input an output of the constant-current ON/OFF circuit; and
    a second current mirror circuit receiving as an input an output of the switch circuit and providing an output connected to a further input of the constant-current ON/OFF circuit.

13. The monostable multivibrator as set forth in claim 12, further comprising:
    a capacitor connected in parallel with the switch circuit and the second current mirror circuit.

14. The monostable multivibrator as set forth in claim 13, further comprising:
    a discharge circuit connected in parallel with the capacitor and receiving the trigger input as an input, wherein the trigger input triggers the discharge circuit to operate to discharge the capacitor.

15. The monostable multivibrator as set forth in claim 12, further comprising:
    a Schmidt trigger circuit receiving as an input the output of the constant-current ON/OFF circuit and providing at least one output signal as an input to the switch circuit.

* * * * *